United States Patent
Saraee et al.

(10) Patent No.: US 12,277,748 B2
(45) Date of Patent: *Apr. 15, 2025

(54) SYSTEMS AND METHODS FOR MANAGING COMPUTER MEMORY FOR SCORING IMAGES OR VIDEOS USING SELECTIVE WEB CRAWLING

(71) Applicant: VIZIT LABS, INC., Boston, MA (US)

(72) Inventors: Elham Saraee, Medford, MA (US); Jehan Hamedi, Wellesley, MA (US); Zachary Halloran, Franklin, MA (US)

(73) Assignee: VIZIT LABS, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,151

(22) Filed: Oct. 14, 2024

(65) Prior Publication Data

US 2025/0037421 A1    Jan. 30, 2025

Related U.S. Application Data

(60) Continuation of application No. 18/587,524, filed on Feb. 26, 2024, now Pat. No. 12,020,471, which is a
(Continued)

(51) Int. Cl.
*G06V 10/40* (2022.01)
*G06F 16/438* (2019.01)
(Continued)

(52) U.S. Cl.
CPC .......... *G06V 10/761* (2022.01); *G06F 16/438* (2019.01); *G06N 3/045* (2023.01); *G06V 10/40* (2022.01); *G06V 10/82* (2022.01)

(58) Field of Classification Search
CPC ...... G06V 10/761; G06V 10/40; G06V 10/82; G06F 16/438; G06N 3/045
(Continued)

(56) References Cited

U.S. PATENT DOCUMENTS 7,813,822 B1 * 10/2010 Hoffberg ............... H04N 7/163
                                                          381/73.1
8,825,662 B1    9/2014 Kingman et al.
(Continued)

FOREIGN PATENT DOCUMENTS

JP    2007-114864 A    5/2007

OTHER PUBLICATIONS

Haccius et al., "Computer Vision Performance and Image Quality Metrics: a Reciprocal Relation," Telecommunications Lab, Saarland University, Saarbrucken, Germany, Dec. 29, 2016, pp. 27-37 (11 pages).

*Primary Examiner* — Charlotte M Baker
(74) *Attorney, Agent, or Firm* — FOLEY & LARDNER LLP

(57) ABSTRACT

A method includes storing a database comprising a plurality of pointers to web pages and identifiers of entities associated with the plurality of pointers; receiving a first request comprising a first identifier; identifying subset of the plurality of pointers from the database responsive to each pointer of the subset having a stored association with a first identification that matches the first identifier; responsive to identifying the subset of the plurality of pointers, establishing, via one or more pointers, a connection with a server hosting a set of web pages associated with the subset of the plurality of pointers; retrieving one or more images or videos from each of the set of web pages over the established connection; calculating a performance score for each of the one or more images or videos; and generating a record identifying the performance score for each of the one or more images or videos.

23 Claims, 16 Drawing Sheets

Related U.S. Application Data continuation of application No. 18/466,465, filed on Sep. 13, 2023, now Pat. No. 11,915,469, which is a continuation of application No. 18/200,102, filed on May 22, 2023, now Pat. No. 11,763,546, which is a continuation-in-part of application No. 17/833,671, filed on Jun. 6, 2022, now Pat. No. 11,804,028, which is a continuation of application No. 17/548,341, filed on Dec. 10, 2021, now Pat. No. 11,417,085, which is a continuation-in-part of application No. 16/537,426, filed on Aug. 9, 2019, now abandoned, which is a division of application No. 15/727,044, filed on Oct. 6, 2017, now Pat. No. 10,380,650.

(60) Provisional application No. 63/348,984, filed on Jun. 3, 2022, provisional application No. 62/537,428, filed on Jul. 26, 2017.

(51) Int. Cl.
*G06N 3/045* (2023.01)
*G06V 10/74* (2022.01)
*G06V 10/82* (2022.01)

(58) Field of Classification Search
USPC .......................................................... 382/157
See application file for complete search history.

(56) References Cited

U.S. PATENT DOCUMENTS

| | | |
|---|---|---|
| 10,162,865 B2 | 12/2018 | Yuen et al. |
| 10,380,650 B2 | 8/2019 | Hamedi et al. |
| 10,489,799 B2 | 11/2019 | Smith |
| 10,592,074 B2 | 3/2020 | Hamedi et al. |
| 10,650,073 B1 | 5/2020 | Manzi et al. |
| 11,922,675 B1 | 3/2024 | Saraee et al. |
| 11,922,683 B2 | 3/2024 | Kazmi et al. |
| 2008/0195649 A1 | 8/2008 | Lefebvre |
| 2010/0028846 A1 | 2/2010 | Cohen et al. |
| 2012/0155778 A1 | 6/2012 | Buchmueller et al. |
| 2012/0213452 A1 | 8/2012 | Matsuyama et al. |
| 2014/0201707 A1 | 7/2014 | Schroeder |
| 2014/0307958 A1 | 10/2014 | Wang et al. |
| 2014/0344186 A1 | 11/2014 | Nadler |
| 2015/0109337 A1 | 4/2015 | Hofmann et al. |
| 2015/0379557 A1 | 12/2015 | Liu et al. |
| 2016/0005175 A1 | 1/2016 | Fujita |
| 2016/0124911 A1 | 5/2016 | Ying |
| 2016/0125451 A1 | 5/2016 | Garg et al. |
| 2016/0132935 A1 | 5/2016 | Shen et al. |
| 2016/0140623 A1 | 5/2016 | Gupta et al. |
| 2016/0299906 A1 | 10/2016 | Cartoon et al. |
| 2017/0236407 A1 | 8/2017 | Rhoads et al. |
| 2019/0066313 A1 | 2/2019 | Kim et al. |
| 2019/0339824 A1 | 11/2019 | Hamedi et al. |
| 2020/0379659 A1* | 12/2020 | Faibish ................ G06F 3/0641 |
| 2020/0401793 A1* | 12/2020 | Leung ................ G06V 10/147 |
| 2021/0398265 A1 | 12/2021 | Baijal et al. |

* cited by examiner

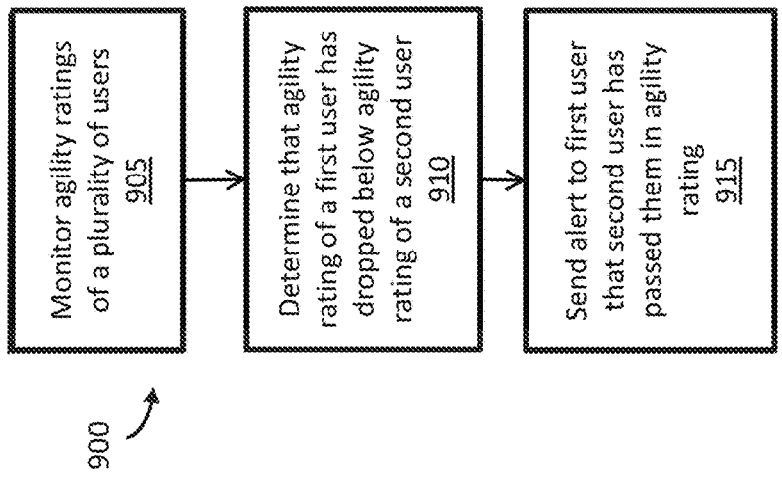
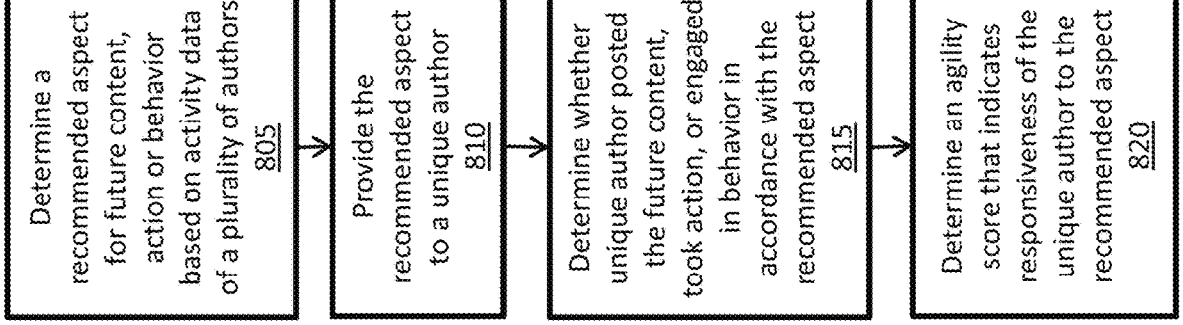

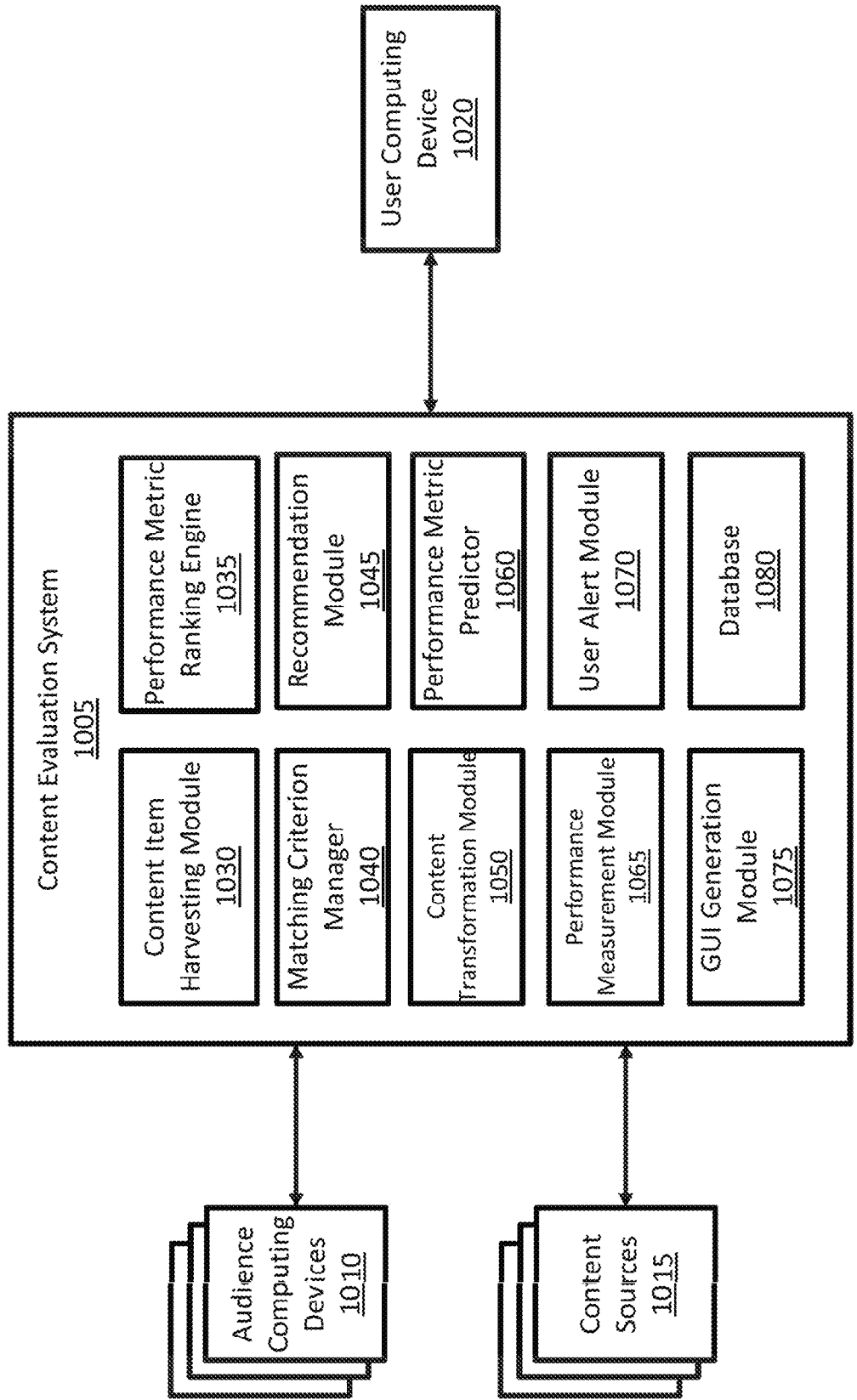

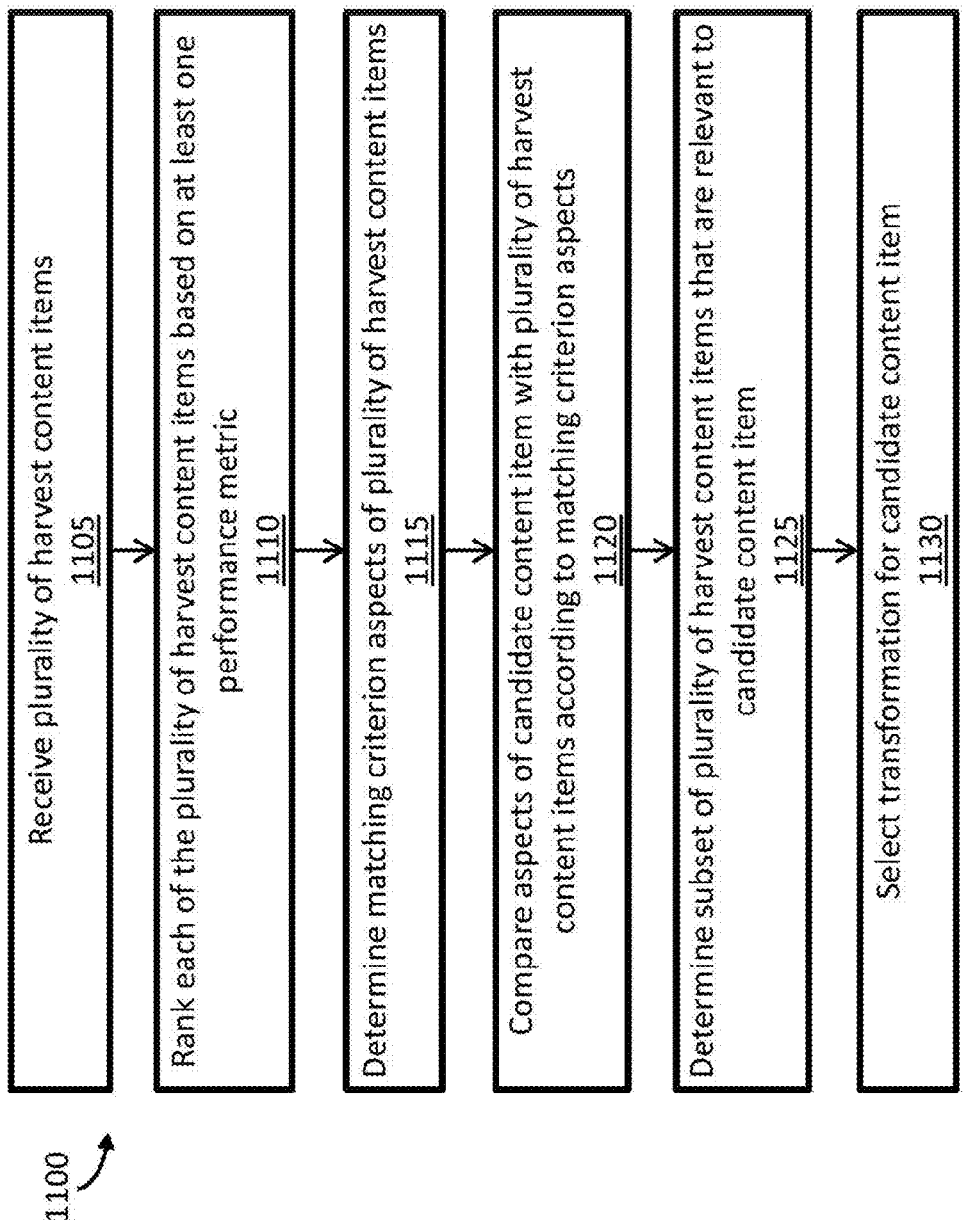

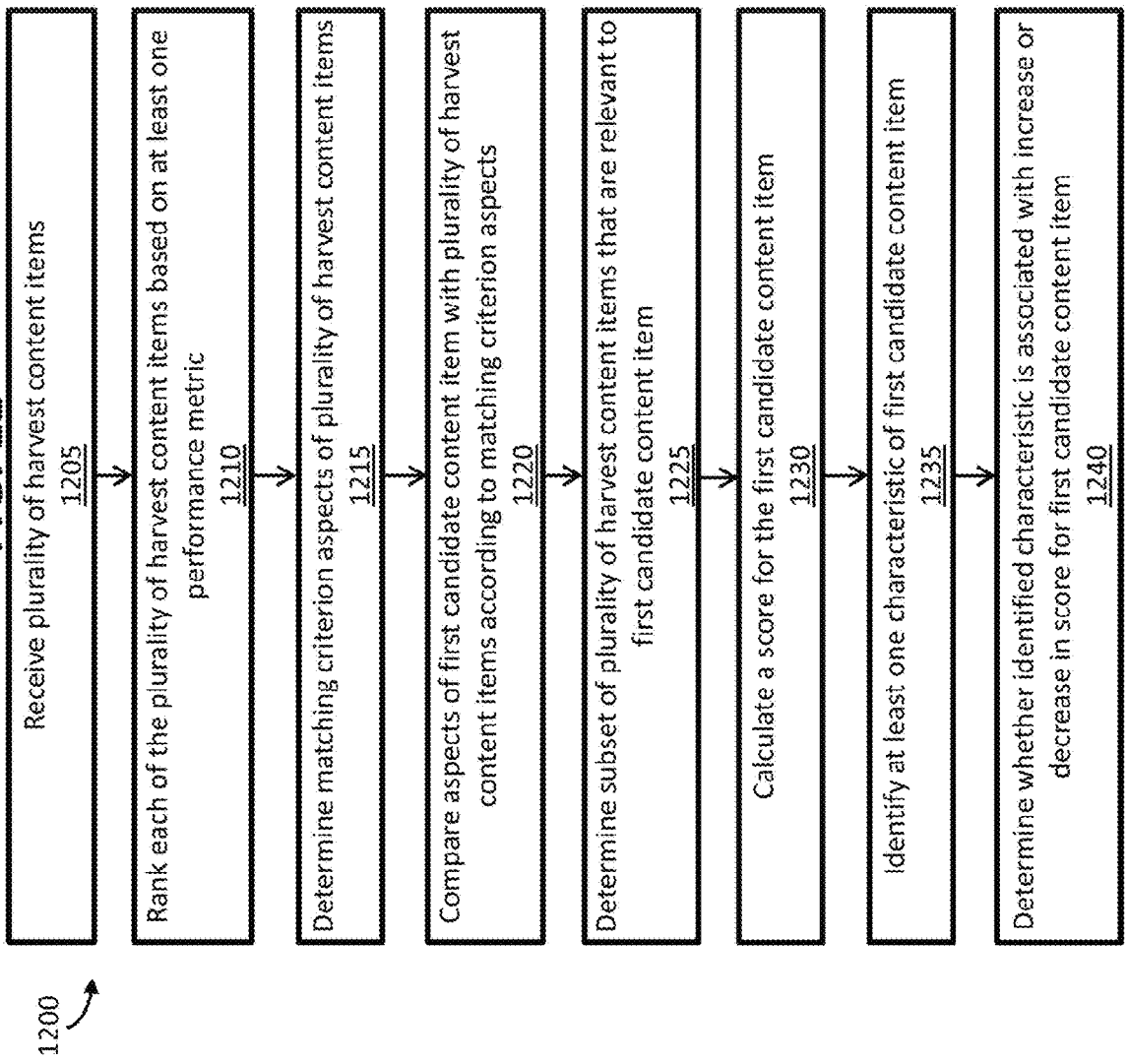

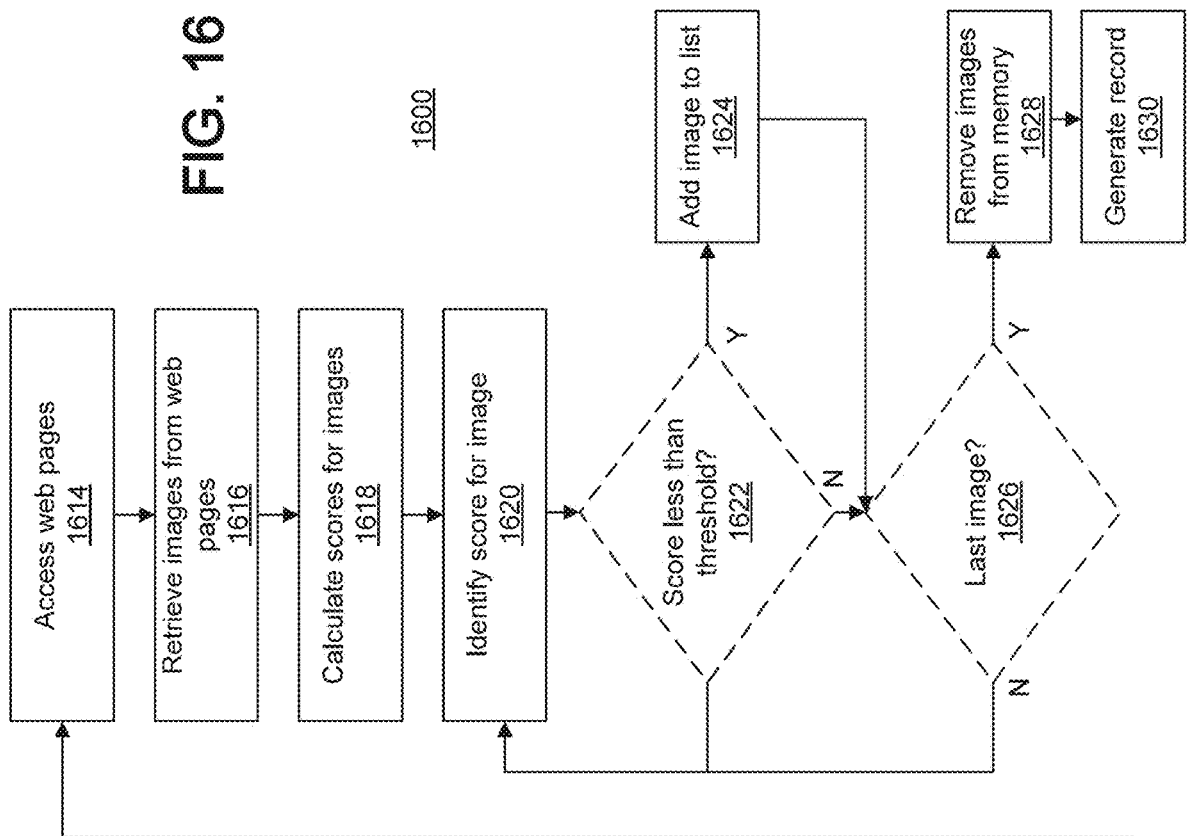
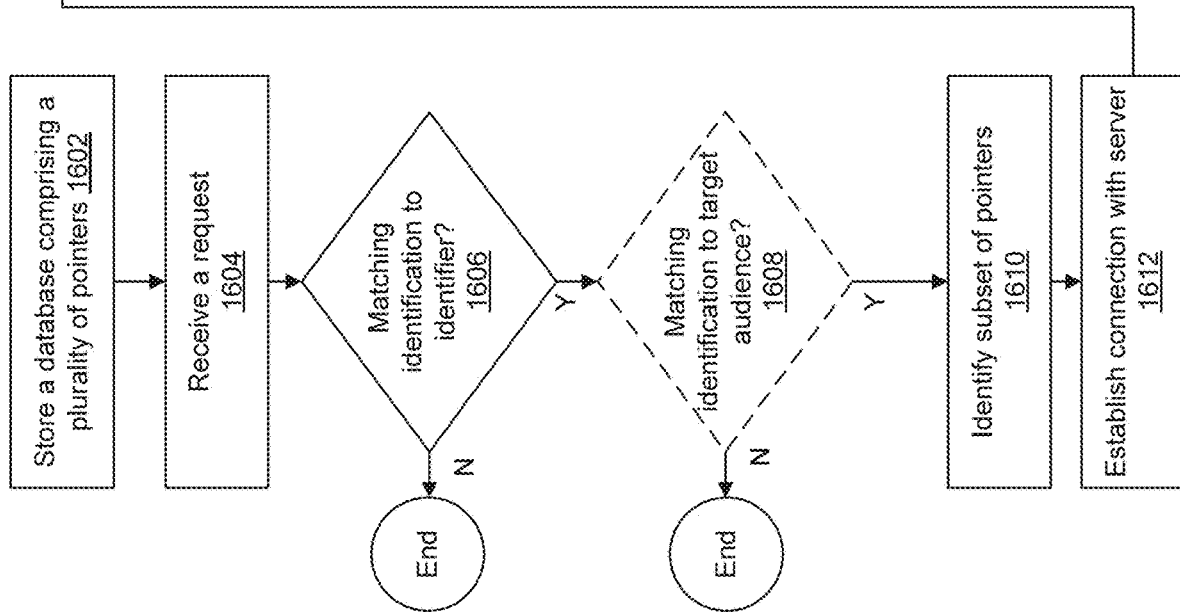
FIG. 16

SYSTEMS AND METHODS FOR MANAGING COMPUTER MEMORY FOR SCORING IMAGES OR VIDEOS USING SELECTIVE WEB CRAWLING

CROSS-REFERENCE TO RELATED APPLICATIONS

This application claims the benefit of priority as a Continuation to U.S. application Ser. No. 18/736,422, filed Jun. 6, 2024, which claims the benefit of priority as a continuation to U.S. application Ser. No. 18/587,524, filed Feb. 26, 2024, which claims the benefit of priority as a continuation to U.S. application Ser. No. 18/466,465 filed Sep. 13, 2023, which claims the benefit of priority as a continuation to U.S. patent application Ser. No. 18/200,102, filed May 22, 2023, which claims the benefit of priority as a continuation-in-part to U.S. patent application Ser. No. 17/833,671, filed Jun. 6, 2022, which claims the benefit of priority as a continuation to U.S. patent application Ser. No. 17/548,341, filed Dec. 10, 2021, which claims the benefit of priority as a continuation-in-part to U.S. patent application Ser. No. 16/537,426, filed Aug. 9, 2019, which claims the benefit of priority as a divisional to U.S. patent application Ser. No. 15/727,044, filed on Oct. 6, 2017, which claims the benefit of priority to U.S. Provisional Patent Application No. 62/537,428, filed Jul. 26, 2017, each of which is incorporated by reference herein in its entirety. U.S. patent application Ser. No. 18/200,102 claims the benefit of priority to U.S. Provisional Application No. 63/348,984, filed Jun. 3, 2022, the entirety of which is incorporated by reference herein.

BACKGROUND

Many people use the internet every day. Some use it to discover information such as news, recipes, phone numbers, etc. Some use the internet to communicate with others through mediums such as chat rooms, message boards, and e-mail. Traffic on the internet is large and many people use the internet for extended amounts of time.

Often times, websites may include different images and other visual or audiovisual content that are designed for a specific target audience. For example, websites may include content items that are designed to draw the target audience's attention or cause members of the target audience to select or interact with the content items in their browser. However, due to the size of the user interfaces on the browser, the bandwidth of the internet provider providing the website to the browser, and/or memory restrictions that are local to the computer executing the browser, only a small number of content items can be displayed at once. Accordingly, only a select number of content items may be displayed before the network or the computers involved in providing and/or displaying the content will start to experience significant latency or will not be able to provide the content items at all.

SUMMARY

To overcome the aforementioned technical deficiencies, a computer implementing the systems and methods described herein may use a neural network to automatically select a small number content items to include on the webpage that are still likely to draw the target audience's attention. For example, the computer may extract images from a web page that is associated with a particular target audience and generate a target audience interaction benchmark with the images by applying the extracted images to a neural network. A user may then input further images into the neural network to determine how the images compare to the benchmark and identify the images with the highest positive difference in performance with the benchmark. Advantageously, only the identified images may then be uploaded to a website to generate target audience interactions without causing the technical problems that typically accompany including a large number of images on a single webpage. Thus, the computer may select a lower number of content items to include in the website to avoid the typical technical deficiencies involved in attempting to obtain a high interaction rate on a website while achieving the same result.

One technical problem that arises when a computer generates scores for images on web pages is generating scores that indicate how images will perform on the web pages can require a large amount of memory resources. The problem may particularly appear when the computer stores the images for all web pages across a domain and for multiple domains. For instance, a computer may store a database of images that are displayed on various online web pages. If a user wishes to see how images perform for a particular website or for a particular group entity (e.g., company), the user may request scores for images on the website or for the group entity, and the computer may retrieve the images from the database and calculate scores for the images. For the results of such queries to represent a real-time view of how images on websites are likely to perform, the computer may continuously communicate with the servers that host the websites to receive images that are added or indications of images that have been removed from the websites and update a stored database accordingly (e.g., add an image to the database if the image was added to a web page or remove an image from the database if the image was removed from a web page). The memory resources that are required to store images for each web page can increase quickly as the computer stores images on an increasing number of web pages. Additionally, the processing resources that are required to maintain and update the database as images are removed or added to websites may similarly increase as the computer communicates with the various servers that host the web pages.

To overcome the aforementioned technical deficiencies, a computer implementing the systems and methods described herein may store a database that stores pointers to different domains and web pages on which images are located. The domains and web pages themselves may be stored and processed by the third-party servers that host the domains or web pages to receive web traffic (e.g., company A may have a server that hosts a website to provide a specific category of information to individuals that access the website). The computer implementing the system and methods described herein may store pointers to the website or individual pages of the website such that if the computer receives a request for data about the images that are on the website or that are associated with the third party, the computer may retrieve the images using the pointers in the database. The computer may use the pointers to access the website and scrape images from the website and/or the individual pages of the website. The computer may then calculate scores for the images and transmit a record including the scores and/or images to the requesting device. The computer may then remove the images from memory. In this way, the computer may avoid storing duplicate copies of images for individual websites or web pages (e.g., the image may only be stored by the third-party server instead of both on the server and in memory of the computing device). The computer may do so while maintaining the ability to calculate real-time performance scores for images on the websites or web pages (e.g., the computer can determine performance scores for images on websites in response to a request without updating a separate database every time images are added to or removed from the websites).

In one aspect, the present disclosure is directed to a method. The method may comprise storing, by a computing device, a database comprising a plurality of pointers to web pages and identifiers of entities associated with the plurality of pointers; receiving, by the computing device from a client device, a first request comprising a first identifier of a first entity; identifying, by the computing device, a subset of the plurality of pointers from the database responsive to each pointer of the subset having a stored association with a first identification that matches the first identifier; responsive to identifying the subset of the plurality of pointers, establishing, by the computing device via one or more pointers of the subset of the plurality of pointers, a connection with a server hosting a set of web pages associated with the subset of the plurality of pointers; retrieving, by the computing device, one or more images or videos from each of the set of web pages over the established connection; calculating, by the computing device, a performance score for each of the one or more images or videos; and generating, by the computing device, a record identifying the performance score for each of the one or more images or videos.

In some embodiments, storing the database comprising the plurality of pointers to web pages comprises storing, by the computing device, uniform resource locators for the web pages in the database. In some embodiments, identifying the subset of the plurality of pointers from the database comprises identifying, by the computing device, a single pointer to a single web page. In some embodiments, retrieving the one or more images or videos from each of the set of web pages comprises accessing, by the computing device, one or more other web pages from the single web page; and retrieving, by the computing device, the one or more images or videos from the single web page and the one or more other web pages.

In some embodiments, generating, by the computing device, the record identifying the performance score for each of the one or more images or videos comprises generating, by the computing device, a user interface comprising the one or more images or videos organized by the web pages from which the one or more images or videos were retrieved. In some embodiments, identifying the subset of the plurality of pointers from the database comprises identifying, by the computing device, a plurality of pointers to a plurality of web pages. In some embodiments, retrieving the one or more images or videos from each of the set of web pages comprises accessing, by the computing device, each of the plurality of web pages; and retrieving, by the computing device, the one or more images or videos from the plurality of web pages.

In some embodiments, the method further comprises identifying, by the computing device, an image or video of the one or more images or videos that has a performance score below a threshold, wherein generating the record comprises including, by the computing device, an indication that the image or video has a performance score below the threshold in the record. In some embodiments, the method further comprises identifying, by the computing device, a first image or video of the one or more images or videos that has a performance score below a threshold; identifying, by the computing device, a second image or video in memory that has a stored association with a performance score above the threshold; and generating, by the computing device, a recommendation to replace the first image or video with the second image or video.

In some embodiments, calculating the performance score for each of the one or more images or videos comprises executing, by the computing device, a machine learning model using the one or more images or videos as input. In some embodiments, calculating the performance score for each of the one or more images or videos further comprises comparing, by the computing device, an output of the machine learning model for each of the one or more images or videos to a threshold. The method may further comprise generating, by the computing device, a second record identifying a first image or video of the one or more images or videos responsive to a performance score for the first image or video exceeding the threshold. In some embodiments, calculating the performance score for each of the one or more images or videos further comprises comparing, by the computing device, the one or more images or videos to a threshold; and incrementing, by the computing device, a counter for each performance score that is less than the threshold. The method may further include generating, by the computing device, a second record identifying a count of the counter and the first identifier of the entity.

In some embodiments, receiving the first request comprises receiving, by the computing device, an identifier of a target audience. In some embodiments, identifying the subset of the plurality of pointers from the database comprises identifying, by the computing device, the subset of the plurality of pointers further responsive to each pointer of the subset having a stored association with a target audient identification that matches the identifier of the target audience. In some embodiments, receiving the first request comprises receiving, by the computing device, an identifier of a target audience. In some embodiments, retrieving the one or more images or videos from each of the set of web pages over the established connection comprises retrieving, by the computing device, an image or video from a web page of the set of web pages; determining, by the computing device, that the image or video is not associated with the target audience; and discarding, by the computing device, the image or video responsive to the determining that the image or video is not associated with the target audience.

In some embodiments, receiving the first request comprises receiving, by the computing device, an identifier of a target audience. In some embodiments, retrieving the one or more images or videos from each of the set of web pages over the established connection comprises retrieving, by the computing device, an image or video from a web page of the set of web pages; determining, by the computing device, that the web page is not associated with the target audience; and discarding, by the computing device, the image or video responsive to the determining that the web page is not associated with the target audience. In some embodiments, the method further comprises storing, by the computing device, the one or more images or videos in memory responsive to retrieving the one or more images or videos; and removing, by the computing device, the one or more images or videos from memory responsive to generating the record.

In another aspect, the present disclosure is directed to a system. The system may comprise one or more hardware processors configured by machine-readable instructions to store a database comprising a plurality of pointers to web pages and identifiers of entities associated with the plurality of pointers; receive, from a client device, a first request comprising a first identifier of a first entity; identify a subset of the plurality of pointers from the database responsive to each pointer of the subset having a stored association with a first identification that matches the first identifier; responsive to identifying the subset of the plurality of pointers, establish, via one or more pointers of the subset of the plurality of pointers, a connection with a server hosting a set of web pages associated with the subset of the plurality of pointers; retrieve one or more images or videos from each of the set of web pages over the established connection; calculate a performance score for each of the one or more images or videos; and generate a record identifying the performance score for each of the one or more images or videos.

In some embodiments, the one or more hardware processors are configured to store the database comprising the plurality of pointers to web pages by storing uniform resource locators for the web pages in the database. In some embodiments, the one or more hardware processors are configured to identify the subset of the plurality of pointers from the database by identifying a single pointer to a single web page. In some embodiments, the one or more hardware processors are configured to retrieve the one or more images or videos from each of the set of web pages by accessing one or more other web pages from the single web page; and retrieving the one or more images or videos from the single web page and the one or more other web pages.

In some embodiments, the one or more hardware processors are configured to generate the record identifying the performance score for each of the one or more images or videos by generating a user interface comprising the one or more images or videos organized by the web pages from which the one or more images or videos were retrieved. In some embodiments, the one or more hardware processors are configured to identify the subset of the plurality of pointers from the database by identifying a plurality of pointers to a plurality of web pages. In some embodiments, the one or more hardware processors are configured to retrieve the one or more images or videos from each of the set of web pages by accessing each of the plurality of web pages; and retrieving the one or more images or videos from the plurality of web pages.

In another aspect, the present disclosure is directed to a non-transitory computer-readable storage medium. The non-transitory computer-readable storage medium may have instructions embodied thereon, the instructions being executable by one or more processors to perform a method, the method comprising storing a database comprising a plurality of pointers to web pages and identifiers of entities associated with the plurality of pointers; receiving, from a client device, a first request comprising a first identifier of a first entity; identifying a subset of the plurality of pointers from the database responsive to each pointer of the subset having a stored association with a first identification that matches the first identifier; responsive to identifying the subset of the plurality of pointers, establishing, via one or more pointers of the subset of the plurality of pointers, a connection with a server hosting a set of web pages associated with the subset of the plurality of pointers; retrieving one or more images or videos from each of the set of web pages over the established connection; calculating a performance score for each of the one or more images or videos; and generating a record identifying the performance score for each of the one or more images or videos.

In some embodiments, storing the database comprising the plurality of pointers to web pages comprises storing uniform resource locators for the web pages in the database. In some embodiments, identifying the subset of the plurality of pointers from the database comprises identifying a single pointer to a single web page. In some embodiments, retrieving the one or more images or videos from each of the set of web pages comprises accessing one or more other web pages from the single web page; and retrieving the one or more images or videos from the single web page and the one or more other web pages.

At least one aspect of this disclosure is directed to a method. The method may include accessing, by one or more processors, a web-based property over a network, the web-based property containing a plurality of images or videos; storing, by the one or more processors, the plurality of images or videos and associations between the plurality of images or videos and a target audience identifier in a database responsive to the web-based property having a stored association with the target audience identifier in the database; retrieving, by the one or more processors, the plurality of images or videos from the database responsive to each of the plurality of images or videos having stored associations with the target audience identifier; executing, by the one or more processors, a neural network to generate a performance score for each of the plurality of images or videos; calculating, by the one or more processors, a target audience benchmark based on the performance scores for the plurality of images or videos; executing, by the one or more processors, the neural network to generate a first performance score for a first image or video and a second performance score for a second image or video; comparing, by the one or more processors, the first performance score and the second performance score to the benchmark; and generating, by the one or more processors, a record identifying the first image responsive to a first difference between the first performance score and the benchmark exceeding a second difference between the second performance score and the benchmark.

In some implementations, calculating the target audience benchmark comprises calculating, by the one or more processors, a distribution of the generated performance scores for the plurality of images or videos. In some implementations, executing the neural network to generate the performance score for the first image or video comprises generating, by the one or more processors, a feature vector comprising one or more extracted features of the first image or video, each of the one or more extracted features comprising a descriptor of the first image or video; and applying, by the one or more processors, the generated feature vector to the neural network.

In some implementations, the method further comprises selecting, by the one or more processors, the neural network from a plurality of stored neural networks responsive to the neural network having a stored association with the target audience identifier in the database. In some implementations, the method further comprises accessing, by one or more processors, a second web-based property over the network, the second web-based property containing a second plurality of images or videos; storing, by the one or more processors, the second plurality of images or videos and associations between the second plurality of images or videos and the target audience identifier in the database responsive to the second web-based property having a second stored association with the target audience identifier in the database; retrieving, by the one or more processors, the second plurality of images or videos from the database responsive to each of the second plurality of images or videos having stored associations with the target audience identifier; executing, by the one or more processors, the neural network to generate a second performance score for each of the second plurality of images or videos; and adjusting, by the one or more processors, the target audience benchmark based on the second performance scores for the second plurality of images or videos.

In some implementations, adjusting the target audience benchmark comprises increasing or decreasing, by the one or more processors, the target audience benchmark based on the second performance scores. In some implementations, comparing the first performance score and the second performance score to the target audience benchmark comprises comparing, by the one or more processors, the first performance score and the second performance score to the adjusted target audience benchmark.

In some implementations, the method may further comprise applying, by the one or more processors, a first weight to the performance scores for the plurality of images or videos and a second weight to the performance scores for the second plurality of images or videos, wherein adjusting the target audience benchmark comprises adjusting, by the one or more processors, the target audience benchmark based on the first weight and the second weight. In some implementations, the method further comprises determining, by the one or more processors, the first weight responsive to the plurality of images or videos originating from the web-based property; and determining, by the one or more processors, the second weight responsive to the second plurality of images or videos originating from the second web-based property. In some implementations, generating the record identifying the first image or video comprises generating, by the one or more processors, a recommendation to upload the first image or video to a website.

Another aspect of the present disclosure relates to a system. The system may include one or more hardware processors configured by machine-readable instructions to access a web-based property over a network, the web-based property containing a plurality of images or videos; store the plurality of images or videos and associations between the plurality of images or videos and a target audience identifier in a database responsive to the web-based property having a stored association with the target audience identifier in the database; retrieve the plurality of images or videos from the database responsive to each of the plurality of images or videos having stored associations with the target audience identifier; execute a neural network to generate a performance score for each of the plurality of images or videos; calculate a target audience benchmark based on the performance scores for the plurality of images or videos; execute the neural network to generate a first performance score for a first image or video and a second performance score for a second image or video; compare the first performance score and the second performance score to the benchmark; and generate a record identifying the first image or video responsive to a first difference between the first performance score and the benchmark exceeding a second difference between the second performance score and the benchmark.

In some implementations, the one or more hardware processors are further configured by machine-readable instructions to calculate the target audience benchmark by calculating a distribution of the generated performance scores for the plurality of images or videos.

In some implementations, the one or more hardware processors are further configured by machine-readable instructions to execute the neural network to generate the performance score for the first image or video by generating a feature vector comprising one or more extracted features of the first image or video, each of the one or more extracted features comprising a descriptor of the first image or video; and applying the generated feature vector to the neural network.

In some implementations, the one or more hardware processors are further configured by machine-readable instructions to select the neural network from a plurality of stored neural networks responsive to the neural network having a stored association with the target audience identifier in the database.

In some implementations, the one or more hardware processors are further configured by machine-readable instructions to access a second web-based property over the network, the second web-based property containing a second plurality of images or videos; store the second plurality of images or videos and associations between the second plurality of images or videos and the target audience identifier in the database responsive to the second web-based property having a second stored association with the target audience identifier in the database; retrieve the second plurality of images or videos from the database responsive to each of the second plurality of images or videos having stored associations with the target audience identifier; execute the neural network to generate a second performance score for each of the second plurality of images or videos; and adjust the target audience benchmark based on the second performance scores for the second plurality of images or videos.

In some implementations, the one or more hardware processors are further configured by machine-readable instructions to adjust the target audience benchmark by increasing or decreasing the target audience benchmark based on the second performance scores.

In some implementations, the one or more hardware processors are further configured by machine-readable instructions to compare the first performance score and the second performance score to the target audience benchmark by comparing the first performance score and the second performance score to the adjusted target audience benchmark.

Another aspect of the present disclosure is a non-transitory computer-readable storage medium. The non-transitory computer-readable storage medium may have instructions embodied thereon, the instructions being executable by one or more processors to perform a method, the method comprising accessing a web-based property over a network, the web-based property containing a plurality of images or videos; storing the plurality of images or videos and associations between the plurality of images or videos and a target audience identifier in a database responsive to the web-based property having a stored association with the target audience identifier in the database; retrieving the plurality of images or videos from the database responsive to each of the plurality of images or videos having stored associations with the target audience identifier; executing a neural network to generate a performance score for each of the plurality of images or videos; calculating a target audience benchmark based on the performance scores for the plurality of images or videos; executing the neural network to generate a first performance score for a first image or video and a second performance score for a second image or video; comparing the first performance score and the second performance score to the benchmark; and generating a record identifying the first image or video responsive to a first difference between the first performance score and the benchmark exceeding a second difference between the second performance score and the benchmark.

In some implementations, calculating the target audience benchmark comprises calculating a distribution of the generated performance scores for the plurality of images or videos.

In some implementations, executing the neural network to generate the performance score for the first image or video comprises generating a feature vector comprising extracted features of the first image or video, each of the one or more extracted features comprising a descriptor of the first image or video; and applying the generated feature vector to the neural network.

At least one aspect of this disclosure is directed to a system for automatically transforming a content item. The system can include a content item harvesting module configured to receive a plurality of harvest content items. The system can include a performance metric ranking engine configured to rank each of the plurality of harvest content items based on at least one performance metric. The system can include a matching criterion manager configured to determine matching criterion aspects of the plurality of harvest content items. The matching criterion manager can also be configured to compare aspects of a candidate content item with the plurality of harvest content items according to the determined matching criterion aspects. The matching criterion manager can also be configured to determine a subset of the plurality of harvest content items that are relevant to the candidate content item based on the comparison of the aspects of the candidate content item with the plurality of harvest content items. The system can include a recommendation module configured to select a first transformation for the candidate content item. The first transformation can be selected to make at least one characteristic of the candidate content item more like the at least one characteristic of a first harvest content item of the subset of the plurality of harvest content items that is ranked more highly than a second harvest content item of the subset of the plurality of harvest content items.

In some implementations, the system can also include a content transformation module configured to apply the selected first transformation to the candidate content item to generate a transformed content item. In some implementations, the content transformation module can be further configured to determine an intensity associated with the selected transformation prior to applying the selected transformation to the candidate content item to generate the transformed content item.

In some implementations, the candidate content item can be an image including a plurality of layers and the content transformation module can be further configured to apply the selected transformation by altering a subset of the plurality of layers. In some implementations, the candidate content item can be a video including a plurality of frames and the content transformation module can be further configured to apply the selected transformation by altering a subset of the plurality of frames.

In some implementations, the system can also include a performance metric predictor configured to calculate a score for the candidate content item, based on the at least one performance metric and at least one target audience. In some implementations, the at least one performance metric can be a uniqueness performance metric. In some implementations, the performance metric predictor can be further configured to calculate a second score for the candidate content item, based on at least a second target audience. In some implementations, the recommendation module can be further configured to select the first transformation such that, upon application of the first transformation to the candidate content item to generate a first transformed content item, a score of the first transformed content item is improved relative to the score of the candidate content item. In some implementations, the recommendation module is further configured to generate a recommendation of an alternate content item having a score that is higher than the score of the candidate content item.

In some implementations, the system can also include a performance measurement module configured to determine a response of the target audience to the first transformed content item, subsequent to the first transformed content item being published. In some implementations, the recommendation module can be further configured to generate a recommendation of a second target audience for the transformed content item, the second target audience different from the first target audience.

In some implementations, the performance metric predictor can be further configured to determine an updated score for the first transformed content item, based on the determined response of the target audience to the first transformed content item. The recommendation module can be further configured to select a second transformation such that, upon application of the second transformation to the candidate content item by the content transformation module to generate a second transformed content item, a score of the second transformed content item is improved relative to the updated score of the first transformed content item. In some implementations, the recommendation module can be further configured to select the second transformation based at least in part on preference information received from a user associated with the candidate content item. In some implementations, the system can also include a user alert module configured to provide a message to a user associated with the candidate content item, the message including a recommendation to apply the second transformation to the candidate content item.

In some implementations, the recommendation module can be further configured to select a second transformation for the candidate content item. The second transformation can be different from the first transformation. In some implementations, the recommendation module can be further configured to provide, to a user associated with the candidate content item, an indication of the first transformation and the second transformation. In some implementations, the system can also include a graphical user interface (GUI) generation module configured to provide a GUI for display on a computing device of the user. The indication of the first transformation and the second transformation can be provided via the GUI displayed on the user computing device.

In some implementations, the GUI generation module can be further configured to provide the GUI via at least one of an extension of a web browser executing on the user computing device and a client application executing on the client computing device. In some implementations, the content transformation module can be further configured to receive, from the user, a user input corresponding to a selection of at least one of the first transformation and the second transformation. The content transformation module also can be configured to apply at least one of the first transformation and the second transformation to the candidate content item to generate a transformed content item, based on the user input. The content transformation module also can be configured to return the transformed content item to the user.

In some implementations, the content item harvesting module can be configured to receive the plurality of harvest content items based on at least one target audience. In some implementations, at least one of the matching criterion aspects comprises a content category.

Another aspect of this disclosure is directed to a system for evaluating a content item. The system can include a content item harvesting module configured to receive a plurality of harvest content items. The system can include a performance metric ranking engine configured to rank each of the plurality of harvest content items based on at least one performance metric. The system can include a matching criterion manager configured to determine matching criterion aspects of the plurality of harvest content items. The matching criterion manager also can be configured to compare aspects of a first candidate content item with the plurality of harvest content items according to the determined matching criterion aspects. The matching criterion manager also can be configured to determine a subset of the plurality of harvest content items that are relevant to the first candidate content item based on the comparison of the aspects of the first candidate content item with the plurality of harvest content items. The system can include a performance metric predictor configured to calculate a score for the first candidate content item, based on the at least one performance metric and at least one target audience. The system can include a recommendation module configured to identify at least one characteristic of the first candidate content item and to determine whether the identified characteristic of the first candidate content item is associated with an increase or a decrease in the score for the first candidate content item.

In some implementations, the system can also include a user alert module configured to provide a message to a user associated with the first candidate content item, the message including information corresponding to the determination of whether the identified characteristic of the first candidate content item is associated with an increase or a decrease in the score for the first candidate content item. In some implementations, the content item harvesting module can be further configured to receive at least a second candidate content item from the user. The performance metric predictor can be further configured to calculate a score for the second candidate content item and to rank the first candidate content item and the second candidate content item according to their respective scores.

In some implementations, the performance metric predictor can be further configured to calculate the score for the second candidate content item based on the at least one performance metric and the at least one target audience. In some implementations, the user alert module can be further configured to provide a second message to the user. The second message can include information corresponding to the ranking of the first candidate content item and the second candidate content item. In some implementations, the at least one performance metric can include a uniqueness performance metric.

Another aspect of this disclosure is directed to a method for automatically transforming a content item. The method can include receiving, by a content item harvesting module, a plurality of harvest content items. The method can include ranking, by a performance metric ranking engine, each of the plurality of harvest content items based on at least one performance metric. The method can include determining, by a matching criterion manager, matching criterion aspects of the plurality of harvest content items. The method can include comparing, by the matching criterion manager, aspects of a candidate content item with the plurality of harvest content items according to the determined matching criterion aspects. The method can include determining, by the matching criterion manager, a subset of the plurality of harvest content items that are relevant to the candidate content item based on the comparison of the aspects of the candidate content item with the plurality of harvest content items. The method can include selecting, by a recommendation module, a first transformation for the candidate content item. The first transformation can be selected to make at least one characteristic of the candidate content item more like the at least one characteristic of a first harvest content item of the subset of the plurality of harvest content items that is ranked more highly than a second harvest content item of the subset of the plurality of harvest content items.

In some implementations, the method can also include applying, by a content transformation module, the selected first transformation to the candidate content item to generate a transformed content item. In some implementations, the method can also include determining, by the content transformation module, an intensity associated with the selected transformation prior to applying the selected transformation to the candidate content item to generate the transformed content item.

In some implementations, the method can also include calculating, by a performance metric predictor, a score for the candidate content item, based on the at least one performance metric and at least one target audience. In some implementations, the method can also include selecting, by the recommendation module, the first transformation such that, upon application of the first transformation to the candidate content item to generate a first transformed content item, a score of the first transformed content item is improved relative to the score of the candidate content item. In some implementations, the method can also include generating, by the content transformation module, a recommendation of an alternate content item having a score that is higher than the score of the candidate content item.

In some implementations, the method can also include determining, by a performance measurement module, a response of the target audience to the first transformed content item, subsequent to the first transformed content item being published. In some implementations, the method can also include generating, by the recommendation module, a recommendation of a second target audience for the candidate content item, the second target audience different from the first target audience.

In some implementations, the method can also include determining, by the performance metric predictor, an updated score for the first transformed content item, based on the determined response of the target audience to the first transformed content item. The method can also include selecting, by the recommendation module, a second transformation such that, upon application of the second transformation to the candidate content item by the content transformation module to generate a second transformed content item, a score of the second transformed content item is improved relative to the updated score of the first transformed content item.

An illustrative system includes a memory and a processor coupled to the memory. The processor receives a first search criteria. The first search criteria specifies a first custom author crowd. The processor also receives a second search criteria. The second search criteria specifies a second custom author crowd. The processor also determines a first fluctuation of first content generated by the first custom author crowd and determines a second fluctuation of second content generated by the second custom author crowd. The processor also determines a fluctuation magnitude. The fluctuation magnitude indicates a difference between the first fluctuation to the second fluctuation.

An illustrative method comprising includes receiving, by a processor of a computing device, a first search criteria. The first search criteria specifies a first custom author crowd. The method also includes receiving a second search criteria. The second search criteria specifies a second custom author crowd. The method also includes determining a first fluctuation of first content generated by the first custom author crowd and determining a second fluctuation of second content generated by the second custom author crowd. The method also includes determining a fluctuation magnitude. The fluctuation magnitude indicates a difference between the first fluctuation to the second fluctuation.

An illustrative non-transitory computer readable medium having instructions stored thereon that, upon execution by a computing device, cause the computing device to perform operations. The operations include receiving a first search criteria. The first search criteria specifies a first custom author crowd. The operations also include receiving a second search criteria. The second search criteria specifies a second custom author crowd. The operations also include determining a first fluctuation of first content generated by the first custom author crowd and determining a second fluctuation of second content generated by the second custom author crowd. The operations also include determining a fluctuation magnitude. The fluctuation magnitude indicates a difference between the first fluctuation to the second fluctuation.

An illustrative system includes a memory and a processor coupled to the memory. The processor provides potential requests. Each of the potential requests include an indication of at least one recommended aspect type for a future content, action, or behavior. The processor also receives a selection of at least one of the potential requests for the at least one recommended aspect type for the future content, action, or behavior. The selection is associated with a unique author in at least one social network, website, application software, or mobile application software (app). The processor also automatically determines, in response to the selection, the recommended aspect for the future content, action, or behavior. The recommended aspect is determined at least in part based on activity data that indicates aspects of other content authored by or interacted with by a plurality of authors in the at least one social network, website, application software, or mobile application software (app) prior to receipt of the selection.

An illustrative method includes providing, by a processor of a computing device, potential requests. Each of the potential requests include an indication of at least one recommended aspect type for a future content, action, or behavior. The method further includes receiving, by the processor, a selection of at least one of the potential requests for the at least one recommended aspect type for the future content, action, or behavior. The selection is associated with a unique author in at least one social network, website, application software, or mobile application software (app). The method further includes automatically determining, by the processor, in response to the selection, the recommended aspect for the future content, action, or behavior. The recommended aspect is determined at least in part based on activity data that indicates aspects of other content authored by or interacted with by a plurality of authors in the at least one social network, website, application software, or mobile application software (app) prior to receipt of the selection.

An illustrative non-transitory computer readable medium having instructions stored thereon that, upon execution by a computing device, cause the computing device to perform operations. The operations include providing potential requests. Each of the potential requests include an indication of at least one recommended aspect type for a future content, action, or behavior. The operations also include receiving a selection of at least one of the potential requests for the at least one recommended aspect type for a future content, action, or behavior. The selection is associated with a unique author in at least one social network, website, application software, or mobile application software (app). The operations also include automatically determining, in response to the selection, the recommended aspect for the future content, action, or behavior. The recommended aspect is determined at least in part based on activity data that indicates aspects of other content authored by or interacted with by a plurality of authors in the at least one social network, website, application software, or mobile application software (app) prior to receipt of the selection.

An illustrative system includes a memory and a processor coupled to the memory. The processor determines a recommended aspect for future content, action, or behavior. The recommended aspect is determined at least in part based on activity data that indicates aspects of other content authored by or interacted with by a plurality of authors in at least one social network, website, application software, or mobile application software (app) prior to receipt of the selection. The processor also provides the recommended aspect for the future content, action, or behavior for a unique author in the at least one social network, website, application software, or mobile application software (app). The processor also determines whether the unique author posted the future content, took the action, or engaged in the behavior in accordance with the recommended aspect. The processor also determines, based at least in part on the determination of whether the unique author posted the future content, took the action, or engaged in the behavior in accordance with the recommended aspect, an agility rating that indicates a responsiveness of the unique author to the recommended aspect.

An illustrative method includes determining, by a processor of a computing device, a recommended aspect for future content, action, or behavior. The recommended aspect is determined at least in part based on activity data that indicates aspects of other content authored by or interacted with by a plurality of authors in at least one social network, website, application software, or mobile application software (app) prior to receipt of the selection. The method also includes providing, by the processor, the recommended aspect for the future content, action, or behavior for a unique author in the at least one social network, website, application software, or mobile application software (app). The method also includes determining, by the processor, whether the unique author posted the future content, took the action, or engaged in the behavior in accordance with the recommended aspect. The method also includes determining, by the processor, based at least in part on the determination of whether the unique author posted the future content, took the action, or engaged in the behavior in accordance with the recommended aspect, an agility rating that indicates a responsiveness of the unique author to the recommended aspect.

An illustrative non-transitory computer readable medium having instructions stored thereon that, upon execution by a computing device, cause the computing device to perform operations. The operations include determining a recommended aspect for future content, action, or behavior. The recommended aspect is determined at least in part based on activity data that indicates aspects of other content authored by or interacted with by a plurality of authors in at least one social network, website, application software, or mobile application software (app) prior to receipt of the selection. The operations also include providing the recommended aspect for the future content, action, or behavior for a unique author in the at least one social network, website, application software, or mobile application software (app). The operations also include determining whether the unique author posted the future content, took the action, or engaged in the behavior in accordance with the recommended aspect. The operations also include determining, based at least in part on the determination of whether the unique author posted the future content, took the action, or engaged in the behavior in accordance with the recommended aspect, an agility rating that indicates a responsiveness of the unique author to the recommended aspect.

BRIEF DESCRIPTION OF THE DRAWINGS

Illustrative embodiments will hereafter be described with reference to the accompanying drawings.

FIG. 8 is a flow diagram illustrating a method of determining an agility rating indicating a responsiveness of an author to recommended aspects for future content in accordance with an illustrative embodiment.

FIG. 9 is a flow diagram illustrating a method for alerting a user that the user's agility rating has dropped below that of a second user in accordance with an illustrative embodiment.

FIG. 10 is a block diagram illustrating a system for transforming one or more content items in accordance with an illustrative embodiment.

FIG. 11 is a flow diagram illustrating a method for transforming one or more content items in accordance with an illustrative embodiment.

FIG. 12 is a flow diagram illustrating a method for evaluating one or more content items in accordance with an illustrative embodiment.

FIG. 16 is a flow diagram illustrating a method for image scoring using selective web crawling in accordance with an illustrative embodiment.

DETAILED DESCRIPTION

Figure 1:
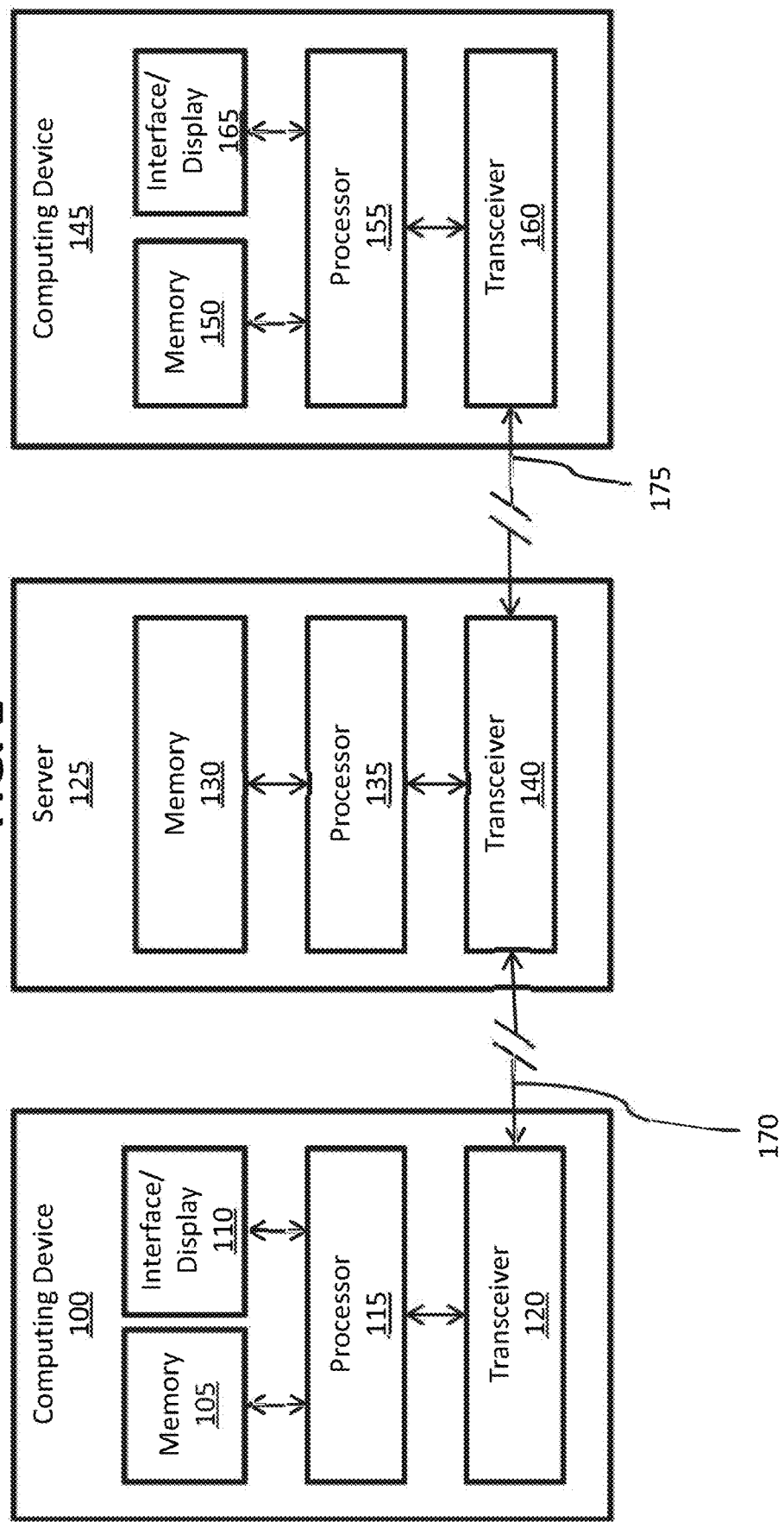
FIG. 1 is a block diagram illustrating computing devices and a server that may be used in accordance with an illustrative embodiment.

Described herein are illustrative embodiments for methods and systems that provide for quantifying social audience activation through search and comparison of custom author groupings. In an illustrative embodiment, a user of the system may enter a search criteria that specifies a custom author crowd. The search criteria may specify various demographic information related to authors, posts created by authors, preferences of authors, temporal considerations (when did an author do something), or other various search criteria as disclosed herein. The user may also be able to enter multiple search criteria to specify, define, and/or search for a custom author crowd.

As disclosed herein, a user is generally referred to as a user of the disclosed system and methods, while an author is generally referred to as any user of social media. Whether the author actually "authors" posts is irrelevant to their categorization as an author. For example, an author as defined here may never actually author a post, but may interact on social media in other ways. In short, a distinction is made in the present application between a user of the disclosed system (the "user") and a user of social media (an "author"). The terminology used throughout the present application is not meant to limit the activity of an author or user, or to prevent an author from also being a user or vice versa. Rather, the terminology is merely used to provide clarity and distinguish between users and authors. A user generally refers to a person using the systems and methods disclosed herein, while an author generally refers to a person using a website, social network, application software (apps), etc. (including applications for mobile phones, smart phones, tablets, personal data assistants (PDA's), laptops, desktop computers, etc. In other words, the system and methods disclosed herein may be used across one or more platforms and mediums including social networks, websites, mobile phone apps, and the like.

Once a crowd has been defined by a user, that crowd can be stored, analyzed, and/or tracked for various fluctuations within the crowd based on the authors in the crowd's behavior after the crowd has been defined. Many examples of fluctuations that may be determined by the system are disclosed herein, and are not meant to limit the possible fluctuations that may be tracked, analyzed, and/or determined. In one illustrative embodiment, a custom crowd may be initially defined by searching for authors who have authored a social media post within the past three months about any type of carbonated soft drink. Such a search may include search for different types and brands of carbonated soft drinks in social media posts. Whoever authored those posts would then be included in the custom author crowd.

A user of the system and methods disclosed herein may be different persons or entities. For example, a user may wish to search for and create custom author crowds to track effectiveness of their campaigns. In another example, the user may be a social network or agent/staffer of the social network who wishes to search for and create custom author crowds. A social network may wish to use custom author crowds for a variety of purposes. For example, the social network may wish to track their own campaigns or campaigns of those who use the social network to display the author's works. In the latter example, tracking others' campaigns on the social network may allow the social network to better promote the effectiveness of the campaigns on their social network, and thereby increase campaign spending on their social network. In another example, the social network (or an agent/staffer of the network) may perform searching for and tracking of custom author crowds on behalf of a separate entity (e.g., an entity). In this situation, the entity may or may not dictate how the searching and tracking should be done by the social network. When the searching and tracking is not dictated by the entity, the social network may be offering the searching and tracking services as part of services paid for by the entity. In another example, the searching and tracking may be provided by the social network to entities. In this example, the entity may be the user of the system. Furthermore, a social network in this example may exert some control over how the searching and tracking is accomplished. For example, the social network may limit the number or type of authors the entity can search for. In another example, the social network may limit the number of custom author crowds the entity can search for or save for tracking. The social network could also limit the total number of authors searched for and or tracked by an entity. The social network could also limit the number of authors allowed in each custom author group tracked by the entity.

In other examples, the system and methods disclosed herein may operate across multiple mediums and platforms such as websites, social media networks, and/or mobile apps. For example, an entity may want to define a custom author crowd by performing searches of Facebook™ authors. The entity may also wish to find the same authors they already found on Facebook™ on another medium. Examples of other mediums may include a Dictionary.com™ mobile app, a user of ESPN™ Fantasy Football services, or individuals with an account on an online shopping website such as Amazon™. The entity may have a particular rationale for discovering or finding users on other mediums as well. For example, the entity may operate the mobile app Uber™, which offers taxi-like services. Uber™ may wish to identify authors that use a mobile app that allows tracking of city buses or other transportation related apps. In a further example, Uber™ may wish to identify authors that use any sort of road navigation app such as Google™ Maps. One possible implementation may be to market to those who use such navigation or transportation apps whenever there are a surplus of Uber™ drivers in a certain town or area. The system may even be able to identify when a particular app is actively being used. In this scenario, an author may be using a navigation app such as a city bus tracker app during a time when there is a surplus of Uber™ drivers. The system may identify the authors actively using the bus tracker app and market Uber™ to those authors. The identification could happen automatically and marketing may happen automatically as predefined by a user. In another embodiment, the identification of surplus drivers and potential market for those drivers may occur automatically and the marketing may be executed manually. In a third embodiment, all steps may be performed manually by a user. In these examples, an app developer may be able to open up their author database to a broader cross-platform activation system that may be tapped into by entities. The entities may target users on apps or platforms they do business on, or perform other relevant cross-platform marketing and targeting.

Next, a baseline magnitude may be determined using a fluctuation criteria. For example, within the custom author crowd, the fluctuation criteria may be set as root beer. In this embodiment, any author in the custom crowd that has authored a post about root beer in the past three months (that is, whoever has previously posted about root beer in the set amount of time before the custom crowd is created or specified) is a part of the baseline magnitude used to calculate a fluctuation. A group of users that are a part of the baseline magnitude may be considered to be a part of a community that enjoys root beer within the custom author crowd. Fluctuation criteria may also have the same parameters as the initial search criteria.

Once the custom author crowd has been specified and a baseline magnitude is determined using a fluctuation criteria, the system may monitor the custom author crowd in order to determine a fluctuation of the custom author crowd if authors in the custom author crowd author content or engage in a behavior that is related to the fluctuation criteria. For example, an author that previously had not posted about root beer or previously been considered part of a community that enjoys root beer may author an online social media posting regarding their experience trying root beer for the first time and enjoying it. The system may determine a fluctuation in the custom author crowd based on the online social media posting. That is, the community of those who enjoy root beer within the custom author crowd has fluctuated upward. In other embodiments, the system may determine a downward fluctuation. For example, an author may leave an affinity group for root beer hosted by a social media website, which may indicate a downward fluctuation and that the author has left the community of those who enjoy root beer. In another example, a system may determine that an author's failure to author content about root beer over a certain time period is a downward fluctuation and that the author has left the community of those that enjoy root beer. In an illustrative embodiment, the system is monitoring a plurality of authors in a custom author crowd for overall fluctuations based on a fluctuation criteria. That is, the system can determine how many authors in the custom author crowd have joined and/or left a community defined by the fluctuation criteria.

In an illustrative embodiment, multiple fluctuation criteria may be used with the same custom author crowd. In this example, a custom author crowd may be watched for fluctuations in multiple types of things. For example, a custom author crowd may be watched in regards to root beer as in the preceding example, and the custom author crowd may also be watched in regards to orange juice. In this example, the additional fluctuation criteria may also be used to establish a baseline community of those authors in the custom author crowd who have authored content indicating a positive emotion toward orange juice. Multiple fluctuation criteria used for the same custom author crowd may or may not be related to each other. In this example, the two fluctuation criteria are related to each other, as both of them are beverages. Similarly, in other embodiments, whenever there are multiple fluctuation criteria used, the multiple fluctuation criteria may be part of a common fluctuation criteria type (e.g. beverages, as in the previous example).

In another illustrative embodiment, a user may specify more than one custom author crowd. Multiple custom author crowds may have at least one different author from each other. In some examples, different custom author crowds may have one or more authors in common. In other examples, different custom author crowds may be mutually exclusive and not have any authors in common. Each of the custom author crowds can be monitored for fluctuations based on fluctuation criteria, similar to the examples disclosed herein. Where different custom author crowds are monitored based on the same fluctuation criteria, the system can determine a fluctuation for multiple custom author crowds based on that same fluctuation criteria. In an illustrative embodiment, the baseline determined using the fluctuation criteria, and the fluctuations determined for the custom author crowds, can be compared to each other. In this way, a difference in fluctuations, called a fluctuation magnitude difference, may be determined as between the multiple custom author crowds. Returning to the root beer example, the multiple custom author crowds may all be the target of a content item for root beer or may receive a promotional coupon for root beer. The custom author crowds may then be monitored to determine how, and when, the fluctuations of the custom author crowds change based on the content item or coupon. In some embodiments, one custom author crowd may have a different fluctuation than another custom author crowd. The resulting fluctuation magnitude difference in the crowds may indicate to a user the relative effectiveness of the content item or coupon on a particular custom author crowd.

In addition to comparing multiple custom author crowds to each other to track performance and return on investment for marketing and other author engagement, a custom author crowd may also be compared to a pre-defined or curated social community, following, or fan base. In other words, a custom author crowd may be compared to another crowd that serves as a baseline or other reference point for the custom author crowd. A pre-defined or curated social community may be all the authors on a social media web site or may be all the authors the system has access to. A pre-defined or curated social community may also consist of a list of current paying customers or former customers, followers or fan bases of the user's social media accounts at a given point in time, followers or fan bases of specific competitors' social media accounts or other stakeholders' social media accounts, pre-existing whitelists of authors who have or are thought to have certain characteristics, influencer lists, custom audiences that may have been generated, procured, targeted, or otherwise leveraged in other marketing or campaigns, or any other applicable user listing. Another pre-defined or curated social community may be determined similar to a custom crowd (by searching based on demographics, posts, etc.) but may be saved in the system perpetually and thus is characterized as a baseline pre-defined social community.

Advantageously, the system provides the ability to effectively interrelate paid audiences (the targets of marketing/paid/sponsored content) and owned audiences (those authors who already follow a company/product/brand account such as a Twitter™ account and are members of the company/product/brand's community). To this end, the system can show after a campaign that more of the authors in a targeted crowd have joined the following (by following the company/product/brand Twitter™ account, for example). This can be referred to as a crowd penetration metric. One by one the system can show authors in a custom author crowd being captured. Advantageously, when an author follows a brand's Twitter™ account, the author is more likely to see unsponsored content posted on the brand's account. This is helpful because the unsponsored content is essentially free to post. Thus, by keeping track of how many authors the brand has captured, it can also keep track of the relative effectiveness of their unsponsored content as well.

In other illustrative embodiments, multiple custom author crowds may be monitored for various and different fluctuation criteria as desired by a user. For example, a user may designate one fluctuation criteria as Brand A Root Beer and may designate a second fluctuation criteria as Brand B Root Beer. Both fluctuation criteria may be applied to the same custom author crowd. Accordingly, the custom author crowd may be monitored to determine not only how the custom author crowd is fluctuating in its sentiments toward Brand A Root Beer, but also how the custom author crowd's sentiment is fluctuating with regard to Brand B Root Beer. This may be useful if Brand A Root Beer and Brand B Root Beer are competitors for the same customers. Similarly, the multiple fluctuation criteria (Brand A and Brand B) may be applied to multiple custom author crowds. Multiple custom author crowds may be selected on the basis of demographics, behavioral tendencies, lifestyle indicators, or other specific market segmentation criteria, thus allowing a user to monitor and compare how fluctuations regarding Brand A and Brand B root beers are changing in particular demographic groups or target market segments.

In an illustrative embodiment, the search criteria that specifies a custom author crowd may include multiple criteria of varying types. For example, the search criteria may include authors in the custom author crowd who have authored a social media post about cheese and who live in the state of Wisconsin. In another example, the search criteria may include authors in the custom author crowd who have liked a particular celebrity (or joined an affinity group for a particular celebrity), such as Harry Houdini, and authored a social media post about magic within the last 6 months. In another example, the search criteria may include authors in the custom author crowd who have purchased tea online in the last year and live in or around Boston, Massachusetts. In another example, the search criteria may include authors in the custom author crowd who have authored a post on social media about their cell phone provider and who have authored a post on social media about their subscription to pay television within the last year.

In an illustrative embodiment, multiple custom author crowds may be specified and stored utilizing systems and methods disclosed herein. In this embodiment, two different custom author crowds may include common authors. In one embodiment, no action is taken by the system with regards to the common authors. That is, the common authors are left in both custom author crowds. In an alternative embodiment, the system automatically identifies that the two custom author crowds both include at least one common author. In one embodiment, the system may present a user with a choice to remove the common author from one of the custom author crowds. In another embodiment, the system may automatically remove the common author from one of the custom author crowds. For example, the system may automatically remove the common author from the larger of the two custom author crowds. In another example, the system may automatically remove the common author from the custom author crowd that was specified later in time as opposed to the first custom author crowd. In another example, the system may automatically detect when an author in one custom crowd joins another custom author crowd specified by the user. This may include custom author crowds defined by the parameters described herein, a specific social fan base, etc. It should also be noted that the ability of the system to detect the presence or absence of an author or authors in one or more crowds may not be limited to one social networking site. In one example, the system may automatically detect when an author joins or leaves a crowd on social networking site A and social networking site B. This may help aid the user in making a determination that it may be more effective to target this author or group of authors with different messages on different social platforms.

When determining a fluctuation within a custom author crowd, various methods and systems may be used. In an illustrative embodiment, content generated by the authors that causes the system to measure a fluctuation may include a status update. For example, an author may post a status update on a social networking site. The status update may include text, image, audio file, video, symbols, and/or universal resource identifiers (URIs) that comprise a fluctuation criteria. That is, the author's status update may include text or a URI the system is looking for to measure a fluctuation. In another embodiment, the fluctuation criteria monitored for and measured may be an online purchase of a good or service. Another fluctuation criteria may be signing up for an account with a web site or web service. Another fluctuation criteria may be selecting a URI, or selecting a URI sent to an author through a messaging service or e-mail. Another fluctuation criteria may be viewing a particular webpage, or viewing a particular webpage for a certain amount of time. Another fluctuation criteria may be authoring a social media post or posts including a particular text, image, video, audio file, symbol, or URI more than once, or any other predetermined number of times. Another fluctuation criteria may be authoring multiple social media posts that contain a particular text or URI that are related. For example, the fluctuation criteria may cause the system to monitor for and measure a number of authors who post about peanut butter and jelly. Another fluctuation criteria may be joining a particular affinity group or liking a particular fan page for an item, brand, celebrity, sports team, interest, etc. Other potential fluctuation criteria may include following another author, retweeting and/or sharing a post from another author, liking an author, commenting on the posts of other authors, or interacting with another author who is also a member of the same custom author crowd. Fluctuation criteria could also be an interaction with a posted or promoted post authored by the user of the system. In other words, if an entity posts sponsored content, the fluctuation criteria may be designed to measure how a custom author crowd interacts with and based on that sponsored content. This can help inform or alert the user to authors' subsequent activity to a user action or interaction. Another fluctuation criteria may involve images or characteristics of images (including image sequences such as videos) such as a certain image, style of an image, item or product in the image, text or signs in an image or appended to an image, person in the image, number of people in the image, age of people in the image, geographic locations of where the image was captured, lighting levels of the image, whether the image was indoor or outdoor, time an image was originally captured, food in an image, resolution of an image, style of an image (i.e., selfie, landscape, panoramic, portrait, square, filter type, video or still, etc.), duration of an image sequence or video, duration of a particular individual or object's presence in an image sequence or video, text or hyperlinks that appear in a video or are appended to a video, or any other characteristic of an image, image sequence, or content of an image. In using such fluctuation criteria for an image, the system may utilize photo analysis software such as facial recognition, image recognition, metadata reading or other analysis on images that are searched. These and other related fluctuation criteria may also be applied to video content and/or other rich media. Other fluctuation criteria could also take into account the user's activity over a certain time period with respect to desired fluctuation criteria in the custom author crowd. In other words, the system may enable the user to determine the total behaviors, postings or promoted messages that were directed to each custom author crowd as a proportion of the user's total outreach efforts, and the resulting viewership and interactions made by authors with that user's content as a proportion of the total interactions made by the custom author crowd during a specific time period. These fluctuation criteria may provide signals related to the efficiency of the user's messages and strategy to reach and engage each custom author crowd, as well as signals related the "mindshare" or brand awareness the user possesses within a custom author crowd.

In an illustrative embodiment, the system may be configured to send out alerts based on the tracked fluctuations of custom author groups. For example, if a fluctuation meets a certain magnitude, an alert may be sent to a user. In just one example, 10% of a custom author group may meet the fluctuation criteria and an alert may be sent. The 10% that meet the fluctuation criteria may be a total of the custom author group, or may be an additional 10% beyond those in the custom author group that had already met the fluctuation criteria (in other words were already a part of the community) when the custom author group was created. Additional alerts may be subsequently sent out when other predetermined thresholds are met. Thresholds may be other varying numbers than the example 10%. Additionally, discrete numbers may be used instead of percentages. For example, alerts may be sent out for every 1,000 authors who meet the fluctuation criteria. Aggregations of these alerts and other real-time performance measures may be viewable to the user in the system.

In another illustrative embodiment, alerts may also be sent out based on fluctuation magnitude differences between multiple custom author groups. For example, the system may encourage a race between multiple custom author groups to meet fluctuation criteria. For example, a user may define two custom author groups that have different authors. The two custom author groups may be assigned to different marketing teams to target. The same fluctuation criteria may be measured for each of the custom author groups. In this way, the marketing teams could compete at getting their respective custom author groups to meet the fluctuation criteria. Alerts may be sent when custom author groups hit certain predetermined thresholds of meeting fluctuation criteria similar to the embodiments described above. In another embodiment, alerts may be sent out when one custom author group surpasses another custom author group in number of authors that meet the fluctuation criteria. In this way, the marketing teams or other users would know who is in the lead for marketing success and would know in real time when they had surpassed another group. Advantageously, this may incentivize marketers or other users to do a better job when reaching out to, engaging, and marketing to the various authors in the custom author groups.

In another illustrative embodiment, alerts may be sent out regarding negative fluctuations. For example, if, in a custom author crowd, a predetermined number of authors disassociate themselves with an affinity group, an alert may be sent to a user to indicate a negative fluctuation. Similarly, in another example, the system may sense negative language toward a product, person, etc. in a post authored by someone in the custom author crowd. These alerts may be triggered by activities of a custom author crowd that take place on multiple social networking sites, websites, or apps.

In another illustrative embodiment, alerts may be sent out based on temporal factors. For example, an alert on the progress of fluctuation criteria for a custom author crowd may be sent out every two weeks, regardless of whether any predetermined threshold is met. In another embodiment, an alert may be sent out if a predetermined threshold for fluctuation is met within a certain time period. For example, if the fluctuation of a custom author crowd based on a particular fluctuation criteria reaches 3% in one month, an alert may be sent out.

In another illustrative embodiment, the system may be configured to alert the user when certain thresholds are met in relation to his or her own outreach efforts that may or may not be directed at specific custom author crowds. For example, the user may want to know when he has attained 10% mindshare within a specific custom author crowd or when he has achieved 95% awareness in a custom author crowd. In other example, the user may want to know when his organic marketing program is at peak efficiency whereby the timing and frequency of his postings elicits the best response rate or desired fluctuation criteria within a custom author crowd.

In another illustrative embodiment, the system may be configured to alert the user when an author of particular importance engages in certain online activities or authors a post with certain words, images, videos, audio files, symbols, and/or URIs. For example, a user may want to know if a famous celebrity authors a post about a user's product. In one specific example, an under the weather President of the United States may tweet positively about the efficacy of a particular brand of facial tissue. The brand manager of that particular brand of facial tissue may wish to be alerted that such a high profile individual is evacuating his or her nasal cavities upon their particular brand of paper handkerchiefs. The system can alert the brand manager thusly. The brand manager may then choose to promote such a post using the system or take other action based on the alert stemming from the President's now famous nasal mucus.

Alerts and other monitoring of fluctuation criteria may also be done in real-time or near real-time. This would allow users to immediately know when thresholds for fluctuation criteria are met. In other terminology, a user may immediately be notified when a certain number of authors from social media sites have been activated or join a community based on their authored posts or other online actions. Advantageously, alerts and other real time notifications may trigger increased content item spending overall, as entities are able to better capitalize on trends and current states of engagement from authors. It may even be the case that entire marketing programs are based off of notification to these fluctuation criteria.

In another illustrative embodiment, the fluctuation criteria may be used to track performance or success of a rival. For example, if someone sells a particular type of electric car, they may wish to know how many of their targeted custom author grouping is interested in other brands of electric cars or even gasoline cars. Accordingly, a user may set fluctuation criteria related to a competitor product as well as their own. In another embodiment, the seller of electric cars may set a fluctuation criteria to monitor and track authors in the custom author group who author or engage with content relating to all cars. In this way, the seller may be able to determine a proportion of those authoring content about cars generally that are interested in electric cars, or are interested particularly in the seller's type of electric cars. In this way, users may determine subsets of custom author crowds. Advantageously, the subsets can be dynamic, as they can be set to track the fluctuations of the custom author crowd in any of the ways disclosed herein. In another illustrative embodiment, this subset can be treated as a separate custom author crowd. In other words, the definition of a custom author crowd may be analogous to a fluctuation criteria. In this way, a custom author crowd may only include, for example, any author that has posted something about a car within the last year. If an author originally is considered part of the custom author crowd, but a year goes by without that author having again posted something about a car, that author may be removed from the custom author crowd.

In another illustrative embodiment, the fluctuation criteria and activation of users in a custom author crowd can be used to trigger the publication or use of content such as marketing. For example, the system may automatically post a content item that is viewable to the custom author crowd when that custom author crowd reaches a particular fluctuation criteria. In just one specific example, when at least 15% percent of authors in a custom author crowd have authored a post on social media about football, the system may automatically publish an online content item to that custom author crowd for a paid television subscription service that offers football programming. In another embodiment, the 15% threshold being met in the custom author crowd may also trigger content items for other custom author crowds about football programming, or may trigger content items for all authors about football programming. In another illustrative embodiment, the automatically published content item may only be published for the authors who have authored a post about football. The automatically published content items may come in many various forms. The content items may be through sponsored content on a news or pseudo-news website, may be native ads or editorial content on a social networking site or other web property, may be a standard banner content item, may be recommended and sponsored content on a shopping website, may be an e-mail, may be a paper mail content item, may be a sponsored video, may be a video featuring a product (product placement or subliminal marketing), or any other type of marketing. In another embodiment, the promoted content may be a post of one of the authors. For example, if an author posts a favorable comment about the aforementioned paid television subscription service that offers football programming, that post may be promoted. Promoting such a post may involve prioritizing the post for other social media users and authors so that it is seen more often than another post.

In another embodiment, the system may not execute the paid content item or unsponsored posting on the user's behalf Instead, when the fluctuation criteria are met the system may signal an opportunity or recommend that the user engage in a certain behavior or publish content to capitalize on the favorable conditions within the custom author crowd. In such an example, execution of these actions may be facilitated by sending the fluctuation criteria and other data from the disclosed system into another software application or set of software applications via a customizable application program interface (API). Examples of integrated software applications may include but are not intended to be limited to a social media management system, a social media publishing or engagement platform, a programmatic marketing platform, a real-time bidding (RTB) platform, a demand side platform (DSP), a supply side platform (SSP), a marketing exchange, a content management system, a community platform, a marketing automation system, or any other data management, analysis and optimization, web, Internet, or marketing technology platform. In other words, the system disclosed herein may be an enabler of other functions. For example, the execution of campaigns may not be done directly via the present system. That is, it may be the case that this system leverages an API that plugs into well-established social media management systems like HootSuite™ that offer post scheduling and publishing functionality. The system may also send data into programmatic ad platforms. In another example, the user could be presented with an example post or a pre-written post to publish based on the opportunity. In yet another example, the user could author their own post or content item based on the opportunity. In another embodiment, the user may be able to start a process to publish a post or content item, but the post or content item may have to be approved by another party before it is posted. For example, if the user is a marketing agency, the agency's client may approve the post or content item. In another example, the post or content item may be approved by the social networking website where the post or content item will be published.

In another embodiment, the system may be utilized by users to support forecasting activities. That is, the activation history of one or more crowds with the system may be leveraged in conjunction with planning exercises of the user and/or to help predict when certain crowds or crowd members will engage in certain behaviors or post certain types of content on a particular medium. Such trend data and other variability measures may be helpful when planning campaigns that may span multiple online platforms, or even promote offline sales. In an illustrative embodiment, the user may want to know how many authors have been activated about root beer in Milwaukee, and the rate at which this fluctuation criteria was met over the last year. The user may then leverage this data and other measurements to predict how many authors may be activated at a later time to plan his or her content item or engagement campaigns accordingly. In another example, if the fluctuation criteria deals with new product availability in-store, the user may leverage this data to inform demand planning and the stocking of merchandise at retail stores within the most activated geographic regions. In that way, crowd activity may help optimize inventory levels and allow the user to better react to shifts in product or service demand.

Advantageously, the systems and methods disclosed herein allow social networks, websites, owners and operators of application software (apps), and other content publishers to monetize their user bases and monetize their user bases more effectively. In other words, the system and method disclosed herein allows a social network to easily track how content item and other targeted content or actions are affecting their user base. Armed with the quantifiable and objective information of how well targeted content and marketing is received and reacted to by a social network user base, a social network can charge higher prices to entities that utilize the social network for marketing or promoting content. A social network may also be able to charge higher prices to marketing customers based on the set of crowd attributes specified by the user or by the number of concurrent custom author crowds that are searched, targeted and tracked by the user. The customization of the systems and methods disclosed herein also offers a significant advantage. The system creates the opportunity for the social network to create a new economy around their inventory, i.e. their authors, where the network may define new ways in which to bid up the most sought-after or niche prospective crowds. It can be an exchange where the economy is based on expression and action, and it may cost entities more to reach the best authors or crowd segments in the highest demand.

Advantageously, the system functionality described herein may help social networks and other content publishers surface important new paid and organic marketing opportunities for their entities, as well as valuable remarketing opportunities for entities to target the same crowd again with a new message at a certain time. Furthermore, another advantage of this system may be the improvement of the social networks' own user experience through better native marketing and more relevant ads. The provision of these and other benefits may help attract new entities or retain existing entities. The system may also increase the size and frequency of ad buys, and incentivize the perpetuation of spend among current marketing customers. Performance metrics that may be generated by the system related to the activities of a custom author crowd and the user may provide deeper context around campaign engagement. Such insights, that may be both qualitative and quantitative in nature, may enrich the return on investment that a social network is capable of demonstrating to a prospective entity and thusly differentiate that social network's ad products from those of other social networks. That is, a social network using the system and methods described herein may be at an advantage in securing greater marketing spend or "share of wallet" due to the richness and effectiveness of the marketing experience provided.

Advantageously, the system may also interrelate success within the curated social communities and target custom author crowds of the user. In other words, the system may be able to drive and illustrate valuable social media community growth for the entities showing that he or she is capturing the attention and hearts of more of the users he cares about through various programs and initiatives. This advantage also applies to other user lists described elsewhere in the present application that may include current customers, competitors' fan bases, influencers, etc.

Another advantage of the system and method disclosed herein can be exploited by brands and brand managers, as well as by their marketing agencies. Similar to how social networks may exploit the systems and methods disclosed herein, brand managers and other marketers may be able to cause maintained or increased spending in content items with the objective and quantifiable information that can be provided by the system and methods disclosed herein. This advantage is important because other forms of tracking the effectiveness of marketing (such as counting the number of clicks a banner content item on a web page gets) may not as accurately reflect the effectiveness of marketing. For example, robots may represent some of the clicks on a banner content item or other promoted content and may not accurately reflect the number of human users that select a content item. Furthermore, a human user may accidentally click a banner content item and may never be truly interested in the content item. The present system and method adds more contextual information and gives quantifiable gains and returns for social media marketing.

Another advantage of the systems and methods disclosed herein is that the systems and methods may be applied across multiple social networks and platforms. That is, authors may be linked across multiple social networking web sites and platforms, so that any post they author or association they make can be attached or linked to that particular author. The system may compile data and authors from multiple websites or other data sources. The system may automatically associate accounts or authors from different social media sites with each other by matching characteristics of the authors or accounts, such as an e-mail or phone number. Other information may also be acquired that can be used by the system to link multiple accounts from different social networking sites together as one author in the presently disclosed system. In another embodiment, some accounts on some social networking web sites may not be easily linked to accounts on another social networking site, and those accounts may be treated as different authors. It may even be the case that a particular custom author crowd consists of entirely different authors or is simply treated as a separate population of unique authors on two or more social networks. That is, an inquiry into multi-platform crowd membership may or may not be executed by the user. Such a system may also help entities and brand managers make informed decisions about social networks that are more effective and cost effective as compared to other social networks. For example, an entity may focus a campaign on social network A and social network B. The results of the system and methods disclosed herein may identify that social network B showed a greater return by measuring the fluctuation criteria for the custom author crowds in social network A and social network B. Further, entities may be able to learn that marketing on one social network may be measured and effected through a second social network. For example, an entity may sponsor an article on a social news website, and authors may tweet about the article separately. The present system allows an entity to capture both how many people read the article on the social news website and how many authors tweeted about the article on a separate social news web site.

Advantageously, the system and methods disclosed herein allow a user to ensure that the audiences they are reaching are the audiences actually targeted by the marketing. This is important because some metrics for achieving engagement and marketing success may not accurately reflect whether a target market is being reached. For example, a web page may get 1,000 new likes in a month, but if 200 of those likes are from authors who do not reside in a country where the user does business, those 200 likes are not particularly useful or helpful to the user.

The present system and methods may also allow a user to more effectively benchmark and determine the total number of their target authors for a given promotion that exist on a marketing medium relative to a defined control group or the total population of authors. That is, an entity may more easily gauge their position relative to a denominator, or average score, and whether they are indeed capturing greater shares of the total available pie. The entity may also determine a relevant range, and scale, on which to assess their performance. Entities have increased visibility into how effective their efforts are in each segment of authors they are targeting over time on social media. Marketing effectiveness is achievable in a context-sensitive, quantifiable way that provides market share-like performance indicators on social media.

The system and methods disclosed herein also advantageously exploit people's natural desires for competition, achievement, and closure. By allowing users to see real-time or near real-time results and return on ad spending and quantifying those results, users may feel a better sense of accomplishment, and the feedback of return on investment may encourage even more aggressive marketing and ad spending.

In an illustrative embodiment, the system and methods disclosed herein may include a software platform that provides flexible and continuous search, refinement, and tracking of target user segments for the purpose of improving marketing effectiveness and providing a gamified marketing experience on a given digital or social medium. The system and methods may provide utility regardless of the entity's firm size or familiarity with social media, digital and social media marketing, best practices in ad targeting, and other web or social media-related technologies.

In an illustrative embodiment, a user can custom-define target segments or crowds of Internet authors on any given digital or social medium. That is, the user may perform digital or social market segmentation by identifying customized groupings of authors that represent a desired target market segment. Search result groupings and sizes are returned according to the user's custom search and targeting criteria made via a search interface.

In another illustrative embodiment, a user can store and refine conceptualizations of these custom-defined and generated author groupings on a dashboard. These crowds can be managed, edited, and constantly updated according to data from the ongoing, or past, activities of the authors contained within these specifically-defined segments (profile information, follower characteristics, text expressions, other web and social behaviors, etc.), as well as from other manual actions executed by the software user.

In another illustrative embodiment, a user can engage in a gamified setting when monitoring and benchmarking all activities concerning a targeted crowd of social media authors. Entities will gain more contextually relevant information about author engagements with their ads and other content, and be alerted of any other desired actions made by authors within their custom-defined crowds. As such, the entity will be able to gauge how he or she is performing in a crowd relative to others (given his or her current level of investment and activity) and have continuous visibility into the degree of success in capturing greater shares of the entire available pie within the frame of specific marketing goals or key performance indicators.

In an illustrative embodiment, the system and methods provide a search tool and interface for returning groupings of similar authors on electronic media based on user-defined criteria in a custom search query. These custom-defined and retrieved groupings of authors constitute a unique target market segment or crowd, which is specified by the user of the system. A user may make a custom search query—through either free-form text in a search bar or by selecting from available check boxes—and look for unique objects and characteristics contained within author records on any participating marketing medium, e.g. a social networking platform. Upon entering a custom search query, the system can return results of groupings of similar authors. In other words, the system may not return a list of every single author that meets the custom search query criteria. Instead, the system may return groups of authors that are similar. For example, a user may search for authors that have authored posts about baseball in the last two months. The system may return groupings of similar authors. In another example, the system may display and return groupings of authors based on a particular baseball team mentioned by the authors. The system may display that 300 authors mentioned Team A, 400 authors mentioned Team B, 200 authors mentioned Team C, etc. In other words, the user may specify a certain market or industry, and have the search results be grouped according to different brands within that industry. How the authors are grouped may be specified by the user. That is, the groupings may be custom defined. In another example, the groupings may be based on what social network the author is a part of. Using the previous example, the system would therefore return results showing, for example, that 700 authors on Facebook™ have posted about baseball in the last two months, 900 authors on Twitter™ posted about baseball in the last two months, 300 authors posted on Instagram™ about baseball in the last two months, etc. Other ways the authors may be grouped is how recently they posted about the selected custom search query. For example, in the baseball example, authors may be grouped together as those who have posted about baseball within the last day, the last week, the last month, and the last two months. In another example, the authors may be grouped by the frequency with which they meet the selected custom search query. For example, authors may be grouped together who have posted about baseball in the last two months once, 2-3 times, 4-5 times, and 6 or more times.

The system can then match all of the authors in the database of that particular medium (or collection of media) who possess the specified criteria and return these results to the user. The retrieved list of authors from search will be "tagged" as members of a population of interest, which collectively represents a crowd the user wants to target. Targeting criteria may include keywords selection, image and video shares, demographic and psychographic attributes such as age, gender, geography and interests, or other behaviors and actions, historical activity, mobile device, and other metadata indexed during a specific time period that will allow for the grouping of similar authors. The system can also work within the constraints of pre-defined targeting criteria offered and controlled by a marketing medium whereby the process of searching and grouping authors to be served a content item is executed solely by the marketing medium. That is, the system may be used in more of a customizable, self-service fashion by the entity or be implemented by the owner of the marketing medium. As an example, the system may be provided to an entity who can perform searching and analysis of custom author groups, or the system can be used by a social network to demonstrate the effectiveness of the content items on their network. In other words, the system can be used by entities, on behalf of entities, or as marketing to entities.

For example, a digital marketer for a department store may want to find all authors on Twitter™ who have mentioned Beyonce Knowles and that department store in the past year, like music, and used shopping-related keywords after December 1st. The entity may call this segment, "Beyonce Holiday Shoppers." The logic in performing this search is that this population might be interested in an offer for Beyonce's new gift set that month. The user enters this search query just like in any other engine, for fast results on segment size and the collection of anonymized or non-anonymized authors who match the search criteria. For the purpose of this user's query, the retrieved author grouping represents the total possible market for the campaign. It provides a quantifiable denominator for determining baselines and benchmarks, and for calculating percentage changes and other measurements over time. This is especially useful if the entity wishes to send another promoted or unsponsored offer at a later time to this exact same population of authors, or to see if they organically take some specified action of interest absent any stimulus from the user. In this way, the system allows the entity to group authors in similar contexts and view them in custom categories or crowds that are meaningful to any given marketing program. This new crowd can then represent the target audience to which the entity may direct a promoted ad or even unsponsored content via e.g. a social networking site. Although this crowd was produced by specific search criteria at a fixed point in time, the social activities of authors contained within this crowd will change, and new data on their activities will accumulate as time goes on.

The system also provides for visualizing search results in discrete groupings based on similarities of contained records. In addition, these author groupings will be visualized and labeled with characteristics, as opposed to returning a list of individual line item results like a traditional search engine would produce. In this way, a user will not be overwhelmed by the results of numerous individual author records. Furthermore, a third party action may not affect the ranking or relevance of search results presented to the user. Existence in a grouping is determined solely by the presence or absence of searched attributes in author records, which is determined by author activity and characteristics, and available metadata in the author database.

The aforementioned search and segmentation process can take place on a purely anonymous or personally identifiable basis, or any combination thereof, in accordance with accepted privacy regulations and standards, privacy measures taken by individual users, and the policies of websites, social networking platforms, and other marketing media who possess the user data.

Query results from a search for authors can be saved for reference and subsequent analysis. Author lists produced from a custom search query can be transferred onto what will be referred to as a whitelist for the purpose of ongoing measurement and later action. In essence, storing and monitoring of custom search results (which happen to be social media authors) can be directly paired with the search functionality.

In searching and archiving the author search results, the system effectively can return a digitized representation of a total crowd. It allows the user to perform accurate segment sizing and to define and better understand a crowd that he or she is uniquely interested in at a given time. Author records contained within the author database that match the user's search parameters can each have unique identifiers, which enable the demarcation and aggregation processes to work easily when subsequently using the whitelist and/or custom author grouping. Furthermore, this may allow an author to be part of a custom author grouping by merely associating or storing the unique identifier in a custom author grouping. This allows a custom author grouping to contain unique identifiers instead of all information relating to an author. When searching for authors, the system may have no results or database or populated list of authors at all stored before the search. Once search parameters are entered, the system searches the internet or various databases (such as a social media database) for the authors and populates the search results.

Since an entity's targeted crowds are dynamic in nature, the user of the system disclosed herein may want to have searches and groupings for crowds—these author search results—archived and available to reference at a later time. The system allows the user to create his or her own personal query-specific "index" of author groupings that can be extracted from the results of the search. That is, the system provides the user with the option to populate one or more custom crowds with the results of a search query. The capability allows a user to store, archive, refine and manually adjust results returned by his or her custom search query. This conceptualization of a crowd of target authors can be viewed and edited in its original form at any time.

For example, a corporate communications professional at a large retail store may want to search for and identify the crowd on Twitter™ who is currently talking about the retailer's recent credit card breach. These authors may be a high priority for the retailer to reach with an apologetic message immediately following the incident. However, six months later, the user may want to follow up and send these exact same authors a different message: perhaps an exclusive, early-bird offer to a brand new clothing line for the purpose of re-engaging these potentially unhappy consumers. That is, the system may be utilized for remarketing campaigns to specific user groupings.

In this way, the ability to tag and store crowds will allow the entity to gain greater context into the behavior of the crowd he or she wishes to curate and nurture over time-whether it is tracking responsiveness to a promotion or any other author behavior. These crowds, in turn, can be constantly refreshed and updated as new authors join Twitter™ or any other social networking site, talk about a topic of interest, are served content items, etc. What's more, the entity can make comparisons and gauge performance measures exclusive to his or her specifically selected crowds-rather than on the marketing channel spend holistically. With this system, the entity can view performance measures on specific crowds, specific campaigns, and the channels they are on.

A user of the systems and methods disclosed herein can also append an aforementioned crowd with proprietary data or third-party audience data related to the target author base that is not produced by the system. For example, a user could upload customer relationship management (CRM) data on individual authors, which may consist of e.g. Twitter™ IDs or other unique author identifiers accumulated from other marketing programs. This capability provides the user with flexibility to add, change, or supplement author records that share similar characteristics with the crowd produced by system and methods disclosed herein.

A crowd may not be subject to any change to a search engine-indexing algorithm, availability of metadata, or by third party activity, which would consequently affect the organic ranking and presence or absence of individual search result listings. Systems and methods disclosed herein may also not be limited by the type of item or items returned on a search engine results page: these may include pages, documents, descriptions, links, usernames, and any other unique records matching the user's search query, which may be useful to archive and reference in original form at a later time.

Such a system and method as disclosed herein may be used for activating or activated crowd members. Returning to the "Beyonce Holiday Shoppers" example from above, some of the crowd members may view an article about a bizarre scandal with the pop star and take to Twitter™ with their commentary. The author postings are not responding to content from the user, but are nonetheless activated to the topic of Beyonce Knowles. So, in this way, any data on reach (impressions), behavioral engagement (likes, retweets, shares, follows and unfollows, photo uploads etc.), text expressions, image or video content shares, and even sentiment data on those mentions (positive, negative or neutrality of posts) can all fuel for social activation metrics. In various embodiments, authors may be activated by either online or offline stimuli. These metrics can indicate a good time to market certain products, services, content, etc.

Metrics actually measured by the system with regards to its crowds can be varied and may be calculated in different ways. Although not a comprehensive list of possible metrics, some example measurements include: (1) crowd to community ratio: size of the crowd vs. size of current follower base; (2) crowd penetration: percentage of crowd members contained in a specific social community or following (this can also be similarly tracked as a "crowd to community conversion rate" or a "crowd acquisition rate"); (3) crowd conversion rate: % of crowd members that opt into a marketing offer/total number of crowd members who saw the offer; (4) crowd activation rate: # of crowd members that take action of interest/total crowd size (this can also be tracked as the "activated" community for something within a crowd); (5) crowd engagement: # of crowd members engaging with paid or organic content/total overall engagement (this can also be tracked in raw numbers); (6) crowd impressions: # of crowd members to whom paid or organic content was displayed/total overall impressions (this can also be tracked in raw numbers); (7) percentage change in crowd size: (# of crowd members at time 1–# of crowd members at time 0)/# of crowd members at time 0; (8) multi-crowd membership: method for finding duplicate records by matching unique author identifiers contained within multiple custom author crowds; (9) crowd awareness: percentage of crowd members who are likely to be aware of a brand, product, or service based on the activities and postings of these authors during a certain time period. Measurements and metrics specific to one crowd may be compared to total measures that may include actions taken by authors who are not represented in the crowd; (10) crowd fatigue: calculated by determining the number and frequency of content items delivered to a singular crowd during a specific time period relative to other crowds (this measurement may also be expressed in percentage or proportional terms); (11) crowd attraction: percentage of total online activity and interactions of the authors within a custom author crowd that concerns or is directed to other members of the custom author crowd or related to the defined characteristics of the crowd—this may be considered a measurement of the degree of attraction within a custom author crowd on a social platform relative to other crowds (this may also be expressed as an evaluation of inter-crowd communicativeness); (12) crowd focus: percentage of behaviors, postings, or promoted messages by the user that were directed to each custom author crowd based on the user's total online activity (this may also be expressed in relation to the user's other custom author crowds).

A user may also use the crowd as a basis for gaining other statistics specific to his target audience, including: other embodiments of awareness measurement, marketing fatigue or other embodiments of reach and frequency capping within a crowd, content relevance, affinity strength and comparisons, word-of-mouth marketing gauges, advocacy and loyalty indicators, or any range of behaviors and expressions—even sharing activity of different media files by these authors. The system may also facilitate event-based alerting and quantifiable aggregations of activities in a custom crowd. For example, when an author uses a specific keyword or hashtag in a tweet, the user of the system may be alerted. He may also be alerted to and may be capable of viewing the total number of such instances that occurred with respect to his crowd over a certain time period. The user of the system could specify these specific events of interest when setting up a custom search monitor.

Advantageously, the system allows for ongoing measurement of a specified crowd as expressed in terms of the share of total authors that exist in that crowd. The user experience with the system may create the feeling of a challenge for the user: it is theoretically feasible to capture one's entire target segment and to verify those successes through various data points, quantitatively. That is, there are a total quantifiable number of target authors, which can be compared against benchmarks and current activity levels. Each step closer to the total may be treated as a minor victory in itself. To accomplish this, the system may include a user interface or dashboard-like visualization to display the various crowds, calculations, comparisons, current user performance, benchmarks, comparison to benchmarks, past user performance, competitor performance, user activity levels, user investment or content item spending, and/or comparison to other investment levels by competitors or industry averages.

An illustrative embodiment may also include notification of action or actions taken by an author contained within a custom-curated crowd that signals fluctuations of interest in the overall performance of that crowd. The addition of gamification techniques to this software platform allows for the creation of thresholds through performance metrics that can provide an entity with a sense of achievement and closure—even addiction—with respect to his or her current level of author activity relative to known baselines, benchmarks, and short and long-term goals.

After creating one or more crowds, a user may choose to proactively target authors by engaging in any variety of direct marketing activities or by leveraging specific ad products offered by the marketing medium. The user may also choose to passively view the organic activity of authors in those segments. In either approach, the system allows the user to monitor subsequent author activity within his or her crowd after the crowd was created.

The system also provides a customizable keyword and behavior-based alerting and aggregate measuring mechanism to the user when any of the authors included in a custom-defined crowd executes an action or behavior of interest on any range of digital or social media. That is, only the activity of the authors specifically contained within a user's crowd will trigger an alert and impact overall performance measurement. The system provides a huge range of possibilities regarding the behaviors that an entity may be interested to track and aggregate within a crowd and/or to receive a direct notification. For example, an author could mention a specific news event or brand name, engage with a piece of unsponsored content such as a Facebook™ message, visit a website, click on a paid content item, follow a corporate Twitter™ handle, or engage in any other behavior on a digital or social medium specified as an action of interest by the user. Recall a previous example: a user may want to know when his or her custom-defined crowd of "Beyonce Holiday Shoppers" takes an action. In an example apart from engagement with paid content items, the user may want to know when a crowd member elects to follow a certain Twitter™ account. That is, the user is interested in each instance an author contained within this particular crowd takes this singular action. In this case, the system will determine the baseline number of users within the custom-defined crowd who follow the Twitter™ handle identified by the user. Every subsequent follower the user receives to that account will be similarly searched against the index to see if the author is a tagged user contained within the user's custom crowd. Say, for example, @jehanhamedi just followed the user's desired Twitter™ handle. If this name exists in the custom crowd, the user will be alerted that he has captured a new member of his target market.

The system may also display performance metrics on a custom-curated crowd. The number of alerts accrued for a particular event or action taken by authors in a custom segment may also be tracked and quantified into perpetuity. In doing so, the aggregation of these events or alerts will serve as a quantifiable representation of performance in that custom-curated segment of Internet authors. These alerts can continue into perpetuity until the crowd containing all tagged authors of interest is deleted from the software platform.

Consider, again, that the act of following a Twitter™ handle is the user's behavior of interest. Let's say that the user's custom-curated crowd consists of 100 target authors and, at the present time, 10 of them follow him on Twitter™. Therefore, the user's current crowd penetration (which may also be described as a variant of a "follower rate") with this crowd is 10%. Fast-forward one week: The user posts several new messages through his Twitter™ account, including a sponsored one, and sees that he has gained new followers. In this example, the user received 10 new followers in the week. The system searches for these authors within the user's crowd and identifies that 5 of the new followers are indeed contained within the crowd. As a result, crowd penetration has now grown to 15% (15/100) in that segment. The user can view this percentage change in performance in that crowd and even compare it to other crowds he may have defined with the system. This figure may also be compared to the total number of that account's followers to determine, for example, the proportion of crowd members to general followers at a given time.

In this way, the system allows for the creation of benchmarks and other comparative measures to gauge, on a continuous basis, the user's performance in a target crowd at the present time relative to the total performance that is achievable in that crowd, i.e. the denominator, at that time. By calculating percentage changes and other raw measurements over time with respect to each of these actions, the user is able to create and monitor his or her own custom, market share-like performance indicators for each author crowd he or she wishes to target.

The system may also include capabilities for benchmarking and ongoing monitoring. The system can provide a display that acts as a dashboard monitoring the activity of the entity's crowds on each marketing medium. This display may show any type of market share-like key performance indicators (KPIs), such as percentages of awareness, purchase intent, content relevance, crowd membership growth and crowd penetration, marketing fatigue, priming indicators, degree of topic or brand affinity, loyalty rates, crowd acquisition rates, etc. With each of these metrics there may also be a display of an average score and an anonymous industry leader to help instill a sense of competition and encourage continued activity. The conceptualization of a leaderboard may also use identifiable information of top achievers. Relative rankings in achievement may be determined with respect to performance in the same custom author crowd, a specific category of interest, within some competitor set, or along any other dimension that is capable of being tracked via fluctuation criteria. One or more of the user's crowds may also be included in these achievement calculations. As described, the system can also quantify overall success rates in each custom crowd. In this way, the user can view success measures at a current activity level in relation to the total possible pie at a given time. By having visibility into total possible achievement or relative achievement to other crowds or other entities, the entity may be incentivized to increase spend levels until reaching 100% or whatever his or her goal may be.

The present system and methods may advantageously help an entity think—"Okay, if I am only at 40%, where do my competitors stand?" I don't want to be out-performed; I want to own the greatest consumer mindshare of the people I care about and keep moving the needle towards 100%, before they do." In that way, the system creates and fosters an arcade-like experience that gamifies marketing expenditures and the user experience for the software user. This model can create value for all parties involved. An entity may use the present system instead of something like sponsoring a TV show or a golf event where the entity has less information on who actually sees and engages with his or her campaign.

In an illustrative embodiment, multiple custom author groupings are compiled and available for selection or display. In this embodiment, statistical summaries of each of a user's custom author groupings can be displayed on one web page or a set of web pages, or within the interface of a software product. Such a collection of one user's custom author groupings may be referred to as a whitelist. The user may use that whitelist as the sole and primary content source for analysis, allowing the user to track and perform measurements on the behaviors, expressions, and other fluctuations of that specific group of authors (i.e. the search results) in isolation. By performing measurements on the activities of a specifically-defined crowd, the user is able to determine, for example, the size of a certain crowd of users or discussion group, as well as determine applicable audience activation and user acquisition metrics for that crowd. These measurements will help the user learn if his or her recent initiatives on any one or set of social media channels are positively impacting these metrics. These metrics can be referenced on an ongoing basis into the future.

The user may also decide to set up new programs around a crowd that may include executing targeted marketing via a social network's marketing platform or any other marketing optimization, analysis, engagement, or technology platform described elsewhere in the present application that may specifically be directed to reach this author set. The user may set up activity-based alerts to notify him of certain actions taken by these crowd members or changes within the size and makeup of the crowd overall. For example, did people in the custom crowd, Pepsi™ Lovers, just follow @Coca-Cola™ on Twitter™ after they saw a promoted ad for Diet Coke™? The user can also compare and contrast other custom author groupings he or she created along any of the same measures.

The system allows for comparison and tracking of two or more customized crowds against each other for the purpose of determining relative achievement and performance. This comparative measure may be a quantification of a desired action taken by certain authors in a crowd against the total crowd or comparisons along any of the metrics aforementioned. For example, the user may decide to compare two custom defined crowds versus viewing one in isolation to determine relative activation (or author acquisition) levels with respect to the total number of social media authors in a crowd or against any other control group. The user may also wish to determine whether he or she was more effective in activating crowd A or crowd B after executing campaigns during a certain time period. In another embodiment, the user may not even define these comparison crowds himself with the system; there may be potential to compare a user-defined crowd to a crowd defined by other users of the system or to a sample crowd or any collection of sample crowds already provided by the system.

In an illustrative embodiment, a marketing campaign executed directly through or in conjunction with the system by a user may be used to capture more customer data. For example, a promotion on a social network may allow authors to participate in the promotion upon giving the user an e-mail address or mobile phone number to receive the offer. This may be an effective way to acquire new information about authors in the crowd which can be stored in customer relationship management (CRM) databases maintained either in the present system or separately by the user.

Advantageously, the present system and methods allows a user to target and analyze the activities of authors across multiple social networks such as Facebook™, Twitter™ Tumblr™, LinkedIn™, Pinterest™, etc. As a result, the system also has the capability of facilitating both the targeting and retargeting of social media users across multiple social networking sites. That is, finding and serving promotional content to the same person when he or she is on each platform. The system can thus function as a neutral third party platform between social networks where neither party needs to worry about divulging valuable information to the other, yet both parties benefit from increased marketing interest. The user of the system can create custom, storable audience segments on a third party platform.

FIG. 1 is a block diagram illustrating computing devices 100 and 145 and a server 125 that may be used in accordance with an illustrative embodiment. In alternative embodiments, fewer, additional, and/or different components may be included in the system. In FIG. 1, there is a computing device 100, a server 125, and a computing device 145. The computing device 100 includes a processor 115 that is coupled to a memory 105. The processor 115 can store and recall data and applications in the memory 105. The processor 115 may also display objects, applications, data, etc. on the interface/display 110. The processor 115 may also receive inputs through the interface/display 110. The processor 115 is also coupled to a transceiver 120. With this configuration, the processor 115, and subsequently the computing device 100, can communicate with other devices, such as the server 125 through a connection 170.

The server 125 includes a processor 135 that is coupled to a memory 130. The processor 135 can store and recall data and applications in the memory 130. The processor 135 is also coupled to a transceiver 140. With this configuration, the processor 135, and subsequently the server 125, can communicate with other devices, such as the computing device 100 through a connection 170.

The computing device 145 includes a processor 155 that is coupled to a memory 150. The processor 155 can store and recall data and applications in the memory 150. The processor 155 is also coupled to a transceiver 160. The processor 155 may also display objects, applications, data, etc. on the interface/display 165. The processor 155 may also receive inputs through the interface/display 165. With this configuration, the processor 155, and subsequently the computing device 145, can communicate with other devices, such as the server 125 through a connection 175.

The devices shown in the illustrative embodiment may be utilized in various ways. For example, any of the connections 170 and 175 may be varied. Any of the connections 170 and 175 may be a hard wired connection. A hard wired connection may involve connecting the devices through a USB (universal serial bus) port, serial port, parallel port, or other type of wired connection that can facilitate the transfer of data and information between a processor of a device and a second processor of a second device, such as between the server 125 and the computing device 145. In another embodiment, any of the connections 170 and 175 may be a dock where one device may plug into another device. While plugged into a dock, the client-device may also have its batteries charged or otherwise be serviced. In other embodiments, any of the connections 170 and 175 may be a wireless connection. These connections may take the form of any sort of wireless connection, including but not limited to Bluetooth connectivity, Wi-Fi connectivity, or another wireless protocol. Other possible modes of wireless communication may include near-field communications, such as passive radio-frequency identification (RFID) and active (RFID) technologies. RFID and similar near-field communications may allow the various devices to communicate in short range when they are placed proximate to one another. In an embodiment using near field communication, two devices may have to physically (or very nearly) come into contact, and one or both of the devices may sense various data such as acceleration, position, orientation, velocity, change in velocity, IP address, and other sensor data. The system can then use the various sensor data to confirm a transmission of data over the internet between the two devices. In yet another embodiment, the devices may connect through an internet (or other network) connection. That is, any of the connections 170 and 175 may represent several different computing devices and network components that allow the various devices to communicate through the internet, either through a hard-wired or wireless connection. Any of the connections 170 and 175 may also be a combination of several modes of connection.

To operate different embodiments of the system or programs disclosed herein, the various devices may communicate in different ways. For example, the computing device 100 and computing device 145 may download various software applications from the server 125 through the internet. Such software applications may allow the various devices in FIG. 1 to perform some or all of the processes and functions described herein. In another embodiment, the computing devices 100 and 145 may operate using internet browsers that can access websites that perform the functionality of any of the systems and methods disclosed herein. For example, a user of the system and methods disclosed herein may be able to use a computer, laptop, smartphone, etc. to access web pages provided by the system. The user could perform searches for custom author groups, save custom author groups, view analysis of those custom author groups, etc. as disclosed herein using only a website with various interfaces and web pages. Additionally, the embodiments disclosed herein are not limited to being performed only on the disclosed devices in FIG. 1. It will be appreciated that many various combinations of computing devices may execute the methods and systems disclosed herein. Examples of such computing devices may include smart phones, personal computers, servers, laptop computers, tablets, blackberries, RFID enabled devices, or any combinations of such devices.

In one embodiment, a download of a program to the computing device 100 involves the processor 115 receiving data through the transceiver 120 from the transceiver 140 of the server 125. The processor 115 may store the data (like the program) in the memory 105. The processor 115 can execute the program at any time. In other embodiments, the computing device 145 may download programs in a similar manner to the client-device. In another embodiment, some aspects of a program may not be downloaded to the computing device 100 and computing device 145. For example, the program may be an application that accesses additional data or resources located in the server 125. In another example, the program may be an internet-based application, where the program is executed by a web browser and stored almost exclusively in the server 125. In the latter example, only temporary files and/or a web browser may be used on the computing device 100 or computing device 145 in order to execute the program, system, application, etc.

In yet another embodiment, once downloaded to the computing device 100, the program may operate in whole or in part without communication with the server 125. In this embodiment, the computing device 100 may access or communicate with the server 125 only when acquiring the program, system, application, etc. through the connection 170. In other embodiments, a constant or intermittent connection 170 may exist between the server 125 and the computing device 100. Where an intermittent connection exists, the computing device 100 may only need to communicate data to or receive data from the server 125 occasionally.

The configuration of the server 125, the computing device 100, and the computing device 145 is merely one physical system on which the disclosed embodiments may be executed. Other configurations of the devices shown may exist to practice the disclosed embodiments. Further, configurations of additional or fewer devices than the ones shown in FIG. 1 may exist to practice the disclosed embodiments. Additionally, the devices shown in FIG. 1 may be combined to allow for fewer devices or separated where more than the four devices shown exist in a system.

In some embodiments, the devices shown in FIG. 1 may be existing devices that are owned or possessed by a user, author in a crowd, other author, system administrator, etc. using the embodiments disclosed herein. In such an embodiment, the author or user may only need to download software (e.g., an application or 'app') to the existing device to execute the various embodiments disclosed herein. In other embodiments, specialized hardware may be used by the author or user that is specifically designed to perform or execute the various embodiments disclosed herein. As such, hardware may be specifically designed to provide such capabilities.

In an illustrative embodiment, the computing device 100 is used by a user of the system and methods disclosed herein. The computing device 100 may be used to search for authors, create/specify custom author groups, and review the results of the monitoring of those custom author groups. A user may further utilize the computing device 100 to implement marketing campaigns, or interact with and otherwise create content for the internet that may not explicitly be marketing, or perform any other functions as disclosed herein. The computing device 145 is used by an author. The author can join social networks, follow Twitter™ handles, like pages, send messages and chats, receive e-mail, author online content, navigate the internet, make purchases, trigger events, etc. or perform any other functions as disclosed herein. The server 125 facilitates and hosts the system and methods that are disclosed herein. It may store for the custom author groupings, calculate and monitor those groupings, and provides the computing device 100 access to the features that are disclosed throughout the present application.

Figure 2:
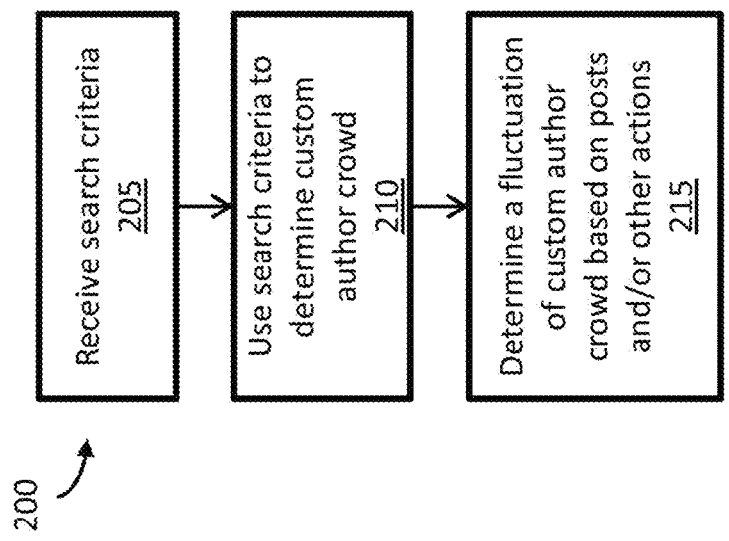
FIG. 2 is a flow diagram illustrating a method of determining fluctuations in a social media custom author group in accordance with an illustrative embodiment.

FIG. 2 is a flow diagram illustrating a method 200 of determining fluctuations in a social media custom author group in accordance with an illustrative embodiment. In alternative embodiments, fewer, additional, and/or different operations may be performed. Also, the use of a flow diagram is not meant to be limiting with respect to the order of operations performed. In an operation 205, the system receives search criteria for authors. The search criteria may be a demographic or user profile trait of an author, a subject matter of a social media post authored by an author, a related subject matter of a predetermined number of social media posts authored by an author, a group association of an author, an affirmative activity executed through the online social network of author, or any other search criteria as discussed elsewhere in the present application. The search may be performed by a user entering text on their own through an input such as a keyboard. The search may also be performed by selecting parameters from a menu such as a drop down menu. For example, a user may be able to select a desired gender, age, home state, time zone, etc. of an author from a drop down menu. Additionally, the search could be automatically populated based on past searches. In other words, a user may be able to save past searches so that he or she does not have to remember the exact parameters he or she has previously entered. This may allow the user to run the same search again or use the populated information to ensure that they do not run the same search again. The user may want to tweak the search only slightly. In one embodiment, the search fields may be automatically populated with the most recent search parameters. In another embodiment, the interface for searching may also include a button that the user can select to clear or set to a default of the fields that are used for searching. In yet another embodiment, the user may be able to view a news feed-like thread of recent custom author crowd searches performed by other users of the system. The user may also apply filters with certain criteria to limit the amount of content that is played.

In an operation 210, the search criteria is used to determine a custom author crowd. In this embodiment, the search criteria can be used to perform a search after receiving an input from the user. If the search results are to the user's liking, another input can be received from the user to indicate that the user would like a custom author crowd created. The custom author crowd is created. The user may be presented with an opportunity to name the custom author crowd, making it easier to identify who is in the crowd, why the crowd was searched or created, or some other identification that the user specifies. The custom author crowd specified at 210 is saved and monitored based on fluctuation criteria.

In an operation 215, the system determines a fluctuation of the custom author crowd based on author posts and/or other actions. The other actions may be a variety of author actions such as retweeting, liking, commenting, purchasing, or any other author action or interaction as disclosed and discussed throughout the present application. These posts and actions signal when an author or number of authors has been activated within the crowd. Thus, fluctuation criteria specified by the user may also be referred to as activation criteria.

Figure 3:
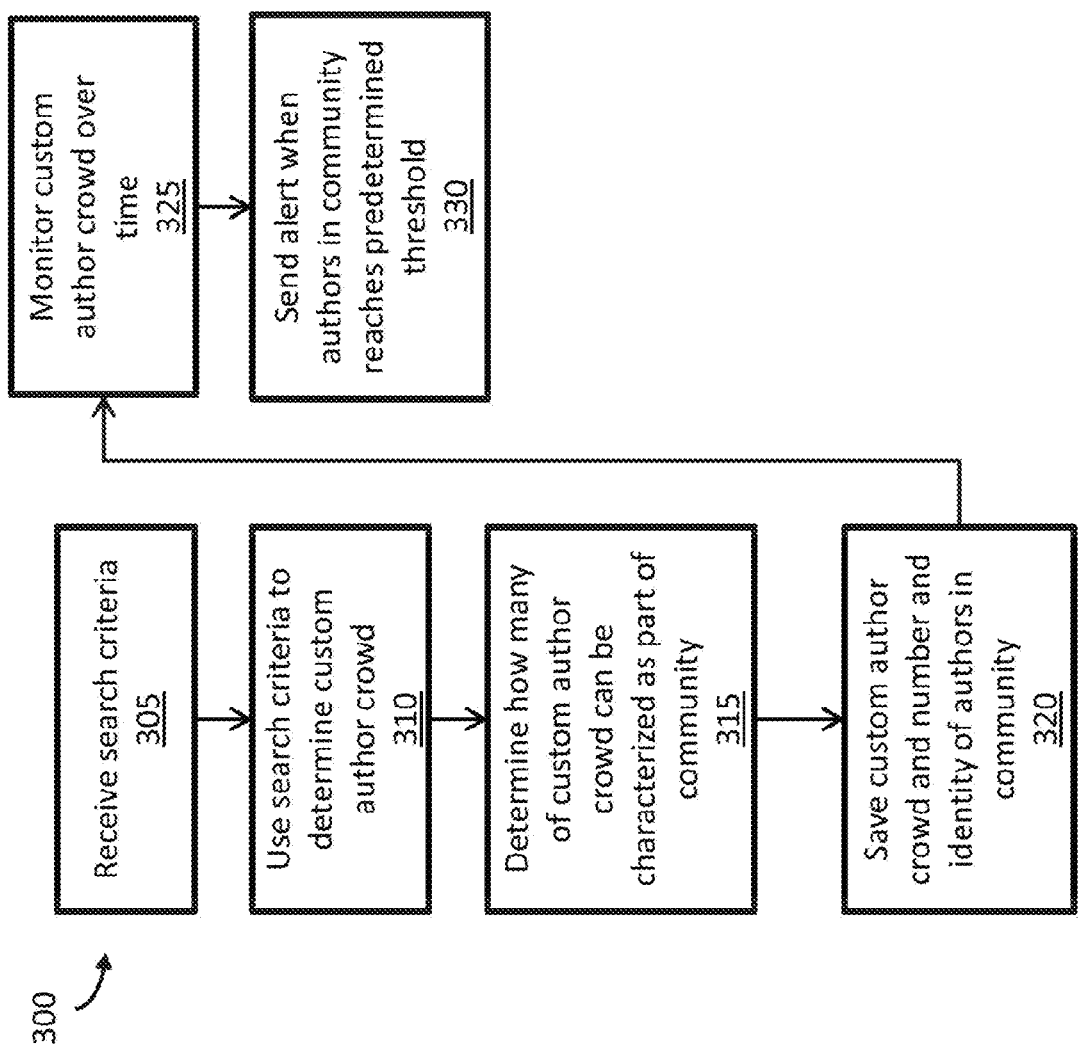
FIG. 3 is a flow diagram illustrating a method of monitoring a social media custom author group and sending an alert when fluctuations of author postings reach a predetermined threshold in accordance with an illustrative embodiment.

FIG. 3 is a flow diagram illustrating a method 300 of monitoring a social media custom author group and sending an alert when fluctuations of author postings reach a predetermined threshold in accordance with an illustrative embodiment. In alternative embodiments, fewer, additional, and/or different operations may be performed. Also, the use of a flow diagram is not meant to be limiting with respect to the order of operations performed. In an operation 305, the system receives search criteria from the user. This search criteria is used to search for authors or groups of authors. The search criteria may be a variety of demographic factors or online actions or interactions performed by the author, as discussed at length elsewhere in the present application. Similarly, in an operation 310, the search criteria is used to determine a custom author crowd as discussed throughout the present application.

In an operation 315, the system determines how many authors in the custom author crowd can be characterized as being a part of a community, where the parameters of the community is specified by the user of the system. In other words, the system is determining a magnitude or number of authors in the custom author crowd that have met a fluctuation criteria. For example, the fluctuation criteria may be whether an author has liked a sponsored page for pizza. In the operation 315, the system determines how many authors in the custom author crowd already have liked the sponsored page for pizza. In this embodiment, the search criteria and the fluctuation criteria are different. In an alternative embodiment, the search criteria and the fluctuation criteria may be the same.

In an operation 320, the system saves the custom author crowd and the number and identity of authors that were determined to be part of the community in the operation 315. In this embodiment, all authors in the custom author crowd and their associated profiles are saved as the custom author crowd. In an alternative embodiment, identifiers of each account are stored in a list that serves as the custom author crowd. Any other information relating to the authors may be stored separately but can be referred to using the author identifiers. Similarly, an identification or identifier may be stored with the author account or identifier that indicates whether a particular author is part of the community or another social following. In this embodiment, the system determines if the authors in the custom author crowd are part of one community. In an alternative embodiment, the system may determine if the authors in the custom author crowd are a part of multiple communities. For example, the system may determine whether the authors in a custom author crowd have been activated, that is, if the authors have posted something indicating their interest or activation in a subject. For example, authors may like, follow, author, etc. a post about fashion. The system may then determine how many authors in the custom author group have been activated to be interested in fashion (part of the fashion community). The system may, in addition to the more general fashion community, determine how many of the authors in the custom author group are part of a particular fan base. For example, the system may determine how many of the authors in the custom author group have liked, followed, etc. the clothier J. Crew™. In this way, a user may be able to determine how many authors in the custom author group are activated, and how many authors are in an owned community such as a particular brand. The system may utilize this functionality to compare the owned community to the broader community. In other words, the system could determine what proportion of the activated community is part of a particular owned community. In this way, the user may be able to more accurately track their own brand (or owned community) or that of a competitor.

In an operation 325, the custom author crowd is monitored over time to determine whether authors in the custom author crowd meet the fluctuation criteria and are subsequently characterized as being part of the community. In an operation 330, an alert is sent to the user when the number of authors in the community has reached a predetermined threshold. In an alternative embodiment, the user is alerted whenever an author in the custom author crowd is characterized as joining the community. In another alternative embodiment, the user is alerted based on a schedule. For example, the alert may be sent once a week and update the user on how many authors have left, joined, or stayed in the community. Other various information or statistics may be included with the alert.

Figure 4:
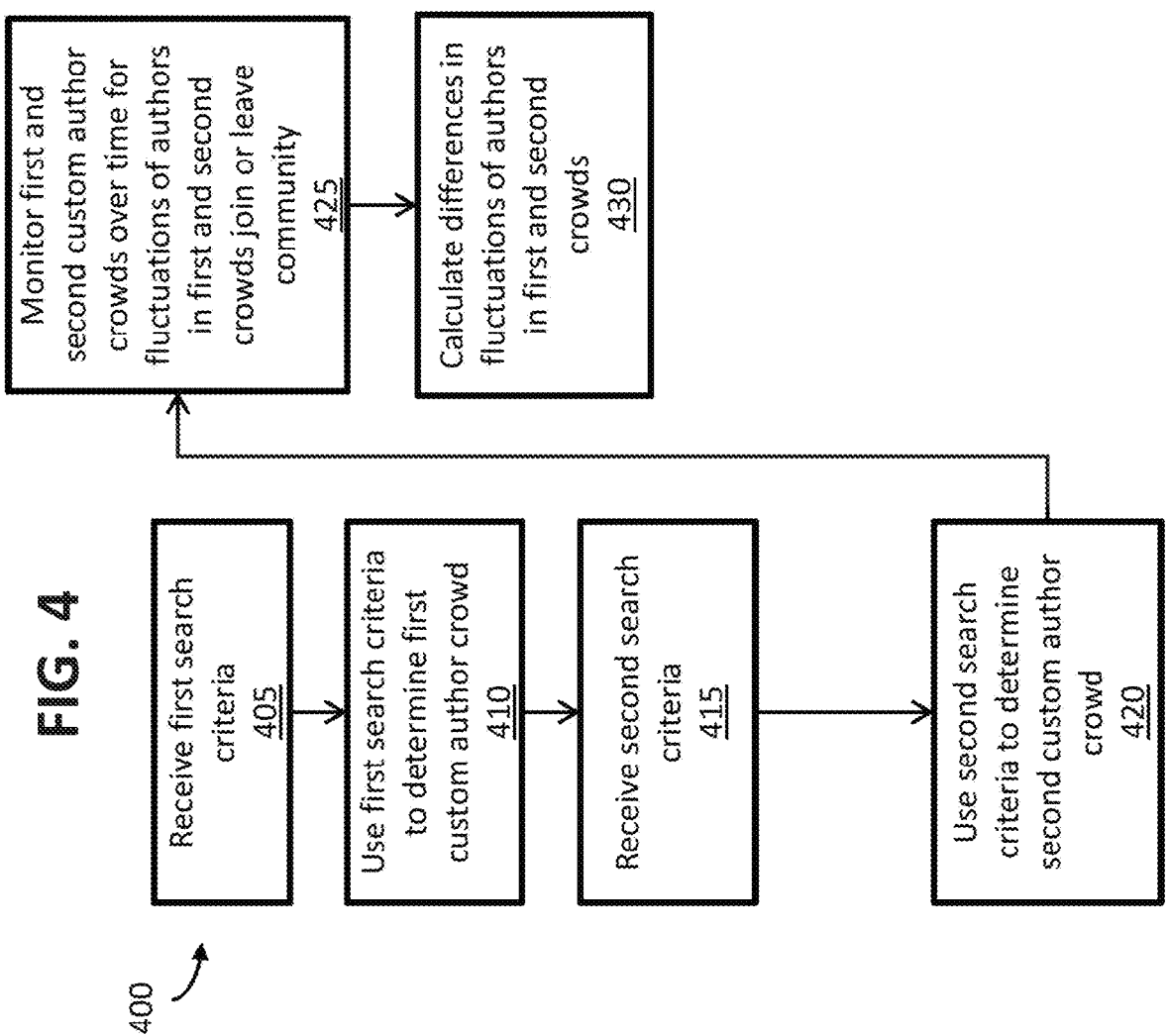
FIG. 4 is a flow diagram illustrating a method of comparing fluctuations in multiple social media custom author groupings in accordance with an illustrative embodiment.

FIG. 4 is a flow diagram illustrating a method 400 of comparing fluctuations in multiple social media custom author groupings in accordance with an illustrative embodiment. In alternative embodiments, fewer, additional, and/or different operations may be performed. Also, the use of a flow diagram is not meant to be limiting with respect to the order of operations performed. In an operation 405, a first search criteria is received from a user. The first search criteria may be received similar to the search criteria discussed above with respect to operation 205 of FIG. 2.

In an operation 410, the first search criteria is used to determine a first custom author crowd. The determining of the first custom author crowd may be performed similar to the determining a custom author crowd 210 discussed above with respect to operation 210 of FIG. 2.

In an operation 415, a second search criteria is received from a user. The first search criteria may be received similar to the search criteria discussed above with respect to operation 205 of FIG. 2. In an operation 420, the second search criteria is used to determine a second custom author crowd. The determining of the second custom author crowd may be performed similar to the determining a custom author crowd 210 discussed above with respect to operation 210 of FIG. 2.

In an operation 425, the system monitors the first and second custom author crowds over time for fluctuations of authors in the first and second custom author crowds who over time leave or join a community, i.e. become activated. The monitoring may be similar to operation 215 of FIG. 2 and/or operation 325 of FIG. 3. In this embodiment, the fluctuation criteria monitored for is the same for both the monitoring of the first custom author crowd and the second custom author crowd. In an alternative embodiment, a different fluctuation criteria may be used or specified for the first custom author crowd and the second custom author crowd. The monitoring determines how many authors in each crowd have joined or left the community, and at what time these events occur.

In an operation 430, the system calculates differences in fluctuations of authors in the first and second custom author crowds joining or leaving the community. In other words, the fluctuations within the first and second custom author crowds are compared. The differences in fluctuations of the first and second custom author crowds may indicate that certain strategies or content proved more effective at getting one crowd over the other to join the community (i.e. to become activated within some specific context), to opt into a marketing offer, to join the fan base of specific social account, etc. In an alternative embodiment, many other statistics, comparisons, and ratios may be calculated as disclosed herein. In another embodiment, the system may compare and monitor more than two custom author crowds.

Figure 5:
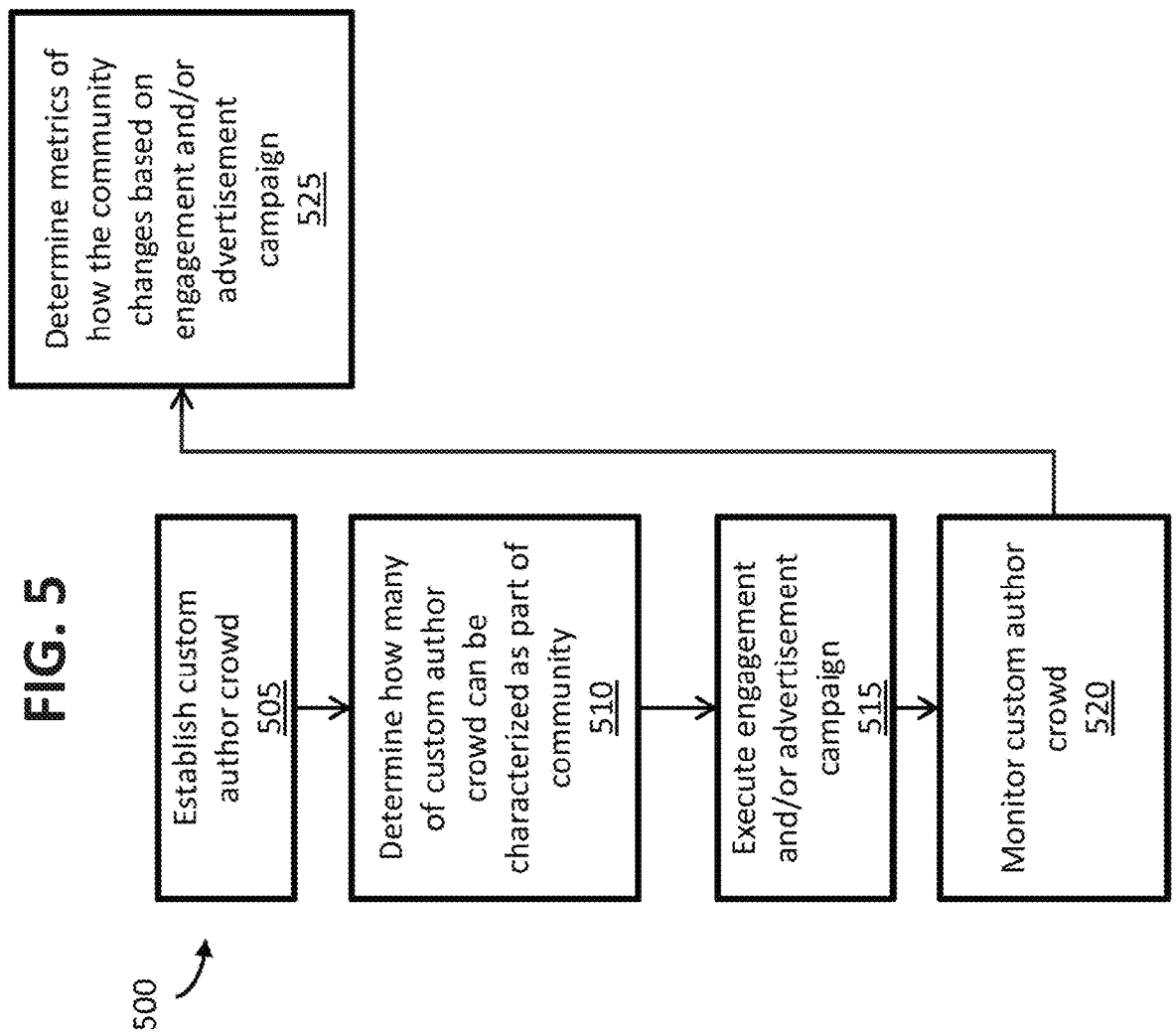
FIG. 5 is a flow diagram illustrating a method of measuring effectiveness of an engagement and/or a campaign based on the monitoring of a social media custom author grouping in accordance with an illustrative embodiment.

FIG. 5 is a flow diagram illustrating a method 500 of measuring effectiveness of an engagement and/or content item campaign based on the monitoring of a social media custom author grouping in accordance with an illustrative embodiment. In alternative embodiments, fewer, additional, and/or different operations may be performed. Also, the use of a flow diagram is not meant to be limiting with respect to the order of operations performed. In an operation 505, a custom author crowd is established. The establishment of a custom author crowd may be performed using steps similar to operations 205 and 210 of FIG. 2. In an operation 510, the system determines how many of the authors in the custom author crowd may be characterized as part of the community. This determining may be similar to operation 315 as discussed above with respect to FIG. 3.

In an operation 515, an engagement and/or content item campaign is executed by or in conjunction with the system disclosed herein. This may be running a content item, posting sponsored content online, sending out print media, running a commercial, tweeting something from an official account, prioritizing particular content on a social networking website, retweeting a post, or any other sort of engagement or content item campaign that can be executed online or offline. In this embodiment, the user executes the engagement and/or content item campaign using the present system. That is, the user may be able to post and or schedule to be posted content items, sponsored content, unsponsored content, etc. utilizing the system. In an alternative embodiment, the engagement and/or campaign may be executed outside the framework of the presently disclosed system and methods. That is, the user or party related to the user may execute an engagement and/or content item campaign utilizing a different electronic system, or the campaign may not be online at all. For example, the user may execute an engagement and/or content item campaign on a different website, may send out paper mailers, e-mails, run a promotion in stores for or related to a product or products, etc.

In an operation 520, the custom author crowd is monitored for one or more fluctuation criteria. The fluctuation criteria may be interacting with sponsored content such as commenting on, reading, or retweeting the content. The fluctuation criteria may also be joining an online affinity group or following a particular individual or brand page or account. Another monitored fluctuation criteria may be whether the author actually authors a post regarding sponsored content, the campaign, or the subject of the campaign. Other fluctuation criteria that may be monitored are disclosed throughout the present application.

In an operation 525, the system determines metrics of how the community and/or the custom author group changed based on the monitored fluctuation criteria. This can inform the user how effective the engagement, marketing and/or marketing program was. The metrics may be many various calculations as described herein. For example, the metrics may include number of authors who joined the community during the content item campaign or a set amount of time after the campaign, percentage change of authors in the custom author crowd who joined the community, number of authors who joined a corporate fan base or a celebrity brand endorser's following, etc.

Figure 6:
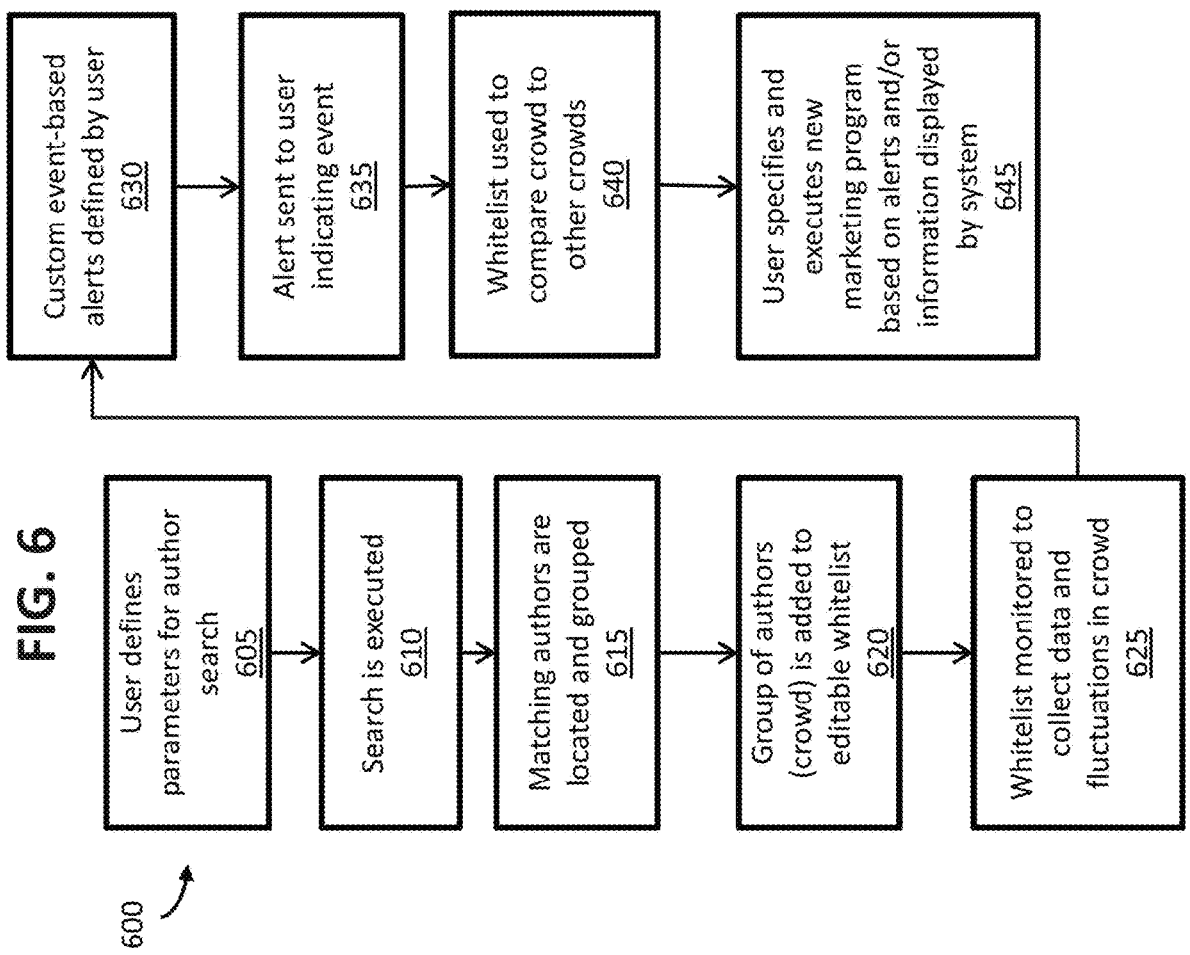
FIG. 6 is a flow diagram illustrating a method of defining, monitoring, and using a custom author grouping to run a marketing campaign in accordance with an illustrative embodiment.

FIG. 6 is a flow diagram illustrating a method 600 of defining, monitoring, and using a custom author grouping to run a marketing campaign in accordance with an illustrative embodiment. In alternative embodiments, fewer, additional, and/or different operations may be performed. Also, the use of a flow diagram is not meant to be limiting with respect to the order of operations performed. In an operation 605, the user defines the parameters for an author search. In an operation 610, the search for authors is executed based on the parameters defined by the user.

In an operation 615, the authors that match the search parameters are located and grouped together in a custom author crowd. In an operation 620, the group of authors, or crowd, are added to an editable whitelist. The whitelist, as described elsewhere in the present application, is a list (including an interface) where different custom author crowds can be viewed, sorted, configured, deleted, etc.

In an operation 625, the whitelist (and subsequently the custom author crowds stored therein) is monitored to collect data and fluctuations in the crowds based on fluctuation criteria determined by the user and/or preset in the system. In an operation 630, custom, event-based alerts are defined by the user. For example, the user may wish to receive an alert whenever an author leaves his or her community. In another example, the user may wish to receive an alert whenever a particular fluctuation criteria changes such that when a predetermined threshold (which can be set by the user) is reached the alert is sent. In another example, the user may wish to get an alert if the fluctuation criteria for one custom author crowd is a higher value than the fluctuation criteria for a second custom author crowd. Other alerts may be set and defined, such as other alerts as defined elsewhere in the present disclosure.

In an operation 635, an alert is sent to the user indicating that an event has occurred. Stated another way, the system has determined that a particular fluctuation criteria is met as defined by the user, so an alert is automatically generated and sent to the user by the system. The alert may be sent in varying ways. For example, the alert may be sent by instant message, short message service (SMS) text, e-mail, tweet, fax, message system viewable in the presently disclosed system interface, etc.

In an operation 640, custom author crowds are compared to other custom author crowds in the whitelist. These comparisons may be done using varying methods as disclosed throughout the present disclosure. Additionally, the comparison may include calculations of particular metrics or indicators based on the comparisons.

In an operation 645, the user can specify and execute a new marketing program based on alerts received and/or additional information displayed by the system. In other words, the user can start a campaign based on an alert received. The user may also wish to access the features of the full system and may view additional information that informs their decision of whether to initiate a content item campaign and what type of campaign that might be. Additionally, the user may have pre-programmed one or more campaigns into the system or another adjoining system or systems that could be accessed by the system disclosed herein. In this embodiment the user can then just select that campaign to commence as soon as the user receives an alert. In an alternative embodiment, a content item campaign may be initiated by the system automatically when a certain alert condition exists. In this embodiment, the alert sent to the user may include the alert information as well as a notification that the content item campaign was initiated automatically. In another embodiment, the execution of a content item campaign may be facilitated via an application programming interface (API) that may allow the user to integrate intelligence generated and provided by this system into other cross-channel marketing strategies and initiatives that may leverage other software applications. Thusly, the presently disclosed system may also aid the user in optimizing other programs that are not entirely managed via this system. In other words, the user may be able to access other programs through interactions between the presently disclosed system and another program. In this example, the user may wish to execute a marketing program. A link to marketing program software may be inserted into an interface for a software, application, or web page. Although the marketing plan in this example is not executed by the present system, capabilities to execute marketing plans can be incorporated into the present system.

The methodology and components described herein may be used for broader applications that combine search functionality, whitelist creation, and custom measurements and alerts to form a custom search monitor beyond social media. Custom search monitors can be applied to help users research any topic and compare custom results to another dataset (similar to comparing a target crowd to an existing social community) where item records are capable of being queried in a database. Further, a custom search monitor may operate with direct database access or it may leverage a web crawler to extract data and populate an index, which is then searchable by the user. In another embodiment, a separate database is created where new data is added by executing frequent API calls of another database or by manual input.

In an alternative embodiment, a custom search monitor may be applied to a store inventory database to alert a user when a new product he wants is in stock at his local retailer or when the product goes on sale, adds a new feature/color, etc. The product types and fluctuation criteria may be specified by the user after a search of all records and then tracked to capture fluctuations in specific attributes of interest. Users may even use this method to compare one retailer or distributor against another along the same dimensions. That is, the user may have an open search monitor running for the products he is interested in spanning multiple stores' databases. A custom search monitor may also be applied in the context of product user reviews as well. In that way, a user may be alerted when the products or services he is interested in cross a certain threshold in terms of the volume or sentiment of ratings, or overall rating score.

In an alternative embodiment, a custom search monitor may be applied to a database of job listings where the user can search and tag target companies he or she is interested in applying to for a job at the present time or at some time in the future. The system may then alert the user to changes to that company's job listings, when new roles are posted, when specific skills and competencies are mentioned in the job requirements, or according to any other fluctuation criteria. The system may also provide new metrics to the user; for example, the system may calculate the frequency and percentage of hires in certain functional areas versus others, and may even provide benchmarking criteria on similar candidates as the user. Another embodiment may compare these job listings to the data contained in a digital version of the user's resume and alert the user when keywords or other criteria match new listings. That is, a job opportunity may not solely be surfaced based on matching company or job title; it could be surfaced through the presence of certain keywords or any other criteria located in the job description or company profile. In another embodiment, fluctuation criteria may include online mentions of the prospective company or specific online activity of its employees and stakeholders that match the parameters provided by the user.

In an alternative embodiment, a custom search monitor may be applied in the context of financial securities and investment decision-making. The system may allow the user to search a database containing various data on available debt, equity, or derivative securities that meet certain parameters. The system may then allow the user to create a whitelist of the securities that he is interested in tracking in either the short-term or long-term. Fluctuation criteria may vary widely depending on the user's investment and trading strategy. Examples of fluctuation criteria include but are not intended to be limited to monitoring securities for changes in interest rates, dividend yield, risk metrics, stock price, strike price, share price volatility, moving averages, weighted averages, 52-week averages, price to earnings (P/E) ratio, debt/equity ratio, revenue figures, reported net income, profitability indicators such as ROA, recent news announcements and public postings containing specific information, etc. Such metrics and measurements may be leveraged in conjunction with other technical analysis. Advantageously, the system may alert the user when certain fluctuation criteria may signal a favorable investment condition. The user could then use this intelligence provided by the system to optimize his or her trading and investment strategies, and inform the timing and execution of new trades or other subsequent actions.

In an alternative embodiment, a custom search monitor may be applied to a setting in which a user wants to improve the frequency, timing and relevance of communications to important contacts. By accessing a database of information from different media accounts, such as social media friends/followers/connections, discussion forums, target author crowds, a mobile phonebook, email and text messaging accounts, etc., the user could search for and tag contact records he wants to prioritize for networking, relationship-building purposes, or other outreach purposes. Search parameters may include things such as company affiliation, university alumni, professional groups, geographic region, age, keyword or topic mention, interest, image or video share, etc. These and other custom fluctuation criteria when met may trigger an alert to the user. The system may also deliver an alert after a pre-defined amount of time has elapsed or when a certain number of contacts in a specific grouping have messaged him. In another embodiment, the system may display an activity summary for a certain time period, which would give the user a digest about past conversations with this target contact list and relevant outreach and success metrics. Furthermore, this group of contacts can be tracked independently of all outbound communications made by the user via the accounts he has connected to the system. Thusly, the system may inform the user when he is not regularly communicating with the people who he deemed are important in proportion to his total outbound communications over a certain time period. In another embodiment, the system may create the feeling of a challenge for the user to accomplish pre-defined short and long-term goals and provide incentives for doing so. In yet another embodiment, the system may help inspire the type, substance, and timing of the next message sent by the user to one or more contacts based on historical context and the unique activation criteria for that contact grouping. For example, say the user had sent a text message to a specific crowd of target contacts on Day 0 about fantasy football prospects. This text message "campaign" had a 100% response rate, effectively initiating a dialogue with all of his targets. Further, these target contacts were in turn 50× more likely to start a new conversation with the user, absent any prompt, within the next 14 days. This was a significant improvement from his past work-related conversation attempts. As a result, the user may decide to specify fantasy football as new fluctuation criteria. That is, the next time this particular crowd becomes activated on the topic of fantasy football, the user may then be alerted to initiate a subsequent dialogue. Context-specific relationship-building may be nurtured in a systematic fashion thusly.

In an alternative embodiment, a custom search monitor may be applied to service offerings as well. In a travel use case, a user may search a database of hotels rooms or flights to locate and track preferred seating arrangements, room accommodations, and travel dates to a specific destination as part of his travel plan. The system may then alert the user when there are fluctuations in variables that may explicitly influence his plans e.g. the ticket price drops or new seats with extra leg room become available, or perhaps there is a new amenity offered to him as a traveler. In the event that the user has already made the booking, the system may compare the data on his booked trip to other options occurring at the same time and notify him of any potentially preferable alternatives that may influence a booking change.

In an alternative embodiment, a custom search monitor may also apply to users making doctor appointments. The system may allow a user to search a database of doctors by specifying parameters, such as area of specialty, geographic region of practice, # of years in practice, required co-pay, accepted insurance plans, having a degree from a particular school, etc., and then save groups of their preferred doctors for treatment. The system may then alert users when this grouping meets desired fluctuation criteria, such as appointment openings with doctors, when preferred doctors are added to the user's insurance provider's coverage, or even when these doctors open up another practice in the user's area. A custom search monitor may also be applied in the context of patient reviews of doctors, facilities, treatments, procedures, and prescription drug usage. In that way, a user may be alerted when the specific services he may be considering cross a certain threshold in terms of the volume or sentiment of ratings, or overall rating score. This information may be useful to different users for benchmarking, evaluation, and research purposes.

In an alternative embodiment, a custom search monitor may be used to track the publishing behavior of target groups of webpages and then alert users when these entities cross a certain threshold in content production or search ranking, viewership rate, preference or relevance metrics, etc. That is, the user may assess competing websites based on content goals, content topics, quantity and frequency of content types (blog, whitepaper, ebook, video, podcast, etc.) keyword use, or along any other attribute or action of interest. The system may also be applied to alert users when webpages located by a search query adjust in content or ranking. The system may use a crawler to create a searchable index of data retrieved from specific website URIs. The system may then categorize content type based on factors such as URI architecture, which it may then use to identify and track when new content in those defined categories are published and then compare it to the entire set of web properties. The system may also leverage direct database access for applications with social media accounts: By creating two crowds each containing one social account and then comparing the two (e.g. @Microsoft™ vs. @Samsung™) the system may use the data to extract the Internet media types and content asset types that were posted and shared by the account most often and track these into perpetuity; this may be a number of jpg files uploaded, a number of gifs, blog mentions in URIs, promoted content, or any other media type or content asset type.

In an alternative embodiment, the system and methods disclosed herein may also be applied to monitoring media libraries that stream entertainment content. Some of the media libraries are available online or through a set top box and television. In this embodiment, the media library may be monitored for specific content such as movies or television shows. If a certain television show becomes available, for example, the user may be alerted to its availability. In another embodiment, the user may be alerted when the status of a certain media changes. For example, the user may be alerted when a television show is transitioned from being available for a fee to being available for free. Further, the systems and methods disclosed herein may also be used to track available content from various media libraries generally. For example, the system may be able to inform a user which media library has the most new material, the most recently added show or movie, or which media library is the largest. If a user is looking for a particular item of media, the user may be able to use the system to search for that media to determine its availability and the conditions of that availability. The user may also determine parameters for a type, length, or genre of media they are looking for. Searching for types, lengths, genres, etc. of media may yield a resulting group of media items. The user may also be able to configure and set custom alerts for that media or group of media. In other illustrative embodiments, the system and methods disclosed herein may also be applied to websites that list real estate sales, rentals, leases, etc. Another illustrative embodiment may be configured to monitor and set up alerts for available parking spots in an area.

Determining Agility Ratings and Recommended Aspects for Future Content, Actions or Behaviors Disclosed herein are systems and methods for determining agility ratings and recommending aspects for future content to be posted by an author, actions to be taken, or behaviors to engage in. As disclosed herein, an author generally refers to a person using a social network, website, application software, or mobile application software (app), etc. Whether the author actually "authors" posts is irrelevant to their categorization as an author. A user is described herein as one who uses the systems and methods disclosed herein. A user may be an author, and vice versa, but a user is not necessarily an author. For example, a user of the systems and methods disclosed herein may merely track the behavior of authors utilizing the systems and methods without actually being an author themselves. Similarly, authors may exist that do not utilize the systems and methods disclosed herein, but such authors may post content, generate data, or take other actions that may be tracked and analyzed by the systems and methods disclosed herein. The system can recommend aspects for future content, actions, and/or behaviors. For example, actions and behaviors, as well as aspects of those aspects and behaviors may be recommended. For example, actions and/or behaviors that may be recommended may include examples such as liking a page, creating a page, editing a webpage, adjusting a page URL or page title, adding alternate text to images, starting a content item campaign, conducting A/B testing of a webpage or other marketing message, starting a remarketing campaign, sending an email, purchase decisions, or whether a particular ad service will address a problem or goal of a user.

A user may wish to determine certain aspects of future content that would make the content more beneficial to post or more attractive to a particular audience. For example, a user may wish to post content on behalf of an author that is more likely to be engaged with by the user and/or author's target audience. The audience may be a custom author crowd as discussed above in the present disclosure. Accordingly, a user may designate a unique author and a target custom author crowd for future content, action, and/or behavior recommendations. The system can then provide potential requests that each include an indication or type of a recommended aspect for a future content, actions, and/or behaviors. For example, a system may provide to a user potential requests with a specific recommended aspect type such as: "How many times should I post content today?" "How long should my next content post be?" "What should the subject matter of my next content post be?" "Should I include a graphic in my next post?" "Who and what should I retweet or share?" In other examples, the recommended aspect types provided with the potential requests may be more general. For example, the potential requests may be grouped by type (e.g., color related, length related, type of content related, etc.), goals, difficulty-level, industry or company type, job title or role within a company, persona, use case, etc. Upon providing such potential requests to the user, the user can select one or more of the potential requests. In one example a potential request is selected with a single user interface interaction, such as a single mouse click or a single touch on a touch screen. In response to the single interaction, the system then automatically determines a recommended aspect of the future content, action, and/or behavior for the selection of the potential request. For example, if the selected potential request was "How many times should I post content today?", the system may provide a numerical recommended aspect response instruction to the user to post content as the unique author, for example, four (4) times today. The system's determination of the recommended aspect can be based on activity data that indicates aspects of other content authored by or interacted with by other authors. For example, the system may use activity data to determine that four is an optimal number of times to post content in a day in order to receive the most interactions with the content without alienating authors or causing fatigue with posts by the unique author. Activity data does not necessarily refer to old data. Rather, activity data used for determining recommended aspects is referred to herein as any data that exists prior to the exact moment in time when a recommended aspect is actually determined. Accordingly, activity data may include data about topics currently trending on social networks, including news from news sources, television, radio, websites, etc. Accordingly, activity data may be updated regularly to provide up to date and real time data for determining recommended aspects. For example, the system may determine that a particular hashtag is currently trending on Twitter™ and can make a recommendation accordingly. In another example, author content may be used to infer potential future events, even though activity data is used. For example, the system may identify certain authors as having spending power based on live tweets or other social media posts such as "I want to buy X," or "Headed out shopping."

After providing a user with a recommended aspect for posts for a unique author, the system can also determine whether a post with the recommended aspect is actually posted. The system can then use this information to determine an agility rating that indicates a responsiveness of the unique author to the recommended aspect. In other words, the system generates an agility rating that indicates how good a unique author account is at posting content according to the system's determined recommendation aspects for that account. An agility rating is the measure of a user's responsiveness to new marketing opportunities. When customer moods shift, or your rival's campaign misses a beat, a user can find out from an agility rating. For example, if the system recommends posting four times in one day, the system can measure at the end of the day, or in certain time increments during the day, how many times content was actually posted by the unique author the recommended aspect was generated for. If the unique author has posted four times, a favorable or positive agility rating is determined. If the unique author already has an agility rating stored by the system, the four postings in one day as recommended can increase the existing agility rating. In contrast, if the unique author has posted more or less times than four, the system may determine an unfavorable or negative agility rating (or decrease an existing stored agility rating for the unique author). In another embodiment, a single agility rating may be related to multiple unique author accounts. Such a functionality is valuable, for example, if a user is in charge of multiple unique author accounts. In such an example, all of those unique author accounts can be used to generate a single agility rating for the user. In another example, a user may wish to track an agility rating of several competitors or other authors. Accordingly, the user may designate a group of authors for which the system can determine a single agility rating. In this way, groupings of authors (e.g., by industry, region, etc.) can be used to determine an average agility rating of those groupings of authors.

Such systems and methods as disclosed herein are advantageous because social media can be a very variable landscape. Because of its changing complexion, marketers need to learn how to strike when it is most favorable. Dynamic and adaptive social media campaigns are now achievable through the systems and methods disclosed herein that can provide instant answers and recommendations for posting content and quantify a user's ability to leverage these instant answers. Additionally, these methods and systems are valuable because the instant answers and other functionalities can be customized to fit the user's needs. Accordingly, users of the systems and methods herein can adapt to changing marketplace conditions and produce more frequent, more relevant, and highly measurable marketing programs that will allow businesses to successfully take advantage of the most advantageous marketing conditions online. Such systems and methods allow sensitivity to current market conditions that are needed to provide meaningful information, and timely and consistent business advice. These systems can help marketers understand exactly what to do next, and what tactics to adjust for optimal results based upon what is going on in that user's promotional climate. That is, the system provides business responses to marketplace change. These responses can be determined and delivered to the user in a personalized or generalized fashion. Advantageously, these responses are not necessarily limited to the marketing function of a business. In turn, users of the system will be able to achieve an incredibly fast time-to-value or time to insight. In other words, a user can achieve high results without dedicating inordinate amounts of time to online marketing activities, saving time and money. The system can also provide individuals who are new to marketing, or who are uneducated in a particular marketing domain such as social media marketing on Twitter™, tools to learn and implement best practices quickly.

Figure 7:
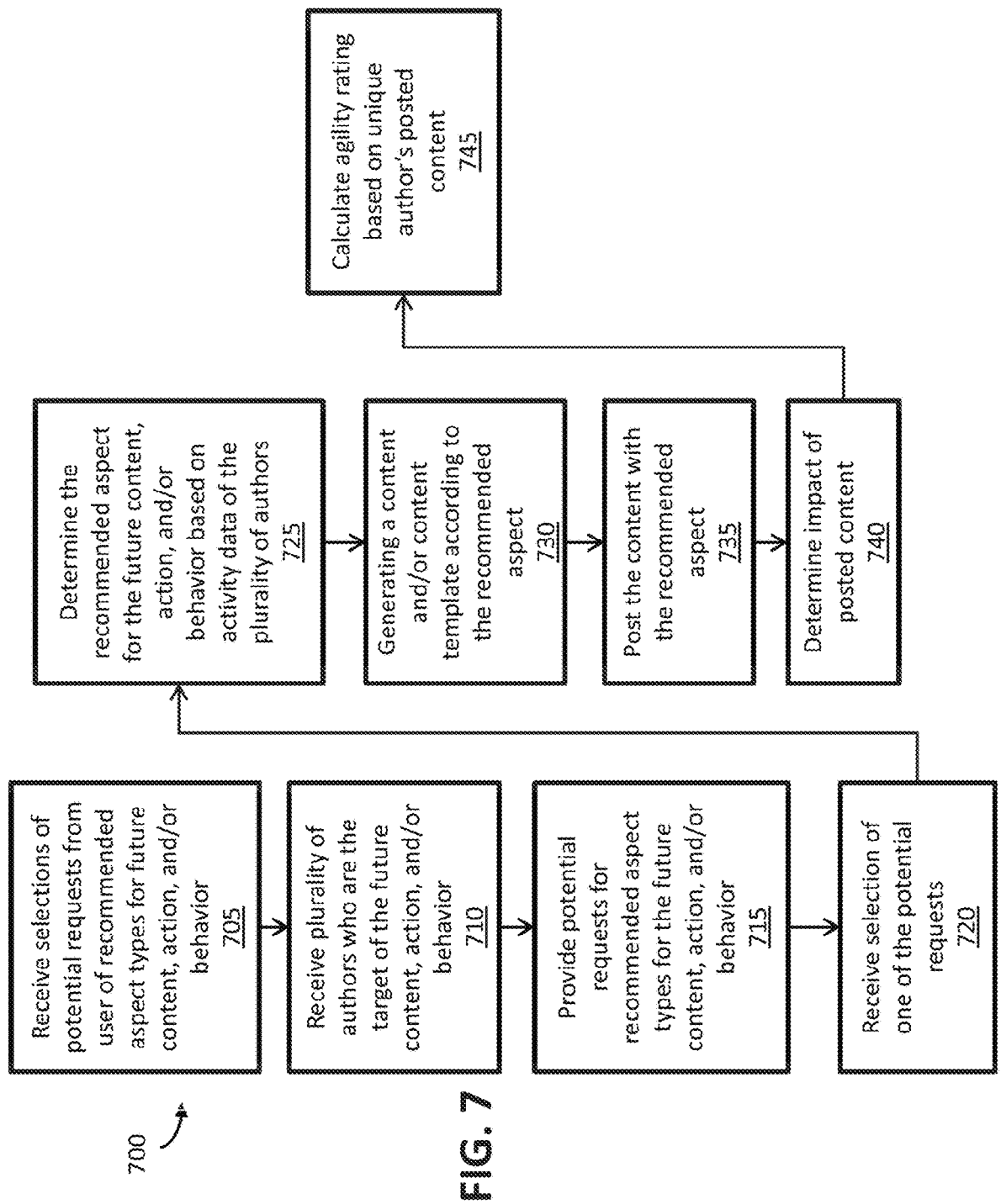
FIG. 7 is a flow diagram illustrating a method of determining a recommended aspect for future content based on historical response data of a plurality of authors in accordance with an illustrative embodiment.

FIG. 7 is a flow diagram illustrating a method 700 of determining a recommended aspect for future content, action, and/or behavior based on historical response data of a plurality of authors in accordance with an illustrative embodiment. In alternative embodiments, fewer, additional, and/or different operations may be performed. Also, the use of a flow diagram is not meant to be limiting with respect to the order of operations performed.

In an operation 705, selections of potential requests from a user for recommended aspect types for future content, action, and/or behavior are received. For example, the user can designate which types of aspects he or she may want to request. For example, requests such as what color should be used in a post or how many images to include in a post may be designated by the user. In an alternative embodiment, the potential requests may be predetermined or default such that the operation 705 may be omitted and the user does not select the potential requests.

In an operation 710, a plurality of authors who are the target of the future content, action, and/or behavior are received. The system may receive a custom author crowd as disclosed herein or plurality of authors who are the target of the future content, action, and/or behavior. In other words, a user may specify particular authors or groups of authors to assemble activity data on. This activity data, as discussed below, can be used to determine recommended aspects that will optimize author response and/or interaction. For example a custom author crowd may be determined by a search criteria such as a demographic trait or user profile trait of the plurality of authors; a subject matter of a social media post authored by the plurality of authors; a related subject matter of a predetermined number of social media posts authored by the plurality of authors; a group association of the plurality of authors such as the following of the unique author or the following of another author; an interaction by the plurality of authors with the unique author, an engagement with a content by the plurality of authors; an amount of time spent viewing a webpage or screen by the plurality of authors; accessing a webpage or screen by the plurality of authors; the selection of a universal resource identifier (URI) by the plurality of authors; an affirmative or negative activity executed through the at least one social network, website, application software, or mobile application software (app); or any other type of search criteria. The custom author crowd may also be the author's immediate following on a social networking site such as Twitter™. In another embodiment, the custom author crowd may be a user's customers. For example, the user can import or upload a list of Twitter™ handles from a customer database maintained by the user. In another example, the user may import an e-mail or mailing list, or any other information that identifies a user's customers. Such identifying information can be used to define a customer author crowd. In such an embodiment, the system may utilize non-social networking site specific data (e.g., name, address, e-mail address) to search social networking sites and identify authors on the social networking sites that likely correspond to the user's customers. This operation may be performed through various hashing methods of data wherein matches are discovered between the social networking site's user base and the user's customer list without either party having to directly expose sensitive customer information to the other party. Accordingly, those customers located on the social networking sites can be included in the customer author crowd.

In an operation 715, potential requests for a recommended aspect type for the future content, action, and/or behavior are provided. The recommended aspect type may indicate what kind of recommendation the user is seeking. For example, if a potential request is "What time should I post today?", that potential request indicates a recommended aspect type: timing. Numerous recommended aspect types are contemplated, and each of the potential requests or groups of potential requests disclosed herein are for at least one recommended aspect type. The potential requests may be displayed on a single display such that the user can see all of the potential requests available for selection before selecting one. The available potential requests here are ones that were selected by the user in the operation 705. However, in some embodiments, the displayed available potential requests may be predetermined or default such that they are not selected by the user. In another embodiment, the displayed potential requests may include some user selected potential requests and some predetermined or default requests. For example, if the user only selects one potential request they would like to see displayed, the system may display additional potential requests in order to still display at least a predetermined number of potential requests on the display. The system can be structured in a personalized question and answer format allowing a user to select their top marketing questions from a list of available options (e.g., check all that apply), and then click one button (a single user interaction or input) to receive fresh and instant answers each time a user needs them. These requests can also be grouped into categories according to the purpose, use case, or practical area they serve, such as "Timing" for informing when certain types of content should be published, or "Images" for informing how a user can better utilize image media in his content postings. Other categories may also be used, such as "Hashtags", "Strategy", "Community Management", "Customer Service", "Website Conversions", "SEO", etc. Such recommendations can be organized in a guide or "wizard" view that walks a user through, step by step, how to create, optimize, publish, and/or distribute certain content or engage in certain behaviors, actions, or marketing activities. In this way, the system can feature additional views and interfaces or display supplemental information to provide better instructions and more intuitive experiences to users. Such resources can provide a template and/or tutorial experience for using and executing the recommended activities described herein. For example, the system may organize potential requests and their associated recommended aspect types in a question and answer format on a display. Other views are contemplated, and may include but are not intended to be limited to a list view, a search view, and a guide view. With the search view, a user can explicitly search for a given potential request or recommended aspect type offered by the system. Search may be done by keyword, for example. The system may also suggest new recommendations for the user based upon their goals, performance, and recent system usage. The guide view may show a more tutorial-based display to provide sequential steps to a user. Such a display can help a user learn how to do modern marketing with templates and the various systems and methods disclosed herein. Answers or recommended aspects may be unlocked at different stages in learning process. As the user grows in familiarity and skill (skill may be indicated, for example, by agility rating) with the system, new sets of potential requests and/or recommended aspect types may appear. Such a process can refine a user's content marketing development and publication or distribution strategies. For example, the system can include modules for learning how to use images in Twitter™ content marketing, how to do video marketing, how to create original content based upon audience trends, etc.

The system can also ask users supplemental questions based on the selected potential requests. The answers can be used as a factor for determining recommended aspects of future content, actions, and/or behaviors. For example, if the user wants to know "Which Twitter Ads Product Is Best For Me?" the system can return a simple answer such as: Promoted Tweets. However, in an alternative embodiment, the system may also ask a follow up question such as: "Do you do email marketing?" The user's response to such a supplemental question can inform the system that there is some value to this user in capturing new email addresses for some other programs the user is running. In such a case, the system can make different or additional recommendations (e.g. a Lead Generation Card) as a primary or secondary ads consideration for that user. The answers provided by users to supplemental questions may also be used to configure and display for the user additional recommended aspects of future content, actions, or behavior. In the case of the example above, the system may introduce the user to a new set of potential requests or recommended aspects that are related to email marketing if the user responded in the affirmative to a supplemental question such as: "Do you do email marketing?"

In an operation 720, a selection of one of the potential requests for the recommended aspect type for the future content, action, and/or behavior is received. In one embodiment, the selection of the potential request of the recommended aspect type is a single input into a user interface of a computing device. For example, several electronic buttons may appear on the screen of a computing device. Each of the electronic buttons can be associated with one of the potential request for recommended aspect types for a future content, action, and/or behavior. By selecting one of the electronic buttons with the single input through the user interface, the system can respond by automatically determining the recommended aspect for the future content, action, and/or behavior. The single input may be various types of input, such as a mouse click, a touch to the location where a button or link appears on a touch screen, a voice command indicating the potential selection, a keyboard or other button selection, or any other type of single input that may be incorporated into the user interface of a computing device. In an alternative embodiment, inputs may include voice inputs, such that a user may simply ask his or her device (e.g., smartphone) a question that corresponds to a potential request, and the system can determine the recommended aspect based on the verbal question asked by the user. In other embodiments, more than a single input may be received before the recommended aspect is determined. For example, multiple inputs may be entered by a user to designate additional criteria for the potential request. For example, a crowd of authors the user would like to focus the request on may be designated, a custom potential request may be designated, a unique author that the recommended aspect is to be determined for may be designated, etc. In one illustrative embodiment, the user may also specify certain goals, such as wanting to increase a following, drive traffic to a website, get a certain number of retweets/shares, drive new product sales, app downloads, etc. Such goals can then be utilized by the system when determining recommended aspects for future content, actions, and/or behaviors as discussed below. In an alternative embodiment, the system may automatically select a potential request to determine a recommended aspect for a future content, action, and/or behavior. In other words, a system may monitor or otherwise check for marketing opportunities, chances to post about a trending topic, etc. Such monitoring can determine answers to potential requests (i.e., a recommended aspect) without an explicit input or selection from a user. For example, a user may make an adjustment or optimization to his or her marketing mix modeling software, business intelligence software, enterprise resource planning, or other business and operations software that may re-appropriate funds, refine goals, or adjust emphasis on certain business activities, and business channels, during some period of time. In such cases, the system may use these events or other inputs made by one or more users or affiliates of the user to external business software applications as signals for determining recommended aspects and/or the degree to which a type, volume, location or context for certain activity data may now be more or less relevant or significant to the user.

In an operation 725, the recommended aspect for the future content, action, and/or behavior is determined based on activity data of the plurality of authors who are a target of the future content, action, and/or behavior. The recommended aspect is determined at least in part based on activity data that indicates aspects of other content authored by or interacted with by a plurality of authors in a social network, website, application software, mobile application software (app), etc. prior to receipt of the selection of a potential request. In other words, the system uses activity data based on posts by authors and/or activity data about how authors interact with posts in a time before the request for a recommended aspect is received. In some embodiments, the activity data may be related to a predetermined amount of time preceding the selection of the potential request. For example, the activity data may represent only the last day, week, month, year, two years, etc. of author interaction and/or posts. In another embodiment, the activity data may include data since the unique author account was formed. In another example, the time baseline for the activity data may be related to the time since an author account other than the unique author has posted content or behaved in a certain way. For example, if the unique account is new and does not have much activity data associated with it, the user may select a different author on which to collect activity data and use to determine recommended aspects for posts. For example, the user may select a competitor author account, or an author account the user or system views as effective that could be used to determine the recommended aspects. In another example, the unique account may have little or no activity data associated with it and no other account specified to base activity data off of. In this example, the system may automatically determine authors to use the activity data from. The automatic determination can, for example, attempt to identify an author or authors the system deems similar to the unique author. Those similar author or authors, as well as their followers, can be analyzed to determine the activity data used. That is, in cases when there is no available data for a user the system would provide a generalized recommendation for what has worked well for other users of the system or users which may share common or similar characteristics with the user. In another example the system may use random authors for the activity data which would generate general recommended aspects as opposed to audience or crowd specific recommended aspects. In another embodiment, the system may generate a general recommended aspect and an audience or crowd specific recommended aspect so that a user may compare how recommended aspects differ based on the activity data used and the authors associated with that activity data. The activity data may be other content authored by the unique author, content authored by the user with different author accounts, content authored by related other authors such as competitors for a similar good or service, content authored by authors who are targeting the same audience and customers as the user, an internal competitor's authored content (internal competitors may be, for example, marketing professionals or users that work for the same entity and using separate accounts can foster performance tracking and internal competition), any unrelated authors, the author accounts owned or operated by the user's clients, partners or affiliates, or some combination of any of the preceding options. The recommended aspects are determined to optimize a response of the plurality of authors to the future content, action, and/or behavior. In other words, an aspect is recommended based on activity data such that a response or other interaction with a subsequently posted content is maximized for the goals of the user. The response to the posted content can be optimized for different factors. Such factors may be determined by the user prior to submitting the potential request, after submitting the potential request, or the factors may be predetermined by the system or default. For example, some factors may be optimizing for responses or interactions by new authors (authors that have never interacted with the unique author before), optimizing for greatest total number of responses or interactions with the posted future content, optimizing for a particular type of response or interaction with the posted future content (e.g., likes, comments, shares, new unique author page likes or follows, shares with a comment appended), or other types of response or interaction. The activity data can be analyzed in different ways to optimize response to posts according to a recommended aspect. For example, the activity data may indicate a fluctuation as disclosed herein that is related to the other content that meets a predetermined threshold. That is, activity data may be analyzed to determine shifts in how authors are behaving. Such shifts may be monitored to see if they reach a particular magnitude or predetermined threshold to determine whether to recommend a particular aspect based on that shift. For example, if a plurality of authors has a subset of authors larger than the predetermined threshold that starts posting content related to a particular live television program, the system may use that information to recommend an aspect relating to the live television program. Furthermore, a fluctuation criteria may also be used to analyze this activity data. That is, the system (as default programmed or selected by a user) may designate a particular type of fluctuation based on the fluctuation criteria to monitor. For example, a bottler of soda in a particular region may wish to monitor posts of those in his or her geographical region for social media posts regarding soda, sports drinks, sparking water, etc. and the shifts or fluctuations that are taking place in such an author crowd. Accordingly, the user may designate both a custom author crowd for monitoring for activity data as well as fluctuation criteria for monitoring for activity data. In another embodiment, a system may recognize automatically an author crowd and/or a fluctuation that may be meaningful to an author. For example, a fluctuation may be meaningful to the user if it is based on a historical context, system usage and user performance, other current activities happening on the system or are being currently performed by the user, or feedback of other users of the system. The fluctuation could also be considered meaningful based on past searches, tracked fluctuations, criteria for custom author crowds, and/or user goals. In this way, a system may determine fluctuations that are relevant to a user without the user explicitly setting a tolerance threshold for receiving helpful or meaningful information about fluctuations in authors or author content. For example, relevance of fluctuations may be determined based on a determined type or size of fluctuations. That is, the system may, for example, inform or alert a user their crowd or target audience is using more positive sentiment even if the user did not input positive sentiment as a desired fluctuation criteria or specify the threshold for what constitutes a meaningful spike in positive sentiment. A similar analysis may be used on other fluctuations such as behavioral changes, topics, discussions and comments by users, or other actions or behaviors. Such information may also be used as disclosed herein to generate recommended aspects for future content, actions, and/or behaviors as well as generating, posting, and/or taking action on such future content, actions, and/or behaviors.

In alternative embodiments, activity data used to determine a recommended aspect for a future content, action, and/or behavior may be activity data related to only one of the unique author's followers. The activity data may also be a unique author's friends; likes; individuals one or more levels removed from the unique author's followers, friends, likes, etc.; or other groups of authors related to a particular author account (even an author that is not the unique author). Activity data for determining the recommended aspects and for determining whether posted content meets the recommended aspects may be culled from internet platforms in various ways. For example, data from web pages may be retrieved with a web crawler or API, or any other data scraping or data transfer techniques. The systems and methods disclosed herein may be accessible via software-as-a-service or as an application such as a mobile app. Information that may be collected to be used as activity data may include, but are not limited to, various types of data such as author timelines, home timelines, recent posts, followers, friendships, follower ids, friends ids, friends lists, followers lists, suggested users, list members, list subscribers, list owners, retweets, statuses, comments, shares, updates, photos, videos, animated GIFs, pages, places and locations, tags, URLs, hashtags, contact information, events, locations other geographic information, device information and other metadata, trends and trending topics, collections, projects, streams, uploaded media, direct messages, user objects, user account settings, relevant tweets or users matching a specific query, user profile and banner information, friend graphs, follower graphs, transaction history and recent purchase activity, other website, marketing information, mobile information, pins, related pins, most clicked pins, most repinned pins, relevant pins from a domain that match a specific query, recent snaps, and other important objects and content that may be relevant to a user of the system. The data the system obtains through an API can be stored in a database, such as a Mongo™ database. Various types of other databases may also be used, such as a distributed database like Hadoop™. The system can run algorithms on selected slices of the data either automatically or when requested by the user to calculate certain recommended aspects. That is, the system is capable of pre-computing recommended aspects to questions even before a user explicitly requests those recommended aspects. These recommended aspects can then pass through the back-end web application and are rendered on the front-end interface for viewing by users—and can also be accessible via a browser extension as discussed in greater length below. In another embodiment, recommended aspects and other functionalities are made available through a mobile app. In some embodiments, multiple algorithms may be combined to deliver a single recommendation. Sometimes, recommended aspects based on the algorithms can fluctuate. Accordingly, the system can synthesize results from multiple analyses performed at different times with the same or similar algorithms into one recommendation that can be more reliable and can help users maximize their marketing effectiveness or impact.

Various types of recommended aspects are contemplated herein for the future content, actions, or behaviors. For example, a recommended aspect could be a social network, website, application software, or mobile application software (app) in which the future content is recommended to be authored; a time of day in which the future content is recommended to be authored; a length that the future content is recommended to be; a subject matter that the future content is recommended to be related to; a type of content that the future content is recommended to be; a tag that the future content is recommended to include; an indication that the future content is recommended to be lifestyle content or product content; an indication whether to use paid marketing services on a social network, website, application software, or mobile application software (app) in which the future content is recommended to be authored; a public figure author to engage with the future content; or a universal resource indicator (URI) that the future content is recommended to include. Other recommended aspects of future content may include any other additional aspects or recommendations, for example, media to attach to or include with the future content; style, tone, or word choice of the future content; an explanation or justification of why a certain action should be taken; a volume of future content; an amount of time that should be spent creating future content; an amount of time that should be spent distributing and promoting future content; other purchase decisions or investments that should be made by the user; etc. Other recommended aspects and/or potential requests that may be selected may include (but are not limited to): How many times should I post today? How many of my posts should contain images? How can I be more relevant to my audience today? What are some trending topics I should know about? How can I insert my brand or voice into an existing conversation that is relevant to my target audience and/or my brand? What is the promotional climate for a paid vs. organic campaign right now? How favorable are the marketing conditions? What's the best mix of paid and organic content to publish today (may be expressed, for example as a percentage or proportion: 1 out of 8 posts should be paid, etc.)? What type of content would resonate most with my audience today (that is, what type of content should I post)? (Different types of content may include types such as base line tweets, hashtag content, behind the scenes/exclusives, quotes/inspirational messages, blog shares, list-based content ("listicals"), how-to guides, podcasts, ebooks, retweets with comments, media mentions, research & case studies, animated GIFs, webinars, original media, infographics, memes, selfies, PowerPoint™/slideware, photo collage, illustrations, cartoons, animations, branded product content, YouTube™ and Vimeo™ videos, or shorter looping videos such as Vines™ or Instagram™ Video. Types of contents that posts can be about may apply to company content (that is, the specific pieces of content that are produced or curated by the company) or user-generated content (that is, content that may be solicited from members of the user's audience via promotions, contests/sweepstakes, etc.)) What should I write a blog about today (such a recommendation may apply to a platform, website, app, social network etc. outside of where the recommendation is derived from (e.g., use Twitter™ data to determine what to write blog post about on Tumblr™)? What percentage of my content should be lifestyle vs. product oriented (e.g., Red Bull™ may promote images of red bull cans (product) or may promote images of extreme sports/adventure (lifestyle; relevant activities/behaviors/questions of their target audience)? Which Twitter™ Ads (or ad products for other platforms) products should I use (e.g., Promoted Accounts, Promoted Trends, Promoted Tweets, App Cards, Website Cards, Lead Generation Cards, etc.)? Where should I post more today? Which of your boards/pages/collections/accounts/handles should you focus on more today (can be valuable cross-platform insights based upon the user's performance: should a user spend more time on Tumblr™, Twitter™, Facebook™, Pinterest™, Instagram™, etc. than they do; or should more time be spent on a particular account on a particular platform)? On which platforms should I increase my media investment and paid marketing and is my current budget sufficient? Proportionally, which social accounts should I post the most text, images, video, audio, etc. to today? When should I publish my fresh marketing content today (timing can be optimized for the type of content in a post)? When should I publish image-rich content today? Or user-generated content, like memes? When should I publish video content today? What tweet length is ideal for getting my audience's attention today? What content should I consider repurposing for other media? Who just gained more influence that I should be talking to? Who in my audience likely has disposable income to spend? Who is most likely to sway multiple interest groups? Who are some of the most impressionable members of my audience? What color choices will help maximize engagement/response rate? What colors should I use in the background and foreground of the images I am posting today? What color variations of my products should I promote today? What settings and environments are most appealing to my audience? Should I use images of people in my product content? If so, how many models should I include in these images? What hair color of models will drive more clicks and other desired behaviors (should the person in your image have gray hair or a specific shade of brown hair? What eye color? How can I improve the reach of my tweets? How can I grow my following? How can I improve sentiment about my brand? How can I become more influential? Where will location targeting have the greatest impact on my online audience? Who am I not talking to that I should be (e.g. superfans/VIPs/top advocates of a brand, people who have complained, people posting about similar topics but are not competitors)? Should I focus ads on mobile or desktop and laptop users? If mobile, should I target Android or iOS devices? How are my competitors capturing people's attention? What types of marketing images/graphics and videos are getting the most traction in my audience? What is the current mood and energy level of my audience (mood can indicate receptiveness to certain types of content)? Should I incorporate more indoor or outdoor settings into my lifestyle content? What emotions is my audience expressing right now? Which other brands/musicians/celebrities/sports teams/movies/TV shows/etc. is my audience interested in? What photo filters are most commonly used by members of my audience? Which members of my audience will likely drive the highest engagement rate? How long should my promotional videos be? What hair colors will drive the most clicks and engagements today? How many different products should I include in one image? How many text characters should I embed in my images? Who is the most influential person in my audience? Who is the most influential person at my company? Who at my company should I ask to share my content? Who is the most influential person working for my competitor? Who could cause the most harm to me if his/her preferences shifted? Who should I send my marketing messages to first? How many hashtags should I include in one tweet or content posting? How long should my hashtags be (e.g., less than 15 characters)? What specific hashtags should I consider integrating into my posts today? What other words and phrases should I use? What is the demographic and psychographic composition of my audience? Which of my website pages should I promote/link people to today via social media? What products on my website should I promote on Pinterest™ today? Twitter™? Other social networks? What keywords or topics should I include in my profile description? How long should my profile description be? What emoticons should I use in my posts? Where is my audience most active today? Should I do influencer marketing today? To whom? What should I say? Should I do advocate marketing today? To whom? What should I say? Where else can I go for help (e.g., provide links to outside services)? How can I improve my top-of-mind awareness? How can I get a certain person or author to join my community/attract him? Should I explicitly ask people to retweet or share my posts? Should I run a contest or sweepstakes today? If so, how and where should I promote it? What images should I share today? What videos should I share today? Whose content should I re-pin, re-post or retweet? Who should I thank on social media? What should I do to change a particular author's perception of me? How can I improve the global perception of my brand? In a particular geographic region? What product category should I promote today? If I am a mass-market retailer, should I post shirts, sneakers, furniture, appliances, etc.? What are people who are pinning my pins doing/liking right now? What size photos should I use? What's the character "archetype" of my target audience or ideal prospect? Where do they shop? Where do they eat? What entertainment do they enjoy? How far apart should I space out content I publish during the day (e.g. my tweets? How long should I wait in between sending each post? If I'm running a campaign, when should I promote it throughout the day with different posts? How should I space out my posts that are specifically for a hashtag campaign? When should I follow people during the day? What day of the week? How much of my budget should I reserve for "floating" campaigns that are opportunity-driven? Which locations should I geotarget? Should I target a new whitelist of authors, or a specific whitelist I'm not using right now? Where do I get one? What character length is best for one hashtag? What hashtags is my competitor using that I should know about? What angle should I position my photo to look the best on each marketing platform? Should it be a landscape or a portrait style image? How closely zoomed into the product should we be? Should I include a hashtag within my image? If so, how many? What types of charts and graphics should I use to visualize my data? Bar charts? Pie charts? What type of infographic should I create? How many different colors should I include in my infographic? How many statistics, facts, or data points should I include in one graphic? How much text should I use within a marketing image? How many objects should I include in one image? Where should the main text or data be placed within the image? What's the best ratio of negative space to have in a marketing image? Where in the image should my largest or main object be? What size text should I use in my content? What size text should I use in my image content? What font should I use in my content? What font should I use in my image content? Are there any special characters I should include in my content? How should I comment on a blog share to get the most exposure? Who should I follow back? Who should I thank for following me? Who should I thank for retweeting or sharing my post? What should I say to someone who favorites my content? Should I thank people over private messages or is public acknowledgement better? Should I favorite or retweet someone's content if I want them to follow me or engage with my content in return? How often should I do that? Whose posts should I retweet? Does this change every day? Multiple times per day? How many times should I retweet the same person? When should I @mention people in my content? Who should I @mention in my content? Should I get in the habit of answering questions on certain topics? How often should I answer customers' questions sent via social media channels? What, if any, questions should I pose to engage my audience today? How often should I favorite or retweet posts made by my followers? How many times in a row should I post my own content without interacting with members of my audience?

How can I news-jack popular discussions going on right now? What news content should I share with my followers or my audience? What product category should I emphasize in my marketing promotions today? Should I share stories with my audience that I discovered via Google Alerts? When? What should the subject of my next video be? What's the best balance of user-generated vs. branded content to promote or solicit via a marketing platform, like Twitter? What size/dimensions should my images be? What aperture setting should I use on my camera? Should I use flash when taking certain images, like product photos? What light exposure should I use? What focal length is best? What type or model of camera should I use? Which photo filters should I use to engage my audience? What other edits or enhancements should I consider making to my photos? Should I post the exact same content across multiple social networks or accounts I manage? How much time should I invest on each social network today? If I want to launch a particular campaign, which social networks should I use to promote this campaign? Which campaign idea of this set will have a higher success rate with my target audience? How do I know when to stop a content campaign? What are the signs I should look for? What's the ideal follower/following ratio for me to have? Is there a point when it hurts me if I am following many more people than follow me? When follower growth stalls, or I lose followers, how can I jumpstart it again? Should I post the same tweet twice in one day? The same image? If so, how long should I wait until posting it again? What should I post to get account X to favorite it? Retweet or share it? If I mis-spell or make an error in my content should I attempt to delete the original post and then re-post my content or just post my content twice? What is the maximum time period I should go without posting new or original content? What is the maximum time period I should go without interacting with members of my audience? How much lifestyle content should I post in one day? In what order or sequence should I post lifestyle and product content during the day? How do I get my first followers? What should my first post be? What words or topics should I include in my profile description? What cover graphic, banner or primary imagery should I feature on my profile? Which hashtags should I include in my profile description? How often should I update my profile page? Do I need to? How do I find a list of some people I should follow or interact with on a social network? How many people should I follow per day? How frequently should I retweet in one day? What audience segments is my competitor most interested in? When do I run the risk of being "muted" by my audience or followers? How do I know if I've been muted? How long should my tweets be if I attach media to them, such as images? Does my target audience exist on this social network? If so, how large is it? What should I not post about on a social network, e.g. on Twitter? Are there certain topics I should avoid or save for other marketing channels? Are there certain words or phrases that my audience has an aversion to? Account X represents an ideal customer of mine, how do I get more people like him/her to follow me, interact with my content, or purchase my products? Who is my top advocate? Who are the most influential people in my audience? Who are the most influential people working at my company? Who at my company should I ask to share my content? Who are the most influential people working for my competitor? Who could be potential ally or marketing partner of mine? What landing pages should I link to in the content I publish today? Why are my competitors doing better than I am? How can I improve? How can I create content that is most amenable to media placement? Graphics? How do I know if a news story is really 'news' within my audience? Will I be the one to break it, or am I late to the game? Should I increase (or decrease) the price of my product or service? Should I emphasize products in price range X or price range Y today? Will my audience likely be compelled by more discounted offerings today or premium offerings?

In various embodiments, recommended aspects may be constrained or determined based on factors other than activity data. For example, other factors may include a user or unique author's marketing budget, a predetermined number of target future contents, available time to spend on marketing activities, a size or location of a target market, the availability of other tools and resources, etc. For example, if a user has a limited budget, the system may restrain from recommending numerous paid content posts. If an author has a stated goal to post content four times a day, the system will not recommend posting more or significantly more than four times. This may be useful if, for example, a user has limited man power or time to post content. Recommendations may also be based on a size of a target market or any other factors of a target market. For example, a user may produce large wind turbines. In this business, the user may sell a significant amount of its product to a very small number of consumers. Accordingly, page likes from non-wind turbine consumers would not be very valuable to the user. Instead the user may wish to focus posted content efforts on a particular subset of authors that is more likely to actually purchase wind turbines. Accordingly, the recommendations may be constrained by the size of the target market and the types of engagements or interactions sought through the posted content.

In an operation 730, a content and/or a content template is generated according to the recommended aspect. In other words, when a recommended aspect is determined, the system may use that aspect to generate a content for posting or a content template for posting that is generated according to the recommended aspect. For example, if the system recommends posting about a baseball pitcher that is eight innings into a perfect game that is being broadcast on television, the system may generate a post for the user to post, such as "WOW! Sandy Koufax is on tonight! #lightsout #perfectgamebid." In other words, the system can provide automatic content generation. The system may do so based on various factors or inputs, such as the posts of other authors about the same content. For example, the hashtag #lightsout may have been used by authors the last time a pitcher was having a great game. In another example, the hashtag #perfectgamebid may be in use in posts during the current game for which the automatically generated content is about. Other ways to automatically generate content may also be used.

For example, a user may use the system to monitor discussion of professional athletes, such as NBA stars and their teams. The system may monitor fluctuations such as when discussion peaks during game (e.g., when a player hits a game-winner), which can trigger automatic content item generation and/or posting for apparel and other branded promotional products that are relevant to that player and franchise. This may happen on a social network where the discussion is taking place or through other marketing channels such as websites, email, text, etc. In another example, sports apparel brands sponsor many professional athletes in order to build relationships with the fan bases of those athletes. When a star athlete has a strong performance during a game, discussion of that player may spike on social media. When this happens, consumers may have been activated on the topic of the sport, and the game, the teams, and that star athlete (among other things). Fans may even decide to follow a certain account or engage with certain social media posts during or after the game. Activity fluctuations such as these represent prime opportunities to promote branded apparel products and services to those audiences. Accordingly, the systems and methods disclosed herein can be utilized to both automatically generate content when such an opportunity arises and automatically post the content, recommend or execute a campaign, etc.

In an operation 735, the content with the recommended aspect is posted. Here, the user may actually post the recommended content in the unique author's account. Where an action or behavior is subject of a recommended aspect, the system can facilitate performing the action or behavior or scheduling the action or behavior. In some embodiments, the unique author may not be an account controlled by the user. For example, the user may be tracking a competitor's author account. In this case, the content would not be posted to the competitor author account.

In an operation 740, the impact of the posted content is determined. The impact is determined by how the plurality of authors responded to or interacted with the content posted according to the recommended aspect. In this way, a user or unique author can determine whether a recommended aspect and subsequent content post was effective. For example, the system may determine how many likes, comments, shares, retweets, mentions, etc. a content post has received. The system may display this impact to the user or author, and may also send an alert to the user or author to let them know how effective their action was or group of their recent actions were. In another example, the system may measure the impact of the content more indirectly. For example, instead of determining authors direct interactions with the content posted, the system may evaluate other subsequent behaviors, activities, or communications made by the plurality of authors on one or more social network to determine the effectiveness of the posted content. In an embodiment where a recommended aspect is related to an action or behavior, the impact of the action or behavior is also determined. The system or user may also evaluate the impact of the content, behaviors, or actions through certain business software and performance measurement dashboards that capture, aggregate, and display data from other areas of a user's business such as sales numbers and website performance.

In an operation 745, an agility rating is determined or calculated based on the unique author's posted content as it compares to the recommended aspect. The agility rating may be determined based on the discussion below with respect to FIG. 8.

In an alternative embodiment, the system may use activity data to predict the impact of a recommended aspect of a future content to be posted, action to be taken, or behavior to engage in. In other words, the system can, based on all the retrieved activity data, determine the expected outcome of the future content if it is posted, action if it is taken, or behavior if it is engaged in according to the recommended aspect. For example, the system may determine a recommendation that a user should post about a presidential debate thirty (30) minutes after the debate begins. Based on activity data of author actions during live television events, the system may determine thirty minutes into the program is the best time to post. For example, the activity data may indicate that an estimated 20% more total authors will view or interact with a content posted about 15-45 minutes after the beginning of a nationally televised live event as opposed to the rest of the debate. Accordingly, the system has output the recommended aspect of posting 30 minutes into the debate. Accordingly, the user may also be informed that following this recommended aspect when posting results in 20% more interactions with the post. This can help a user engage with the system and motivates the user to use the system and actually post content based on the recommended aspect because they get an indication of what the post will do before it even happens. The system may further estimate an absolute impact of the posted content if it is posted according to the recommended aspect. For example, as above, the system may have determined that 20% more users interact with a content that is posted about 30 minutes into a live television event. To determine a baseline, different factors may be used. For example, the type of television event, the unique author's current follower base, time of day, and other factors may impact what a baseline of estimated interaction would be. As an example, the system may determine that a baseline estimate number of authors who will likely interact with a post from the unique author during the presidential debate would be about 15,000. Accordingly, this baseline number can be displayed to the user, alongside an indication that, if the recommended aspect is followed, the system estimates an increase of 20%, or 3,000 increased interactions up to 18,000 if the user posts content at the right time during the debate. Again, this estimate and display may encourage further use of and engagement with the system.

FIG. 8 is a flow diagram illustrating a method 800 of determining an agility rating indicating a responsiveness of an author to recommended aspects for future content, actions, and/or behaviors in accordance with an illustrative embodiment. In alternative embodiments, fewer, additional, and/or different operations may be performed. Also, the use of a flow diagram is not meant to be limiting with respect to the order of operations performed.

In an operation 805, a recommended aspect for future content, action, and/or behavior based on activity data of a plurality of authors is determined. The recommended aspect may be determined similar to the recommended aspects discussed above at length with respect to FIG. 7. In an operation 810, the recommended aspect is provided to the unique author. In another example, the recommended aspect may be provided to the user. In yet another example, the unique author and the user may be the same person or entity, so the recommended aspect may be provided to the unique author and the user. Similarly, if a unique author has multiple users associated with the unique author, the recommendations may be sent to the multiple users associated with unique author.

In an operation 815, the system determines whether the unique author posted the future content or with the recommended aspect, action, and/or behavior. In other words, the system determines whether the user or unique author has actually taken the recommended aspect and posted content or engaged in an action or behavior accordingly. For example, if the system recommended a time of day to post content, did the user or author post content on or around that time of day?

In an operation 820, the system determines an agility rating that indicates responsiveness of the unique author to the recommended aspect. The agility rating measures a user or unique author's aptitude at responding to and posting content that is in accordance with recommended aspects. In order to determine the agility rating, the system may first determine if content with the recommended aspect has actually been posted by the user or the unique author that is being agility rated. The agility rating is ultimately designed to measure how well a user or author reacts to recommendations provided to it by the system or in other ways (i.e., the agility rating may still be utilized to measure effectiveness even if another platform is used to generate recommended aspects for content, behaviors, etc.). In an alternative embodiment, a user may publish content, run an ad, execute an e-mail campaign, or take any other action or behavior that may not be detectable by the system. For example, this may occur when the content, action, or behavior is out of the platform of the user's author accounts. Accordingly, the inputs used to calculate an agility rating may be received in different ways. For example, the system may allow a user to manually input data that indicates a response, success, feedback, etc. of the user's out of platform content, action, or behavior. For example, if the user runs an e-mail campaign that is sent to the user's 2,000 Twitter™ followers, the system may prompt the user to manually enter how many of those 2,000 followers followed a link in the e-mail to the user's webpage. Such a metric can be used to determine agility ratings even if the response itself cannot be detected by the system. In another embodiment, a manual input of a response may be input by a user with voice recognition: the user may tell the system what the response was like. Such ratings can be derived for a user's product or accounts or can be derived for a competitor author account that is not controlled by the user. In this way, an agility rating can also indicate how well a competitor is reacting to opportunities in the market. The agility rating may further be determined based on whether the user or author has posted a plurality of future contents, taken a plurality of actions, and/or engaged in a plurality of behaviors that have or are associated with a plurality of recommended aspects. In other words, the agility rating may reflect a user or author's aptitude over time at responding to various recommended aspects and actually posting content with those recommended aspects. When determining the agility rating, it may be based on a plurality of recommendations and posted contents over a predetermined amount of time. For example, the predetermined amount of time may be related to a period of time that occurred most recently relative to the determining of the agility rating. For example, the agility rating may capture recommendations and subsequent posts within the last three (3) months. In another embodiment, the agility rating may be calculated for different discrete periods of time. For example, a user may calculate two of the author's agility ratings for the first six months of last year to compare how the author is doing in the first six months of this year. In another embodiment, the agility rating may relate to an entire amount of time than a user or author account has been active, which would yield a sort of all-time score for the user or author.

Other various factors may also be used to determine an agility rating. For example, the agility rating may be a relative score. For example, the system may also track how internal (other professionals within the same company or organization) or external (outside) competitors are responding or reacting to recommended aspects for content posts (whether or not those competitors are actually receiving or being notified of the recommended aspects). The system can use this information to determine who is reacting to the recommended aspects better or worse as compared to each other. Thus, a relative agility rating can be determined, rather than just a concrete agility rating that goes up or down based merely on whether a recommendation is being followed. In this way, an indication of how well a user or author is doing as compared to his competitors, peers, or other users attempting to reach the same or similar target audiences can be determined. Another way an agility rating may be modified or customized is by selecting a custom author crowd for the activity data. In this way, the recommended aspects are determined based only on activity data relating to a particular group of authors. In this embodiment, different users may have specified different crowds or groups of authors, which can lead to different recommendations. For example, User A may be advised to post eight times a day, while User B may be advised to post twice a day. If User A misses one post (for seven out of eight), they may receive a relatively higher score than if User B misses one post (for one out of two) because User B missed a much higher percentage of their opportunities than User A. That is, an agility rating determination may be adjusted based on the recommendations that a user or users have received. In other embodiments, the agility rating may be determined based on a number of recommendations the user accesses per time period, the number of webpages or screens the user visits, the number of goals the user has set, the number of goals the user has actually attained in a certain time period (or all time) using the system, whether or not he is outperforming industry or pre-established benchmarks, etc. The system could also take into account whether the user followed recommendations for what are deemed to be more advanced tactical recommendations by the system that may require additional time, effort, experience or know-how, and budget to execute on. In another embodiment, the system may take into account effectiveness of future content posts, actions taken, and/or behaviors engaged in to determine agility ratings. For example, if a post is effective at generating positive interaction, that may positively impact the agility rating. In other words, if a fluctuation of content generated by a plurality of authors is significant or meets a particular threshold, it can be used to determine the agility rating. The fluctuation may be a change in authored content, author action, or author behavior by the plurality of authors occurring over a period of time and with respect to the future content, action, and/or behavior. An agility rating may be a percentile as described herein, a letter grade, a 1-100 rating, or any other type of scale or rating. The system can also display agility ratings in tiers as compared to other users. This display can be anonymous with un-named participants or could actually show the names of other users. The system could also show high performing and/or low performing users.

Some users, for example those who pay more, may also have the ability find out more about and have access to more features relating to the computation of the agility rating. The system can provide these users with precise actions and recommendations on how to improve his/her agility rating. Such a functionality may even interrelate a list of marketing recommendations that were delivered to the user, and then display how each one had impacted the user's agility rating. For example, such a report may show to the user that he/she was very good at following X category of recommendations, but not Y category of recommendations. As a result of this performance, the system would then demonstrate the impact the user's tactics had on his/her agility rating. If a user had neglected to follow all recommendations about the timing of new marketing content, or had followed only 3 out of 10, then it may be a very simple concept to convey to the user that if he/she posts each type of content at the suggested times, then he or she will see an increase in their agility rating. Similarly, it may be important for the user to learn precisely which set of recommended tactics he/she had overlooked or perhaps misinterpreted or what specifically contributed to the decline or growth in the user's agility rating.

FIG. 9 is a flow diagram illustrating a method 900 for alerting a user that the user's agility rating has dropped below that of a second user in accordance with an illustrative embodiment. In alternative embodiments, fewer, additional, and/or different operations may be performed. Also, the use of a flow diagram is not meant to be limiting with respect to the order of operations performed.

In an operation 905, the system monitors agility ratings of a plurality of users. In an operation 910, the system determines that an agility rating of a first user has dropped below the agility rating of the second user. In an operation 915, the system sends an alert to the first user indicating that the second user has passed the first user in agility rating. Multiple other types of alerts and/or differences in agility rating between a first and second user may be determined in other embodiments. In alternative embodiments, the system may also monitor for different thresholds or comparisons between the agility ratings of different users or authors. For example, the system may also determine that the first user's rating has risen above the agility rating of the second user. In another example, a user's agility rating may be monitored in comparison to an average of other user's agility rating, such as a group of competitor author accounts. In other embodiments, the system may monitor for predetermined metrics as opposed to or in addition to comparisons with other authors. For example, if a user or author reaches an all-time high agility rating, the user may be alerted of that. In another example, if a user or author's agility rating goes significantly down or up by a particular threshold or percentage, the user or author may be warned. In another embodiment, the system may monitor for any movement up or down (increase or decrease) in the agility rating. In another embodiment, the system may send the alerts to someone other than the author or user that the alerts are about. For example, if a user is tracking competitors, the user may receive alerts on author accounts that they do not control. In another embodiment, a company may have a large staff of marketing professionals. Each marketing professional may have his or her own user account to use the system disclosed herein on behalf of one or more of the company's author accounts. Supervisors of the company's marketing department can therefore receive alerts, agility ratings, and additional information based on the individual marketing user accounts to monitor performance of their employees. Further, the marketing professionals may be organized into teams based on multiple author accounts owned by the company. In this way, by receiving alerts, agility ratings, etc. about the multiple author accounts, teams of marketing professionals can also be monitored on their performance. Furthermore, a plurality of authors or users may also be ranked by agility rating in this way. For example, a leaderboard showing a top 10 in an industry or at a company (or team of a company) may be maintained. In another ranking methodology, the system may calculate a percentile rank to indicate how the user or author is doing. For example, if a user's agility rating is higher than 90% of his peers at a marketing firm, he is ranked at the 90th percentile. In order to select a group of authors for ranking, comparing, tracking, alerting, etc. a user or author may use a search criteria to define a custom author crowd as disclosed herein for such functions. Using a search criteria to specify a custom author crowd can be effected in different ways. For example a user may interact with a user interface and display to specify a custom author crowd. A user may specify authors they would like to include in a crowd or may specify authors whose followers should be included in the user's custom author crowd. For example, a user may type in a brand name or brand names, a user may specify Twitter™ handles, upload a list of usernames/actual names/brands/etc., the user may choose predetermined crowds from a drop down list or checklist, etc. In another embodiment, a potential request may be selected to yield a determined recommendation for authors to add to a custom author crowd. Output reports of agility ratings, history, etc. can be downloaded, emailed, etc. to their team of users, a boss, etc. showing how each of the tactics of each user has individually contributed to their goal and increased the overall engagement, agility rating, etc. of the brand. The systems and methods disclosed in this application to determine and provide recommended aspects and personalized recommendations may also be applied to a variety of educational and higher education contexts and settings to facilitate the teaching, learning, understanding, and application of certain materials. Student performance, teaching methods and standards vary; thus, more customized approaches may be beneficial. Variations of the systems and methods of the presently disclosed system may also be used to help instruct, measure, enhance, and benchmark student knowledge in a set of business-related or non-business related subjects. Further, the generation of an agility rating may also be applied to incentivize or otherwise encourage certain behaviors, actions, goals, and outcomes of participants which may include both instructors and students and other parties directly involved in or influencing the education process.

Alerts may be utilized in other embodiments. For example, a user can specify a recommendation and specific threshold or customized criteria which must first be met before the system sends alerts to the user with new marketing opportunities, or calculates fresh marketing recommendations (these may be in-product alerts, via email, text, push notification, mobile alerts etc.). The alerts could be based on fluctuations, agility rating, size of custom author crowds, etc. Alerts can also be generally sent whenever new information is available for viewing. Such alerts may also be used to signal as to when the user has reached a certain recommendation limit or quota with their account—or when a user is underutilizing his or her allotted quota, or some other indicator of system usage and the user's current position relative to some threshold or benchmark. This may help the user preserve their budget or offer opportunities for the system to offer the user paid content and/or access to certain features. Some content available to paid users can be the ability to refresh results, recommendations, etc. frequently in an on-demand fashion. Other users, for example, may only get to update their results, recommendations, etc. infrequently, such as on a schedule (e.g., once a day, hourly, set number of refreshes in a time period). Another way features may be divided between paid and free (or discounted) users is, for example, a free (or discounted) user may only have one author account in which they can determine recommended aspects for future content posts, actions, and/or behaviors, while a paid account may have 2, 5, 10, unlimited, etc. author accounts based on their paid status or may have different number of author accounts depending on how much is paid. This may be valuable for those managing multiple brands or wanting to track competitors, or targeting discrete or multiple audiences.

In some embodiments, a target audience or market is not contained, or is only partially contained, within an author's current following. In such an embodiment, customer author crowds are useful. For example, a user may want to know when it is best to post new Vine™ videos to reach Audience A vs. Audience B; similarly, the user may want to know whether promoting an infographic or podcast will be more effective at engaging their target audience at 3 pm on a Friday, or for meeting some specific marketing/business goal they have with respect to that target audience. In another example, a user wonders when they should tweet if they want to engage video gamers vs. fans of Manchester United™. If they work in marketing at EA Sports™, and are trying to promote the next FIFA™ game, they may want to know about both crowds.

When first accessing the system, users may be able to view pre-selected/pre-computed recommendation aspects based upon their prior usage of the system. That is, users may not want to go through the exercise of re-checking or re-selecting each desired recommendation aspect every time they use the system. Instead, the system can pre-populate these results for the users to view quickly without extra effort. In this way, the user will have the option to either select a new set of recommendations in his current session or have a shortcut to acquire fresh insights from the same set of recommendations as his prior session. In a similar fashion, a user may receive a suggested set of recommendations that the system determines may be of interest to the user. This will serve the dual use case of experimentation and consistency. In other words, the system can save past potential request selections as well as the recommended aspects determined in response to the potential request selections in order to allow for easier use. A history for a user may include information such as the recommended aspects delivered, when they were delivered to the user, how long the recommended aspects are fresh or the time/date at which they expire and may no longer be valid, when the recommendation was acted on by the user, whether or not the user actually followed the advice of the system, other information that was input by the user and used by the system to provide a certain recommendation, and/or the impact each of these marketing tactics had on a particular goal or goals of the user. In another example, a user may receive a suggested set of recommendations that the system determines may be of interest to the user, which the user may or may not have previously accessed. Benchmarks or industry averages may also be shown for comparison. A user can also submit, through the interface, new potential requests that they want added to the system.

In an illustrative embodiment, the system may receive requests of recommended aspects to monitor over time. For example, a user may input a potential request such as, "When should I post product related content today?" In the previously described embodiments, selecting this request may generate a time, such as 3 PM (post meridian). After receiving this selection, the system may send an alert to the user at 3 PM or at a predetermined time before 3 PM to remind the user to post content according to the recommended aspect. In another embodiment, the system may receive a selection of a custom author crowd and, the system may alert user if that custom author crowd grows or shrinks based on the criteria that specifies the custom author crowd. For example, a user may indicate a criteria that designates a custom author crowd of everyone on Facebook™ who likes a page relating to Fig Newtons™. In one example, the system may determine that this custom author crowd grows to reach one million authors. In accordance with this determination that the crowd has reached a predetermined threshold, the system may generate an alert that includes a recommended aspect for a content post. For example, the alert may recommend that the author post a celebratory message relating to gaining a one millionth user of fanatical Fig Newtons™ followers. In this embodiment, the alert may be determined automatically, or may be determined based on preset characteristics determined by the user. In other words, the user may have preset that they would like to be alerted when one million users is reached, or the system may automatically determine or have default criteria for generating alerts in this way. The system may also automatically determine that such events represent new marketing opportunities for a user.

In another illustrative embodiment, the system may determine an agility rating or a change in agility rating in advance of a user or author actually posting a future content, taking an action, or engaging in a behavior with the recommended aspect. In this way, a user or author may be able to know how their agility rating will change if they post content according to a recommended aspect. In another example, the system may determine a different metric in advance of an actual post of future content, action taken, or behavior engaged in. For example, the system may predict how a draft post should be best optimized to achieve a different user goal, such as sales from a website or new registrations to a mailing list, subscription service, clicks and engagement, impressions/reach, etc. This can help foster further engagement of authors and users with the system because they can see the benefits of following the recommendations. In another embodiment, the user and/or author may also get to see the change in their agility rating immediately after posting a content that follows a recommendation. In other words a user and/or author's agility rating may be updated in real time to further improve engagement with the system. For example, the system may scan the contents of a post currently being drafted as well as any uploaded media, metadata, the current time, etc. to see if the user is following the recommended aspects. In another embodiment, the system may send an alert or message regarding a change in agility rating or potential change in agility rating (if the user has not posted the content yet) to a competitor in order to spur on the competitor to use the system as well. In another embodiment, a real time indication of how an agility rating may change can be calculated and displayed while an author is in the process of authoring a post. For example, if a recommendation is to make a post between 80-120 characters, an author may be writing a post and see his or her agility rating go up when the post goes higher than 80 characters and goes back down if the post goes over 120 characters. In another example, the recommended aspect may be to author a post with three hashtags. While three hashtags will result in the best increase in agility rating, the system can also show incremental increases in agility rating as one and two hashtags are put into the post. Once a content is actually posted/published, the agility rating can go up permanently based on the content. In another example, the user's draft tweet could be 50 characters in length and have an infographic attached to it with the "#funfacts" hashtag. The system may then tell the user that, in fact, 60 characters are ideal (so their text length may be shown in red coloring) and reaffirm that indeed an infographic is the best content choice to engage their audience (shown in e.g. green text). It may also approve of the "#funfacts" hashtag because it meets a suggested character length and hashtag-per-post quantity. However, the timing may not be right so the system may display in red—"wait to post until 12 pm." This same technique could be applied across any recommendation on any platform. Such a tool is a powerful on-demand marketing helper to help deal with many questions a marketing professional may have in real time. This tool may also be connected directly to the medium on which the user posts the content. For example, the system may facilitate a user working in the compose tweet window of Twitter™. In another embodiment, the system may calculate in real time a prediction of how a particular action, behavior, or content will impact other business goals. For example, if a business goal, either predetermined by the system or input by the user, is to increase a followers for a Twitter™ account, the system can also predict/calculate how a post will increase followers to the account. In another embodiment, the system may calculate an impact and/or agility score change while actions and/or behaviors are being scheduled. For example, in a social media management system, such as HootSuite™, a user can schedule posts or other actions/behaviors (e.g., selecting day/time content should be posted). A user may also specify a location to tag a post (e.g., Boston MA), or select different targeting options for a post, action, or behavior (e.g., country, mobile device, specific crowd). A user may also engage in behaviors like creating certain meta tags on their website to describe certain content, page title tags, or use alternate keywords as part of a strategy. For example, the strategy may be to drive a higher ranking in organic search results. In another example, a user who is using Photoshop™ to edit or create images/design/graphic for a post the system can determine in real-time that if the user, for example, cropped an image in a particular way or made certain filter adjustments to it, the image may be more likely to drive favorable results for a business goal and/or agility rating. Other actions or behaviors can also be monitored in real time to determine how business goals and/or an agility rating will be impacted. For example, templating decisions for a website or website optimizations may be monitored. In another example, page speed/page load changes or other performance optimizations for web visitors, fixing broken links or dead pages in a website navigation may be actions that are monitored by the system in real time to determine how would that action impact business goals and/or an agility rating. Another business goal that impact may be determined for is search result optimization. For example, if the user is updating a website, the system may automatically determine how likely a web search for a particular term will result in finding the user's website.

The systems and methods disclosed herein may also include a registration process. First a user may login to the system or create an account. In some embodiments, login names such as a Twitter™ handle may be used to login to the present system as well. This may be useful if, for example, the system operates utilizing Twitter™. In this way, the system can use the login information to access data from Twitter™ to retrieve activity data and post content. Authorization protocols such as OAuth may be used to obtain tokens from users that allow the system to request data from networks, such as Twitter™'s API. In other embodiments, the system may directly access a social network's user database or achieve access through a third party API or data provider such as Datasift™ for Facebook™. Accordingly, the system can collect data like an author's timeline, profile information, follower graph, friend information, lifetime tweets, last tweet, etc. A user may optionally add in additional login information or account specifications so that the system can retrieve data on multiple accounts.

A user may enter various information to set up an account. Some of the information provided may be used to determine recommended aspects for posting content, taking actions, or engaging in behavior. Such information may be changed by the user to adjust how the recommended aspects are determined in the future. For example, inputs to register for an account may include contact information (your name and email address). A further input may be time zone allowing the system to appropriately deliver recommendations related to content publication timing. A user may also specify the author accounts (e.g., Twitter™ handle(s)) they want recommendations for (i.e. the recommendee). A user does not need to be the owner of an author account to receive recommendations for it. Activity data can be collected from public or private information sources on the internet. A user may also specify all or just significant competitors. Such a specification may be by specifying a brand name, product name, Twitter™ handle, Facebook™ name, etc. In one example, the potential request "How much should I post today" may be informed by combining the results of multiple algorithms. One input can be related to competitors' activities. For example, the system finds that a competitor named by the user is posting much more often than the user, and that competitor is receiving a high post engagement rate, and so the system may recommend that the user should increase the volume of content he/she posts on a given day by some factor or multiple. Users may also specify one or more goals for their business or marketing initiatives. These goals may either be long-term or short-term goals, which may impact how the system determines certain recommended aspects for the user on a given day.

A user may also input products/brands/services, campaign indicators such as hashtags, etc. that they will be promoting through their user account or through one or more author accounts. This can be used as an input to determine recommend aspects for users regarding, for example, the frequency and proportion of lifestyle vs. product-oriented content they should post on a given day. Accordingly, the systems and methods disclosed herein recommend that a user balance publishing lifestyle and product or explicitly branded content. A loyal following may be better gained by not talking about yourself and how beneficial your product is all day long. Rather, it can be beneficial to talk about the topics that are of particular interest to your audience.

A user may also specify the size of their target market. Such data may be used as an algorithm input for certain recommended aspects or types of aspects. A user may also specify to what extent they feel their current following contains their ideal targets. This input may be used to determine an approximate target market. That is, if a user thinks they have only captured 40% (e.g., 400,000 people) of their target market, their total target market is the 40% (e.g., 400,000 people) of captured authors plus an additional 60% (e.g., 600,000 people) equaling the total target market 100% (e.g., 1,000,000 people). A user may also specify their primary goals, which can be used to determine, for example, how much and which kinds of marketing the system should recommend that the user do or use. A user could also specify their marketing budget, specify the amount of time they spend online marketing, or any other information related to use of or goals in social media. Information such as this can help adjust certain recommendations according to the user's preferences, daily routine, specific business and team needs, operational/financial feasibility, etc. on certain tasks and recommendations.

After logging in and/or creating an account, the user is shown the available potential requests for recommended aspect types and can select the ones they want. In some embodiments, certain potential requests may be available for paying customers. After selecting the potential requests desired, the user can make a single click or interaction to generate all of the recommended aspects. The recommended aspects could be displayed on the same page with the potential requests, or could be displayed on a separate page or on some other medium leveraged by the user. In an alternative embodiment, separate account creation may not be needed by the system. For example, if the system disclosed herein is integrated into a social network such as Twitter™, a user may log in and access the various functions of the system using their Twitter™ handle and password. Advantageously, the presently disclosed system may also be integrated into different types of marketing and social media management dashboards, such as HootSuite™, or other business software. Recommended aspects may be used in conjunction with or to inform tactical decisions or other tasks that may be executed through or performed while using other marketing, business, or consumer software applications. The pairing of the presently disclosed system with other systems may give rise to one or more new or complementary recommendations. Embodiments in which the system functionality is interrelated or enhanced by other systems, or vice versa, are contemplated.

The systems and methods may be executed on computing devices in various ways, such as those discussed above with respect to FIG. 1. Another way in which the disclosed embodiments may be executed is through a browser extension that will allow users to access their recommended aspects outside of a web application. A browser extension can allow users to access their personalized insights on the fly. These can be valuable for users who are busy using other web-based software platforms to create content and engage with customers (e.g. HootSuite™ or Sprinklr™), sending emails, or when they are on Twitter.com. That way, system does not force users to be on an additional webpage or inside an application when they want to harvest new insights using the systems and methods disclosed herein. Instead, the system can deliver these answers to the specific context in which they are desired by the user. Through a browser extension, users are given the opportunity to view updated analysis results from the set of recommended aspects just as would be available to them in the web application. The users may be able to choose from a fresh set of questions via the browser extension. In yet another embodiment, users may be limited to the set of potential requests and recommended aspect types, which they had accessed during their last session not using the browser extension or mobile app.

In one embodiment, the system may, without specific selections of potential requests from a user, still determine recommended aspects for future content, actions, and/or behaviors. For example, the system can measure fluctuations in data (user, author, crowd, entire network, etc.). Such fluctuations can be measured manually (directed by a user), but may also be scheduled by a user or automatically scheduled on the back end (a default schedule). For example, data processing system may occur for all users in one-hour increments so the system may provide hourly answers. The system can then identify new marketing opportunities based upon fluctuations in data and/or the user's current climate, position, and goals (i.e. identify favorable marketing conditions for the user). The system can also convert these opportunities into practical insights and one or more suggested marketing tactics. The system can also learn from the user's performance or fulfillment of certain recommended aspects. Based upon the user's subsequent activities (and successes and failures) and those of other users' of the system, the system may provide additional recommendations or suggested tactics for the user. The system may also adjust a user's recommendations to make the performance of certain tactics more manageable. Such adjustments may be made based on time availability, financial resources, access to certain types of content and media (for example, if the user has no way of producing an infographic, the system should learn from that—either by user input or via the user's activity—and instead recommend the next-best type of content the user should post instead), or general performance/fulfillment of recommendations. In one example, if the system recommends the user should post 10 times each day, but he/she only posts 4 times, it may be a function of the available time that user has in the day to devote to social media marketing. Therefore, the system should learn from this user's activity and adjust the future recommendations like this that are delivered to the user until he/she attains more steady fulfillment of each recommendation. That is, the optimal recommendation may be unrealistic for the user to fulfill right away; but he/she may learn to do it over time.

Other features can also be included in various embodiments. For example, users can export recommendation aspect results into a spreadsheet such as Microsoft Excel™ to save for later viewing and/or analysis. A user may also be able to download other document types, such as PDF or PowerPoint™ files. The system may provide a "Refer A Friend" link, where the user will have the opportunity to choose between sending a pre-populated tweet or an email message to a specified recipient and invite them to use the system. Users may also have the ability to access additional content through the system that provide enhanced tutorials, guides, and extra helpful information that will help them execute and improve upon their marketing. There may also be a leaderboard that is viewable to users containing performance measures of other users of the system, or a forum in which users of the system can interact with each other to share advice and best practices, or ask for help. The system may also provide a workspace where the user can experiment with, design, store, or test different variations of his or her content. The system may also provide a series of pre-loaded samples of recommended aspects for popular authors to illustrate how users of the system, who may work for companies of different sizes and industries or foreign countries, may be able gain meaningful insights from the system.

The systems and methods disclosed herein can be integrated with any social network. Other social networks the system could integrate with may include but are not limited to: Pinterest™, Yelp™, Flickr™, Meetup™, Tagged™, YouTube™, Vine™, Facebook™ Instagram™ QQ™, WhatsApp™, QZone™, LinkedIn™, Skype™, Google+™, Viber™ Tumblr™, Snapchat™ LINE™, Sina Weibo™ VK™, Reddit™, StumbleUpon™ Foursquare™, etc.

The concept of generating recommended aspects based on potential requests can be used in other sectors of the marketing industry. For example, recommended aspects can be determined as disclosed herein for areas including but not limited to: display ad spending, mobile ad spending, radio ad spending, SMS and text message marketing, SMS and text message ad spending, search engine marketing, search ad spending, TV ad spending, email marketing, email ad spending, b2b marketing, lead generation, content marketing, public relations, market segmentation, mobile content, market research, digital marketing and website marketing, display marketing, programmatic marketing, real-time marketing, marketing automation, loyalty programs, couponing, social commerce and social selling, mobile and tablet commerce, e-commerce, omni-channel retailing, cost-per-click, local search, mobile search, paid search, search engine optimization (SEO), mobile social media, native marketing, ratings and reviews, social media marketing, social media ad spending, digital video, digital video ad spending, mobile video, mobile video ad spending, video marketing, print media marketing, direct mail, in-store displays, outdoor marketing, event marketing, non-traditional and guerilla marketing, telemarketing, cross-media marketing, daily deals, graphic design and illustration, other art forms, etc. Accordingly, the systems and methods disclosed herein are not meant to be limited to a certain medium or type of marketing.

The systems and methods disclosed herein can also be used to manage and systematize marketing experiments. For example, users as disclosed herein can consume their tactical and best practice recommendations from the system whenever they want, wherever they want. The system may also include a campaign tactic or a group of campaign tactics that the user could select to move forward with. Tactics can be directed towards one marketing channel or involve conducting activities on multiple marketing channels. Such a system could provide an integrated or multi-channel programmatic ad spending mechanism or some other structure where the system may recommend a suite of marketing channels, platforms, or devices for the user to try out that day and then allow the user to execute certain promotional tactics and new marketing activities. Such an embodiment could convert answers, trends, and other data-driven insights into an array of pre-populated tactics, methods and campaigns that the user may choose to trigger, test, modify, or ignore. Such tactics could include a group of recommendations across multiple social networks, for example. Social networks or sellers of marketing services may offer users of the system promotional access to marketing services to increase their business. Similarly, social networks or sellers marketing services may also offer the systems disclosed herein as a promotional tool to their existing customers in order to help increase per customer ad spend. The systems and methods disclosed herein may also convince users who have floating or ongoing marketing campaigns and flexible budgets to allow companies to react to these new, on-the-fly marketing opportunities determined by the system. This could also increase overall ad spend.

For example, the system may partner with multiple marketing platforms, such as Google Adwords™, Twitter™ Ads, and Facebook™ Marketing. The various marketing products offered by these platforms can be displayed in the user's campaign menu. The system can automatically create a customized marketing tactical response or suggested activity set for the user based upon that user's freshly available recommended aspects for content posts and what is going on in his or her audience or the marketing medium generally that day.

The system may have already learned from user-submitted information that a user's primary marketing goal is to drive installs of a new mobile application. The system can determine based on previous results with a marketing product or a stated purpose of a marketing product what might work best to accomplish those goals. For example, an App Card product by Twitter™ Ads may be recommended for this goal. The user may have also specified a secondary goal of growing his follower base. The Twitter™ Ads product that may be recommended for quickly gaining relevant followers can be a Promoted Account. The goals of a user may be captured by the system with explicit reference to a single marketing medium (e.g., what is your top goal on Twitter™) or they could be the user's overall goals for social media, marketing, or his business. There may even be some required interpretation by the system of which marketing product is a preferred solution for meeting a certain goal of the user—if this information is not readily available or open to interpretation.

However, at certain times online marketing climate conditions can be used to direct a shift in marketing strategy as determined by the system disclosed herein. Accordingly, a user may experiment with an additional or alternative marketing products, mediums, suppliers, services, etc. based on a current climate at a particular time or on a particular day. Recommendations to experiment in this way can be determined through analysis of variables in activity data as disclosed herein. For example, when a user has identified a set of competitors, the competitor accounts may experience a spike in follower growth rates and have an order of magnitude larger number of followers than the user. In such a case, it may be justified for the user to shift priorities for the day to use, for example, a Promoted Account product instead of an App Card because the current climate indicates that there are many authors out there following new pages or accounts that are similar to the user's. Therefore, switching to a strategy designed to get more followers would be well timed in this scenario. Additionally, users discussing or engaging regarding similar content may be tightly connected and actively engaged in retweeting messages that day, so there may be opportunity for the user to receive more exposure for the user's Twitter™ handle as well—an additional incentive to try to reach those targets right now. In this case, the system can present Promoted Account on a screen as a proposed tactic that the user may choose to execute a) along with a promoted App Card, b) ahead of or in place of an App Card, or c) in combination with some other set of suggested marketing tactics or campaigns. That is, marketing tactics considered to be advantageous may be calculated for and suggested to a user irrespective of that user's explicit goals or established marketing plan. This new suggested ad can include a performance estimate indicating the expected impact that the ad may have and pre-populated creative elements, such as text, images, designs, tags, and other inputs. Additionally, the template of this new ad could be based off an existing message or a previous ad campaign developed by the user.

Suggested targets or goals could also be generated by the system and can be customized and edited by the user at various points in time. Targets can include but are not limited to factors such as location, gender, language, devices, platforms/operating systems and carriers, keywords, followers, interests, tailored audiences, TV targeting (shows, networks, genres etc.), other behaviors and characteristics, the placement of where this ad will appear on Twitter™ (e.g. in users' timelines), etc. In one simple example, the system could detect that a certain percentage of the user's target audience is active in New York right now (a potential request regarding geographic locations of active users may have been selected or the system may have determined this on its own). The system may then automatically input and recommend "New York" as a specific criterion for geographic targeting for a suggested content item on Twitter™ at that time. The user could also add targets or exclusions to any of the recommended targets; certain exclusions may also be suggested by the system. For example, the user may target the entire United States except California for a product content item. The user may also specify a total budget, daily budget, a custom bid, or max duration or time frame for a selected campaign.

In another embodiment, the system may suggest and provide the capability for a user to execute a new Facebook™ ad. A suggested Facebook™ ad could be shown in the display of a user's computing device as part of a marketing menu alongside the tactical marketing suggestions for Twitter™. The display of all of these suggested items may also reflect a ranking or sorting of the recommended tactics by order of importance or in terms of suggested priority to the user, shelf life (how long until the opportunity expires, or will need to be recalculated), or by the relevance and predicted impact of each tactic the goals of the user, or by the time and effort it will take for the user to execute the recommended tactic.

In another embodiment, the user's goals may be different for different mediums. For example, a user's top goal on Facebook™ may be to use marketing to increase online traffic and conversions on the user's website, while the user's goal on Twitter™ is to increase the number of followers the user has. The system may, sometime after the goals were set, detect that the user's target audience for Facebook™ website conversions activated in the geographic area of the user's headquarters that day may be perceptive to liking the company's Facebook™ page. For example, a high proportion of these authors' online posts contain words and phrases, which are deemed to reflect positive sentiment. Given this environment, the system may recommend that the user leverage a supplementary marketing tactic on Facebook™ that day to capitalize on this new change. Because of the opportunity to drive local awareness of his company, the user can be alerted to and given the opportunity to execute a Facebook™ ad to promote his business—specifically to people who are nearby that area. This newly surfaced promotional opportunity may not have been something the user planned for. Instead, the opportunity or potential request was triggered by current conditions that may have a small time window of opportunity. Similarly, this secondary recommended aspect may be shown next to, or proceeding, a primary recommended aspect for the Facebook™ content item that the user may leverage to attain his goals with respect to new website conversions.

As disclosed herein, the system may be integrated with other marketing platforms outside of social networks. For example, the system may be integrated with Google Adwords™ In such a case, the system may be integrated with one or more of Google's APIs or the user's personal Google Adwords™ account in order to gain access to important information like the user's keyword planner, display planner, current search marketing campaigns, the user's organic search rankings, the user's goals and preferences, transactions, performance history, current trends on Google™ search volumes and other industry data, the user's available budget, and other settings and information. The system may use this data to determine goals for the user and as factors for determining recommended aspects of content. For example, the system may detect a fluctuation in search volume, bidding, or some other indicator around a particular keyword that may indicate a new opportunity. Such opportunities, like those described on Twitter™, may warrant a new marketing campaign or tactical combination of campaigns to be conducted by the user.

The system may also suggest recommendations of an explicit pairing of a paid search content item with other marketing tactics in a user's menu of possible future content posts, such as a Twitter™ Promoted Accounts campaign. These tactics may use targeting criteria that allow the user to reach authors with similar characteristics on different platforms. However, in some cases it may be preferable to use different tactics on different platforms to appeal to different audiences. For example, the demographics of authors on the social network Pinterest™ may be very different from the demographics of authors on the social network Spotify™. Accordingly, the user may direct different tactics or campaigns to those respective networks. Each suggested tactical combination may contain recommendations for using certain words, phrases, or design elements to help ensure a consistent brand identity or to more effectively appeal to each audience in each setting. Similarly, the content such as postings or content items in this suggested tactical combination may leverage the same features or system outputs that were actually derived from activity data or fluctuations in the user's target audience or social network. For example, the system may recommend to the user that they should use a new trending hashtag #fantasyfootball, and participate in that hashtag conversation, to become more relevant to the user's target custom author crowd. In one embodiment, the system may automatically insert, or suggest inserting, #fantasyfootball into the message text for each content item that is posted. The system may even recommend variations of these ads, or prompt to the user to include other insights from system that the user could test by operating multiple campaigns or tactics at one time. These fields could be automatically pre-populated by the system or otherwise input by the user.

Furthermore, the system can automatically tag each tactic or collection of tactics in a way that facilitates tracking and measurement of a multi-channel (or platform) opportunity campaign. For example, if a user's product is a mobile app that includes a music streaming service, the system may recommend to the user that there is opportunity to do a paid search ad on Google™ using the keyword "live internet radio" based upon other activity around that keyword and the recent search habits of consumers. Similarly, the system may recommend using a related keyword to the user's current keyword set. The system may also recommend that the user take this insight and apply it to another marketing channel—for example, to publish a promoted tweet on Twitter™ that contains the exact keyword "live internet radio" in the text of the tweet or some variation of that keyword or concept. Alternatively, the system may recommend a new keyword or set of keywords to promote on Google™ based upon the expressions, activity, and/or behavioral fluctuations of that user's target audience on Twitter™ or some other preferred marketing medium/platform.

The system can identify new opportunities, generate recommendations to tailor one or more suggested tactics to the user, and can present such recommendations or tactical sets on a display in a menu format where the user could decide whether they want to initiate, postpone, ignore, deactivate, or abort a particular tactic or campaign recommendation. Put another way, the user is given the flexibility to choose from a set of system-generated recommendations or instead do something that is not explicitly listed. That is, the user may propose an alteration to a baseline tactical suggestion, make an explicit modification to a tactical suggestion, or choose a new marketing tactic autonomously. The system can structure experiments to only be run within certain timeframes, which can provide the user with greater transparency into when, where, why, and how the marketing tactic is applicable and appropriate for the user's current situation. The user can therefore a gain deeper understanding of how a campaign fits within the bigger picture of his or her collection of online and offline marketing programs.

The system can also adapt to current marketing conditions the user is facing at the present moment, as well as take into account constant fluctuations in data and changes in competitor and other participant activities. The system can also automatically adjust campaign experiments and the delivery of new tactical marketing opportunities to users according to the explicit goals, information, and other criteria submitted and set by the user.

The system allows the user to ramp up his or her activity and media investment on the integrated marketing mediums in order to expand the scope of their marketing activities seamlessly. For example, if a user has available budget, a smaller experiment can be expanded or scaled up into large-scale campaigns very quickly with the systems and methods disclosed herein. The system can achieve this by recommending additional tactics, duplicate tactics, alternative timing of marketing content, follow-up recommendations, or proposing investment in a new marketing tool or marketing medium that is currently not being used by the user. As previously discussed, some of these experiments may be free trials offered by a marketing platform as an incentive to capture new users and expand the engagement and ad expenditure of existing customers. As such, the system provides an incentive or process for the user to subscribe to a more premium level of access and additional functionality with the ad provider. The system may thus become a lead generation tool for a social network or ad provider.

The combination of intelligently determining recommended aspects for posted (paid and unpaid) content and a dynamic opportunity classifier allows the system to appeal to the needs of a wide range of companies and provide mechanisms with which the system can onboard, educate, and ramp up the online marketing activities of the user. Accordingly, the systems and methods herein are worthwhile for a small business that has little to no knowledge about social media best practices or a large business that wants more advanced monitoring, recommendations, tactical campaigns, and timely and practical advice. The system also allows the user to manage and customize many of their own settings, which are useful for more precise progress measurement and efficient goal attainment of the user. All of these systems and methods incorporate and/or work in conjunction with the determination and usage of recommended aspects for future content to be posted, actions to be taken, and/or behaviors to engage in that are based on activity data that indicates aspects of other content authored by or interacted with a plurality of other authors. These recommended aspects can be embedded in and/or help inform, alter, revise, compel, or otherwise adjust a particular tactic or marketing strategy/campaign.

Various algorithms may be used for text, behavior, and other analysis to analyze data, content, authors, etc. and generate recommended aspects. For example, algorithms utilizing machine learning, network analysis, predictive analytics, descriptive statistics, natural language processing, graph algorithms, sequencing algorithms, numerical algorithms, optimization algorithms, database algorithms, signal processing, deep learning, artificial intelligence, etc. may all be used in various embodiments disclosed herein. The system can also include computer vision specific algorithms that allow the system to do sophisticated image processing. Such techniques are used to examine image (e.g., stills, videos, GIFs) based content to analyze activity data and determine recommended aspects for potential requests directly or tangentially regarding image based content. For example, an image based potential request may include a request such as: What color choices will help to increase my engagement rate today? The recommended aspect (or answer to the question) depends on activity data indicating current color preferences of the authors on which the potential request is centered as well as images they are engaging with most frequently or most recently. In one illustrative embodiment, the system can determine, based on the activity data, a recommended aspect that indicates the optimal color pallet each user should use for their posted image content that day, and for example the RGB, CMYK or hexadecimal values of these colors. These RGB values, and other information extracted from the image, may be used by the user to inform new marketing design choices in PowerPoint™ Illustrator™, Photoshop™, Microsoft™ Word, other text, word processing, graphic, image or video editing tools, campaign manager and ads management/editing tools etc. for example. There may also be a conversion mechanism to Pantone™ color values to facilitate certain marketing use cases. Advantageously, the system provides a connection between recommended aspects to target an audience and the tools, platforms, and other software products or services that may be leveraged by the user to create, edit, store, or distribute certain marketing content. In some embodiments, certain data analysis (e.g., video content) may utilize additional integrated APIs (e.g. a YouTube™ API). For example, YouTube™ videos posted or linked on Twitter™ may not be able to be pulled and analyzed using a Twitter™ API as with text or images. Instead, the system can layer in another data source to understand what is actually in a video and analyze it with various computer vision techniques. Integrating additional APIs may be used any time data from one provider or social network is distributed on another provider or social network. It may also be beneficial in certain cases to correlate, interrelate, or perform other analysis exercises on multiple data sets in conjunction to enhance understanding and value for the user.

Results from Google's custom search API, or Yahoo BOSS Search™, or for example the Bing™ search API can be used to get more information about images shared by users on a given social network or other marketing channel. That is, the system can, in addition to or instead of relying on computer vision techniques to understand the characteristics and attributes of a set of images, Google's API can be used to get additional information about images. For example, the system may be able to capture certain metadata about the images from a reverse image search via Google's search API. Such a process may make determining recommended aspects faster and easier, because metadata indicating the color palate of an image or sequence of images (e.g., GIF, video) is generally smaller in size than an actual image, and no image analysis has to be performed. In other words, the system can use metadata of historical image data to generate the color preferences of authors instead of analyzing and using the images themselves to determine the activity data. This can save on processing speeds and potentially increase accuracy of the recommendations and activity data processing depending on the quality of image metadata.

In such an implementation, the system can integrate with a search engine API, such as Google's API, to gain more information about the image, such as the websites where that searched image or set of images is currently hosted. For example, if the potential request is to provide a recommended aspect to a user about the usefulness and timing of product photos (e.g., what percentage of your posts today should contain product images?), the system can determine what exactly constitutes a "product photo." Such a determination may be accomplished by looking at the host site of that image. Product photos, for example, would likely come from retailer websites or corporate sites. In this case, the system could use available metadata to identify which images in the set were product photos without having to do complex object detection. However, where context based recognition is not used or cannot be used, complex object detection may still be used. In another embodiment, the system may use both context based and complex object detection. In another embodiment, the user may upload or otherwise provide a means with which the system can access a repository of product or non-product images to inform certain recommendations. In another example, the system can identify which photos shared by Twitter™ authors are stock photos. Stock photography may be leveraged in many different areas of marketing that are not limited to posting content via social networking sites. A corresponding potential request may be, "Should I use stock photo imagery? If so, where should I use it, and how often?" The system can then compile (or have pre-loaded on it) its own catalogue, website list, taxonomy or grouping of websites which are likely to contain or offer access to stock photography and then look for matches within those sources. If an image is hosted on a stock photo website, it is likely to be a stock photo and can therefore be treated as such by the system. Such a technique can be applied across a range of other content types, such as videos, or any other searchable items where a user may be interested in understanding the origin site, hosted websites, geographic locations, and other relevant metadata associated with that particular object.

Web analytics platforms can also be integrated to inform the systems and methods disclosed herein. For example, the system can use data obtained from web analytics platforms, such as Google™ Analytics, through product integration. Such an integration can allow an interrelation between the system and the activity and performance of the user's website (traffic, conversions, sales, etc.) to allow the system to use this data to inform the system's recommended aspects, tactics, and best practices for social media marketing, or other marketing and business purposes. For example, a user may wish to receive a recommended aspect telling them which products on his website he should promote today on social media sites. In one illustrative embodiment using Google™ Analytics' API, the API allows a user to request certain information, or even real time data, for an authenticated user. The API allows users to query for dimensions and metrics that display active viewers of a page, the most popular content and pages on a users' website, etc. Such data can be used to inform recommended aspects of future content, actions, and/or behaviors.

In one embodiment, the system may determine through an API that visitors to the user's website are currently interested in peacoats. Webpages featuring product images of various peacoat styles may be receiving a proportionally higher share of page views, clicks, sales, or a longer average session length. As a result, the system may use this data to generate a recommended aspect telling the user that they should publish marketing content about peacoats on platform (e.g., Twitter™, Facebook™, Pinterest™) or even recommend explicitly that the user share those exact same images of peacoats on various social media at that time. The viewing behavior of this user's website visitors may be indicative of a preference held by others in the user's target market or digital audiences who may not know about the particular product offering on the user's website(s) yet. Accordingly, such a recommended aspect, if acted upon, could be very helpful in driving additional traffic to the user's website, and potentially more sales of the peacoats. It is advantageous for the user to capitalize on such current trends by publishing more relevant content about peacoats via one or more preferred marketing channels. The same technique may be applied to old products or product pages and marketing offers as well as new ones; the user may be alerted by the system to a positive fluctuation in page views for a product listed on his website e.g. six months ago. This may, in turn, generate a separate recommendation that the user could consider posting about this page content (e.g. product/service) via social media as well.

A specific promotional climate on a particular social network can also be used to inform the substance, timing, and design elements of recommended aspects and subsequent posted content or activities or behaviors of the user. For example, the hair color of the models used in a suggested image, or the optimal number of products to feature in one image that can help the user to maximize the engagement rate with their post on a particular medium or help achieve some other goal specified by the user. Therefore, activity on the user's website, or set of websites, may inspire both new website optimization tactics as well as tactics that are unrelated to the user's website. For example, website statistics as market signals and inputs can be used to inform recommended aspects of subsequent marketing activities on social media that can be executed by the user, and vice versa.

In another embodiment, a user can upload multiple potential images, designs, videos or other media for a future post, and the system can recommend one based on activity data in a way that indicates a likelihood that the user's audience will like the image or contribute to meeting a goal of the user. Similarly, a user may also upload multiple future content posts or other text and keyword selections. The system can determine the contents' character length, word choice, universal resource indicators (URIs) and other website links, grammar, etc., and the system can recommend one based on activity data, or other market data, and determine the likelihood the user's audience will like it or contribute to meeting a goal of the user or increasing his or her agility rating.

Numerous (hundreds or thousands) private and public APIs and user databases exist that the systems and methods disclosed herein may using according the various embodiments to provide recommend aspects for future content, actions, and/or behaviors to businesses and individuals. Some of these APIs may include but are not limited to: Amazon™ Product Marketing, Shopzilla™, Ebay™, weather APIs, event aggregator APIs, news service APIs, etc. New APIs may even be created or offered by certain companies specifically for integration with the disclosed system. Such integrations may use the API as an input (e.g., historical or real-time streaming data) to the system or may serve as output destinations where the recommendations generated by the system may be consumed by or within other software technologies.

Data used for any of the embodiments disclosed herein, including custom search criteria, fluctuation criteria, comparison of groups of authors, recommended aspect determination, activity data, agility rating calculation, marketing campaign recommendations, etc. can be gathered from any type of various electronic devices, software, and sensors. For example, devices where data can be collected may include (although this list is not meant to be limiting) smart thermostats, automobiles, biometric devices such as a FitBit™, smart product labeling, in-store shopper tracking and geotagging, wearable electronic devices, bicycle computers, etc. where data is transmitted via connections to the Internet in various ways such as WiFi, Bluetooth™, etc. Data captured through such devices can be used as historical or real-time data for determining certain tactical marketing campaigns and/or recommended aspects of content for the user.

For example, in-store tracking may be accomplished through Bluetooth™, video capture and analysis of in-store shoppers, WiFi fingerprinting where a system tracks the signal strength of a WiFi signal in a store, data from a MEMS chip in smartphones to track a heatmap of customer activity, LED lighting in a store where frequency emissions are used to determine customer location, as well as via loyalty programs that may leverage NFC-enabled cards to track purchase activities at checkout. Such in store activities may be used to determine marketing opportunities to authors and ways to further engage with them in store and on social media. Tracking authors using electronic devices may be done in other settings than a store. For example, authors at a sports stadium may be tracked to determine opportunities to market to them. For example, a fan in close proximity to a merchandise booth may be texted a special coupon for use at the merchandise booth. Such a campaign may come to the user in the form of a recommended aspect of a content post as disclosed herein.

The systems and methods disclosed herein may be utilized for a variety of different purposes by a variety of different users. For example, a consumer, instead of a marketer, may want to use systems and methods herein to learn how to improve his or her popularity or credibility on a given social network. In another example, a user may want to use answers generated by the system to help inform a purchase decision. What product or service should they choose? Which store should they purchase it from? Which location? Should they ask for discounts? Where can they find out if there is a coupon for the product? The systems and methods herein could also inform lifestyle choices: What clothes or shoes should they wear today? What's the current style or trend? What TV shows should they watch? What places should they visit? Who should they talk to? Where should they go to get advice? When should they do different tasks during the day? Numerous applications are contemplated where a user of the system may apply audience-driven insights in making decisions in his or her own life. Other data rich scenarios that could utilize the systems and methods herein for decisionmaking include but are not limited to sales, marketing, enterprise resource planning, accounting and finance, project management and collaboration, healthcare, manufacturing, public relations, human resources and recruitment, research and development, operations and supply chain management, distribution and logistics, customer service and customer relationship management, IT and service management, purchasing and procurement, inventory, merchandising, quality assurance, market research, insurance, management consultancy and strategy, consumers, etc.

Various embodiments utilizing the agility rating as disclosed herein are also contemplated. For example, agility rating weights may be adjusted based upon criteria such as more consistent performance, fulfillment of what are deemed more advanced recommendations provided by the system, timely fulfillment of recommendations based on how pressing the opportunity is, etc. An agility rating may also give preference to someone who consistently capitalized on marketing opportunities generated by the system, that have a shorter time to execute the opportunity or who actually posted in a shorter amount of time. Adjustments to the agility rating may also be directly linked to real-time or near real time changes in the results output of the system. That is, if there is a change in the output of the system (e.g., a fluctuation detected), then that change can represent an opportunity for a user to adjust his or her strategy. Whether the user adjusts his or her strategy can be a factor in the computation of the agility rating. For example, the system may take into account how many new opportunities a user received in a given time window and then the percentage of those opportunities that were fulfilled by the user.

The following details how the systems and methods disclosed herein may be used by an example user. For example, the user is a custom t-shirt manufacturer. The user wants to know what to do on Twitter™ today to promote their business. Initially, the user can set goals and plan generally how the day will look with regards to marketing. The user may use the system to determine recommended aspects for 1) how many times the user should post today (e.g. 10); 2) what time of day should be a focus (i.e. should the user concentrate more posts during a specific type of day or post their longer posts at a specific time of day?) (e.g. 11 AM); 3) how many of the user's tweets should contain image content? Additionally, a user may also discover through the system what marketing products and opportunities may be used to achieve particular goals. This may be accomplished through supplemental questions answered by the user.

The system can also be used to help the user identify new opportunities that arise spontaneously. For example, the system can help the user determine what type of content the user's audience is really interested in right now or may pique their interest. For example, the user may discover that hashtag content is receiving the most engagement. A user may also use the system to determine what is trending in the user's custom crowd/target audience. For example, the user may discover that "#FreeBrady" is a trending topic, which presents an opportunity to relate the user's brand and offerings to a trending conversation that is popular within the user's target audience. In order to react to this opportunity, the user may utilize previous content posted and/or new original content. For example, if the user tweeted last week that people should share the funniest t-shirt designs they have seen, the user and the system can learn about clever designs and even get content from the t-shirts designs that people shared that can be incorporated in a post. This type of data can be very relevant to the user's audience (because the content originated with the user's audience in the first place) and help elicit more user-generated content or any other favorable outcome. The user can also determine what kind of original content they want to create. In this case, the user may decide to create a t-shirt design and integrate #FreeBrady directly into the concept art. To promote this content on Twitter™ the user can compose a series of tweets using this hashtag, and then attach an image of the shirt design to at least one tweet. In another tweet, a link to where an author may purchase the t-shirt may also be included.

Other factors for content generation can also be determined using the systems and methods disclosed herein. For example, colors of the post, generated graphics, text, and t-shirt itself may be determined using the system. For example, the system can determine that the color scheme of the New England Patriots football team is inherently associated with the #FreeBrady concept and therefore could/should be included in the content generation. The system can also help determine what other colors the user's target audience prefers and/or is interested in. This recommendation could help the user to decide what colors to use in other promotional materials for the product, such as the background for product images shared on Twitter™, or the best color scheme for a promotional infographic. The system may help determine other factors for a content post, such as how many models to use in an image, how many of the models should be wearing the shirt, time of day to post the image content, what the optimal tweet character length is for the content, etc. The user may therefore compose a promotional tweet based on the recommended aspects and publish the content.

In another recommended aspect, the system may recommend now publishing lifestyle content after the product (t-shirt) posting. Since the latest shirt was football related and a football season may be approaching, the system may recommend posting about things like sports news, the Patriots football team, fantasy football, etc. In addition, since the context surrounding the #FreeBrady hashtag has to do with football (as Tom Brady is the quarterback for the New England Patriots football team) it may also be preferable for the user to engage in sports or football-related discussion topics. In this way, the user may build awareness and likability with their target audiences over time. For other subsequent content, the user may use the system to determine a type of video that resonates with his or her audiences. For example, the user may discover through the recommendations of the system that Vines™ are very popular right now, driving high engagement rates. Accordingly, the user can extend the concept of #FreeBrady into another content format and do testing to see what drives the most engagement. Accordingly, the user can decide to make a 6-second vine about the production of his #FreeBrady shirt coming off the press. The system may recommend, for example, to share the video at 3 PM that day. These various postings can be developed and scheduled within a service for social media postings, such as HootSuite™, or managed through other marketing software platforms.

The user may then try to leverage the system to discover opportunities for more direct engagement with his or her target audience. For example, the system may analyze authored content to determine who is likely to have disposable income right now (have users recently tweeted about going shopping or new things they bought?). The system can identify such authors and facilitate sending those users a special offer for goods or services. In some instances, the user may reach out to these authors on Twitter™ or a different marketing channel. For example, although the author tweeted about shopping on Twitter™, the system may recommend sending the promotional offer to the author via e-mail if an e-mail address is available. The system may also help identify which members of a target audience are more impressionable (e.g., which authors are more likely to share content from a company). The system may recommend tweeting at this authors using their handle and including a special offer to alert them to a deal. These authors may subsequently share the tweet and further propagate the marketing of the user's products and brand.

The user may also use the system to determine who is most likely to sway an interest group (e.g., football fans, fashion crowds, Boston crowds, sports crowds, or news/media crowds, etc.) that is part of a user's target audience. For example, the system may recommend interacting with an author who is influential with a particular interest group. For example, the user could offer an influential author something that may incentivize them to share the user's branded content with those valuable audiences he/she has influence in. The system may also help the user determine who has gained more influence. For example, the user may recognize someone that tweets about the product to their followers and give them a free t-shirt or other recognition. Such authors may be worth befriending and fostering a relationship with. The system can help the user determine how to do this through personal tweets, whether to send tweets publicly or privately, through other communication channels (e.g., phone, e-mail, paper mail) or social networking platforms, etc.

In this way the t-shirt designer user receives timely answers from the system about how to promote his company on Twitter™ today. The user even received an idea for a new product variation, which evolved into its own multi-faceted marketing campaign. Accordingly, a user may use the system and methods disclosed herein to learn, for example, promotional guides and frameworks to focus on for the day; how to construct original content that day; how to make choices about things like product styles and other merchandising considerations; how to build stronger ties with the lifestyle needs of the user's audience; how to conduct effective community engagement on and offline; how to conduct other important marketing tasks and behaviors; and/or how to launch a grassroots paid campaign on top of his/her other activity.

Automating Content Design Transformations Based on User Preference and Activity Data The world is becoming more and more visually driven. Images and video content are among the most important feature of a content item. Such content is often referred to as "creative." Under-performing ads result from sub-par creative, but marketers may not know when their creative is sub-par and even if they do know it's sub-par, they may not know what to do about it. There is no easy way to intelligently tune content, such as an image, before, or while, a campaign is running. In some instances, marketers may not even be aware of the aspects of their content that could be improved. Generally, the best thing marketers can do is to test an alternative image (which takes time and resources to develop).

Some ad serving platform technologies, such as those used by social networks, also penalize the distribution of an ad if click rate slows. Therefore, operators of social networks typically recommend that entities "refresh" their content regularly. Currently, this is a manual process for the entities, and doesn't happen very often because the design resources on content have already been spent—and there aren't suggested optimizations that are personalized to each business and user. The systems and methods described herein can be used to provide recommendations to modify images, videos or other content automatically, with each modification or adjustment configured to improve an attribute or performance metric of the content, such as a marketing performance metric.

Selecting the right content (e.g., images), and the right attributes of content, can drive more awareness, customer engagement, conversions, and sales. The systems and methods described below can implement a creation, selection, scoring, evaluation, and transformation mechanism which can either collectively or in part be used as a "perpetual improvement machine" for business and marketing content and for marketing creative and in many other areas of design and creative works.

As described above, content (e.g. for use in a marketing campaign) includes "creative," which may be marketing content and including an image or video, as well as copy (e.g., text). A creative strategy provides the guiding principles for copywriters, graphic designers, and art directors who are assigned to develop contents, including designs, photos, and content items. Creating content can be a subjective exercise and tends to not be very data-driven. Further, any insights obtained via data-driven means or via consumer research lose value rapidly and often never make it back to those who are actually designing content and planning and executing campaigns through marketing platforms (e.g., Google, Facebook, etc.) in a timely manner. The insights have a very short shelf life and may be closely related to changes in audience behavior. "Guess and check" techniques are common practice. As a result, a tremendous amount of capital is wasted on "A/B testing" in marketing.

In many instances, personalized recommendations on how to improve content are not available. Automated audience-based evaluation systems or improvement mechanisms for creative assets used in a marketing campaign or other types of content publishing campaigns are also generally not available. As a result, it is difficult to know specifically how to change and adjust content or campaigns to achieve a particular business goal. For example, it is not easy for a business or operator to know how to maximize the impact of digital or traditional marketing programs during planning, creative production, and execution, or how to recalibrate such a program to achieve a specific result.

Thus, marketing and other forms of content generation and/or content publishing today typically begin with an image, a video, audio, or text (or a combination of these) that becomes an ad, and then finds an audience. This process can be expensive and error-prone. The systems and methods described herein can use artificial intelligence and other techniques to first find an audience, and then evaluate, rank, score, give recommendations, and generate new content items that are optimized for the target audience. The audience's actual behavior becomes a standard against which new and proposed content, designs, or creatives are evaluated.

The systems and methods described below can adjust and refine content, such as marketing content, in real-time based on the target audience's activities. As a result, content can be continuously or periodically updated based on a target audience and the response data to the content and campaigns (from that audience and other audiences). The systems and methods described below represent new technology that advances this concept even further with images, videos, text, audio, and other forms of content. They also have applications in other industries, business functions, and consumer applications.

The solutions of this disclosure also can take attributes from a harvest of content items and analysis of audience data associated with the harvest content items to inform the creation of a target audience. For example, the systems and methods of this disclosure may determine popular keywords relevant to a target audience of consumers of a particular brand. These high-performing keywords, and related words and phrases, that are important or unique to the audience may then be used in a subsequent analysis of the more general audience of potential consumers of that brand to more accurately find, define and otherwise segment a better set of the brand's consumers on the basis of their textual information and conversations. That is, signals derived from within an audience are used to better understand and define that audience for the purpose of analysis. Through this process, a user of the system is able to more accurately find and classify people that belong in that audience or may otherwise be considered members of the audience's extended network for the purpose of conducting a more comprehensive analysis of the target audience.

As described below, various computer-implemented techniques, including artificial intelligence and machine learning algorithms, can change marketing content, such as by performing content transformations on text entries, and on image and video pixels, based on predictions determined to improve the impact of that content. In general, a transformation can be any alteration of any portion of a content item. For example, a transformation may be an image manipulation or generative visual manipulation for content items that include visual content. Various types of content transformations are described in detail below. In some implementations, the technology can be applied to one or more types of content at a time, e.g. to optimize three images or a set of text entries. This can be particularly important in the field of marketing optimization and customer experience.

This is in contrast to traditional methods for content production, which may rely strictly (or heavily) on A/B testing, or no testing at all. For example, in an A/B test, image A can be determined to be generating ten clicks per 1000 impressions, while image B is determined to be generating 15 clicks per 1000 impressions. Based on these determinations, traditional methods would recommend that the content publisher devote more spending to image B. Some content platforms (e.g., social networking platforms such as Facebook) may perform this type of spending optimization as an option, either automatically or based on a particular key performance indicator, such as reducing cost per lead or reducing cost per acquisition.

However, the A/B testing process assumes that the creative which was used in the content is the best it possibly could be. The traditional techniques only work with the best content it has at a given time, and those contents are typically made with very little data optimizations, or none at all. Therefore, the content used in these traditional systems is already sub-optimal to begin with because it does not include the optimal characteristics and attributes that the new and improved systems and methods described below can recommend in the pre-production or during the production of the content. In addition, the failed A/B tests performed using traditional techniques can contribute to even more wasted money and time. Further, A/B tests do not provide clear insight about why one asset fared better than another in a live field test. This information gap makes it even harder for marketers, entities, designers, campaign planners, and brand managers to consistently improve performance.

Using the systems and methods described further below, optimizations can be made to content before it is developed at the idea/concept stage, while it is in-development (e.g., in image or video editing software), and via post-production enhancements to the content by leveraging user preference data. In some implementations, the user preference data can include audience data. So, instead of mounting costs, wasted time and energy, high uncertainty with A/B testing, and overall sub-optimal content, the systems and methods described below can help content producers to move towards only having to do "A Testing" and being confident that the image, text, video, audio, or other creative assets they are publishing are maximizing the likelihood that their message will resonate with the target audience and drive the best possible business outcome or goal. Thus, the systems and methods described below represent a significant improvement in the field of design, content development, and business and marketing performance optimization.

FIG. 10 is a block diagram illustrating a system 1000 for transforming one or more content items in accordance with an illustrative embodiment. The system 1000 includes a content evaluation system 1005 in communication with a plurality of audience computing devices 1010, a plurality of content sources 1015, and a user computing device 1020. The content evaluation system 1005 includes a content item harvesting module 1030, a performance metric ranking engine 1035, a matching criterion manager 1040, a recommendation module 1045, a content transformation module 1050, a performance metric predictor 1060, audience performance measurement module 1065, a user alert module 1070, a graphical user interface (GUI) generation module 1075, and a database 1080. In general, the system 1000 can be configured to evaluate one or more content items, determine scoring criteria select an optimal subset of content items from among a group of candidate content items, and/or apply one or more transformations to content items in order to improve a performance metric associated with the content items, as described further below.

In some implementations, the system 1000 can receive original content, such as an original image A, and can then create new optimized versions of it, such as transformed image 1, transformed image 2, transformed image 3, etc. which can each be a predicted optimal permutation of the original image A. This functionality can effectively scale up the inventory of creative assets for a content publisher without the need for additional manual work of a graphic designer, whose design iterations are inherently subjective. Stated another way, the system 1000 can receive a first content item, such as a first image, and can produce, for example, five optimal versions, 500 optimal versions, 5000 optimal versions, etc. according to user preference data that has been analyzed by the system 1000. The system 1000 may also do so in conjunction with user preferences, which may include, for example, creative restrictions, brand guidelines, or marketing requirements.

In some implementations, the system 1000 can determine that a target audience likes content item A more than content item B. As a result, the system 1000 can transform content item B to look more like content item A, or to look more like other content items that are similar to content item A. The system 1000 is also sophisticated enough to extract features from a large corpus of content items, such as images, to figure out the aspects of the content that matter the most to that audience. That is, the system 1000 scales and becomes more intelligent as more content items are added to a model implemented by the system, which may include artificial intelligence and machine learning algorithms.

In one example, before a content publisher conducts a campaign based on at least one content item, the system 1000 can be configured to make the content item resonate more with an audience including people who like hiking. The system 1000 can take the original content item and transform it to look, sound, or feel more like the content items that people interested in hiking are engaging with, or have engaged with previously on one or more media or websites, etc.

Using the system 1000, real-time adjustments can be made to the content items, based on real time feedback. This real-time feedback can be based on response data to the content items themselves (e.g., as measured by the performance metric ranking engine 1035) or based on activity data within the target audience, which may include the audience computing devices 1010, or a combination of both of these datasets. The system 1000 also may use other information to inform the content transformation process, including television commercials, weather forecasts, sports scores, entertainment events such as local concerts, award ceremonies and festivals, news, holidays, location data, new business, marketing, communications or public relations initiatives, etc. The transformation made to the content items by the system 1000 can be an automated improvement on a candidate content item, or can be an incremental improvement to a content item that has already been optimized by the system 1000 at least once. Thus, one or more transformations may be applied at any given time to a particular content item or content items.

In some implementations, the system 1000 can trigger image transformations based on new events within a target audience while a campaign is live in action. When consumers start talking about a topic, mention a keyword, express a certain emotion or behave in such a way that indicates a particular mood state or desire, or share or engage with a certain type of content item (e.g., image or video content), it can trigger the system 1000 to perform a new transformation on a content item. For example, if the system 1000 determines that an audience of sports fans begins talking about the NBA and the Cleveland Cavaliers, the system 1000 may adjust a content item used in a campaign to reflect the characteristics of content that is of interest to that audience. For example, the system 1000 can transform the content item to look, sound, or feel more like basketball-related content by transforming the content item to share similar features and attributes, scenes, objects, word choice, etc. of content items determined to be of interest to that audience. Alternatively, the system 1000 may specifically transform the content to look more like content that an audience of Cleveland Cavaliers fans is likely to engage with.

In some implementations, the system 1000 can transform a content item if members of the target audience are speaking positively or negatively. In some implementations, the system 1000 can perform a different type of transformation when members of the target audience express some other kind of emotion, such that the content item can evolve over time. For example, if one or more members of the target audience are expressing sentiments of anger and frustration, the system 1000 may transform the content item to have a look, sound, or feel that is more calming and approachable. If a user is depressed, for example, the system 1000 may transform the content to include aspects that would be humorous or uplifting.

In some implementations, an audience may be an individual person or entity. Thus, if an individual expresses a negative opinion regarding a user (e.g., a content publisher), the system 1000 may can avoid presenting content items that don't have identifying information regarding the content publisher, such as a logo, inside them, or content items that contain a special offer from the content publisher. In another example, the system 1000 can determine that an audience member recently visited several websites about baby care products. As a result, the system 1000 may transform a content item to be displayed to that audience member to emphasize themes relating to family, parenting, fatherhood, etc. In some implementations, the system 1000 can derive such transformations based on other successful content items that were targeted towards an audience of new fathers, or based on the recent content that was viewed and or engaged with by this particular audience member. Thus, the system 1000 can use many types of factors regarding an individual's behavior or engagement (or engagement of a larger audience), and can transform the content items delivered to the individual to look, sound, or feel like the content items the individual engages with most and may have a preference to see and react to or spend time on. Additionally, the system may transform the content to look, sound, or feel like content that the individual may not have seen or engaged with before, thus providing "freshness" and novelty.

The system may also be used to refresh content items and creatives that have been previously published or are currently out in the field, e.g. as part of an ongoing digital campaign. In one embodiment, these contents may be fed into the system either via API or via manual user input, or via a cloud storage or content management system, or other means, with certain performance data and metadata. The system will then take this information into account when producing a new transformation for the content item. In that way, it may be referred to as a "second-generation transformation." For example, if the audience has been shown an ad of a red apple four times per day, the system 1000 may determine that the audience has been fatigued by red apples due to the high frequency with which red apples appeared in other content items displayed to the audience. As a result, the system 1000 may determine that the next transformation of this content item should de-emphasize or eliminate the prominent red attribute. Thus, the transformation may produce, for example, an image of a green apple rather than a red apple. Alternatively, the system 1000 may remove or replace the apple within the content item for this audience. The purpose of such a transformation would be to "refresh" the content item for the users with the intent of increasing the performance of the content in the audience.

The system 1000 can perform transformations based on any type of performance metric associated with a content item. For example, the system 1000 can be configured to make a content item "stand out" from other content items, which may not necessarily produce an optimal click-through-rate or marketing outcome. In this example, the system 1000 receive information corresponding to various activities of audience members, or in a particular individual's browsing or viewing history, and can transform the content item so it looks unlike other content items the target user has seen before. For example, if the individual has never been shown as having a lime green theme or engaged with a lime green post on a social networking site, then the system 1000 may recommend that transforming a content item by adding a lime-green treatment to the content item is likely to get the individual's attention. The system 1000 also can perform a transformation of the content item to generate a transformed content item having the lime green treatment. There are several of these types of transformations that may vary based on a content publisher's expressed or inferred goal, or based on the current market and business conditions or consumer state. A list of example marketing use cases in which the system 1000 may provide beneficial content transformations is described briefly below. One of skill in the art will understand that the examples provided below are intended to be illustrative only, and should not be interpreted as limiting the scope of this disclosure.

The system 1000 may also recommend that a particular element, feature, style, or category of image is unpopular in an audience and/or unlikely to lead to the user's intended marketing outcome. For example, if the system 1000 determines that a user-provided image contains an image of a baby but the audience has not responded favorably to baby images, or if the system 1000 determines that this particular baby image is unlikely to produce greater brand recall, memorability, or sales performance for the brand product, the system 1000 may recommend to the user to instead use an alternative image, e.g. a family photo. The alternative image feature or category can be predicted to perform better in the target audience. In another embodiment, the recommendation of an image, photo, design, or creative execution may be informed by previous campaigns and creative choices of the user or by other external factors that may impact the performance of the user's creative executions. Such external factors may include the creative executions of competitive brands.

In another embodiment, a user of the system 1000 may define a "creative target" based upon a set of images provided to the system 1000 by the user. In such an embodiment, the user may select or provide images, instructing the system 1000 to transform a candidate content item (e.g. image) to be more like the examples the user has provided. That is, the system 1000 can determine optimal characteristics in the provided image set and apply transformations to the new content items based on what the system 1000 has learned about that input set of images. In such an embodiment, performance criteria of images in the target audience may be absent or ignored, as the user of the system 1000 has articulated the desired design parameters or other preferences for his/her candidate content item by inputting them into the system 1000. In that way, the system 1000 can be "overridden" by the preferences of the user for how the user would like the design creation to appear.

In another embodiment, the user may specify that the candidate content item is a Christmas or holiday-related promotion of a product. In such an embodiment, it may be the user's intention to make the content item look more appealing among the target audience than other Christmas content items in circulation (i.e., content in the same or similar category to the user's content). The system can then recommend unique enhancements to the content to achieve this result, as it may be a goal to drive more sales relative to competitors. In such an embodiment, the system 1000 may also take special consideration, or apply special weight and emphasis, to the characteristics of Christmas-related content items in order to make the candidate content item better stand out among all other Christmas-related content items the system 1000 has analyzed. In this embodiment, the system 1000 may leverage audience data to achieve this result, or it may look at audience-agnostic signals that are pertinent to the Christmas/holiday category of content.

In another embodiment, the user may upload past images used in an e-commerce store, such as a storefront on Amazon.com or the brand's own e-commerce web domain. In some implementations, the user may provide performance data with these images (e.g. product photos) indicating the relative success of each image used. Performance metrics may include elements such as the click-through-rate. In this example, the user may want the system 1000 to learn from the product photos used on the storefront in order to recommend a better product photo to use in place of one or more currently used photos for the purpose of improving the sales performance of the product, or products, listed on the e-commerce store. In another embodiment, labeled datasets on past marketing performance using certain image or video contents may be uploaded by the user.

In another example, the user may provide performance data on an email campaign along with the images used in those campaigns. A common email marketing performance measure is the click rate or click-through rate. In such an embodiment, the user may desire to learn how to use better images in email messages in order to get more clicks from email subscribers. The user may also wish to reduce the unsubscribe rate of these emails. In such implementations, the system 1000 can use this data in order to recommend image selection and transformation to improve the effectiveness of subsequent email programs to this subscriber base.

Sample Marketing Use Cases:
  Improve the aesthetics and visual appeal of a particular product, packaging, label, image, video, video frame, or content item. These enhancements may make the content item more effective for business purposes.
  Adjust creative to better appeal to a particular user or audience, or to achieve a particular business goal.
    For example, a content item may transform differently if the goal is 1) to generate more positive comments vs. 2) to produce website conversions. The content item transformation may also differ based on the target audience selected for the content item, which may include an individual or a larger group of individuals.
  Rank and select which image from one or more images is the best image to use for a particular purpose.
  Rank and select which video or video clip or frame from one or more videos, video clips, or frames is the best to use for a particular purpose.
  Score individual video frames
  Identify the most relevant frames in a video or the most resonant frames
  If a content publisher uploads a content item and the system 1000 applies multiple transformations to the content item, the system 1000 can show the content publisher which transformations are predicted to have more positive outcomes. Thus, the system 1000 can return a plurality of transformed content items, along with a ranking and scoring of the transformed content items.
  Apply a recommended "filter" to a photograph. That is, the system 1000 can automatically apply a "smart filter" to the image.
  Adjust the design elements of a graphic or man-made design.
  Adjust one or more layers in a design file, e.g., Adobe Photoshop's psd files or Illustrator files.
  Apply a recommended treatment to a video or live video broadcast.
    For example, the system 1000 can determine that the NBA audience would be more engaged by a video if it was broadcast with a slight red hue. As a result, the system 1000 may dynamically apply such a filter to all incoming video data as part of a video stream directed to the NBA audience. The system 1000 may also apply the transformation to an existing video file. This transformation may apply to all footage or only a given segment, time frame, video frame, or image of the video.
  Automatically increase the number of marketing content assets with more than one example that is highly (more) relevant to the target audience, and likely to create a preferred business outcome.
  Automatically transform the content item based on real-time data.
  Create a set of computer-generated, pre-optimized content items to use in A/B testing.
  Create an optimal GIF.
  Select a product photo for use on an e-commerce storefront.
  Transform a product photo in order to improve product sales performance on an e-commerce storefront.
  Select an optimal video thumbnail for the purpose of increasing video views or engagement.
  Create an optimal video thumbnail for a video platform, website, webpage, app, app screen, or social media feed.
  Create a better image for a particular email message or blog post.
  Create a better image for use on a company's website or a particular webpage or panel on a website.
  Move a website panel or image(s) to another area on a website in order to increase performance
  Automatically re-write a social media post, subject line, headline, body copy, or any text content used for marketing purposes to be more effective with the target audience.
  Move, re-locate, replace or refresh imagery on a webpage or website.
  The system 1000 may transform text, for example by changing the phrase "These apples are delicious" to instead read "These apples are mouth-watering" Or "This fruit is delicious."
  Create a superior content item to use as a social media post or within a particular campaign. That is, for single-purpose use OR ongoing use.
    For example, many social networking posts are made, and then published one time.
      That is, most businesses and other content publishers will not delete a post, and then re-post a new version of it, or do duplicate posts, via their organic social media channels.
    A paid social networking campaign can involve multiple simultaneously running creatives, which can each be swapped in and out over time.
  Targeting the message of a content item to apply to the group or individual person. For example, transformed content items can be used to reach a particular target audience more effectively as part of marketing, customer experience, or customer service initiative in an aggregated manner.
  Transformed content items can be used to target at least one user—in a personalized manner.
    For example, the system 1000 can receive information corresponding to the viewing habits of an individual over the last 6 months on one or more platforms. The system 1000 can then take the content items the individual has engaged with the most, and can learn from those content items features and other aspects of the content items that appear to be appealing to the individual. The system 1000 can then apply machine learning to dynamically transform a new content item to be more performant for the individual.
    These content transformations can occur automatically in real-time, or they may require the manual approval of an end user. For example, some compliance-focused marketing departments will not allow marketing creative to change without proper approval.
  The system 1000 can source a content item from an external website or content repository (e.g., the content sources 1015) or directly from users (e.g., the audience computing devices 1010 or the user computing device 1020), and can then perform content optimizations on these content items dynamically, depending on the goal of the content publisher.
    Then, the system 1000 may recommend each of those content items to be used at a particular time. These content items may then be plotted into a content calendar or "flight schedule" for content items. For example, the system 1000 can receive a raw image from a content publisher, can transform the raw image to produce a transformed content item, and can then recommended a particular time for placement of the transformed content item. In some implementations, the system 1000 may automatically transmit or publish the transformed content item or served to the intended user or target audience The system 1000 may also generate one or more optimizations and then recommend that each new version is better for a respective audience. For example, given a first content item, the system 1000 can produce first, second, and third transformed content items (or any number of transformed content items corresponding to respective transformations), and may also suggest that the first transformed content item is a good fit for an audience of beer drinkers, that the second transformed content item is a good fit for Patriots fans, and that the third transformed content item is a good fit for both beer drinkers and Patriots fans audiences.

In another embodiment, a user input may be captured which will inform the substance of the content item transformation. This user input may be facilitated by the system 1000. It may also be a derivative of another recommendation that is generated by the system 1000. For example, the user may select an option for adding more of a particular component color (e.g., RGB color components) to their candidate content item. The system 1000 can then perform a transformation on the content item that may include a re-styling procedure that adds more of the selected component color to the content item. The system 1000 may also modify proximate colors within the content item such that the proximate colors are converted to the selected component color. The user may also desire to insert a scenery background or an object into an image included in the content item, as a result of a recommendation that may be produced by the system 1000. The system 1000 may then be configured to transform the content item in order to adapt the content to the user's input preferences. In some implementations, a content item can be an image that may include a plurality of layers which are overlaid on one another to produce the complete image. In some such implementations, the system 1000 may apply a transformation by altering any subset of one or more layers of the image. Another subset of the layers may remain unaltered. Similarly, in some implementations, a content item can be a video including a plurality of frames, and the system 1000 can apply a transformation by altering a subset of one or more of the plurality of frames, while another subset remains unaltered.

In some implementations, the system 1000 may automatically suggest new transformations for the user to consider and opt into based on other data and learnings the system has made. For example, in some implementations, the system 1000 can be configured to provide a user interface allowing the user to see recommended transformation and to determine whether one or more recommended transformations should be applied to a candidate content item. In some implementations, the user interface can be a graphical user interface (GUI). For example, the user may be able to select a menu item corresponding to each recommended transformation using a pointing device, and may further use the pointing device to select whether or not a selected recommended transformation should be applied to the candidate content item. The user may also indicate whether a system-provided transformation is acceptable or preferable with his or her creative vision or business goal. In such an embodiment, the system 1000 may capture feedback data from the user, or from other systems utilized by the user, such as "thumbs up" or "thumbs down" preference feedback. The system 1000 may also capture feedback related to a number of business performance metrics. Further, the system 1000 may incorporate this feedback data or a feedback loop based on the postings of the user and the actual performance of the creative execution, content, or media placement. In one example, if a candidate image that had been modified with a particular transformation not perform as well as expected once published, that transformation may be "blacklisted" from the user's account maintained by the system. Alternatively, the system 1000 may learn that that transformation is less effective in that particular context for the user. Thus, future candidate content items that are similar to the candidate content item may not receive that transformation. The system 1000 may also apply that transformation in a dulled, weakened, or incremental, so as to test alternate variations of the transformation and its viability for the user in other content items. In another example, the user may input actual business performance data of a transformed content item. The system 1000 may then use this data to inform subsequent recommendations. There are myriad ways in which the system 1000 may retrieve feedback data after making one or more recommendations. These means may be manual or programmatic, or learning-based such as via reinforcement learning, and the examples in this disclosure are not meant to limit the scope of possible implementations of the learning mechanisms. In general, the system 1000 may use any means for receiving feedback related to the performance of a published content item, including receiving such feedback from a user or collecting such feedback in an automated fashion.

In another embodiment, the system 1000 may be used for influencer and microinfluencer marketing use cases. For example, a brand, company, or marketing or software vendor may use the system 1000 to optimally transform a content item such as an image, text, or video content that was provided from the brand or the brand's marketing agency to an influencer for promotional purposes. In this example, the branded content to be shared by the influencer may benefit the brand and may be optimized by the system 1000 to appeal to an audience that includes that particular influencer's followers or another target audience in which the influencer may have reach and authority. In another example, the system 1000 may transform user-generated content that may have been originally produced by the influencer or microinfluencer or another user. In this example, the system 1000 could automatically apply a transformation to the content that could be shared or promoted by the influencer, which may or may not be on behalf of a brand or company. The content need not have been marketing content in nature. An influencer need not be an actual celebrity figure. The influencer, or individual consumer, may use the product on their own behalf in order to increase the impact of their own messages and content and thereby increase their influence, authority, and followership. The system 1000 may also be utilized by an ordinary person who is interested in self-promotion of his or her content, public persona, or social media accounts. There are millions of individuals who want to build a larger online following and cultivate more engagement per content posting.

In another embodiment, transformations produced by the system 1000 may be used in the creation of a new file type, which may provide a unique marketing experience to a user. For example, a new file type may correspond to any video, audio, or text based content (or combinations thereof) that can be presented to an audience through any type of medium. This file type may automatically update its contents according to the layer-based transformations as described in this application or based on other contextual information.

In another embodiment, the system 1000 can implement custom transformations or "filters". That is, in the future it is conceivable that new visual design treatments, methods, enhancements and transformations may be computerized such that the transformation of a candidate content item may be unique to any candidate content item currently on the Internet or on the World Wide Web.

The system 1000 may also be utilized in the context of Adobe Creative Cloud design projects. For example, Adobe Photoshop is a software program used by creative professionals to design graphics and visuals, edit photos, and work on various forms of marketing content, digital art and graphics. A design file for a given image can be converted into an image format such as PNG or JPG. Photoshop also allows for files to be saved as Photoshop Document Files (PSDs). PSDs can be used to preserve editing capabilities within Photoshop such that an image can be manually edited at a later time by a designer). As a result, it is common practice for PSDs to be shared among design professionals so that designs can be edited, re-worked or otherwise changed by an individual with knowledge of Photoshop. In some implementations, the system 1000 can receive a candidate content item formatted as a PSD file, and can select and apply transformations for the candidate content item that are compatible with the PSD file.

In the system 1000, the transformations disclosed can be performed automatically, rather than manually by a human. Therefore, using the system 1000, it is not necessary to rely on designer to make changes to content items, which may be inherently subjective according to the designer's preferences. Within some content editing tools such as Photoshop, designers can utilize "layers" for graphics work and design projects. Layers separate different elements of an image or video. In digital image editing, designers use layers to work on individual parts of an image, while not affecting the other parts of the image. For example, consider an image of a girl standing outside in a garden looking down at a group of bright red strawberries. In this example, the image may have four layers so that each of the components of the image can be treated as separate entities in the overall image file, which can be formatted as a PSD file. In some implementations, each layer may be formatted as a PNG file. For example, the image of red strawberries may be in one layer of the design, the plants in the garden may be contained in a second layer, the image of the girl may be in a third layer, and the background image of a sky may be contained in a fourth layer. Other elements, such as headline text (copy), a brand logo, a call-to-action, etc. may be contained in separate layers.

It is possible that even more layers are added to separate subtle design elements that were added. In theory, a design file could have hundreds or thousands of layers, depending on the desired complexity of the design. In some implementations, the system 1000 may perform "PSD parsing," by automatically separating a PSD file by layer into individual image files (e.g., PNG or JPG). In doing so, the system 1000 can generate a unique transformation for each layer independent of the other image layers in the overall file. The system 1000 can also apply transformations to the overall PSD file. In one example, if the entire PSD is converted into one PNG file, the system 1000 can apply a transformation to that PNG file as a whole. Continuing the example above, a transformation may affect the visual appearance of the girl, the strawberries, the sky background, the garden, or any combination thereof. In another example, if the PSD file is separated into four separate PNG image files, each for one of the four image layers of the design, then the system 1000 can select a unique transformation for each layer. In some implementations, one or more layers may receive no transformation at all. In some implementations multiple elements of an image may exist in a single layer. In some implementations, if a user is an employee of a consumer brand that sells orange juice, the user of the brand marketing team may not want to make any alterations to the visual presentation of the bottle of orange juice. The color, the appearance of the label, the brand font, etc. may be protected under a style guide or brand guidelines. Therefore, the system 1000 can allow users to apply transformations only to the layers, or individual elements, of the image that the user desires to be modified. The system 1000 can thus allow the user to tag individual layers for transformation. For example, a user may tag a layer containing a product image of orange juice as a layer that should not be modified by the system. In this case, the system would treat this layer as a separate image and not perform any transformations to it according to the user's preferences.

In another embodiment, the user may select the type of transformation that can be performed to the layer containing the image of a bottle of orange juice. For example, the user may not want the visual composition of the bottle to be altered in any way, but he/she may want the system to replace the bottle with another image of a bottle that is more likely to resonate with the target audience. Therefore, the system 1000 may perform a "refresh" operation for that particular layer, in which the new image of the orange juice bottle would be more likely to resonate with the audience and also improve the score (and potential success) of the overall image. Alternatively, the user may allow for a transformation to the layer containing the bottle that moves the bottle into a different location, or adjusts the size of the bottle, within the image. In another example, the transformation that moves the bottle to a more optimized location in the image, or resizes the bottle, may be automatically deployed by the system 1000. In another example, a transformation may be applied to the layer containing the sky background, which has the effect of brightening the color blue. In yet another example, transformed images from a design file or video may be turned into a GIF format for use.

Many variations of layer-based transformations are possible in the presently disclosed system and the descriptions above are not meant to be limiting in scope in any way to the potential applications of the system 1000. In some implementations, the system 1000 may automatically detect and categorize layers of an image based on the contents it identifies while processing the image layer(s). For example, the system 1000 may apply computer vision and object and pattern detection techniques. These techniques may distinguish between a background, a cohesive object, sets of objects, etc. The system 1000 may also detect and categorize brand elements, such as a product packaging or a brand logo, and make a determination about which transformations should be applied to each layer or feature of a content item. In some implementations, the system 1000 may make a determination to apply zero transformations to one or more layers. The system 1000 may also, based upon its analysis of the layer's contents, adjust the intensity of a transformation or otherwise create and apply a new transformation to one or more elements of the layer's contents (e.g., add a special treatment to an object contained in a layer) in order to improve the contents of the layer. Transformations may also be "chained" together, such that the system 1000 can link multiple transformations together to be applied to a given content item or to a given layer within a content item.

The system 1000 may also be utilized in a similar manner with other design software, photo editing, or video production software not limited to Photoshop. In an example, similar operations to those disclosed above for graphics and design files may be applied in the context of video files (e.g. MOV, MPG, AVI, MP4, etc.) The system 1000 can parse a video into images, calculate scores (for example, scores per frame) and apply a transformation effect(s) during a time period, or number of frames, or to an individual frame in a video. The system 1000 may also determine the most relevant or engaging frames in the video. The system 1000 may also layer an effect on top of a video as a transformation. For example, if a user of the system 1000 determines that the first 3 seconds of a video represents the most critical time frame to capture a viewer, or audience's, attention, then the user may desire to only transform those first three seconds. In such an embodiment, the system 1000 may apply a set of transformations to the contents of the first three seconds of video and apply zero transformations to the video after the first three seconds. In other embodiments, the system 1000 may apply transformations to the entire video file, or to distinct segments, time periods, or individual frames of the video file. The system 1000 may also identify collections of frames with similar contents and apply the same transformation(s) to those frames. For example, if the candidate content item is a video of a man shooting a basketball, each frame of that shot may be transformed with the same transformation, e.g. applying a slight change to the hue or saturation of each successive frame. In an alternate embodiment, the transformations of related content may vary depending on the determination of the system 1000 or by user preference. For example, if the user determines that the current set of transformations applied to a particular time frame of the video do not look aesthetically pleasing, then he or she may perform an alternate transformation or instruct the system 1000 to adjust the way it is applying transformations to that video clip. The user may also want a singular video frame to be transformed. In such an example, the system 1000 may convert the video frame to an image file, such as a JPG file, and perform transformations similar to imagery. Like transformation for images described above, transformations for videos also can be informed by the user's preferences and business needs, and may have a wide range of potential applications. In yet another embodiment, the system can be utilized with Adobe Illustrator (AI and EPS files) to perform transformations. For example, the system may move, align, distribute, and transform objects in Illustrator. The system may be utilized to edit text or other elements within the graphic or perform transformations to these any of these elements.

In another implementation, the system 1000 can be utilized to automatically evaluate imagery on a webpage, webpages, or website. In this example, a user may provide a URI to a public website and the system 1000 can crawl the user-provided URI, save any images or other content items found on the site, and evaluate each content item. In such an embodiment, the system 1000 can return to the user a variety of information. For example, the system 1000 may determine the average score for each image, determine the top images, and determine how many images (and which specific images) are underperforming among a target audience. This information can then be shown to the user. Thus, the user can be able to quickly evaluate content items and take corrective action. In another example, the system 1000 can recommend transformations to the underperforming images. Similarly, the system 1000 may determine transformations that may make the website's high-performing image assets even stronger. In another example, the system 1000 may recommend a transformation which involves moving an image from one area, or page, on the site to another area, or page on the site. Another transformation may involve moving one website panel to another area or page on the site, or involve moving a particular image on a panel on a website to another panel on a website. In some implementations, the system 1000 can evaluate imagery or other within a mobile application or desktop application. The above-mentioned embodiment may be applied in a variety of contexts where contents may be evaluated and "refreshed" in order to improve performance.

As described above, the system 1000 can be used to transform various types of content items, which may include images, audio, video, text, and other features. Various examples of types of content items that the system 1000 can be used to transform or optimize are described below. It should be understood that the following examples are provided by way of illustration only, and not by way of limitation. One of skill in the art will appreciate that the types of content described below are merely exemplary, and that other types of content items also may be transformed by the system 1000 without departing from the scope of this disclosure.

Example Content Item Types that can be Transformed:

The following list includes social, digital, print, broadcast, traditional media, etc. For digital media, content items can be implemented, for example, as static creative, flash creative, rich media creative, or in other forms:

Photographs
Stock photos
Landing page, webpage (s) and website images
Social media posts
Email message and email newsletter images
Television and broadcast marketing
Video, video clips, or video feeds
Live video broadcast
Video thumbnail image
Display ads
Print media
Magazines
Books and ebooks
App screens
Leaflets
GIFs and video files
MP3s and music files
Newspaper
Banners
Billboards
Posters
Brochures
Cards
Flyers
Booth and trade show displays
Online marketing
Sponsored content
Organic content
Cell phone and mobile marketing
Website graphics
Mobile content
Mobile ads
Mobile coupons
Downloadable coupons
Notifications
Freestanding inserts
Look books
Print circulars
Point of sale marketing
Direct mail marketing
Product placement Event and sports sponsorships
Menus
Guerilla marketing
PPC search ads
Display ads: static, video, cinematographic, flash, pop-up and mobile
Social ads: Facebook, Twitter, YouTube, Instagram, Pinterest, Snapchat, LinkedIn, etc.
Interactive video content items and clickable content item customizations
Augmented reality contents and experiences
Virtual reality contents and experiences
Interior design-related visuals
Architectural/building visuals
Merchandise designs
Product and material designs
Fashion designs/clothing and apparel designs
Fine art and commercial artwork
Design files (PSDs, AI, EPS)
Trade promotions
Coupons
Cartoons/Comics
Digital Art
Product ad design
Blog
Search ads
E-commerce product images, product pages/galleries, and displays
Store design
Virtual store design/Online store
Mobile store design/Mobile storefront
Carousel content items and other multi-dimensional content types
Infographic
Graph/Chart/Diagrams
Illustration
Silhouette
A "creative refresh" for a campaign
A "campaign refresh" for an entity
Video end card
Bumper
Animation
Dailies
On-figure images
Still life images
Holiday creative
On-location shoots
Studio shoots
3D art
Product labels
Sports merchandise
CSS
HTML, XHTML, HTML5
XML As disclosed herein, the system 1000 may store a huge corpus of content items from sources such as the Internet and a variety of both online and off-line content sources from which "audiences" are defined for the purpose of analysis and transformation. In the below example, content items can be harvested from any of the audience computing devices 1010, the content sources 1015, and the user computing device 1020. For example, some of these components may represent public social media accounts that are part of a defined audience. Generally, content items can be harvested by the content item harvesting module 1030.

In some implementations, the system 1000 can implement advanced artificial intelligence and machine learning techniques, such as convolutional neural networks and generative adversarial networks, to acquire and analyze content items. However, it is feasible that the system 1000 could use other collections of algorithms to accomplish a similar result. In an example, the content item harvesting module 1030 collects content items from a harvest of social media accounts of members of a defined target audience. These content items can be referred to as harvest content items.

In some implementations, the content item harvesting module 1030 can be configured to collect harvest content items that match one or more criteria. The criteria can be selected, for example, based on the target audience. For example, the content item harvesting module 1030 can collect content items having textual content (e.g., metadata, captions, hashtags, etc.) relevant to the target audience. In some implementations, the content item harvesting module 1030 can acquire such content items through an API of a website or social network. For example, if the target audience is sports fans, the content item harvesting module 1030 can search for content items (e.g., images or videos) that include the hashtags "basketball," "football," or "baseball" on one or more social networks.

The system 1000 can analyze the harvest content items, and can evaluate and rank them based on a number of characteristics including user preference data (e.g. volume of engagement on social media). In some implementations, the performance metric ranking engine 1035 can carry out the steps of ranking the harvest content items relative to one another, for example by generating a numerical score for each harvest content item that represents the performance of that content item among the target audience for a given performance metric. The higher performing content items (e.g., the content items with higher scores) with regards to the user preference data and/or audience data can be harvested by the content item harvesting module 1030 from one or more data sources. For example, if a user wanted to design the best image of a cup of coffee, the content item harvesting module 1030 could gather images from social media accounts, public search engine results, a content library, a stock photo site, a content repository associated with a marketing platform, websites and news feeds, etc., all of which may correspond to the content sources 1015.

The system 1000 can process the harvest content items to determine which transformations, or categories of transformations, the visual features of each harvest content items represent or are reminiscent of. In some implementations, the system 1000 can implement a neural network to process the harvest content items. The matching criterion manager 1040 can then process the harvest content items to produce a matching criterion for each harvest content item that can be used for comparison with other content items at a later time. In some implementations, the matching criterion manager 1040 may implement a neural network to process or classify the harvest content items in this manner. A candidate content item can be provided by a user of the computing device 1020 for transformation by the system 1000. The system 1000 can process the candidate content item, for example using the second neural network referred to above, to identify one or more harvest content items, visual attributes, or categories that match most closely with the candidate content item. In some implementations, the system 1000 can achieve this by comparing the harvest content items themselves to the candidate content item, for example via the matching criterion manager 1040. In some other implementations, the system 1000 can compare characteristics of features of the harvest content items, such as the matching criterion aspects, with those of the candidate content item or to the candidate content item itself.

In some implementations, the system 1000 may evaluate more than one candidate content item at a time. For example, the user of the user computing device 1020 may provide two or more candidate content items to the content evaluation system 1005, and the content evaluation system 1005 can evaluate the two or more candidate content items simultaneously. In some implementations, the performance metric predictor 1060 can be configured to predict performance metrics for each of the candidate content items for a given target audience, which may also be selected by a user of the user computing device 1020. The recommendation module 1045 can then generate a recommendation for the user indicating that the candidate content item most likely to be perform well with the target audience should be published. In some other implementations, the recommendation module can provide a recommendation of a transformation to be applied to one or more of the candidate content items. The transformation can be selected to increase a likelihood that the candidate content item will perform well with the target audience. In some implementations, more than one transformation can be applied to one candidate item at a time. For example, candidate content item A may receive transformation X and transformation Y, or transformation X and transformation Z, or transformation W and transformation X, etc. There can be hundreds, thousands, or millions of possible combinations for evaluating the transformation matrix and determining the best content assets. In another embodiment, candidate content item A may be transformed by transformation X (producing content item A-X), and then be separately transformed by transformation Y (producing content item A-Y). Thus a user is capable of evaluating each transformed image against the other transformed images (or against other available images in the content library, which may or may not have been transformed by the system). This process too can create thousands and thousands of iterations.

Thus, the recommendation module 1045 can provide a best-fit transformation recommendation for the purpose of improving a selected performance metric of the candidate content item. In some implementations, the selected performance metric may be related to a target audience, as described above. The performance metric may also be a numerical score that is provided by the system 1000 (e.g., by the performance metric predictor 1060) as an objective evaluation of the quality of the content item for the particular audience. For example, the system 1000 may generate a score for a transformed content item indicating its likelihood of achieving a desired outcome (e.g., succeeding as defined by one or more performance metric) with respect to a target audience. In some implementations, the system 1000 can generate a scaled score for content items based on a predetermined scale. Thus, the system 1000 can generate a score for a content item on a scale of zero to one, one to ten, one to 100, or any other scale. In some other implementations, the system 1000 can generate a score for a content item as an absolute number based on any of a variety of factors impacting its likelihood of performing well according to a performance metric. The system 1000 can generate a percentile or percentage-based ranking in a similar manner. In still other implementations, the system 1000 can generate a non-numerical score for a content item. For example, the system 1000 may generate letter scores of A-F for a content item, with a score of "A" corresponding to the highest probability of the content item performing well. Thus, the transformation recommendations provided by the system 1000 can vary based on the candidate content item. In some implementations, the system 1000 can provide more than one transformation recommendation for the candidate content item.

Content scores provided by the system 1000 can also be compared against other known benchmarks. For example, the user may compare the score of an image against other images the user has previously used. This benchmark may be helpful to the user in comparing current or past campaigns. If a new content item scores a 55.4, but the average content item of the user's past campaigns (or existing content library) is a 32.6, then relatively speaking the content item scored 55.4 may be expected to a better content item (e.g., a higher-performing content item according to one or more performance metrics). In another example, the system 1000 can evaluate an audience benchmark. For example, if a content item scores a 55.4 out of 100, that may be perceived as a low scoring content item on its face. However, if that score is in the top 99th percentile of all content that the target audience consumed that week, then that may be determined to be a strong content item among other creatives that audience had been shown. This superior content quality may lead to greater awareness, memorability, and recall among a target audience. Similar types of score comparisons can be derived and displayed for image categories, content categories, content repository or libraries, marketing channels, competitor, competitor sets, industry, file type, etc. a user of the system 1000 who performs competitor benchmarking can use the scoring mechanism provided by the system 1000 as an objective measure with which to evaluate a campaign and/or a content item against the campaign and/or content items of competitors. The user could also apply these scores in determining comparisons of website imagery, social media imagery, etc.

In another embodiment, an individual content item can receive multiple numerical scores, e.g. one for each of the user's target audiences. That is, a content item can be scored for more than one target audience at a time. For example, if a user uploads an image of a bicycle to the system, that image may score a 45 among Men, a 56 among Men in Boston, a 45 among sports fans, a 60 among bikers, a 97 among female sports fans, etc. Thus, content items can be scored within demographic target audiences, brand audiences, competitor audiences, interest and psychographic audiences, behavioral audiences, conversation groups (i.e. people who are talking about a topic or keywords), or any combination thereof, or any type of target audience that is of interest to the user. For any given content item, a user can evaluate how the asset is likely to fare with different groups of people, customers, or prospective customers. Multi-audience scoring evaluations such as these can be performed while the content is being designed, after the content is created, before it is published, or after the content is published.

In some implementations, the user can select a transformation to apply to the candidate content item, for example, via a user interface provided by the system 1000. However, in some other implementations, the system 1000 can be configured to apply the transformation automatically to the candidate content item without a user input. By applying the transformation, the system 1000 generates a transformed content item. The system 1000 can return the transformed content item to the user as a new visual or media asset, along with one or more projected performance metrics or scores generated by the performance metric predictor 1060 or the performance metric ranking engine 1035. In some implementations, multiple versions of the candidate content item can be returned to the user, each with a different candidate transformation, and each candidate transformation may be associated with a respective predicted performance metric.

It should be understood that, in some implementations, the candidate content item can be uploaded directly into the system 1000 by the user computing device 1020. In some implementations, the system 1000 can cause the candidate content item to be uploaded. In some other implementations, the system 1000 can retrieve the candidate content item from a database, via browser extension, or via API connection to another application, website, or content repository, or via desktop client, mobile app, or chatbot, which may be represented in FIG. 10 by the content sources 1015 or the audience computing devices 1010.

In another embodiment, the system 1000 can allow a user to evaluate images outside of the platform while they are on the Internet. This may be particularly useful when the user is on other web-based business and marketing application software, or while the user is on a social network, a website, or on stock photography and other image-rich domains or competitor properties. In one particular example, which is not meant to be limiting, the system 1000 may provide the user with access to a browser plugin (e.g. for Google Chrome), which is linked to an account of the user maintained by the system 1000. In some implementations, such a browser plugin can be provided to the user by the GUI generation module 1075. This could also be achieved with an application integration on certain websites or with certain web-based software providers. In the case of a browser plugin, for example, the user would have the option to right-click-analyze an image (similar to how users on the web can right-click "save as" for an image or link). This function can allow the user to quickly assess the quality and viability of a particular image that the user found on the Internet. For example, if the user is trying to choose between ten images of sunsets to purchase from a stock photography website, the user can select each one and evaluate the images with respect to a target audience using the system 1000, in order to determine a likelihood that the target audience will find it engaging. The evaluation or score provided can thus allow the user to make a more informed decision.

Additionally, the plugin can be configured to detect, grab, and display a series of images or other content items found on a webpage that a user is currently visiting. These images may be shown to the user in an overlaid screen and displayed as a "gallery" of various images. In this example, the user can utilize the system functionality to evaluate, rank, and score all of the images simultaneously (or in sequential fashion by selecting the individual images the user wants to be evaluated) on a page against a particular target audience, or selection of target audiences. This can allow the user to quickly compare many images and make a more rapid determination of the best image for his/her particular purpose. The scores may also be displayed to the user upon an image hover as the user's cursor "hovers" on top of the image in question on a webpage, for example. The user may also use this tool and similar tools made possible by the system 1000 disclosed herein when evaluating images on their websites, social properties, or other competitor's properties in order to determine when certain optimizations are available. There are many such use cases and the examples above are not meant to limit the scope of potential ways that users may employ this technology.

In another example, the GUI generation module 1075 may provide a user with access to a user interface via an application, such as an application executing on a mobile device (e.g., the user computing device 1020). The application may be linked to an account of the user maintained by the system 1000, similar to the browser plugin described above. The application may provide a user interface that allows the user to analyze an image or other content item stored on the device that executes the application. For example, the user could make use of the application to quickly evaluate a photo stored in a photo library on the user's computing device or content management system or cloud storage system. In some implementations, the application can transmit selected content items from the user computing device 1020 (or from another location) to the system 1000 for evaluation, and can return the results of the evaluation to the users computing device 1020. In some implementations, the system 1000 can evaluate more than one item at a time, thereby allowing the user to evaluate any number of photos or other content items stored on the user's computing device to determine which content items are likely to be most effective with a target audience. For example, the user can upload a batch of content items to the content evaluation system 1005 for simultaneous evaluation. Such an implementation may be particularly valuable for users who frequently publish content (e.g., photos or videos) stored on a mobile computing device, such as a smartphone, as it would enable these users to more easily determine which content items are likely to be most popular among their followers or among any other target audience.

In some implementations, the system 1000 can provide the user with a voice-activated interface. Such functionality can be provided along with, or separate from, any of the GUIs discussed above, such as a web browser extension of a standalone application. Generally, a voice-activated interface can allow a user to provide voice commands (e.g., via a microphone of a user computing device) allowing the user to perform any of the functions discussed above in connection with the various GUIs described above. For example, the system 1000 can allow a user to select or publish a content item, such as a transformed content item, via a voice command. In addition, the system 1000 can be configured to support other voice-activated commands. In some implementations, the system 1000 may be configured to process voice data corresponding to natural language. Thus, a user may be able to interact with the system 1000 by issuing voice commands such as "show me alternate examples," "transform this image," "show me an image example with a different X," "what are my top colors," "show me images that are engaging my audience," "rank these images," "resize my logo," "remove my logo," change color X to color Y," "change the background," "transform layer X," "what is the score of this image," "how does this image score with audience X", "how does this image score against a competitor," "optimize this image," "build me a mood board," "find me the best image of X," etc.

As discussed briefly above, the harvest content items are not limited to being harvested from social media accounts. For example, in some implementations, the system 1000 can harvest images from anywhere on the World Wide Web or from any accessible database or data store. The system 1000 could also harvest content items from a marketing platform that maintains a stored record of past creatives, along with the relevant performance data, that were used in campaigns, which may have been used to target a particular audience in a campaign at a particular time with a certain set of characteristics, budget, copy etc. The harvest content items may also be part of a dataset that is not owned or maintained by the user.

As described above, the system 1000 can be used to transform content items to achieve a variety of performance metrics. Various examples of performance metrics that the system 1000 can be used to optimize for are described below. It should be understood that the following examples are provided by way of illustration only, and not by way of limitation. One of skill in the art will appreciate that the types of performance metrics below are merely exemplary, and that the system 1000 can be configured to achieve other types of performance metrics than those described below without departing from the scope of this disclosure.

Sample Content Performance Metrics:
- Impressions
- Clicks
- Engagement (e.g., social media engagement)
- Number of followers
- Follower growth rate
- Shares
- Comments
- Time on site
- Time viewing content item
- Sales
- Sales lift
- Revenue growth
- Repeat sales
- Conversions
- Cost per lead
- Cost per click
- Cost of customer acquisition
- Churn rate
- Customer retention rate
- Content Downloads
- Inbound links
- Lead quality score
- Relevance score
- Cost per thousand (CPM)
- Lead volume
- Subscribers (blog, newsletter, email, etc.)
- Website traffic (e.g., monthly)
- Unique website visitors
- Customer lifetime value
- Lead to sale conversion rate
- Cost per order
- Net promoter score
- Profitability
- Referrals
- Frequency
- Fatigue
- Click through rate
- Number of view views
- Cart size
- Order size
- Average purchase value
- Response time
- Market share
- Brand recall
- Ad recall lift
- Market penetration
- Household penetration
- Memorability
- Brand association
- Qualified leads (e.g., per month)
- Net profit margin
- Gross margin
- Monthly recurring revenue (MRR)
- Employee happiness
- Social media sentiment
- SEO keyword ranking
- SEO traffic
- Social media mentions
- Call abandonment
- Resolution rate
- Customer satisfaction score
- Dwell
- Churn prevention
- Unit share
- Relative market share
- Brand penetration
- Unit share
- Awareness
- Top of mind
- Purchase intent
- Likeability
- Loyalty
- Willingness to refer/provide referral
- Share of voice
- Net reach
- Gross ratings points
- Page views
- Frequency response
- An attraction metric
- Unsubscribe rate
- Uniqueness
- Resonance
- Relevance The system 1000 may optimize content items against any criteria or metadata that is related to the content being processed by the system 1000. For example, the system 1000 can examine a set of webpages visited by one or more users, and can apply a weight to the "value" of each content item on those pages based on the amount of time the user stayed on the page. In another example, the system 1000 can weight each content item by whether or not that content item led to the user completing some action of interest (e.g., filling out a form or adding a product to a shopping cart). The system 1000 can also be configured to place a higher value on content items that have received more viewer activity, comments, social media engagement or have been "Pinned" by users most often with a Pinterest-like plug in.

In some implementations, to make a content item more engaging, the system 1000 can be configured to determine how unique the content item is relative to other content items viewed by the target audience, or to transform the content item to increase its uniqueness. For example, the system 1000 can extract various features from the candidate content item as well as from a set of harvest content items. In some implementations, the system 1000 can examine the frequency of the features of the candidate content item within the sample of harvest content items, and can determine a score of the candidate content item's uniqueness. For example, if the features of the candidate content item appear infrequently in the harvest content items, the system 1000 can determine a relatively higher score relating to the uniqueness of the candidate content item. In some other implementations, the system 1000 can be configured to generate a vector representing a plurality of features of the candidate content items, as well as vectors representing the features of each of the candidate content items. The system 1000 can then determine the uniqueness of the candidate content item based on distance between the vector for the candidate content item and the vectors for the harvest content items. It should be understood that, in some implementations, the system 1000 can use digital representations other than vectors to calculate the uniqueness of a candidate content item in a similar manner to that described above. In some implementations, some of the features examined by the system 1000 to determine the uniqueness of a candidate content item may be features that are not readily apparent to a human consumer of the candidate content item.

In some embodiments, to transform the candidate content item to increase or decrease the candidate content item's uniqueness, the system 1000 may replace less unique features within the sample of harvest content item with more unique features. For example, the system 1000 may determine a frequency of a first feature (e.g., the color red on a hat or a horn sound) within the sample of harvest content items. The system 1000 may also determine a frequency of a second feature (e.g., the color blue on a hat or a whistling sound) within the sample of harvest content items. The system 1000 may compare the two frequencies. If the system 1000 determines the first feature is more common than the second feature (e.g., the first feature is present in more harvest content items than the second feature), the system 1000 may transform the candidate content item by replacing the first feature with the second feature. Similarly, to decrease the candidate content item's uniqueness, if the system 1000 determines the first feature is less common than the second feature, the system 1000 may replace the first feature with the second feature. Thus, the system 1000 may automatically transform the candidate content to be more or less unique to the sample of harvest content items.

In some implementations, the system 1000 can evaluate a content item based on a variety of performance metrics as described above, including one or more performance metrics relating to engagement. Generally, engagement can refer to any type or form of interaction with a content item by an audience member. For example, engagement can relate to a number of views, a number of shares, a number of likes, a number of comments, or any other number of user interaction events experienced by the content item among the target audience. Thus, engagement can be a measure of a level of interest that the target audience has in a content item relative to other content items. In some implementations, engagement may relate to resonance or relevance of a content item among the target audience.

In some implementations, the system 1000 may use audience activity data on a social network to inform the transformation of candidate content items for use in a campaign. Alternatively, the system 1000 may use historical response data to one or more campaigns. For example, the performance measurement module 1065 can be configured to track one or more metrics relating to a response of members of a target audience to various harvest content items. Metrics relating to audience response can include, for example, clicks, views, sales, etc. These campaigns may have targeted the same or a similar audience as the one that is currently being targeted now. The system 1000 may examine one company's past campaigns, e.g. the performance of a coffee seller's marketing creative towards an audience made up of coffee drinkers. In some implementations, the system 1000 may examine a competitor or competitor set of marketing creative performance (e.g., the response rates to a competing coffee seller's last two campaigns on a particular platform). The system 1000 may also combine multiple audience or marketing measurement datasets in order to inform the transformations. The system 1000 may also learn from the performance data of other companies who are not competitors, but who are trying to market and sell to the same audience.

After performing these transformations, the system 1000 can return new transformed versions of the candidate content items. The user may then choose to download, share, edit, or publish the transformed content items, for example in a campaigns. Once a campaign is live (e.g., currently in progress), the system 1000 can be configured to suggest and/or enact new transformations to the content items of the campaign based on new data as it becomes available. The data used to inform the new transformation may be audience activity data from one or more digital sources, such as a social network or website or mobile or web or desktop application software, or it may be based on the response rates to the present creative assets, or to any other external datasets that can be used as "signals" as to inform the selection of one or more transformations. For example, the system may integrate with a website analytics software and may recommend an image transformation in order to increase new visitors to a company's website. The amount of traffic to the company's website can be tracked in real-time and thus the system 1000 can use the traffic information to determine changes to the creative in order to optimize the company's performance against the goal of maximizing new website traffic. Any number of business, marketing, or sales goals may be calibrated to the system 1000 in such a manner. The system 1000 may enact new transformations based on a user's desire to reach a new target audience, or desire to refresh content previously published to a current target audience, the process of which may involve producing one or more variations of previously transformed content.

As described above, the system 1000 can be used to transform content items in a variety of ways. Various examples of transformations that the system 1000 can perform on candidate content items are provided below. It should be understood that the following examples are provided by way of illustration only, and not by way of limitation. One of skill in the art will appreciate that the types of transformations below are merely exemplary, and that the system 1000 can be configured to perform other types of transformations than those described below without departing from the scope of this disclosure.

Sample Types of Content Item Transformations:
   Word choice, such as synonyms.
   Sentence structure, punctuation, syntax
   Language
   Adding keyword, phrase, or hashtag
   Adjust word order or sentence order
   Adding, changing or removing an emoji or symbol
   Adjusting the tone or sentiment of the content
   Move the location of an image on a webpage
   Replace the image on a webpage
   Adjust the text on a webpage
   Move the location of text on a webpage
   Edit, move or replace a panel on a webpage
   Edit, move or replace the contents of a panel on a webpage (e.g. an image on a panel)
   Adjusting color histogram of the image, RGB and HEX value modifications
   Manipulate HSV color space. Adjust the image along the color spectrum, e.g. slightly increase HSV values
   Adjusting the saturation of the image
   Adjusting the composition of the image
   Adjusting the layout or balance of the image
   Manipulating the edges of the image
   Adjusting the symmetry of the image
   Changing, moving or altering the focal point of the image
   Pixelate a certain area or feature of the image (pixelization effect)
   Emboss the image
   Apply Photoshop photo effects
   Apply a negative effect
   Apply an infrared effect to an image
   Apply an X-Ray effect Apply a bokeh effect
Apply a blooming effect
Apply a vignetting effect
Adjust the framing of the photo
Add a border to the image or a feature/element of the image
Enhance the edges in the image
Invert the image
Invert the colors of the image
Adjust shading/shadow or lighting
Adjusting the amount and location of white space in the image
Adjusting the resolution of the contents
Adjusting the hue, tint, or tone of the contents
Adding a specific image feature, such as an object
Restyling of 1 or more image features, such as objects, products, scenes, visual elements
Replacing of 1 or more image features, such as objects, products, scenes, visual elements
Applying an overall stylistic filter to the entire image
Applying a gradient, accent, or overlay to the image or to a specific area of the image.
Add a logo or watermark
Add a call-to-action
Resize the call to action
Move the location of logo or branding features
Adjust the color, font or style of the headline, text or call-to-action
Move the location or position of an image feature, such an object, product, call-to-action, button, etc.
Adjust the lighting or brightness
Adjust the scene (e.g. beach, living room, kitchen, restaurant, football stadium, etc.)
Change the background color or scenery
Adjust the time of day (daytime/nighttime)
Adjust contrast of the image
Adjust the shade and shadow
Apply a transformation that makes the image to look like a cartoon
Apply a transformation to make the image look like an illustration or artwork
Add infographic-like elements to the image
Insert new text into the image
Turn an image featuring a single product into an image of a product collage
Adjust the size and location of the headline text, or main text, etc.
Adjust the texture of the image
Adjust the font of text in an image
Add a pattern to the contents
Add a shape to the image
Adjust the shape of certain contents
Manipulate the edges, contours, and boundaries of the image features
Turn the image to be gray scale
Applying a transformation to one layer in the image design file
Applying a transformation to a collection of layers in the image's design file
Adjust the forms, lines and angles of elements of the image
Adjust the spatial context or spatial relation of items in the image
Remove one or more layers in the image
Move or replace contents in one or more layers in the image
Adjust the size of objects in an image
Adjust the sharpness or blurriness of a photo
Apply a blur effect to a layer in an image
Applying a negative effect or inverting certain colors in the visual content
Crop/re-crop an image (for example, to fit the optimal dimensions for a certain platform, such as a Google banner ad, Facebook ad, etc.)
Increase the size of the text
Shrinking the size of the text in an image
Adjust the highlights in the image
Apply a "zoom" transformation to either zoom-in or zoom-out on the particular image
Crop the image in one or more areas
Rotate the placement of certain objects in the image.
Adjust the photo temperature
Adjust the opacity of the image
Add a person in the image
Adjust certain features of the people in the image, such as hair color, or hairstyle, facial hair, etc.
Adjust the clothing colors, variations, styles or items they are wearing in the image
Adjust age features of the people in the images
Adjust facial look (feature enhancement, makeup, distortion, gender, e.g. Snapchat filters).
Add a person of a certain ethnicity into the contents
Adjust the action or scenario of the image
Combine multiple elements of two or more images
Warp the image
Adjust the time of day of the image
Apply a gradient or pattern to the image
Adjust the perspective of the photo (or image layer)
Adjust the emotion or sentiment of a person in the image or photo
Adjust the positioning or posture of a person in the image
Adjust the facial prominence
Adjust playback speed of a video or GIF
Change the size of a video or GIF
Splice a section out of a video or splice two videos together
Generate a highlight reel of one or more video clips or video files
Make a video montage from images and/or videos
Choose the optimal thumbnail for a video
Transform the thumbnail image for a video using any of the transforms described here
Transform a GIF using any of the transforms described here
Chang the image into a video or GIF by animating a feature
Changing the file format of a video or image
Changing a video into a GIF or vice versa
Make a video or GIF loop in a different way. E.g. going forward through all frames and then reversing rather than starting back at the beginning.
Adjustments to the audio content and audio files
Adjustments to acoustic features of a voice recording
Adjustments to a musical score
Adjustments to the tone, pitch, prosody, etc. of someone speaking live
Pitch correction
Edit the start time and stop time of the video
Edit the start time and stop on the audio file
Edit the duration of any sound on the audio file
Add or adjust fades into or out of a clip, or between clips
Add a cross-fading effect
Change the audio by means of compression
Change the audio by means of equalization Add other effects to the video, image, and/or audio files.
Identify the optimal take(s) from a video or audio recording session
Add a flanging effect to the audio
Add a reverb effect to the audio
Adjust noise reduction effect
Transform a video frame, still image, or collection of frames in a video
Layer an effect on top of a video
Apply a transformation to a specific time period in a video
Splice video frames into a GIF
Convert longer-form video contents into shorter-form contents (e.g. truncating a video from 30 seconds to 3 seconds)

In general, the system 1000 may create a huge amount of new data related to the types of creative and content attributes and specific optimizations that are effective with a target audience, or that are effective for a particular program or campaign goal. In some implementations, this information can be leveraged to generate data products and tools in addition to the outputs of the system 1000. For example, if ten companies use the system 1000 to optimize their respective content items for campaigns and programs for sports fans, the system 1000 can produce a rich dataset on what works well (or does not work well) with sports fans, according to at least one performance metric. It should be understood that, in this example, each company may be selling very different types of products in their programs. For example, a first company may sell athletic shoes, a second company may sell event tickets, a third company may sell airline and travel tickets, a fourth company may sell sporting goods, etc. Thus, the dataset produced by the system 1000 in this example can be a highly valuable dataset based on which new transformations or combined transformations may be derived and offered to other users at a later time. The same dataset and analysis insights can be applied to produce a tool that generates designs for new retail or sports merchandise. It can additionally be utilized to inform marketing and customer service initiatives tailored for that audience.

In addition, datasets such as those described in the example above may have applications that are useful in areas outside of marketing. For example, transformations can be applied directly to any kind of content item including text (including characters and symbols), images, and video that are viewed on a screen or computing device. Also, such transformations could be applied to applications that are involved in the planning, production, or refinement of physical goods or services, or in many different areas of design. That is, the systems and methods described herein have applications in industries and business processes that involve physical and real-life design choices.

In some implementations, the system 1000 may be used to generate an audio transformation. That is, the system 1000 could transform a candidate audio content item in an audible manner along many different dimensions. For example, if an audio content item is targeting users who are elderly or hard of hearing, the system 1000 may transform the audio content item to adjust the vocals to be higher in tone, pitch, prosody, etc. In general, any aspect of the acoustic features of the voice may be subject to transformation by the system 1000. In another example, the system 1000 may make adjustments to the music playing in the content, or swap in new musical elements. The system 1000 may also increase the volume of such sonic content. This could be particularly useful in for audio included in content items, training and instruction videos, entertainment, and in other video broadcasts.

For example, if the system 1000 determined that a target audience for a content item including audio is more receptive to a narrator or voice actor who has a female British accent, the system 1000 may be able to transform the original voice recording to reflect the desired vocal and/or musical attributes that would be optimized for maximum business performance. This may be achieved by swapping out the current narration of the audio content item with pre-recorded narration or by applying one or more transformations to an audio file corresponding to the audio content item and/or editing the audio file automatically.

In some implementations, the system 1000 may be used to select a particular person (e.g. an actor, a model, etc.) to be featured in a particular image or other content item, from among a group of people. For example, images containing one or more people may be uploaded and received by the system 1000. The system 1000 can then determine which images are optimal based upon an analysis of various attributes of the people in the images. These attributes may include facial or body attributes. Based on this analysis, the system 1000 can select a subset of one or more of the people depicted in the images for inclusion in a candidate content item directed towards a target audience, based on a likelihood that content items including the selected subset of people are likely to perform well according to at least one performance metric. In an example, a user may upload a candidate content item and may select a target audience, and the system 1000 can determine and provide recommendations for ideal characteristics of people to be depicted in the content item. The system 1000 may recommend that a person having particular attributes, such as age, gender, race, ethnicity, etc., should be included in the content item to make the content item more appealing among the target audience. For example, the system 1000 may determine that including an image of a middle-aged person in the content item could result in better performance than including an image of a young person in the content item. Similarly, the system 1000 can be further configured to select a particular middle-aged person from among a group of middle-aged people whose photos are available, based on an analysis of the photos indicating that a content item including an image of the selected person is likely to perform better among the target audience than a content item including an image of a different person. It should be understood that the system 1000 could determine any combination of attributes or numbers of such people to include in a content item.

One of skill in the art will appreciate that the examples described above are illustrative only, and are not intended to be exhaustive of the types of applications that may be relevant to the system 1000. By way of example, the following list provides a variety of other types of applications and technology areas that may benefit from the systems and methods described herein.

Other Applications for the Systems and Methods Described Herein:
Virtual reality and augmented reality applications
Transform the contents of AR and VR applications, digital experiences, and visual environments.
Gaming
Transform the contents of mobile, console, PC gaming, etc.
Transform a still image in a gaming environment.
Entertainment
Transform the contents of television programs, motion pictures, sports games, live video broadcasts etc.

Ecommerce/Retail
  Transform the presentation of products or selection of products in an ecommerce store, or in-store display/aisle.
  If a user's preference for the color purple is known, content items shown to the user (e.g., via a website or a touchscreen interface inside a store) may be displayed with a purple treatment. Alternatively, items that are close to the preferred purple color can be emphasized.
Fashion
  Inform and transform new styles of apparel, clothing, accessory designs, etc.
  Transformations can be used for the purpose of informing fabric selections and purchases, and even in textile generation
Architecture and construction
  Transform the structural design, layout, and materials composition.
  Transform computer-aided designs (CAD) developed by architects and architecture professionals.
  Transform the presentation of the building in photography and collateral.
Interior design, graphic design, industrial design, app design, web design, art direction, logo design, etc.
  Transform visual design assets, photos, and new digital creations to be more on-audience.
Product Design & product variations
  For example, a can of beer may be transformed. In another example, the structural design of a home appliance may be transformed. In another example, the design of a pair of women's tennis shoes may be transformed to inherit the qualities of footwear that appeal to that audience.
Merchandising & Product packaging
  Inform and transform the product display and packaging, and labeling of a wide variety of consumer products from cereals to chewing gum.
Travel and transportation
  Transform the content that is being displayed on screens in the airplane
  Transform the locations and scenes that are displayed to prospective travelers on a digital screen or website
  Transform the images of travel destinations that are displayed to users in search results, on websites, and on other digital media.
Search Results (e.g. from a search engine)
  Transform the way that webpage contents are displayed to a particular site user. For example, the order and priority of the URIs may change. The site descriptions themselves may change (text optimization) depending on who the search user is. The image content on the site or on an individual webpage may transform as well, such as the landing page of a website.
  Promoted offers in search listings (e.g. Google Ads) may transform as well.
Paper, plastic, boxes, etc.
  Transformations can be applied to physical products and printed products, e.g. patterns on cardboard boxes, containers, posters, displays, etc.
Inventory management
  Design transformations for certain products may also integrate and inform inventory purchase decisions and inventory management. For example, if the system 1000 determines that red sandals will appeal most to the audience of users, then the system may recommend and/or trigger that more red sandals should be ordered, produced, and delivered to a particular location or website for consumption by the target audience.
  Similarly, the system may determine that in order to induce more sales of red sandals, digital marketing content items should be transformed to include color-based transformations that emphasize shades of red. The system may also perform a transformation to include or emphasize sandals in the visual assets.
Retail and Sports merchandise
  Transform branded merchandise materials, e.g. the look and feel of jerseys and novelty items and the display of such items in promotional materials.
Customer service
  Transform the communications and content that are being sent to one or more customers, either in digital or non-digital formats.
  Transform the experiences that customers receive in call-centers or via online chat mechanisms.
Programming and computing
  Automatically adjust or re-write code in an application based on the audience activity, user preference or response data. This could also inform the adjustment of a configuration setting or inform an engineering priority and/or task to be accomplished to optimize user experience or application performance.
Printing and 3D printing
  Transform the printing settings and design choices to emphasize the design attributes that are preferred by a user or target audience.
Automotive
  Transform the design, manufacture and promotion of new automobile models and the presentation of such vehicles and accessories in promotional materials.
Digital billboards
  Transform the content that is displayed to passersby in a personalized manner according to the visual preferences of the passersby.
Store displays
  Transformations to the digital display technologies in a retail store, e.g. text-based content items may be displayed in a larger font when an older individual views them. Preferred items, fonts, designs, etc. may be emphasized as well.
Photography
Video production and motion graphics
Video design
Art direction
Graphic design
Web design
Interior design
Fashion design
Product design
Merchandising
Animation
User experience design
Industrial design
Interactive design
Instructional design
Music videos
Computer fine art and commercial art
Illustration
Parametric design
Store design and showroom design
Virtual store design (e.g. e-commerce store)

Creative writing
Copywriting/content writing
Screenwriting
Expository writing
Persuasive writing
Descriptive writing
Narrative writing
Dramatic writing
Academic writing
Writing literature (fiction and non-fiction)
Poetry
Comics
Journalistic Writing
Biography and autobiographical writing
Technical writing
Corporate videos
Webinars
Culture videos
Event videos
Presentation videos
PowerPoint videos
Online video marketing
Promotional videos
Testimonial videos
Product videos
Sizzle reels/Highlight reels
Marketing videos
Real estate videos
Training videos
Tip series videos
Explainer videos
Educational videos
Infomercials
Travel videos
Wedding videos
Documentary videos
Ceremonial videos
Video public service announcements (PSAs)
Interview videos
Digital journalism/news videos
Music videos
Television commercials
Digital art
Streaming online content experiences
Subscription contents
Sales contents and materials FIG. 11 is a flow diagram illustrating a method 1100 for transforming one or more content items in accordance with an illustrative embodiment. In some implementations, the method 1100 can be performed by a system such as the system 1000 shown in FIG. 10. In brief overview, the method 1100 includes receiving a plurality of harvest content items (operation 1105), ranking each of the plurality of harvest content items based on at least one performance metric (operation 1110), determining matching criterion aspects of the plurality of harvest content items (operation 1115), comparing aspects of a candidate content item with the plurality of harvest content items according to the determined matching criterion aspects (operation 1120), determining a subset of the plurality of harvest content items that are relevant to the candidate content item based on the comparison of the aspects of the candidate content item with the plurality of harvest content items (operation 1125), and selecting a first transformation for the candidate content item (operation 1130).

Referring again to FIG. 11, the method 1100 includes receiving a plurality of harvest content items (operation 1105). In some implementations, this operation can be performed by a content item harvesting module such as the content item harvesting module 1030 shown in FIG. 10. The content item harvesting module can receive the content items from any content source, such as the content sources 1015, the audience computing devices 1010, or the user computing device 1020 shown in FIG. 10. The content items can include text entries, images, GIFs, videos, audio data, or any other type or form of content. In some implementations, the content item harvesting module can be configured to harvest the content items based on a particular target audience. The target audience can be selected based on a preference of a user. For example, a user may provide one or more candidate content items to the content evaluation system 1005, along with an indication of a target audience. Thus, if the user works at a business selling sporting goods, the content item can be content item for sporting goods and the target audience can be people who are interested in one or more sports. In this example, the content item harvesting module can be configured to harvest content items that are relevant to the selected audience of people interested in sports. For example, the content item harvesting module may harvest content items from social media accounts associated with professional sports teams or other businesses that market to sports fans. The content item harvesting module also may harvest content items from social media accounts of individuals who appear to have an interest in sports.

The method 1100 also includes ranking each of the plurality of harvest content items based on at least one performance metric (operation 1110). In some implementations, this operation can be performed by a performance metric ranking engine such as the performance metric ranking engine 1035 shown in FIG. 10. The ranking can be based, for example, on audience measurement data that may be collected by a performance measurement module such as the performance measurement module 1065 shown in FIG. 10. In some implementations, the performance metric ranking engine can be configured to generate a numerical score for each harvest content item that represents the performance of that content item among the target audience for a given performance metric. Examples of such performance metrics are provided above.

The method 1100 also includes determining matching criterion aspects of the plurality of harvest content items (operation 1115). In some implementations, this operation can be performed by a matching criterion manager such as the matching criterion manager 1040 shown in FIG. 10. In general, the matching criterion aspects can be any aspect, characteristic, or category of the content items, such as those described above. For example, for image-based content items, matching criterion aspects may include colors included within the images, objects or people included within the images, filters applied to the images, or any other visual aspects of the images. In some implementations, a matching criterion aspect may include a category of one or more content items. For example, category information can be stored in electronic content items as metadata, or may instead be inferred based on other characteristics of the content item. There is no limit to the number of matching criterion aspects that can be selected by the matching criterion manager. The matching criterion manager can also be configured to compare aspects of a candidate content item with the plurality of harvest content items according to the determined matching criterion aspects (operation 1120). As described above, the candidate content item can be received from a user (e.g., from the user computing device 1020 shown in FIG. 10), and may generally correspond to any content item that the user is considering publishing and would like to have evaluated or transformed prior to publishing. The matching criterion manager can compare any or all of the identified matching criterion aspects of each of the harvest content items with corresponding aspects of the candidate content item in order to determine harvest content items that are similar to the candidate content item. The matching criterion manager can similarly determine harvest content items that are relevant for a particular candidate transformation, or for a performance evaluation of a new content item or campaign.

The method 1100 includes determining a subset of the plurality of harvest content items that are relevant to the candidate content item based on the comparison of the aspects of the candidate content item with the plurality of harvest content items (operation 1125). In some implementations, this operation also can be performed by the matching criterion manager. In some implementations, the subset of the plurality of harvest content items can include those harvest content items having the highest number of matching criterion aspects that are similar to corresponding aspects of the candidate content item. It should be understood that there is no limit on the number of harvest content items that can be included in the identified subset of harvest content items. In some implementations, each pair of content items including the candidate content item and one of the harvest content items can be assigned a numerical score representing a degree of similarity between the two content items, and the identified subset of harvest content items can include all of the harvest content items whose corresponding pair has a score exceeding a predetermined threshold. In other implementations, the subset of harvest content items can be determined in a different manner. For example, the subset of harvest content items may include content items that are not necessarily most similar or relevant to the candidate content item, but are most relevant to the candidate content item according to a different metric. In other implementations, the candidate content item may be determined to be relevant to all harvest content items, rather than to a subset of content items.

The method 1100 also includes selecting a first transformation for the candidate content item (operation 1130). In some implementations, this operation can be performed by a recommendation module such as the recommendation module 1045 shown in FIG. 10. The first transformation can be any of the transformations described above. In some implementations, the first transformation is selected to make at least one characteristic of the candidate content item more like the at least one characteristic of a first harvest content item of the subset of the plurality of harvest content items that is ranked more highly than a second harvest content item of the subset of the plurality of harvest content items. Thus, the transformation can be expected to result in a transformed content item that also is likely to be ranked more highly than the original candidate content item. The characteristic can relate to any quality of the content item that can be perceived by an audience. For example, the characteristic can be any visual characteristic (e.g., if the content item includes image or video data) or any auditory characteristic (e.g., if the content item includes audio). The transformation can be any alteration of any portion of the content item that results in a change in the identified characteristic.

In some implementations, the method 1100 also can include applying the selected transformation to the candidate content item to generate the transformed content item. For example, the transformation can be applied by a content transformation module such as the content transformation module 1050 shown in FIG. 10. In some implementations, the content transformation module can be further configured to select an intensity of the transformation to be applied. For example, if the transformation to be applied is determined to be a red treatment applied to an image-based candidate content item, the content transformation module can be configured to select a degree to which the red treatment should be applied. This can include determining color parameters such as hue and saturation level to be applied across the candidate content item, or to particular locations, or layers, within the candidate content item. It should be understood that the term "intensity" can refer to different characteristics depending on the selected transformation. Generally, the term intensity can relate to a degree to which the content item is altered from its original state by application of the selected transformation. Thus, a higher intensity can result in a content item that has been altered more heavily relative to the alteration applied to a content item whose transformation intensity is relatively lower.

In some implementations, the method 1100 also can include calculating a score for the candidate content item. For example, such a score can be calculated by a performance metric predictor such as the performance metric predictor 1060 shown in FIG. 10. The score can be calculated based on a performance metric and a target audience. In some implementations, the user that provides the candidate content item for analysis and transformation also can provide an indication of the performance metric and target audience to be used in the calculation of this score. Generally, the score may relate to a likelihood that the candidate content item will perform well with the target audience in relation to the selected performance metric. In some implementations, the recommendation module can be configured to select the first transformation (i.e., operation 1130 of the method 1100) such that, upon application of the first transformation to the candidate content item to generate a first transformed content item, a score of the first transformed content item is improved, or is likely to improve, relative to the score of the candidate content item.

In some implementations, the performance metric predictor can be configured to calculate the score based on a variety of factors or attributes of the content item or of features in the content item. For example, the performance metric predictor can calculate the score based on any combination of the following attributes: layout and composition, position, symmetry, balance, arrangement (e.g. golden mean, rule of thirds), object location, depth of field, angle of view, focal point, view point, vantage point, foreground/background content, white space/negative space, cropping, framing, color scheme, hue, tint, temperature, tone, contrast, saturation, brightness, shade, mood, line, angles, noise, contours, gradients, texture, repetition, patterns, blowout, blooming, concentricity, cubic attributes, geometric attributes, shadow, blocked shadow, vignetting, objects, scale, number of objects, position of objects, spatial context, proportion, shapes, shape of objects, number of shapes, attributes of objects, form, perspective, representation, path, scenery, time of day, exposure, time lapse, typography, position of headline, size of headline, length of text, location of call-to-action, typeface, font, location of faces, posture/pose of people, location of figures, gestures, action/activities of people, number of people, hair color of people, ethnicity of people, gender of people, age of people, expressions and emotions of people, facial attributes, clothing and appearance, accessories, resolution, orientation, icons, emojis, logos, watermarks, etc. It should be understood that this list of attributes is exemplary only, and should be not read as limiting the scope of this disclosure.

It should be understood that, in some implementations, the recommendation module may not be limited to recommending transformations for a candidate content item. For example, in some other implementations, the recommendation module can be configured to recommend an alternate candidate content item, if the user provides more than one content item for evaluation, or if the system has access to a plurality of other content items. The user may not have provided these other content items. Thus, in some implementations the method 1100 can include calculating a score each of two or more candidate content items, and the recommendation module can recommend choosing, selecting, prioritizing, improving, or publishing the candidate content item having the highest score, without applying any transformation to the candidate content items.

Furthermore, it should be noted that the recommendation module may recommend more than one type of transformation for a single candidate content item. For example, in some implementations the method 1100 can include determining two or more different transformations, either or both of which may be applied to a single candidate content item to improve the score of the candidate content item. In some implementations, the recommendation module can provide an indication of the two or more different transformations to the user who provided the candidate content item. In some other implementations, the indication can be provided to the user by a user alert module such as the user alert module 1070 shown in FIG. 10. As discussed above, such an indication can be provided via a GUI that may be implemented as a browser extension, a standalone application, or through other means. Such a GUI may be generated, for example, by a GUI generation module such as the GUI generation module 1075 shown in FIG. 10. The GUI also can allow the user to provide feedback to the content evaluation system. Thus, in some implementations, the method 1100 can further include receiving a user input corresponding to a selection of at least one of the two or more transformations recommended to the user. The content transformation module can then apply the selected one or more transformations to the candidate content item, and can return the transformed content item to the user. The user feedback may also be captured after a transformation has been applied to one or more candidate content items. User feedback may also be captured after a particular campaign has launched or concluded.

In some implementations, after a content item (which may be an original candidate content item or a transformed content item) has been published, the method 1100 can further include determining a response of the target audience to the content item. In some implementations, this operation can be performed by audience performance measurement module such as the performance measurement module 1065 shown in FIG. 10. The response can include any type and form or interaction or response from the target audience, such as a number of clicks, a total or average duration of time during which members of the target audience viewed or otherwise interacted with the content item, sales that result from audience interaction with the content item, sales performance during the time period of the campaign, week-to-week sales performance from channel partners and retailers, household penetration figures, etc. In some implementations, the recommendation module also can be configured to recommend at least a second target audience for the published content item. For example, the content evaluation system can be configured to determine a second audience among which the content item is likely to perform well according to at least one performance metric, and the recommendation module can generate a recommendation corresponding to this second target audience. The recommendation can then be provided to the user. In this way, the system can inform the user of new target audiences who that the user may not have considered, and which are likely to respond well to the user's content items.

In some implementations, the method 1100 can further include determining an updated score for a published content item (e.g., either an original candidate content item or a transformed content item) based on the response of the target audience to the published content item. Thus, the updated score may indicate that the audience has become either more or less receptive to the content item over time. This operation can be performed, for example, by the performance metric predictor. In some implementations, the performance metric predictor also can be configured to select an additional transformation for the content item based on the updated score. For example, the additional transformation can be selected such that, upon application of the additional transformation to the content item by the content transformation module, a score of the content item is improved relative to the updated score of the content item in its previous state. The user alert module or the recommendation module can be configured to provide a message to the user including a recommendation to apply the additional transformation to the content item.

FIG. 12 is a flow diagram illustrating a method 1200 for evaluating one or more content items in accordance with an illustrative embodiment. In some implementations, the method 1200 can be performed by a system such as the system 1000 shown in FIG. 10. In brief overview, the method 1200 includes receiving a plurality of harvest content items (operation 1205), ranking each of the plurality of harvest content items based on at least one performance metric (operation 1210), determining matching criterion aspects of the plurality of harvest content items (operation 1215), comparing aspects of a first candidate content item with the plurality of harvest content items according to the determined matching criterion aspects (operation 1220), determining a subset of the plurality of harvest content items that are relevant to the first candidate content item based on the comparison of the aspects of the candidate content item with the plurality of harvest content items (operation 1225), calculating a score for the first candidate content item (operation 1130), identifying at least one characteristic of the first candidate content item (operation 1235), and determining whether the identified characteristic of the first candidate content item is associated with a likely increase or a decrease in the score for the first candidate content item (operation 1240).

Referring again to FIG. 12, the operations 1205, 1210, 1215, 1220, and 1225 are similar to operations 1105, 1110, 1115, 1120, and 1125, respectively, of the method 1100 described above, and can be performed in a similar manner. The method 1200 also includes calculating a score for the first candidate content item (operation 1130). In some implementations, this step is carried out by a performance metric predictor such as the performance metric predictor 1060 shown in FIG. 10. The score can be calculated based on at the least one performance metric and at least one target audience. As described above, the user that provides the first candidate content item for analysis also can provide an indication of the performance metric and the target audience to be used in the calculation of this score. Generally, the score may relate to a likelihood that the candidate content item will perform well with the target audience in relation to the selected performance metric. It may also be inferred that more highly scored content items increase the likelihood of higher performing campaigns.

The method 1200 also includes identifying at least one characteristic of the first candidate content item (operation 1235) and determining whether the identified characteristic of the first candidate content item is associated with an increase or a decrease in the score for the first candidate content item (operation 1240). In some implementations, these operations can be performed by a recommendation module such as the recommendation module 1045 shown in FIG. 10. The characteristic can be any type or form of characteristic of the first candidate content item, including any visual, text, or auditory characteristic. In some implementations, the method 1200 can further include providing a message to the user including information corresponding to the determination of whether the identified characteristic of the first candidate content item is associated with an increase of a decrease in the score for the first candidate content item. Thus, the user can be alerted to the fact that the characteristic is predicted to be beneficial or harmful to the performance of the first candidate content item among the target audience. Low performing or low-value characteristics may also be omitted from the set of transformed contents that are presented to the user.

In some implementations, the method 1200 can further include receiving at least a second candidate content item from the user, calculating a score for the second candidate content item, and ranking the first candidate content item and the second candidate content item according to their respective scores. The scoring and ranking of the second candidate content items can be performed, for example, by the performance metric predictor in a manner similar to that used for scoring the first candidate content item. The ranking can indicate which of the first candidate content item and the second candidate content item is likely to perform better with the target audience based on the performance metric. In some implementations, the alert module can also be configured to provide a second message to the user including information corresponding to the ranking of the first candidate content item and the second candidate content item.

Figure 13:
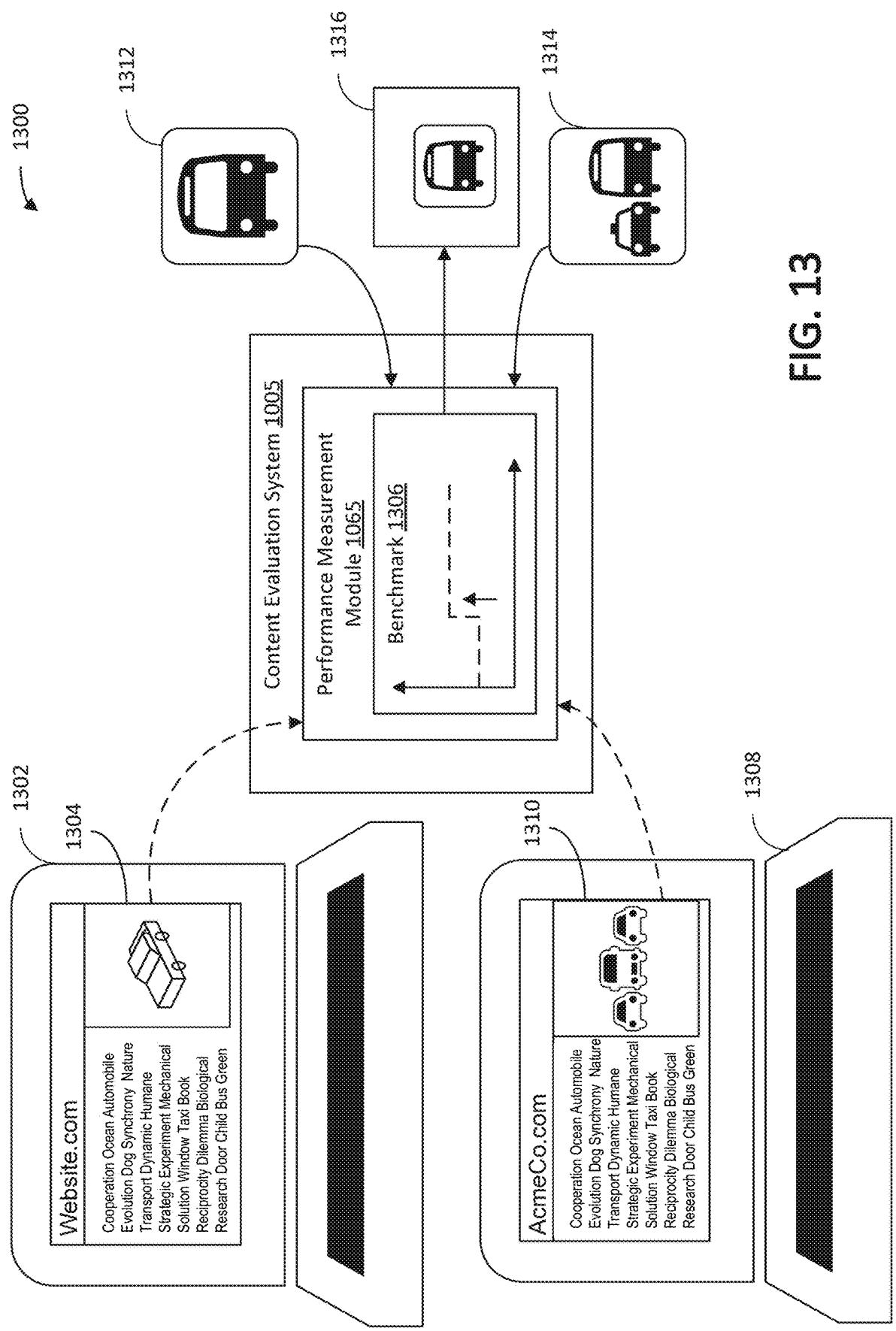
FIG. 13 is a sequence diagram illustrating automatically generating and adjusting a target audience benchmark in accordance with an illustrative embodiment.

FIG. 13 is a sequence diagram illustrating automatically generating and adjusting a target audience benchmark in accordance with an illustrative embodiment. In brief overview, FIG. 13 illustrates a sequence 1300 in which, via the performance measurement module 1065 the content evaluation system 1005 accesses multiple web-based properties (e.g., websites) and extracts content items (e.g., images) from the web-based properties. The measurement module 1065 uses the extracted content items to generate a benchmark for a particular target audience (e.g., subset of people with a common characteristic or a common interest) that indicates the likelihood that a target audience would interact with any particular content item if they were to see it on a website. After generating the target audience benchmark, the content evaluation system 1005 continues to extract images from further web-based properties or monitors (e.g., via webhooks or APIs) the web-based properties for new content items and extracts the new content items from the web-based properties and updates the target audience benchmark to maintain an accurate and up-to-date benchmark. The content evaluation system 1005 then compares new images to the benchmark to determine whether to generate a recommendation to use the new images on websites that have been designated as pertaining to the target audience. As described herein, solely for succinctness, each reference to an image may be a reference to a video.

The content evaluation system 1005 accesses a first web-based property. As described herein, a web-based property may be or include any number of web pages, image files, websites, or other electronic content that can be accessed by the content evaluation system 1005. In some examples, the target audience itself can be defined in terms of one or more web-based properties. For example, the target audience can include users who view, or follow, a particular web-based property, or otherwise engage with its published contents. In some implementations, the target audience may be a group of users that share a common interest (e.g., sports) or characteristic (e.g., age). The first web-based property may be stored on or maintained by a first computing device 1302. The content evaluation system 1005 may access the first web-based property from the first computing device 1302 and extract the images (e.g., image 1304) that are on or that are otherwise associated with the web-based property.

The content evaluation system 1005 may use different techniques to extract images from web-based properties depending on the type of the web-based properties. For example, to extract images from a website, the content evaluation system 1005 uses web scraping techniques. To do so, the content evaluation system 1005 loads the URLs of the different pages of the website and renders each of the pages using their URLs. The content evaluation system 1005 then identifies the images on the pages, selects the images, and creates one or more files that contain the images. In another example, the content evaluation system 1005 extracts images from a web-based database. The database may be a cloud storage database that is accessible to the content evaluation system 1005 and may contain one or more images. The content evaluation system 1005 may transmit a request for images to the computer that hosts or maintains the database and the computer may transmit the images to the content evaluation system 1005.

The content evaluation system 1005 stores the extracted plurality of images in a database (e.g., the database 1008). The content evaluation system 1005 may store the plurality of images in the database with a stored relationship with the same target audience identifier (e.g., a string that is unique to the target audience within the database, such as a sports target audience having a "sports" string identifier) as the target audience identifier of the first web-based property. For instance, the content evaluation system 1005 may store an identifier (e.g., a URL) of the web-based property in a database with an identifier of a particular target audience. The content evaluation system 1005 may determine the extracted images originated at the web-based property based on the content evaluation system 1005 extracting the images from the web-based property. The content evaluation system 1005 identifies the stored association (e.g., a relationship in a relational database) of the web-based property with the target audience and store an association between the extracted images from the web-based property and the target audience identifier accordingly. Thus, if the content evaluation system 1005 ever receives a request to retrieve images that correspond to the target audience, the content evaluation system 1005 may retrieve the images that have stored associations with the target audience identifier in the database to respond to the request.

The content evaluation system 1005 retrieves images from the database that have a stored association with the target audience. The content evaluation system 1005 may retrieve the images in response to a request to generate a target audience benchmark for the target audience. For example, the content evaluation system 1005 may receive a request to generate a target audience benchmark for a target audience that likes sports. In response, the content evaluation system 1005 queries the database using sports as a keyword to identify the images in the database that have a stored relationship with the string sports. In doing so, the content evaluation system 1005 may retrieve the images from the first web-based property and/or images from any other web-based property that has a stored association with the string sports in the database.

The content evaluation system 1005 executes a neural network (or any other machine learning model) to generate a performance score (e.g., a score indicating a likelihood that a particular user would interact with an image) for each of the retrieved images. The content evaluation system 1005 may execute the neural network using the retrieved images as input to generate performance scores for each of the images.

In some implementations, the content evaluation system 1005 inputs the images into the neural network one image at a time by creating feature vectors from the images. To do so, for each image, the content evaluation system 1005 may extract pixel data (e.g., values indicating different characteristics about the pixels of the image such as color, hue, brightness, etc.) and create a vector with the extracted values. In some implementations, the content evaluation system extracts features from the image using a feature extraction neural network and creates a vector with the extracted features. The content evaluation system 1005 applies the feature vector into the neural network and the neural network may output a performance score for the image. The content evaluation system 1005 may iteratively create feature vectors for each of the images that were stored in the database with associations with the target audience identifier to generate performance scores for each of the images.

In some implementations, the content evaluation system 1005 may create feature vectors from images by extracting individual features from the images. For example, the content evaluation system 1005 may input an image into a feature extraction neural network. The feature extraction neural network may be configured to automatically extract features from the image. Such features are or include descriptors of the image such as identifications of objects within the image, colors within the image, scenery within the image, shades of colors within the image, etc. In this example, the content evaluation system 1005 executes the feature extraction neural network with the image and outputs values for the different features, thus extracting features from the image. The content evaluation system 1005 formats the extracted features into a feature vector for the image by setting the values for the extracted at different index values of the vector. The content evaluation system 1005 then stores the feature vector in the database with associations with the target audience identifier. The content evaluation system 1005 may similarly generate feature vectors for any number of images. Further detail about how the content evaluation system 1005 can extract features from an image to create a feature vector using a neural network can be found in U.S. patent application Ser. No. 16/236,298, the entirety of which is incorporated by reference herein.

In some implementations, the content evaluation system 1005 retrieves the neural network responsive to the neural network being trained to simulate the target audience when generating performance scores for images. The content evaluation system 1005 may retrieve the neural network that corresponds to the target audience by selecting the neural network from a plurality of neural networks based on the neural network having a stored relationship with the target audience identifier of the target audience for which the target audience is generating a benchmark. Advantageously, by using a neural network that has been trained to generate performance scores for a particular target audience, the content evaluation system 1005 is able to more accurately predict performance scores for images that correspond to the specific target audience.

In some implementations, the content evaluation system 1005 has previously trained the neural network to simulate the target audience. For example, the content evaluation system 1005 may train the neural network using images from web-based properties that correspond to the target audience. The content evaluation system 1005 may train the neural network using image metadata such as interaction data (e.g., amount of time viewed, number of comments, number of likes, ratings, etc.) indicating an amount of interaction users had with the images. For instance, the content evaluation system 1005 may input training images from web-based properties that correspond to the target audience into the neural network. The content evaluation system 1005 executes the neural network using the training images as inputs to generate performance scores. The content evaluation system 1005 then uses the interaction data for the individual images as labels for the correct performance scores. The content evaluation system 1005 may use back-propagation techniques based on differences between the predicted performance scores and the interaction data to tune weights of the neural network to more accurately predict performance scores for images in the future. Advantageously, by generating a neural network in this manner, the content evaluation system 1005 may be able to accurately simulate individual target audiences to determine how images will perform for the respective target audiences. Further detail about how the content evaluation system 1005 can train a neural network to simulate a particular target audience can be found in U.S. patent application Ser. No. 16/236,298.

The content evaluation system 1005 calculates a target audience benchmark 1306. The content evaluation system 1005 may calculate the target audience benchmark 1306 by calculating an average, median, or mode of the performance scores that were generated by the neural network. For example, if executing the neural network for five images caused the neural network to generate performance scores of 20, 25, 50, 75, and 90, the content evaluation system 1005 may calculate the median of the performance scores to be 50. The content evaluation system 1005 will then set the benchmark 1306 for the target audience by storing the value of 50 in a database as the benchmark for the target audience (e.g., store an association between a benchmark identifier and the calculated value). The content evaluation system 1005 may use any function on the performance score for the images to calculate the benchmark 1306 for the target audience.

In some implementations, the content evaluation system 1005 calculates a distribution of performance scores when calculating the target audience benchmark for a target audience. The distribution is or includes counts of the number of images of the target audience with performance scores at set performance score values or within different performance score ranges. For example, the content evaluation system 1005 may maintain a counter for each of performance score ranges 1-25, 26-50, 51-75, and 76-100. In this example, the content evaluation system 1005 applies the images of the target audience to the neural network to determine a performance score for each image and increments the counters that correspond to each range when the neural network outputs a performance score for the respective range. In implementations in which the content evaluation system 1005 determines distributions for set performance score values, the content evaluation system 1005 similarly maintains and increments counters for each value (e.g., each value between 1 and 100). The content evaluation system 1005 may continue to update the distribution (e.g., increment the counters of the distribution) as the content evaluation system 1005 ingests further images. In response to any requests to evaluate an image's performance score with the target audience, the content evaluation system 1005 generates and presents a user interface that includes the distribution with the performance score for the image at the requesting device. Thus, the content evaluation system 1005 provides a graphical representation of how the evaluated image compares with other images that are associated with the same target audience.

In some implementations, the content evaluation system 1005 accesses a second web-based property from a second computing device 1308. The content evaluation system 1005 may access the second web-based property responsive to determining the second web-based property has a stored association with the same target audience identifier as the first web-based property. For example, the first web-based property may have a stored association with a "sports" string in the database. The content evaluation system 1005 may query the database using the sports string as a keyword to identify another web-based property (e.g., a URL of another web-based property) that has a stored association with a sports string. In this example, the content evaluation system 1005 identifies the second web-based property based on the query and accesses and extracts images from the second web-based property. The content evaluation system 1005 may do so similar to how the content evaluation system 1005 accesses and extracts images from the first web-based property. The content evaluation system 1005 then stores the extracted images in the database with stored associations with the target audience identifier similar to how the data processing stored the images from the first web-based property.

The content evaluation system 1005 adjusts the benchmark 1306 for the target audience based on the images from the second web-based property. The content evaluation system 1005 may do so by generating performance scores for the images from the second web-based property (e.g., image 1310) using the neural network and recalculating the benchmark 1306 based on the new performance scores. For example, the content evaluation system 1005 may input the images from the second web-based property into the neural network to generate a performance score for each image. The content evaluation system 1005 may then aggregate the performance scores into a data set with the performance scores for the images from the first web-based property. The content evaluation system 1005 determines the average (or any other metric as described above) of the performance scores of the data set and set the new average of the performance scores to be the new benchmark 1306, thus increasing or decreasing the benchmark 1306 for the target audience to a more refined value.

After generating and/or adjusting the benchmark 1306, the data processing system uses the benchmark 1306 to determine whether to recommend uploading an image. For instance, the data processing system may receive two uploaded images, image 1312 and image 1314. The data processing system receives the images 1312 and 1314 after a user uploads the images 1312 and 1314 via a user interface on a computing device. The data processing system receives a request to score the uploaded images 1312 and 1314 for a target audience (e.g., the same target audience for which the content evaluation system 1005 generated the benchmark 1306). The content evaluation system 1005 may receive the request after a user selects the target audience at a user interface (e.g., the same interface that the user used to upload the images). The user may have selected the target audience from a drop-down list on the user interface or otherwise provided an indication to score the images from the user interface.

The content evaluation system 1005 selects the neural network. The content evaluation system 1005 may select the neural network from the database based on the target audience for which the user requested performance scores. For example, the content evaluation system 1005 may select the neural network by using an identifier for the target audience as a lookup in the database and retrieve the neural network that has a stored association with a matching identifier.

The content evaluation system 1005 executes the neural network to determine performance scores for the two uploaded images 1312 and 1314. To do so, the content evaluation system 1005 may generate a feature vector for each of the images 1312 and 1314 as described above. The content evaluation system 1005 may then separately input or apply the feature vectors to the neural network to generate a first performance score for the image 1312 and a second performance score for the image 1314.

The content evaluation system 1005 compares the performance scores to the benchmark 1306. The content evaluation system 1005 may compare the first performance score to the benchmark 1306 to determine a first difference between the first performance score and the benchmark 1306. The content evaluation system 1005 may compare the second performance score to the benchmark 1306 to determine a second difference between the second performance score and the benchmark 1306. Such differences may be positive or negative depending on whether the performance scores are higher or lower than the benchmark 1306.

Accordingly, because the benchmark 1306 represents an average or is otherwise representative of how other images typically score with the target audience, the data processing system may determine how the images would perform with the target audience compared to the average image. Such may be advantageous, for example, if a particular target audience is not prone to interacting with images on web-based properties, thus causing performance scores of images for the target audience to be lower than typical scores for other target audiences. A user seeking to evaluate images against a metric that is specific to the target audience to avoid audience bias (e.g., if a target audience typically has average performance scores of 20 out of 100, a performance score for an image of 30 would be considered high even though the average performance score for all target audiences together may be 50) may use the benchmark 1306 to avoid such bias when selecting images.

The content evaluation system 1005 compares the first difference to the second difference. The content evaluation system 1005 may do so by determining if the first difference is higher than the second difference. Responsive to determining the first difference is higher than the second difference, the content evaluation system 1005 generates a record 1316 (e.g., a file, document, table, listing, message, notification, etc.) comprising an identification of the image 1312. Responsive to determining the second difference is higher than the first difference, the content evaluation system 1005 generates a record (not shown) comprising an identification for the image 1314.

In some implementations, the content evaluation system 1005 generates the records for the image 1312 or the image 1314 by generating a recommendation to upload the image 1312 or the image 1314 to a web-based property. The recommendation may include a string of text that includes identifications of the images (e.g., "Image A" or "Image B"). The content evaluation system 1005 generates the record and transmits the record to the computing device that submitted the request to score the images. Thus, the content evaluation system 1005 automatically determines which images to recommend uploading to a web-based property to optimize the performance of the images. The content evaluation system 1005 may do so while minimizing the number of images (and therefore the computer resource requirements) that are required to obtain a target interaction rate for a particular web-based property.

Figure 14:
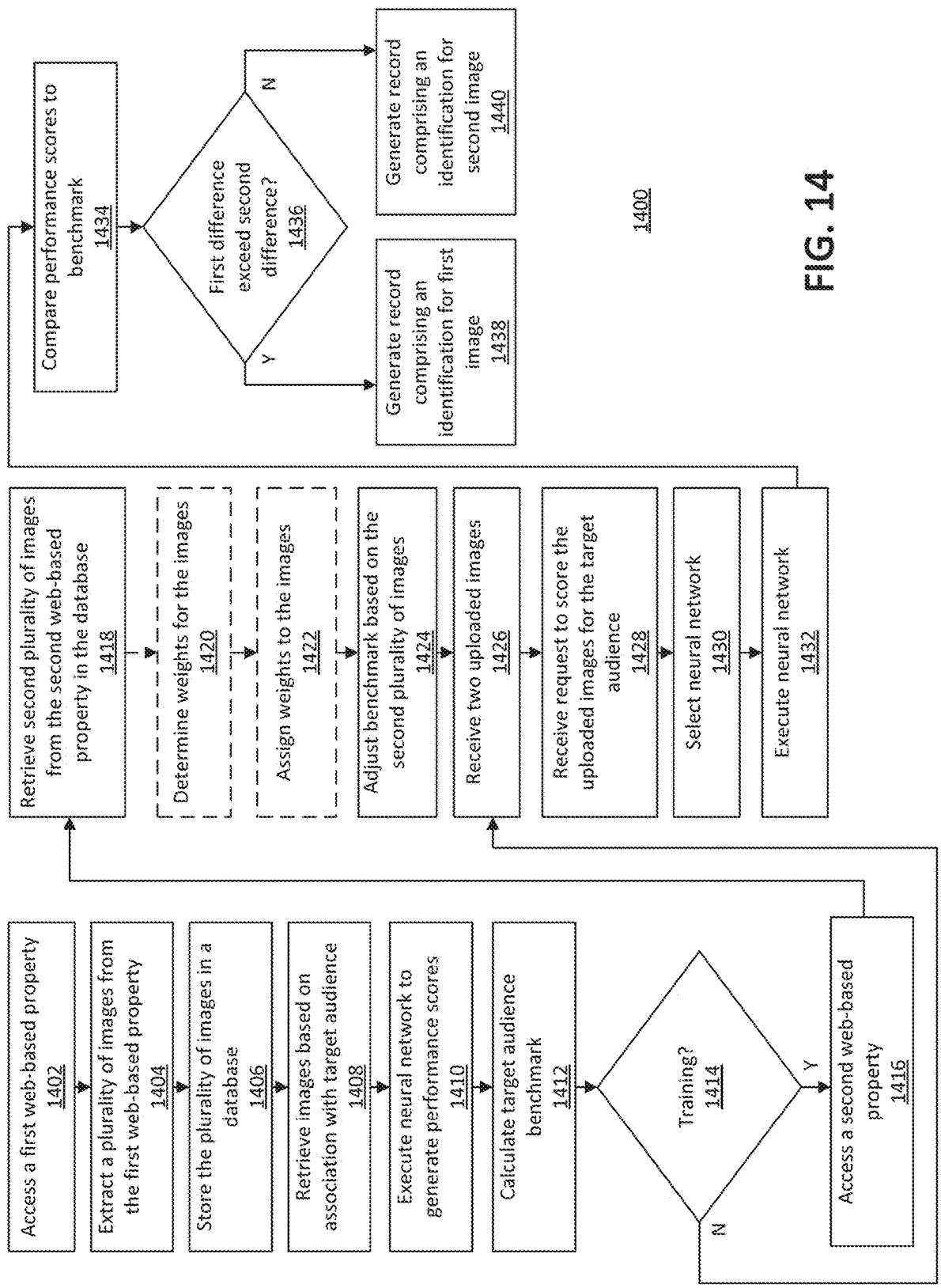
FIG. 14 is a flow diagram illustrating a method for automatic benchmark generation in accordance with an illustrative embodiment.

FIG. 14 is a flow diagram illustrating a method for automatic benchmark generation in accordance with an illustrative embodiment. In some implementations, the method 1400 can be performed by a data processing system such as any of the components of the system 1000 shown in FIG. 10. The method 1400 may include more or fewer operations and the operations may be performed in any order. Performance of method 1400 may enable the data processing system to generate performance score benchmarks for different target audiences using a machine learning model. The performance scores may indicate how the images will likely perform with a target audience (e.g., how likely members of the target audience are to interact with the image). For example, using one or more neural networks, the data processing system generates a benchmark for a target audience based on images or other content items from various web-based properties that have stored associations with the target audience. The data processing system then compares new images to the benchmark to determine whether to recommend for the new images to be uploaded to a website that is typically visited by members of the target audience. As described herein, solely for succinctness, each reference to an image may be a reference to a video.

At operation 1402, the data processing system accesses a first web-based property. As described herein, a web-based property may be or include any number of web pages, image files, websites, or other electronic content that can be accessed by the data processing system. In some examples, the target audience itself can be defined in terms of one or more web-based properties. For example, the target audience can include users who view, or follow, a particular web-based property, or otherwise engage with its published contents. In some implementations, the target audience may be a group of users that share a common interest (e.g., sports) or characteristic (e.g., age). The data processing system may access the first web-based property and, at operation 1404, extract the images that are on or that are otherwise associated with the web-based property.

The data processing system may use different techniques to extract images from web-based properties depending on the type of the web-based properties. For example, to extract images from a website, the data processing system may use web scraping techniques. To do so, the data processing system loads the URLs of the different pages of the website and render each of the pages using their URLs. The data processing system then identifies the images on the pages, select the images, and create one or more files that contain the images. In another example, the data processing system extracts images from a web-based database. The database may be a cloud storage database that is accessible to the data processing system and may contain one or more images. The data processing system may transmit a request for images to the computer that hosts or maintains the database and the computer may transmit the images to the data processing system.

At operation 1406, the data processing system stores the extracted plurality of images in a database. The data processing system may store the plurality of images in the database with a stored relationship with the same target audience identifier (e.g., a string that is unique to the target audience within the database, such as a sports target audience having a "sports" string identifier) as the target audience identifier of the first web-based property. For instance, the data processing system may store an identifier (e.g., a URL) of the web-based property in a database with an identifier of a particular target audience. The data processing system may determine the extracted images originated at the web-based property based on the data processing system extracting the images from the web-based property. The data processing system may identify the stored association (e.g., a relationship in a relational database) of the web-based property with the target audience and store an association between the extracted images from the web-based property and the target audience identifier accordingly. Thus, if the data processing system ever receives a request to retrieve images that correspond to the target audience, the data processing system may retrieve the images that have stored associations with the target audience identifier in the database to respond to the request.

At operation 1408, the data processing system retrieves images from the database that have a stored association with the target audience. The data processing system may retrieve the images in response to a request to generate a target audience benchmark for the target audience. For example, the data processing system may receive a request to generate a target audience benchmark for a target audience that likes sports. In this example, the data processing system queries the database using sports as a keyword to identify the images in the database that have a stored relationship with the string sports. In doing so, the data processing system may retrieve the images from the first web-based property and/or images from any other web-based property that has a stored association with the string sports in the database.

At operation 1410, the data processing system executes a neural network (or any other machine learning model) to generate a performance score (e.g., a score indicating a likelihood that a particular user would interact with an image) for each of the retrieved images. The data processing system may execute the neural network using the retrieved images as input to generate performance scores for each of the images.

In some implementations, the data processing system inputs the images into the neural network one image at a time by creating feature vectors from the images. To do so, for each image, the data processing system may extract pixel data (e.g., values indicating different characteristics about the pixels of the image such as color, hue, brightness, etc.) and create a vector with the extracted values. In some implementations, the content evaluation system 1005 extracts features from the image using a feature extraction neural network and creates a vector with the extracted features. The data processing system applies the vector into the neural network and the neural network outputs a score for the image. The data processing system may iteratively create feature vectors for each of the images that were stored in the database with associations with the target audience identifier to generate performance scores for each of the images.

In some implementations, the content evaluation system 1005 creates feature vectors from images by extracting individual features from the images. For example, the content evaluation system 1005 may input an image into a feature extraction neural network. The feature extraction neural network automatically extracts features from the image. Such features are or include descriptors of the image such as identifications of objects within the image, colors within the image, scenery within the image, shades of colors within the image, etc. The content evaluation system 1005 executes the feature extraction neural network with the image and outputs values for the different features, thus extracting features from the image. The content evaluation system 1005 may format the extracted features into a feature vector for the image by setting the values for the extracted at different index values of the vector. The content evaluation system 1005 may then store the feature vector in the database with associations with the target audience identifier. The content evaluation system 1005 may similarly generate feature vectors for any number of images.

In some implementations, the data processing system retrieves the neural network, responsive to the neural network being trained to simulate the target audience when generating performance scores for images. The data processing system may retrieve the neural network that corresponds to the target audience by selecting the neural network from a plurality of neural networks based on the neural network having a stored relationship with the target audience identifier of the target audience for which the target audience is generating a benchmark. Advantageously, by using a neural network that has been trained to generate performance scores for a particular target audience, the data processing system may be able to more accurately predict performance scores for images that correspond to the specific target audience.

In some implementations, the data processing system has previously trained the neural network to simulate the target audience. For example, the data processing system may train the neural network using images from web-based properties that correspond to the target audience. The data processing system may train the neural network using image meta data such as interaction data (e.g., amount of time viewed, number of comments, number of likes, ratings, etc.) indicating an amount of interaction users had with the images. For instance, the data processing system may input training images from web-based properties that correspond to the target audience into the neural network. The data processing system executes the neural network using the training images as inputs to generate performance scores. The data processing system then uses the interaction data for the individual images as labels for the correct performance scores. The data processing system uses back-propagation techniques based on differences between the predicted performance scores and the interaction data to tune weights of the neural network to more accurately predict performance scores for images in the future. Advantageously, by generating a neural network in this manner, the data processing system may be able to accurately simulate individual target audiences to determine how images will perform for the respective target audiences.

At operation 1412, the data processing system calculates a target audience benchmark. The data processing system may calculate the target audience benchmark by calculating an average, median, or mode of the performance scores that were generated by the neural network. For example, if executing the neural network for five images caused the neural network to generate performance scores of 20, 25, 50, 75, and 90, the data processing system may calculate the median of the performance scores to be 50. The data processing system may set the benchmark for the target audience by storing the value of 50 in a database as the benchmark for the target audience (e.g., store an association between a benchmark identifier and the calculated value). The data processing system may use any function on the performance score for the images to calculate the benchmark for the target audience.

In some implementations, the data processing system calculates a distribution of performance scores when calculating the target audience benchmark for a target audience. The distribution is or includes counts of the number of images of the target audience with performance scores at set performance score values or within different performance score ranges. For example, the data processing system may maintain a counter for each of performance score ranges 1-25, 26-50, 51-75, and 76-100. In this example, the data processing system applies the images of the target audience to the neural network to determine a performance score for each image and increments the counters that correspond to each range when the neural network outputs a performance score for the respective range. In implementations in which the data processing system determines distributions for set performance score values, the data processing system similarly maintains and increments counters for each value (e.g., each value between 1 and 100). The data processing system may continue to update the distribution (e.g., increment the counters of the distribution) as the data processing system ingests further images. In response to any requests to evaluate an image's performance score with the target audience, the data processing system generates and presents a user interface that includes the distribution with the performance score for the image at the requesting device. Thus, the data processing system may provide a graphical representation of how the evaluated image compares with other images that are associated with the same target audience.

In some implementations, at operation 1414, the data processing system determines whether to train or adjust the target audience benchmark. The data processing system may do so by determining if an internal configuration or setting of the data processing system indicates for the data processing system to extract images from another web-based property. Such a setting may be configured by a user seeking to improve the accuracy of the target audience benchmark. If the data processing system identifies a setting or configuration to train or adjust the target audience benchmark, at operation 1416, the data processing system may access another web-based property. Otherwise, the method proceeds to operation 1426, as described below.

If the data processing system identifies a setting or configuration to train or adjust the target audience benchmark, at operation 1416, the data processing system accesses a second web-based property. The data processing system may access the second web-based property responsive to determining the second web-based property has a stored association with the same target audience identifier as the first web-based property. For example, the first web-based property may have a stored association with a "sports" string in the database. The data processing system may query the database using the sports string as a keyword to identify another web-based property (e.g., a URL of another web-based property) that has a stored association with a sports string. The data processing system may identify the second web-based property based on the query and access and extract images from the second web-based property. The data processing system may do so similar to how the data processing system accesses and extracts images from the first web-based property in operations 1402 and 1404. The data processing system then stores the extracted images in the database with stored associations with the target audience identifier similar to how the data processing stored the images from the first web-based property in operation 1406.

In some implementations, at operation 1420, the data processing system determines weights for the extracted images. The data processing system may determine weights for the extracted images based on the web-based properties from which the images originated (e.g., the web-based properties from which the images were extracted). For example, the data processing system may store weights for the web-based properties in the database. Each web-based property may have a stored association with a different weight. The data processing system may determine the weights for the extracted images from the first and second web-based properties by identifying images that originated at the first web-based property, identifying the images that originated at the second web-based property, and determining the weights for each image based on the web-based property from which the images originated. At operation 1422, the data processing system assigns the determined weights to the corresponding images (e.g., tag the weights to identifiers of the images or generate vectors that include the weights at and identifiers at set index values).

In some implementations, the data processing system determines the weights for the web-based properties. The data processing system may determine the weights based on a variety of criteria, such as the number of images that are stored in the respective web-based property, the amount of image interaction that typically occurs on the web-based property, the number of visitors the web-based properties typically receive, etc. For instance, the data processing system may determine weights for web-based properties to be higher the higher the number of visitors that visit the web-based properties, the higher the number of images the web-based properties contain, the higher the amount of image interaction that typically occurs on the web-based property, etc. The data processing system may determine the weights for the web-based properties to be lower if any of such values are lower. In some implementations, the data processing system may determine the weights based on a combination of such criteria such that the data processing system increases or decreases a weight for a web-based property based on the values of each of the aforementioned criteria (e.g., the data processing system may increase a weight for a large traffic volume and decrease the same weight for a low number of images). In some implementations, users may input the weights at a user interface into the data processing system.

In some implementations, the weights dynamically change over time. For example, the data processing system may monitor the web-based properties (e.g., use webhooks on the web-based properties or poll the web-based properties at set intervals) or receive new data about the web-based properties that change the values of the criteria that the data processing system uses to determine the weights. For instance, the data processing system may receive data indicating that more images have been added to a web-based property. Accordingly, the data processing system may increase a stored value of the number of images that are stored on the web-based property and increase or otherwise recalculate the weight for the web-based property based on the new value and any other criteria that the data processing system used to calculate the previous weight. The data processing system may use similar processes to calculate weights based on new data or values from any number of different types of criteria (e.g., increase or decrease the weights as more or fewer visitors visit the web-based properties, people interact with the web-based properties more or less often, etc.). Thus, the data processing system may continuously refine the weights for the different web-based properties over time.

At operation 1424, the data processing system adjusts the benchmark for the target audience based on the images from the second web-based property. The data processing system may do so by generating performance scores for the images from the second web-based property using the neural network and recalculating the benchmark based on the new performance scores. For example, the data processing system may input the images from the second web-based property into the neural network to generate a performance score for each image. The data processing system may then aggregate the performance scores into a data set with the performance scores for the images from the first web-based property. The data processing system may determine the average (or any other metric as described above) of the performance scores of the data set and set the new average of the performance scores to be the new benchmark, thus increasing or decreasing the benchmark for the target audience to a more refined value.

In implementations in which the data processing system applies weights to the different images, the data processing system adjusts or generates the benchmark for the target audience based on the weights. For example, the data processing system may determine a weighted average of the performance scores based on the weights that the data processing system applied to the images. The data processing system may set the weighted average to be the benchmark, thus enabling the data processing system to have more control over the data that the data processing system uses to generate the benchmark and to avoid using data from irrelevant or inaccurate web-based properties.

In some implementations, the data processing system updates the benchmark over time based on changes to the weights for the different web-based properties, as described above. For example, the data processing system may update a weight for a web-based property that corresponds to the target audience. The update may trigger the data processing system to reapply the weights to the images (e.g., replace the previous weight values with the new weight values) that originated at the web-based property. The data processing system may then recalculate the benchmark for the target audience using the new weight for the web-based property and the weights for any other images that correspond to the target audience. Accordingly, the data processing system may continually tune the benchmark over time as the data processing system gains access to more data.

In some implementations, the data processing system is configured to train or adjust the target audience benchmark by monitoring the web-based properties at set time intervals or for any changes in images that are uploaded to the web-based properties. The data processing system may do so using webhooks that are set to provide identifiers of any new images that are uploaded to the web-based property and/or APIs that communicate with the web-based properties. Through the APIs, the data processing system may request (e.g., poll) the web-based properties at set time intervals for information about the images that are uploaded to the web-based properties. In some implementations, the data processing system may be configured to web scrape the web-based properties at set time intervals to identify any new images (e.g., images with identifiers that do not match any identifiers in the database in which images are stored). If the data processing system identifies any new images that have been uploaded to a web-based property, the data processing system may use the new images to generate a new benchmark for the target audience by recalculating the benchmark with performance scores for the new images.

After generating and/or adjusting the benchmark, the data processing system uses the benchmark to determine whether to recommend uploading an image. For instance, at operation 1426, the data processing system receives two uploaded images. The data processing system may receive the images after a user uploads the images via a user interface on a computing device. At operation 1428, the data processing system receives a request to score the uploaded images for a target audience (e.g., the same target audience for which the data processing system generated the benchmark). The data processing system may receive the request after a user selects the target audience at a user interface (e.g., the same interface that the user used to upload the images). The user may have selected the target audience from a drop-down list on the user interface or otherwise provided an indication to score the images from the user interface.

At operation 1430, the data processing system selects the neural network. The data processing system may select the neural network from the database based on the target audience for which the user requested performance scores. For example, the data processing system may select the neural network by using an identifier for the target audience as a lookup in the database and retrieve the neural network that has a stored association with a matching identifier.

At operation 1432, the data processing system executes the neural network to determine performance scores for the two uploaded images. To do so, the data processing system may generate a feature vector for each of the images as described above. The data processing system may then separately input or apply the feature vectors to the neural network to generate a first performance score for the first image and a second performance score for the second image.

At operation 1434, the data processing system compares the performance scores to the benchmark. The data processing system compares the first performance score to the benchmark to determine a first difference between the first performance score and the benchmark. The data processing system may compare the second performance score to the benchmark to determine a second difference between the second performance score and the benchmark. Such differences may be positive or negative depending on whether the performance scores are higher or lower than the benchmark. Accordingly, because the benchmark represents an average or is otherwise representative of how other images typically score with the target audience, the data processing system may determine how the images would perform with the target audience compared to the average image. Such may be advantageous, for example, if a particular target audience is not prone to interacting with images on web-based properties, thus causing performance scores of images for the target audience to be lower than typical scores for other target audiences. A user seeking to evaluate images against a metric that is specific to the target audience to avoid audience bias (e.g., if a target audience typically has average performance scores of 20 out of 100, a performance score for an image of 30 would be considered high even though the average performance score for all target audiences together may be 50) may use the benchmark to avoid such bias.

At operation 1436, the data processing system compares the first difference to the second difference. The data processing system may do so by determining if the first difference is higher than the second difference. Responsive to determining the first difference is higher than the second difference, at operation 1438, the data processing system generates a record (e.g., a file, document, table, listing, message, notification, etc.) comprising an identification of the first image. Responsive to determining the second difference is higher than the first difference, at operation 1440, the data processing system generates a record comprising an identification for the second image. In some implementations, the data processing system compares the performance scores for images and recommend the image with the higher performance score.

In some implementations, the data processing system generates the records for the first image or the second image by generating a recommendation to upload the first image or the second image to a web-based property. The recommendation may include a string of text that includes identifications of the images (e.g., "Image A" or "Image B"). The data processing system may generate the record and transmit the record to the computing device that submitted the request to score the images. Thus, the data processing system automatically determines which images to recommend uploading to a web-based property to optimize the performance of the images. The data processing system may do so while minimizing the number of images (and therefore the computer resource requirements) that are required to obtain a target interaction rate for a particular web-based property.

In some implementations, the record includes other recommendations for actions to take with an identified image (e.g., an image selected based on its performance score in comparison to a benchmark). Examples of such recommendations include, but are not limited to, a recommendation to include the image or video in a market test or research study, a recommendation to view an image that's determined to be a likely higher performer than the image (e.g., a stored image that has a higher performance score with the target audience), a recommendation to share a link to the image, a recommendation to upload an alternate image or video to a website because the image has a low score compared to the benchmark (e.g., a score lower than the benchmark by a defined amount), a recommendation to include specific subject matter in the image or make a stylistic or compositional alternation to the image as described herein, a recommendation to view image insights and heat maps (as described in U.S. application Ser. Nos. 17/316,503 and 16/537,426, the entirety of each of which is incorporated by reference herein) and see how the image can be tweaked to improve the performance score, a recommendation to view image trends (e.g., a selection of images that score well or better than the image), a recommendation to download the image, and/or a recommendation to view the image that is associated with the target audience with the highest performance score.

In some implementations, instead of comparing differences of two images with the benchmark between each other, the data processing system determines whether to recommend individual images. For instance, the data processing system may determine the difference between a performance score of an image and the benchmark. The data processing system may then compare the difference to a threshold (e.g., a predetermined threshold). If the performance score exceeds the threshold, the data processing system generates a record recommending to upload the image to a web-based property. Otherwise, the data processing generates an alert or notification indicating that the image should not be uploaded to the web-based property. Thus, the data processing system automatically determines whether to upload individual images to a web-based property.

In some implementations, the data processing system uses a combination of the comparison between the images and the threshold to determine whether to recommend to upload an image. For example, the data processing system may compare the differences between two images, image A and image B, and the benchmark and determine the difference for image A is higher than image B. The data processing system may then compare the difference for image A to a threshold. If the data processing system determines the difference for image A does not exceed the threshold, the data processing system generates an alert or notification indicating image A should not be uploaded to the web-based property. Otherwise, the data processing system determines to recommend uploading image A to the web-based property. The data processing system may use any such uploading criteria to determine whether to recommend uploading images to web-based properties.

In some implementations, the data processing system stores and dynamically updates differences between the benchmark and performance scores for images as the data processing system updates the benchmark. For example, the data processing system may determine a performance score and a difference for an image based on a benchmark for a particular target audience. The data processing system may store the performance score and difference for the image in a database with associations between the performance score and difference and an identifier for the target audience and/or an identifier for the image. The data processing system may then extract or otherwise exhume further images and update the benchmark for the target audience based on the new images. Upon updating the benchmark, the data processing system may identify the performance score for the image based on the performance score having a stored association with the target audience identifier and recalculate the difference for the image based on the updated benchmark. The data processing system may then replace the previous difference with the new difference or add the new difference to the data structure that includes the previous difference to indicate the new difference. The data processing system may similarly update any number of differences for images and/or target audiences as the data processing system updates the benchmarks.

In some implementations, upon updating the stored differences for the images, the data processing system notifies a user if the new difference satisfies an upload criteria. For example, if the data processing system had previously determined the difference for an image did not satisfy a threshold to recommend uploading the image to a web-based property, the data processing system may compare the new difference to the threshold again. If the data processing system determines the new difference satisfies the threshold, the data processing system may generate and transmit a record with a recommendation to upload the image to a web-based property to a computing device. The data processing system may similarly determine whether other uploading criteria are met to determine whether to recommend to upload an image to a web-based property (e.g., compare new differences between images and recommend uploading a new image and/or removing an old image if the new image now has a difference that exceeds the old image).

In some implementations, the data processing system determines whether an image is the highest scoring image of the images that are available to the user that requested that the image be evaluated. For example, a user may be associated with an entity (e.g., a company or organization) that owns a set of images. The data processing system may have scored each of the images of the set as described herein and stored the images with their scores in a database with stored relationships with an identifier for the entity. In this example, the data processing system identifies the performance score for the image and compares the performance score with the performance scores of the images in the database that correspond to the entity. If the image has the highest performance score, the data processing system generates a record indicating the image has the highest performance score. If the image does not have the highest performance score, the data processing system retrieves the image with the highest performance score (or an identifier of such an image) and transmits a recommendation identifying the higher scoring image. Thus, the data processing system may provide recommendations for images to upload to a website or to otherwise use and to which a user has access and ensure the user uses the highest scoring image.

Figure 15:
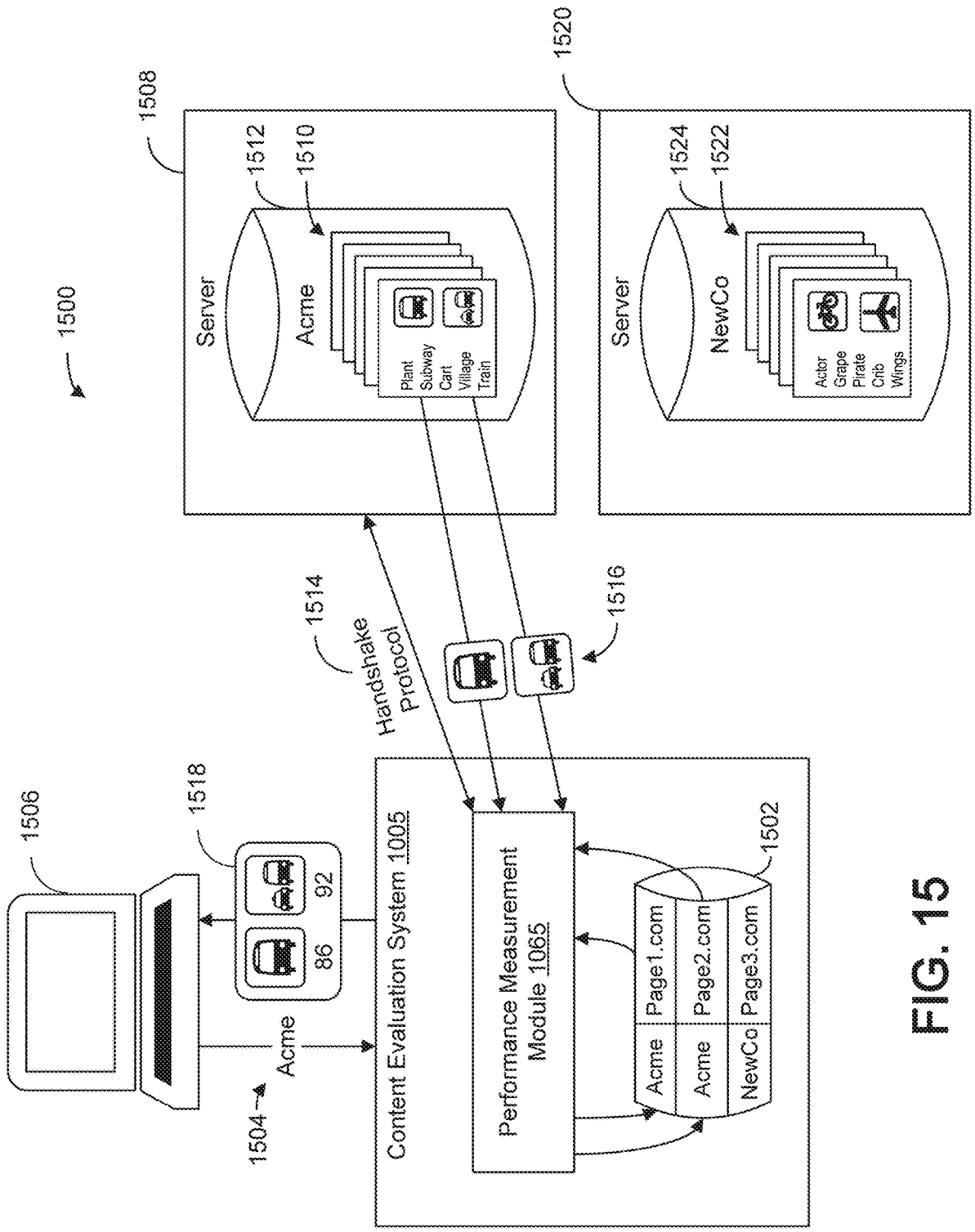
FIG. 15 is a sequence diagram illustrating image scoring using selective web crawling in accordance with an illustrative embodiment.

FIG. 15 is a sequence diagram illustrating image scoring using selective web crawling in accordance with an illustrative embodiment. In brief overview, FIG. 15 illustrates a sequence 1500 in which, via the performance measurement module 1065, the content evaluation system 1005 responds to a request for performance scores from a client device (e.g., a computing device) for images that are on web pages of a particular group entity. The content evaluation system 1005 accesses multiple web pages and extracts content items (e.g., images) from the web-based properties. After receiving the request, the content evaluation system 1005 may search a database using a string identifying the group entity from the request as a key. The content evaluation system 1005 may identify pointers in the database 1504 through the query and use the pointers to retrieve web pages 1506 from a web server. The content evaluation system 1005 may extract images from the retrieved web pages, calculate scores for the images, and transmit the images and the corresponding scores to the requesting client device. Accordingly, the content evaluation system 1005 may provide a real-time view into the performance scores of images that are on web pages of a particular entity (e.g., a group entity) without using the memory resources to store the images locally over a long period of time. As described herein, solely for succinctness, each reference to an image may additionally or instead be a reference to a video.

The content evaluation system 1005 stores a database 1502 comprising a plurality of pointers. The database 1502 may be or include a relational database that stores pointers and identifications of entities (e.g., group entities) in separate database entries (e.g., rows in the database). The pointers may be uniform resource locators (e.g., URLs) that the content evaluation system 1005 can use to access web pages that are associated with the respective URLs. Each pointer in the database 1502 may have a stored association (e.g., a stored relationship, such as being stored in the same entry) in the database 1502 with an identification of an entity that owns or manages the web page associated with the pointer. Individual identifications of entities may have one or more multiple stored associations with different web pages, depending on the number of web pages the respective entities own or manage. Content evaluation system 1005 may use the pointers to establish connections with servers that host various websites (or any other computing devices that store or host websites) to retrieve the images that are stored on the websites.

In some embodiments, the content evaluation system 1005 may store target audience identifications in the database 1502. Target audience identifications can be string identifications of target audiences. The content evaluation system 1005 may store the target audience identifications with stored associations with the respective web pages or websites in the database 1502. As described in more detail above, target audiences may be associated with web pages or websites if users that fall within the target audience typically view or follow the particular subject matter of the respective web pages or websites (e.g., a website may appeal to individuals are interested in camping or sports).

The content evaluation system 1005 receives a request 1504. The content evaluation system 1005 may receive the request 1504 from a client device 1506 (e.g., a computing device). The request 1504 may be or include a data packet that includes an identifier of an entity. The entity may be a group or an individual entity that owns or manages one or more websites or web pages. The request 1504 may be a request for the content evaluation system 1005 to retrieve images from the web pages that the entity owns or manages and to calculate performance scores (e.g., scores indicating how likely users would be to interact with the images if they were viewing the images on a web page) for the images. For example, the content evaluation system 1005 may receive a request that includes a string identifying "Company A." The request 1504 may be a request for performance scores for the images that Company A has posted on the web pages that a server owned or managed by Company A hosts.

In some embodiments, the request 1504 includes a target audience identifier. The target audience identifier may be a string that indicates a target audience for which the requesting client device 1506 is requesting performance scores. For example, the request 1504 may include a string identifying Company A and a string identifying a "sports" target audience. In this example, the request 1504 may be a request for performance scores for the images that Company A has posted on web pages that are associated with the sports target audience and that a server owned by Company A hosts.

The content evaluation system 1005 determines if there is an identifier in the database 1502 that matches the identification in the request 1504. For example, the content evaluation system 1005 may store multiple identifiers for entities in the database 1502 that are associated with different entities. The content evaluation system 1005 may query entries in the database 1502 using the identification from the request 1504 as a key. If the content evaluation system 1005 is not able to identify any identifiers in the database 1502 that match the identification, the content evaluation system 1005 may generate an alert indicating no match could be found and send the alert to the requesting client device 1506.

However, if the content evaluation system 1005 identifies one or more matching identifiers in the database 1502 that match the identification, in some embodiments, the content evaluation system 1005 may determine if any of the pointers that have a stored association with one of the matching identifiers also has a stored association with a target audience identification in the request 1504. The content evaluation system 1005 may do so by querying the entries in the database 1502 that have a matching identifier to the entity identification (e.g., querying only the entries in the database that have a matching identifier to the entity identification) for target audience identifiers that match the target audience identification in the request 1504.

The content evaluation system 1005 identifies a subset of pointers that are associated with identifiers that match the identification or identifications in the request 1504. For example, the content evaluation system 1005 may identify five entries in the database 1502 that include an identifier for an entity that matches the identification of an entity in the request 1504. The content evaluation system 1005 may scan each of the five entries for a pointer and identify and extract (e.g., retrieve and store in random access memory) the pointers from the entries. In another example, the content evaluation system 1005 may identify four entries in the database 1502 that include an identifier for an entity that matches the identification of the entity in the request 1504 as well as a target audience identifier that matches the target audience identification in the request 1504. The content evaluation system 1005 may scan each of the four entries and identify and extract the pointers from the entries. In this way, the content evaluation system 1005 may filter the pointers in the database 1502 so the content evaluation system 1005 can search the websites that are associated with the entity and, in some cases, the target audience, that are identified in the request 1504.

The content evaluation system 1005 establishes a connection with a server 1508. The server 1508 may be a server, a set of servers, a computer, a tablet, or any other type of computing device that hosts web pages 1510 in a database 1512. The server 1508 may be owned or managed by a group entity with a name that matches the group entity identification in the message 1504. The content evaluation system 1005 may establish the connection with the server 1508 instead of other servers (e.g., server 1520 which may separately store web pages 1522 in a database 1524 that is local to the server 1520) responsive to determining the identified pointers in the database 1502 point to web pages that the server 1508 hosts or stores. The content evaluation system 1005 may establish the connection with the server 1508 by performing a handshake protocol using the pointers as an address to send messages to the server 1508. The content evaluation system 1005 may send a handshaking message 1514 (e.g., a syn message) to the server 1508 and the server 1508 may respond with a corresponding message to establish the connection.

Upon establishing the connection, the content evaluation system 1005 may access (via an application programming interface) the web pages to which the pointers point and that are hosted by the server 1508. The content evaluation system 1005 may access the web pages by requesting the web pages from the server 1508 using the pointers in the request 1504. The server 1508 may receive the request 1504, identify the requested web pages using the pointers as an address to search for the web page in memory, and transmit the requested web pages to the content evaluation system 1005 in one or more messages 1516. Thus, the content evaluation system 1005 may access web pages that are hosted by the server 1508 and that include embedded images that the content evaluation system 1005 can evaluate to calculate performance scores.

When accessing the web pages, the content evaluation system 1005 may access all web pages of a domain using a single pointer or only access individual web pages to which the subset of pointers point. For example, in some embodiments, the content evaluation system 1005 may only store a single pointer for a domain in the database 1502. The content evaluation system 1005 may identify the pointer from the database 1502 and establish a connection with a server that hosts the web page to which the pointer points. The content evaluation system 1005 may request and the server may transmit the web page to the content evaluation system 1005 and the content evaluation system 1005 may use character recognition techniques to scan the web page and identify various links on the web page. The content evaluation system 1005 may select the identified links to receive various web pages on the website from the server and thus access the different web pages that are hosted by the server. In another example, the content evaluation system 1005 may only access the web pages that are directly accessible via the pointers (e.g., the content evaluation system 1005 may not parse the web pages for links to other web pages). For instance, the content evaluation system 1005 may store one or multiple pointers for a particular entity in the database 1502. The content evaluation system 1005 may identify the pointers from the database 1502 and establish a connection with the server that hosts the web pages to which the pointers point. The content evaluation system 1005 may request and the server may transmit only the web pages to which the pointers point to the content evaluation system 1005.

The content evaluation system 1005 retrieves images from the web pages. The content evaluation system 1005 may retrieve the images from the web pages using screen scraping techniques. For example, the content evaluation system 1005 may load the URLs of the different pages of the website and render each of the pages using their URLs. The content evaluation system 1005 may then identify the images on the pages, select the images, and create one or more files that contain the images. The content evaluation system 1005 may store each of the files in random access memory of the content evaluation system 1005 for temporary storage and for quick retrieval. In this way, the content evaluation system 1005 may temporarily retrieve images that an entity has stored on a server for evaluation.

In some embodiments, the content evaluation system 1005 may discard or remove images from memory responsive to the images having an association with a different target audience than the requested target audience or not being associated with the requested target audience. For example, upon retrieving an image from a web page, the content evaluation system 1005 may determine one or more target audiences that are associated with the image. The content evaluation system 1005 may do so by using an object recognition technique on the image by identifying objects or other features of the image (e.g., using a neural network to extract features from the image) and comparing the features to a database (not shown) using a look-up technique and identifying target audiences that have stored associations with the features. The content evaluation system 1005 may identify one or more target audiences for the image from the identified matches. Upon identifying the one or more target audiences for the image, the content evaluation system 1005 may compare identifiers of the identified one or more target audiences to the target audience identification in the request 1504. Responsive to determining there is a match, the content evaluation system 1005 may store the image in memory (e.g., keep the image in random access memory). However, responsive to determining there is not a match, the content evaluation system 1005 may discard (e.g., remove from memory) the image. In this way, the content evaluation system 1005 may only evaluate images that are associated with a particular target audience that is identified in a request, thus minimizing the amount of computer resources that are required to process (e.g., evaluate by executing a machine learning model using the image as an input) the images, which may otherwise require a large amount of resources, particularly when the request involves retrieving and evaluating a large number of images.

In some embodiments, instead of discarding the image responsive to determining the image is not associated with the requested target audience, the content evaluation system 1005 may discard the image responsive to determining the web page from which the image was retrieved is not associated with the requested target audience. For example, upon accessing a web page and/or retrieving an image from the web page, the content evaluation system 1005 may use object recognition techniques and/or natural language processing techniques on the contents of the web page to extract features from the images and/or text on the web page. The content evaluation system 1005 may compare the features to a database (not shown) using a look-up technique and identify target audiences that have stored associations with the features. The content evaluation system 1005 may identify one or more target audiences for the image from the identified matches. Upon identifying the one or more target audiences for the image, the content evaluation system 1005 may compare identifiers of the identified one or more target audiences to the target audience identification in the request 1504. Responsive to determining there is a match, the content evaluation system 1005 may store the image in memory. However, responsive to determining there is not a match, the content evaluation system 1005 may discard the image. In some embodiments, the content evaluation system 1005 may determine the web page is not associated with the target audience identified in the request 1504 prior to retrieving any images from the web page. In such embodiments, the content evaluation system 1005 may avoid retrieving images from the web page altogether. In this way, the content evaluation system 1005 may avoid processing images for web pages that a designated target audience would not visit, thus minimizing the processing resources that may be required to respond to the request 1504.

In some embodiments, the content evaluation system 1005 may identify the target audience for content (e.g., an image, text, or a combination of different types of content) using a machine learning model (e.g., a neural network, support vector machine, random forest, etc.). For example, the content evaluation system 1005 may store a machine learning model that has been trained to predict the target audience for different types of content. The content evaluation system 1005 may input the content into a feature extraction machine learning model to extract features from the content and generate a feature vector from the extracted features. The content evaluation system 1005 may input the feature vector into the machine learning model and execute the machine learning model to obtain a predicted target audience for the content. In some cases, the content evaluation system 1005 may directly input the content into the machine learning model to predict the target audience, depending on the type of content.

The content evaluation system 1005 calculates scores for the images. In some embodiments, the content evaluation system 1005 calculates the scores for the images using one or more machine learning models, in some cases using similar processes to those described above. For example, for each of the retrieved images, the content evaluation system 1005 may extract features from the image by inputting the image into a machine learning model (e.g., a neural network). The content evaluation system 1005 may then generate a feature vector by concatenating the extracted features together or otherwise adding the identifications of the features into separate index values of the feature vector. The content evaluation system 1005 may input the feature vector into a machine learning model (e.g., a neural network trained to output performance scores for a particular target audience, such as the target audience identified in the request 1504) and execute the machine learning model to obtain a performance score for the image. The content evaluation system 1005 may similarly use a series of machine learning models to obtain performance scores for any number of retrieved images from web pages.

In some embodiments, upon obtaining the performance scores for the retrieved images, the content evaluation system 1005 may determine how the performance scores compare to a benchmark or threshold (e.g., a stored benchmark or threshold associated with the target audience identified in the request 1504). The benchmark or threshold may be the same as or similar to the benchmark described above. The content evaluation system 1005 may retrieve the benchmark or threshold from memory. In some embodiments, the content evaluation system 1005 may retrieve the benchmark or threshold responsive to determining the benchmark or threshold has a stored association with a target audience identifier that matches the target audience identification in the request 1504. The content evaluation system 1005 may compare the performance scores to the benchmark or threshold to determine differences between the performance scores and the benchmark or threshold. In this way, the content evaluation system 1005 may determine how images for different web pages may perform for a particular target audience as compared with other images on the Internet.

In some embodiments, the content evaluation system 1005 may determine how images that are on web pages of a particular entity may perform in the aggregate. For example, the content evaluation system 1005 may maintain a counter for a request. The counter may indicate a count of the number of images that have performance scores below the threshold or benchmark as described above. After calculating performance scores and comparing the performance scores to a threshold or benchmark, the content evaluation system 1005 may increment the counter for each image that has a performance score below the benchmark or threshold. In some embodiments, the content evaluation system 1005 may additionally or instead maintain and increment a counter for each image with a performance score above the threshold or benchmark. The content evaluation system 1005 may then generate a record 1518 that identifies the count or counts and that includes the identifier of the entity from the request 1504 and transmit the record 1518 to the client device 1506. By doing so, the content evaluation system 1005 may evaluate images on web pages that are hosted by servers of a particular entity to give a holistic overview of how the images would perform with users and, in some embodiments, a particular target audience.

In some embodiments, the content evaluation system 1006 calculates weighted aggregate scores for web pages hosted by individual entities or for the individual entities (e.g., the websites hosted by the individual entities). The content evaluation system 1006 may do so, for example, by assigning weights to the individual images on the web pages or a single web page (e.g., a product page) of an entity. The weights can be assigned based on a user input or can be assigned by the content evaluation system 1006 based on the types of the images. For instance, hero images may be weighted higher than other images. In some instances, the content evaluation system 1006 can automatically assign weights to images based on characteristics of the images, such as the size (e.g., relative size compared to the size of the web page on which the image is presented or compared to sizes of other images presented on the same web page or web pages of the entity) of the image, the composition of the web page, the order of the images in which the images are shown on the web page, etc. The content evaluation system 1006 can calculate a weighted sum of the count of images with performance scores that exceed the threshold or benchmark based on such assigned weights. In doing so, the content evaluation system 1006 can determine a score for individual entities associated with (e.g., hosting) the web pages containing the images and/or the individual web pages. The content evaluation system 1006 can generate the record 1518 with the count, counts, and/or weighted sum. The content evaluation system 1006 can also generate the record to include the identifier of the entity from the request 1504. The content evaluation system 1006 can transmit the record 1518 to the client device 1506.

The content evaluation system 1005 can identify a score for an image. The content evaluation system 1005 may identify the score for an image by identifying the stored association between the image and the score in memory. The content evaluation system 1005 determines whether the score for the image is less than a threshold (e.g., a predefined threshold stored in memory, such as the threshold or benchmark described above). The content evaluation system 1005 may determine whether the score is less than the threshold by comparing the score to the threshold. If the content evaluation system 1005 determines the score is less than the threshold, the content evaluation system 1005 may add the image to a list (e.g., a list of images with a score below the threshold for the request 1504). The content evaluation system 1005 may add the image to the list by storing the image in memory (e.g., random access memory), generating a string pointer that points to the image's location in memory, and storing the string pointer (and, in some cases, the performance score for the image) in a separate list from the database. Thus, the content evaluation system 1005 may create a list of images that have been flagged by the content evaluation system 1005 as having a low performance score, potentially signifying the images on the list may need to be replaced or transformed as described herein.

The content evaluation system 1005 determines if the image is the last image that has been retrieved in response to the request 1504. The content evaluation system 1005 may determine if the image is the last image by searching memory for scores that have not been compared with the threshold yet and/or for further retrieved images. If the content evaluation system 1005 identifies a retrieved image or determined score that has not yet been evaluated, the content evaluation system 1005 may repeat the above operations adding any images that have been flagged as being below the threshold to the list as the content evaluation system 1005 performs the operations.

If the content evaluation system 1005 determines an image is the last image that was retrieved based on the request 1504, the content evaluation system 1005 removes the retrieved images from memory. The content evaluation system 1005 may remove the images from memory by retrieving the images from memory and deleting, or otherwise discarding, the images. By doing so, the content evaluation system 1005 may avoid storing the images and using memory resources to store images to respond to a single request.

The content evaluation system 1005 generates a record 1518 (e.g., a file, document, table, listing, message, notification, etc.). The content evaluation system 1005 may generate the record 1518 by including the images (or strings identifying the images) and/or the calculated performance scores for the images in the record 1518. In some embodiments, the content evaluation system 1005 may retrieve the images from the generated list of images with performance scores below the threshold and include identifiers of the images from the list in the record 1518. The content evaluation system 1005 may also include an indication that the performance scores for such images are below the threshold. In such embodiments, the content evaluation system 1005 may include a recommendation in the record 1518 to replace the images from the list with new images to improve the performance scores of the images on the web pages. In some embodiments, when including a recommendation in the record 1518 to replace images from the list with new images, the content evaluation system 1005 may identify, from a database (not shown) stored in memory, an image that has a stored association with a performance score above the threshold and/or a second threshold, and include a recommendation to replace the first image with the second image responsive to the second image having a stored association with a performance score above the threshold and/or the second threshold. In some embodiments, the content evaluation system 1005 may further identify the second image in response to the second image having a stored association with a target audience identification that matches the target audience identifier in the request 1504. The content evaluation system 1005 may transmit the generated record 1518 to the client device 1506 that transmitted the identifier of the entity to the content evaluation system 1005. In this way, the content evaluation system 1005 may use selective web crawling techniques to provide users with real-time insights into how images on different websites may perform with users while avoiding using memory resources to store the images themselves.

In some embodiments, the content evaluation system 1005 may generate the record 1518 by generating a user interface that illustrates the retrieved images and the calculated performance scores for the images. For example, the content evaluation system 1005 may display the retrieved images on a user interface with the performance scores below the respective images. The content evaluation system 1005 may generate the user interface and transmit the user interface to the client device 1506 that sent the request 1504 to cause the client device 1506 to present the user interface to a user.

In some embodiments, the content evaluation system 1005 may organize the images and performance scores in the record 1518 based on the web pages from which the content evaluation system 1005 retrieved the images. For example, the content evaluation system 1005 may generate a user interface with tabs that are dedicated to different web pages from which the content evaluation system 1005 retrieved the images. As described herein, a tab may be or include a virtual selectable button. The content evaluation system 1005 may generate the user interface by including images from the web pages in the respective tabs such that a user may select the individual tabs to cause the images that were retrieved from the web page associated with the tab to be displayed on the user interface. In some embodiments, responsive to receiving a selection of such a tab, the content evaluation system 1005 may cause images that were retrieved from other web pages to disappear from the user interface. In this way, the content evaluation system 1005 may enable users to view the performance scores for individual web pages to easily determine which web pages need to be revamped and which web pages have the highest performing images.

In some embodiments, the content evaluation system 1005 may include scores for web pages themselves in the record 1518. For example, the content evaluation system 1005 may store associations between the images that the content evaluation system 1005 retrieves and the pointers or other identifiers of the web pages from which the content evaluation system 1005 retrieved the respective images. The content evaluation system 1005 may identify the scores of the images that have a stored association with the same or a common web page and calculate an average, median, sum, and/or perform any other operation on the performance scores to obtain a value or set of values. The content evaluation system 1005 may store an association between the value or set of values and the pointer for the web page in memory and include the value or set of values in the record 1518 with an indication that the value or set of values corresponds to the web page. Accordingly, the content evaluation system 1005 may provide a user with an indication of how the different web pages would perform, in some cases with a particular target audience.

FIG. 16 is a flow diagram illustrating a method 1600 for image scoring using selective web crawling in accordance with an illustrative embodiment. In some implementations, the method 1600 can be performed by a data processing system such as any of the components of the system 1000 shown in FIG. 10. The method 1600 may include more or fewer operations and the operations may be performed in any order. Performance of the method 1600 may enable the data processing system to generate real-time performance scores for images on web pages without storing all of the images for the web pages in memory or continuously updating a locally stored database as images are removed or added to the web pages. For example, the data processing system may store a database with pointers to different web pages and associations between the web pages and identifiers of different entities (e.g., group entities, such as companies or organizations). The data processing system may receive a request that includes an identification of an entity and compare the identification to the database. The data processing system may identify pointers to web pages that have a stored association with an identification that matches the identifier and retrieve images from the servers that host the web pages. The data processing system may calculate performance scores for the retrieved images and transmit the performance scores to the requesting device. Thus, the data processing system may provide a real-time view into the performance scores for images on web pages without storing local copies of the web pages or the images.

At operation 1602, the data processing system stores a database comprising a plurality of pointers. The database may be or include a relational database that stores pointers and identifications of entities (e.g., group entities) in separate database entries (e.g., rows in the database). The pointers may be uniform resource locators (e.g., URLs) that the data processing system can use to access web pages that are associated with the respective URLs. Each pointer in the database may have a stored association (e.g., a stored relationship, such as being stored in the same entry) in the database with an identification of an entity that owns or manages the web page associated with the pointer. Individual identifications of entities may have one or more multiple stored associations with different web pages, depending on the number of web pages the respective entities own or manage. The data processing system may use the pointers to establish connections with servers that host various websites to retrieve the images that are stored on the websites.

In some embodiments, the data processing system may store target audience identifications in the database. Target audience identifications can be string identifications of target audiences. The data processing system may store the target audience identifications with stored associations with the respective web pages or websites in the database. As described in more detail above, target audiences may be associated with web pages or websites if users that fall within the target audience typically view or follow the particular subject matter of the respective web pages or websites (e.g., a website may appeal to individuals are interested in camping or sports).

The data processing system may update the database with new pointers or entity identifications over time. For example, in some embodiments, servers that are owned or managed by entities may transmit indications (e.g., pointers) of new web pages on which the servers have added images or that include images to the data processing system and, in some cases, identifications of the group entities that own or manage the web pages. The data processing system may receive the indications and update the database with pointers to the new web pages as well as the identifications. In another example, in some embodiments, the data processing system may scrape different web pages on the Internet and identify any web pages with images that do not have corresponding pointers in the database. To do so, upon identifying a web page with an image, the data processing system may determine if there is a pointer to the web page in the database by comparing the address of the web page to the database and determining if there is a match. If there is a match, the data processing system may not add the address to the web page and scrape another web page. However, if there is not a match, the data processing system may retrieve an identification of the group entity that owns or manages the web page (e.g., retrieve the identification of the group entity by identifying the identification using object recognition techniques on the web page and identifying a name of the owner of the web page or request the identification form the server hosting the website) and add the address and/or the identification of the group entity that owns or manages the web page to the database. In this way, the data processing system may update the database to maintain a real-time view into images on different web pages without using memory resources to store the images themselves.

At operation 1604, the data processing system receives a request. The data processing system may receive the request from a computing device or a client device. The request may be or include a data packet that includes an identifier of an entity. The entity may be a group or an individual entity that owns or manages one or more websites or web pages. The request may be a request for the data processing system to retrieve images from the web pages that the entity owns or manages and to calculate performance scores (e.g., scores indicating how likely users would be to interact with the images if they were viewing the images on a web page) for the images. For example, the data processing system may receive a request that includes a string identifying "Company A." The request may be a request for performance scores for the images that Company A has posted on the web pages that a server owned or managed by Company A hosts.

In some embodiments, the request includes a target audience identifier. The target audience identifier may be a string that indicates a target audience for which the requesting computing device or client device is requesting performance scores. For example, the request may include a string identifying Company A and a string identifying a "sports" target audience. In this example, the request may be a request for performance scores for the images that Company A has posted on web pages that are associated with the sports target audience and that a server owned by Company A hosts.

At operation 1606, the data processing system determines if there is an identifier in the database that matches the identification in the request. For example, the data processing system may store multiple identifiers for entities in the database that are associated with different entities. The data processing system may query entries in the database using the identification from the request as a key. If the data processing system is not able to identify any identifiers in the database that match the identification, the data processing system may generate an alert indicating no match could be found and send the alert to the requesting device. In this case, the data processing system may stop performing method 1600.

However, if the data processing system identifies one or more matching identifiers in the database that match the identification, in some embodiments, at operation 1608, the data processing system may determine if any of the pointers that have a stored association with one of the matching identifiers also has a stored association with a target audience identification in the request. The data processing system may do so by querying the entries in the database that have a matching identifier to the entity identification (e.g., querying only the entries in the database that have a matching identifier to the entity identification) for target audience identifiers that match the target audience identification in the request.

At operation 1610, the data processing system identifies a subset of pointers that are associated with identifiers that match the identification or identifications in the request. For example, at operation 1606, the data processing system may identify five entries in the database that include an identifier for an entity that matches the identification of an entity in the request. The data processing system may scan each of the five entries for a pointer and identify and extract (e.g., retrieve and store in random access memory) the pointers from the entries. In another example, at operation 1608, the data processing system may identify four entries in the database that include an identifier for an entity that matches the identification of the entity in the request as well as a target audience identifier that matches the target audience identification in the request. The data processing system may scan each of the four entries and identify and extract the pointers from the entries. In this way, the data processing system may filter the pointers in the database so the data processing system can search the websites that are associated with the entity and, in some cases, the target audience, that are identified in the request.

At operation 1612, the data processing system establishes a connection with a server. The server may be a server that hosts the web pages to which the identified subset of pointers point. The data processing system may establish the connection with the server by performing a handshake protocol using the pointers as an address to send messages to the server. The data processing system may send a handshaking message (e.g., a syn message) to the server and the server may respond with a corresponding message to establish the connection.

Upon establishing the connection, at operation 1614, the data processing system may access the web pages to which the pointers point and that are hosted by the server. The data processing system may access the web pages by requesting the web pages from the server using the pointers in the request. The server may receive the request, identify the requested web pages using the pointers as an address to search for the web page in memory, and transmit the requested web pages to the data processing system. Thus, the data processing system may access web pages that are hosted by the server and that include embedded images that the data processing system can evaluate to calculate performance scores.

When accessing the web pages, the data processing system may access all web pages of a domain using a single pointer or only access individual web pages to which the subset of pointers point. For example, in some embodiments, the data processing system may only store a single pointer for a domain in the database. The data processing system may identify the pointer in operations 1602-1610 and establish a connection with a server that hosts the web page to which the pointer points. The data processing system may request and the server may transmit the web page to the data processing system and the data processing system may use character recognition techniques to scan the web page and identify various links on the web page. The data processing system may select the identified links to receive various web pages on the website from the server and thus access the different web pages that are hosted by the server. In another example, the data processing system may only access the web pages that are directly accessible via the pointers (e.g., the data processing system may not parse the web pages for links to other web pages). For instance, the data processing system may store one or multiple pointers for a particular entity. The data processing system may identify the pointers in operations 1602-1610 and establish a connection with the server that hosts the web pages to which the pointers point. The data processing system may request and the server may transmit only the web pages to which the pointers point to the data processing system.

At operation 1616, the data processing system retrieves images from the web pages. The data processing system may retrieve the images from the web pages using screen scraping techniques. For example, the data processing system may load the URLs of the different pages of the website and render each of the pages using their URLs. The data processing system may then identify the images on the pages, select the images, and create one or more files that contain the images. The data processing system may store each of the files in random access memory of the data processing system for temporary storage and for quick retrieval. In this way, the data processing system may temporarily retrieve images that an entity has stored on a server for evaluation.

In some embodiments, the data processing system may discard or remove images from memory responsive to the images having an association with a different target audience than the requested target audience or not being associated with the requested target audience. For example, upon retrieving an image from a web page, the data processing system may determine one or more target audiences that are associated with the image. The data processing system may do so by using an object recognition technique on the image by identifying objects or other features of the image (e.g., using a neural network to extract features from the image) and comparing the features to a database using a look-up technique and identifying target audiences that have stored associations with the features. The data processing system may identify one or more target audiences for the image from the identified matches. Upon identifying the one or more target audiences for the image, the data processing system may compare identifiers of the identified one or more target audiences to the target audience identification in the request. Responsive to determining there is a match, the data processing system may store the image in memory. However, responsive to determining there is not a match, the data processing system may discard (e.g., remove from memory) the image. In this way, the data processing system may only evaluate images that are associated with a particular target audience that is identified in a request, thus minimizing the amount of computer resources that are required to process (e.g., evaluate by executing a machine learning model using the image as an input) the images, which may otherwise require a large amount of resources, particularly when the request involves retrieving and evaluating a large number of images.

In some embodiments, instead of discarding the image responsive to determining the image is not associated with the requested target audience, the data processing system may discard the image responsive to determining the web page from which the image was retrieved is not associated with the requested target audience. For example, upon accessing a web page and/or retrieving an image from the web page, the data processing system may use object recognition techniques and/or natural language processing techniques on the contents of the web page to extract features from the images and/or text on the web page. The data processing system may compare the features to a database using a look-up technique and identify target audiences that have stored associations with the features. The data processing system may identify one or more target audiences for the image from the identified matches. Upon identifying the one or more target audiences for the image, the data processing system may compare identifiers of the identified one or more target audiences to the target audience identification in the request. Responsive to determining there is a match, the data processing system may store the image in memory (e.g., keep the image in random access memory). However, responsive to determining there is not a match, the data processing system may discard the image (e.g., remove the image from memory). In some embodiments, the data processing system may determine the web page is not associated with the target audience identified in the request prior to retrieving any images from the web page. In such embodiments, the data processing system may avoid retrieving images from the web page altogether. In this way, the data processing system may avoid processing images for web pages that a designated target audience would not visit, thus minimizing the processing resources that may be required to respond to the request.

In some embodiments, the data processing system may identify the target audience for content (e.g., an image, text, or a combination of different types of content) using a machine learning model (e.g., a neural network, support vector machine, random forest, etc.). For example, the data processing system may store a machine learning model that has been trained to predict the target audience for different types of content. The data processing system may input the content into a feature extraction machine learning model to extract features from the content and generate a feature vector from the extracted features. The data processing system may input the feature vector into the machine learning model and execute the machine learning model to obtain a predicted target audience for the content. In some cases, the data processing system may directly input the content into the machine learning model to predict the target audience, depending on the type of content.

At operation 1618, the data processing system calculates scores for the images. In some embodiments, the data processing system calculates the scores for the images using one or more machine learning models, in some cases using similar processes to those described above. For example, for each of the retrieved images, the data processing system may extract features from the image by inputting the image into a machine learning model (e.g., a neural network). The data processing system may then generate a feature vector by concatenating the extracted features together or otherwise adding the identifications of the features into separate index values of the feature vector. The data processing system may input the feature vector into a machine learning model (e.g., a neural network trained to output performance scores for a particular target audience, such as the target audience identified in the request) and execute the machine learning model to obtain a performance score for the image. The data processing system may similarly use a series of machine learning models to obtain performance scores for any number of retrieved images from web pages.

In some embodiments, upon obtaining the performance scores for the retrieved images, the data processing system may determine how the performance scores compare to a benchmark or threshold (e.g., a stored benchmark or threshold associated with the target audience identified in the request). The benchmark or threshold may be the same as or similar to the benchmark described above. The data processing system may retrieve the benchmark or threshold from memory. In some embodiments, the data processing system may retrieve the benchmark or threshold responsive to determining the benchmark or threshold has a stored association with a target audience identifier that matches the target audience identification in the request. The data processing system may compare the performance scores to the benchmark or threshold to determine differences between the performance scores and the benchmark or threshold. In this way, the data processing system may determine how images for different web pages may perform for a particular target audience as compared with other images on the Internet.

In some embodiments, the data processing system may determine how images that are on web pages of a particular entity may perform in the aggregate. For example, the data processing system may maintain a counter for a request. The counter may indicate a count of the number of images that have performance scores below the threshold or benchmark as described above. After calculating performance scores and comparing the performance scores to a threshold or benchmark, the data processing system may increment the counter for each image that has a performance score below the benchmark or threshold. In some embodiments, the data processing system may additionally or instead maintain and increment a counter for each image with a performance score above the threshold or benchmark. The data processing system may then generate a record that identifies the count or counts and that includes the identifier of the entity from the request and transmit the record to the client device. By doing so, the data processing system may evaluate images on web pages that are hosted by servers of a particular entity to give a holistic overview of how the images would perform with users and, in some embodiments, a particular target audience.

In some embodiments, the data processing system calculates weighted aggregate scores for web pages hosted by individual entities or for the individual entities (e.g., the websites hosted by the individual entities). The data processing system may do so, for example, by assigning weights to the individual images on the web pages or a single web page (e.g., a product page) of an entity. The weights can be assigned based on a user input or can be assigned by the data processing system based on the types of the images. For instance, hero images may be weighted higher than other images. In some instances, the data processing system can automatically assign weights to images based on characteristics of the images, such as the size (e.g., relative size compared to the size of the web page on which the image is presented or compared to sizes of other images presented on the same web page or web pages of the entity) of the image, the composition of the web page, the order of the images in which the images are shown on the web page, etc. The data processing system can calculate a weighted sum of the count of images with performance scores that exceed the threshold or benchmark based on such assigned weights. In doing so, the data processing system can determine a score for individual entities associated with (e.g., hosting) the web pages containing the images and/or the individual web pages. The data processing system can generate the record with the count, counts, and/or weighted sum. The data processing system can also generate the record to include the identifier of the entity from the request. The content evaluation system can transmit the record to the client device.

At operation 1620, the data processing system identifies a score for an image. The data processing system may identify the score for an image by identifying the stored association between the image and the score in memory. At operation 1622, the data processing system determines whether the score for the image is less than a threshold (e.g., a predefined threshold stored in memory, such as the threshold or benchmark described with reference to operation 1618). The data processing system may determine whether the score is less than the threshold by comparing the score to the threshold. If the data processing system determines the score is less than the threshold, at operation 1624, the data processing system may add the image to a list (e.g., a list of images with a score below the threshold for the request). The data processing system may add the image to the list by storing the image in memory (e.g., random access memory), generating a string pointer that points to the image's location in memory, and storing the string pointer (and, in some cases, the performance score for the image) in a separate list from the database. Thus, the data processing system may create a list of images that have been flagged by the data processing system as having a low performance score, potentially signifying the images on the list may need to be replaced or transformed as described herein.

At operation 1626, the data processing system determines if the image is the last image that has been retrieved in response to the request. The data processing system may determine if the image is the last image by searching memory for scores that have not been compared with the threshold yet and/or for further retrieved images. If the data processing system identifies a retrieved image or determined score that has not yet been evaluated, the data processing system may repeat operations 1620-1626 adding any images that have been flagged as being below the threshold to the list as the data processing system performs the operations.

If the data processing system determines the image is the last image at operation 1626, at operation 1628, the data processing system removes the retrieved images from memory. The data processing system may remove the images from memory by retrieving the images from memory and deleting, or otherwise discarding, the images. By doing so, the data processing system may avoid storing the images and using memory resources to store images to respond to a single request.

At operation 1630, the data processing system generates a record (e.g., a file, document, table, listing, message, notification, etc.). The data processing system may generate the record by including the images (or strings identifying the images) and/or the calculated performance scores for the images in the record. In some embodiments, the data processing system may retrieve the images from the generated list of images with performance scores below the threshold and include identifiers of the images from the list in the record. The data processing system may also include an indication that the performance scores for such images are below the threshold. In such embodiments, the data processing system may include a recommendation in the record to replace the images from the list with new images to improve the performance scores of the images on the web pages. In some embodiments, when including a recommendation in the record to replace images from the list with new images, the data processing system may identify, from a database stored in memory, an image that has a stored association with a performance score above the threshold and/or a second threshold, and include a recommendation to replace the first image with the second image responsive to the second image having a stored association with a performance score above the threshold and/or the second threshold. In some embodiments, the data processing system may further identify the second image in response to the second image having a stored association with a target audience identification that matches the target audience identifier in the request. The data processing system may transmit the generated record to the client device or computing device that transmitted the identifier of the entity to the data processing system. In this way, the data processing system may use selective web crawling techniques to provide users with real-time insights into how images on different websites may perform with users while avoiding using memory resources to store the images themselves.

In some embodiments, the data processing system may generate the record by generating a user interface that illustrates the retrieved images and the calculated performance scores for the images. For example, the data processing system may display the retrieved images on a user interface with the performance scores below the respective images. The data processing system may generate the user interface and transmit the user interface to the client device that sent the request to cause the client device to present the user interface to a user.

In some embodiments, the data processing system may organize the images and performance scores in the record based on the web pages from which the data processing system retrieved the images. For example, the data processing system may generate a user interface with tabs that are dedicated to different web pages from which the data processing system retrieved the images. As described herein, a tab may be or include a virtual selectable button. The data processing system may generate the user interface by including images from the web pages in the respective tabs such that a user may select the individual tabs to cause the images that were retrieved from the web page associated with the tab to be displayed on the user interface. In some embodiments, responsive to receiving a selection of such a tab, the data processing system may cause images that were retrieved from other web pages to disappear from the user interface. In this way, the data processing system may enable users to view the performance scores for individual web pages to easily determine which web pages need to be revamped and which web pages have the highest performing images.

In some embodiments, the data processing system may include scores for web pages themselves in the record. For example, the data processing system may store associations between the images that the data processing system retrieves and the pointers or other identifiers of the web pages from which the data processing system retrieved the respective images. The data processing system may identify the scores of the images that have a stored association with the same or a common web page and calculate an average, median, sum, and/or perform any other operation on the performance scores to obtain a value or set of values. The data processing system may store an association between the value or set of values and the pointer for the web page in memory and include the value or set of values in the record with an indication that the value or set of values corresponds to the web page. Accordingly, the data processing system may provide a user with an indication of how the different web pages would perform, in some cases with a particular target audience.

In some embodiments, the data processing system may receive a request for scores for images of a particular product. For example, the data processing system may receive a request for performance scores for images of product A on Company B's web pages (e.g., a request comprising an identifier of product A and an identifier of Company B). The data processing system may receive the request and retrieve the web pages that are owned or managed by Company B as described herein. The data processing system may scan the images on the web pages and use object recognition techniques on the images to determine if the images contain product A. The data processing system may retrieve any images that have been identified as containing the product A, determine scores for the images or web pages containing the images (or any other metric as described herein), and generate and transmit a record with the scores and images to the requesting device. In this way, the data processing system may further filter the images that need to be evaluated to minimize the amount of computing resources that are needed to calculate scores to respond to the request.

In some embodiments, the data processing system may provide scores for images of products based on the products themselves instead of based on the owning or managing group entity of the server that hosts the web pages that include the products. For example, the data processing system may store identifications of products and pointers to web pages with images of the products. Multiple group entities may store or manage the images of the products, so the images may be stored on multiple servers or servers owned by different entities. The data processing system may receive a request for scores of images of the products and retrieve the web pages using the pointers in the database that have stored associations between the product identification and the pointers. The data processing system may calculate scores for the images and generate and transmit a record to the requesting device with the scores and/or web pages containing the images as described herein. Accordingly, the data processing system may selectively evaluate images to provide users with a view of how images on the Internet with users.

Figure 17:
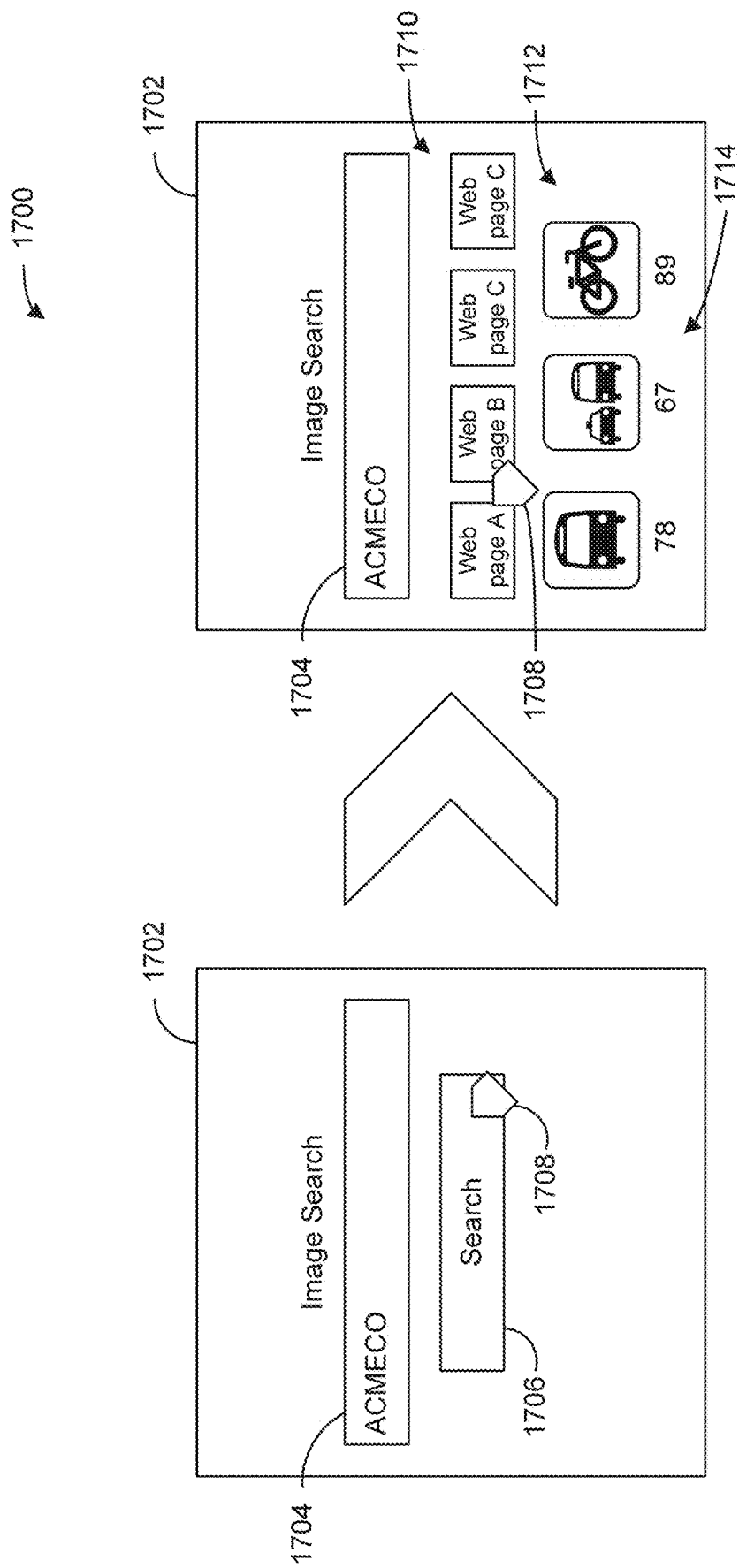
FIG. 17 is a sequence diagram illustrating a user interface that is updated according to the operations of the method described with respect to FIG. 16 in accordance with an illustrative embodiment.

FIG. 17 is a sequence diagram of a sequence 1700 illustrating a user interface 1702 that is updated according to the operations of the method described with respect to FIG. 16 in accordance with an illustrative embodiment. In the sequence 1700, a user may access the user interface 1702 via a client device that has connected with a data processing system (e.g., the data processing system described with respect to FIG. 16) that hosts the user interface 1702. The user may input an identifier (e.g., a name) of a group entity into a search bar 1704 on user interface 1702, in some cases after selection of the search bar 1704. After inputting the identifier, the user may select a search button 1706, in some cases with a cursor 1708. The selection may cause the user's client device to transmit the identifier of the group entity to the data processing system and, in some cases, an indication that the search button 1706 was selected. The data processing system may receive the identifier and/or indication that the search button was selected and perform the operations 1604-1630 of FIG. 16 to retrieve images from web pages that are hosted by the group entity (e.g., hosted on a server owned or managed by the group entity) and calculate scores for the images.

After calculating the scores for the entity, the data processing system may update the user interface 1702 (or generate and replace the user interface 1702 with a new user interface) and transmit the updated user interface 1702 to the client device of the user. As described herein, the updated user interface 1702 may be a record that the data processing system generates. As illustrated, the updated user interface 1702 may include tabs 1710 for different web pages that are hosted by the group entity, images 1712 that were retrieved on the web pages, and scores 1714 for the respective images. The images 1712 may be images for a particular web page that is identified or associated with one of the tabs 1710. Via the user interface 1702, and in some cases with the cursor 1708, the user may select different tabs of the tabs 1710 to view images that were retrieved from the web pages that correspond to the respective tabs and scores for the respective images. In some embodiments, selecting a tab may cause a score that the data processing system calculated for the web page (e.g., an average of the performance scores of images on the web page or another calculated value) to appear on the user interface 1702.

In some embodiments, the data processing system may cause other information that the data processing system calculated for the images to appear on the updated user interface 1702. For example, the data processing system may include indications of the differences between the performance scores of the images and a benchmark on the user interface 1702. The data processing system may include a separate tab that a user may select to view a list of images to consider replacing for having a performance score below a threshold or benchmark on the user interface 1702. In some embodiments, the data processing system may also include recommendations of images to use to replace the images on the user interface 1702.

In some embodiments, the user interface 1702 may enable a user to compare performance scores for two different group entities. For example, the user interface 1702 may include two search bars 1704. A user may input different group identifiers in search bars 1704 and select the search button 1706. Upon selecting search button 1706, the client device presenting user interface 1702 may transmit a message with the identifiers of the two different group entities to the data processing system. The data processing system may perform the operations 1604-1630 of FIG. 16 to retrieve images from web pages that are hosted by the two group entities and calculate scores for the images. The data processing system may then transmit the images and scores back to the client device in the updated user interface 1702 but with an added tab that enables the user to select and view images for the group entities, thereby enabling the user to view how the images for the group entities compare with each other.

In an illustrative embodiment, any of the operations described herein can be implemented at least in part as computer-readable instructions stored on a computer-readable medium or memory. Upon execution of the computer-readable instructions by a processor, the computer-readable instructions can cause a computing device to perform the operations.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A system comprising:
    a processor having programmed instructions to:
    identify a plurality of content items and a performance metric for each of the plurality of content items;
    extract, using a neural network, one or more features from each of the plurality of content items;
    compare a set of features of a candidate content item with the one or more features of each of the plurality of content items;
    determine a subset of the plurality of content items that are relevant to the candidate content item based on the comparison between the set of features of the candidate content item and the one or more features of each of the plurality of content items;
    generate a score for the candidate content item based on the performance metric for each of the subset of the plurality of content items;
    determine a subset of the set of features of the candidate content item that each correspond with a decrease or increase in the score for the candidate content item; and
    generate a record identifying the subset of the set of features to a graphical user interface (GUI).

2. The system of claim 1, wherein the processor is further programmed with instructions to:
    generate a data file including information corresponding to the determination of the subset of the candidate content item that each correspond with a decrease or increase in the score for the candidate content item; and
    store the data file in one or more data structures.

3. The system of claim 2, wherein the processor is further programmed with instructions to provide a message to a user associated with the candidate content item, the message including the information corresponding to the determination of the subset of the candidate content item that each correspond with a decrease or increase in the score for the candidate content item.

4. The system of claim 3, wherein the processor is further programmed with instructions to provide the GUI for display on a computing device, wherein the message is provided via the GUI displayed on a user computing device.

5. The system of claim 4, wherein the processor is further programmed with instructions to provide the GUI via at least one of an extension of a web browser executing on the user computing device and a client application executing on a client computing device.

6. The system of claim 1, wherein the processor is further programmed with instructions to:
    receive at least a second candidate content item;
    generate a second score for the second candidate content item; and
    rank the candidate content item and the second candidate content item according to their respective scores.

7. The system of claim 6, wherein the processor is further programmed with instructions to generate the second score for the second candidate content item based on the performance metric and a target audience.

8. The system of claim 6, wherein the processor is further programmed with instructions to generate a second message to the GUI, the second message including information corresponding to the ranking of the candidate content item and the second candidate content item.

9. The system of claim 1, wherein the performance metric comprises a uniqueness metric or an engagement metric.

10. The system of claim 1, wherein the processor is further programmed with instructions to select a transformation for the candidate content item to make at least one characteristic of the candidate content item more like the at least one characteristic of a first content item of the subset of the plurality of content items that is ranked more highly than a second content item of the subset of the plurality of content items.

11. The system of claim 10, wherein the processor is further programmed with instructions to adjust the candidate content item according to the selected first transformation to generate a transformed content item.

12. The system of claim 11, wherein the processor is further programmed with instructions to determine an intensity associated with the selected transformation prior to applying the selected transformation to the candidate content item.

13. The system of claim 1, wherein the processor is further programmed with instructions to generate the score for the candidate content item based on a first target audience, and generate a second score for the candidate content item based on a second target audience.

14. The system of claim 1, wherein the one or more processors determine the subset of the set of features of the candidate content item by:
  determining the subset such that each feature of the subset corresponds with a decrease in the score for the candidate content item or each feature corresponds with an increase in the score for the candidate content item.

15. The system of claim 1, wherein the one or more processors generate the record by:
  storing, in the record, the set of features of the candidate content item in the record as or with one or more of a feature embedding, RGB color values of candidate content item, an amount of whitespace in the candidate content item, or textual features describing aspects of the candidate content item.

16. A system comprising:
  a processor having programmed instructions to:
    identify a plurality of content items and a performance metric for each of the plurality of content items;
    extract, using a neural network, one or more features from each of the plurality of content items;
    compare a set of features of a candidate content item with the one or more features of each of the plurality of content items;
    generate a score for the candidate content item;
    determine a subset of the set of features of the candidate content item that each correspond with a decrease or increase in the score for the candidate content item based on the comparison and the performance metric for each of the subset of the plurality of content items; and
    generate a record identifying the subset of the set of features to a user interface.

17. The system of claim 16, wherein the performance metric comprises a uniqueness metric or an engagement metric.

18. The system of claim 16, wherein the processor is further programmed with instructions to select a transformation for the candidate content item to make at least one characteristic of the candidate content item more like the at least one characteristic of a first content item of the subset of the plurality of content items that is ranked more highly than a second content item of the subset of the plurality of content items.

19. The system of claim 18, wherein the processor is further programmed with instructions to adjust the candidate content item according to the selected first transformation to generate a transformed content item.

20. One or more non-transitory computer-readable media comprising instructions that, when executed by one or more processors, cause the one or more processors to:
  identify a plurality of content items and a performance metric for each of the plurality of content items;
  extract, using a neural network, one or more features from each of the plurality of content items;
  compare a set of features of a candidate content item with the one or more features of each of the plurality of content items;
  determine a subset of the plurality of content items that are relevant to the candidate content item based on the comparison between the set of features of the candidate content item and the one or more features of each of the plurality of content items;
  generate a score for the candidate content item based on the performance metric for each of the subset of the plurality of content items;
  determine a subset of the set of features of the candidate content item that each correspond with a decrease or increase in the score for the candidate content item; and
  generate a record identifying the subset of the set of features to a graphical user interface (GUI).

21. The one or more non-transitory computer-readable media of claim 20, wherein the performance metric comprises a uniqueness metric or an engagement metric.

22. The one or more non-transitory computer-readable media of claim 20, wherein execution of the instructions further causes the processor to select a transformation for the candidate content item to make at least one characteristic of the candidate content item more like the at least one characteristic of a first content item of the subset of the plurality of content items that is ranked more highly than a second content item of the subset of the plurality of content items.

23. The one or more non-transitory computer-readable media of claim 22, wherein execution of the instructions further causes the processor to adjust the candidate content item according to the selected first transformation to generate a transformed content item.

* * * * *